US008587573B2

(12) United States Patent
Watanabe et al.

(10) Patent No.: US 8,587,573 B2
(45) Date of Patent: Nov. 19, 2013

(54) DRIVE CIRCUIT AND DISPLAY DEVICE

(75) Inventors: Toshio Watanabe, Osaka (JP); Shinsuke Anzai, Osaka (JP); Yoshihiro Nakatani, Osaka (JP); Hiroaki Fujino, Osaka (JP); Hirofumi Matsui, Osaka (JP); Masami Mori, Osaka (JP); Kohichi Hosokawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 507 days.

(21) Appl. No.: 12/735,930

(22) PCT Filed: Feb. 5, 2009

(86) PCT No.: PCT/JP2009/051987

§ 371 (c)(1),
(2), (4) Date: Oct. 5, 2010

(87) PCT Pub. No.: WO2009/107469

PCT Pub. Date: Sep. 3, 2009

(65) Prior Publication Data

US 2011/0199355 A1 Aug. 18, 2011

(30) Foreign Application Priority Data

Feb. 28, 2008 (JP) ................................ 2008-048639
Feb. 28, 2008 (JP) ................................ 2008-048640
Mar. 4, 2008 (JP) ................................ 2008-054130

(51) Int. Cl.
*G06F 3/038* (2013.01)

(52) U.S. Cl.
USPC ............... 345/211; 345/204; 345/93; 345/98; 345/99; 345/100

(58) Field of Classification Search
USPC .............................. 345/204, 211, 93, 98–100
See application file for complete search history.

(56) References Cited

U.S. PATENT DOCUMENTS 5,465,053 A 11/1995 Edwards
5,631,698 A 5/1997 Lee (Continued)

FOREIGN PATENT DOCUMENTS

CN 1112674 6/2003
JP 1-225996 9/1989

(Continued)

OTHER PUBLICATIONS

U.S. Office Action dated Apr. 20, 2012, issued in co-pending U.S. Appl. No. 12/225,182.

(Continued)

*Primary Examiner* — Bipin Shalwala
*Assistant Examiner* — Afroza Chowdhury
(74) *Attorney, Agent, or Firm* — Harness, Dickey & Pierce, P.L.C.

(57) ABSTRACT

A driving circuit of at least one embodiment includes: m output terminals; m+1 video signal output sections including m+1 output circuits, respectively; a decision section for determining the quality of each of the video signal output sections; and switches for switching connections between the output terminals and the video signal output sections in accordance with a result of determination made by the decision section. When the decision section has determined the ith (i being a natural number of m or less) video signal output section to be defective, the switches connect the jth (j being a natural number of i−1 or less) video signal output section to the jth output terminal and connect the (k+1)th (k being a natural number of i or more to m or less) video signal output section to the kth output terminal. Thus provided is a driving circuit, capable of self-repairing a defective one of the video signal output sections, which has more simplified wires connected to the video signal output sections.

21 Claims, 59 Drawing Sheets

(56) References Cited

U.S. PATENT DOCUMENTS

| | | | | |
|---|---|---|---|---|
| 5,664,053 | A | 9/1997 | Laflamme et al. | |
| 5,859,627 | A | 1/1999 | Hoshiya et al. | |
| 5,923,512 | A | 7/1999 | Brownlow et al. | |
| 5,926,156 | A | 7/1999 | Katoh et al. | |
| 5,956,008 | A | 9/1999 | Kawasaki et al. | |
| 5,995,073 | A | 11/1999 | Isami et al. | |
| 6,166,725 | A | 12/2000 | Isami et al. | |
| 6,492,802 | B1 | 12/2002 | Bielski | |
| 6,707,437 | B1 | 3/2004 | Kuno et al. | |
| 6,809,541 | B2 * | 10/2004 | Bu et al. | 324/750.02 |
| 6,816,143 | B1 | 11/2004 | Lambert | |
| 7,138,975 | B2 | 11/2006 | Koyama | |
| 7,190,338 | B2 | 3/2007 | Kubota et al. | |
| 7,280,090 | B2 | 10/2007 | Keeney et al. | |
| 7,474,290 | B2 * | 1/2009 | Makuuchi et al. | 345/87 |
| 2002/0011971 | A1 | 1/2002 | Hamamoto et al. | |
| 2002/0030656 | A1 | 3/2002 | Goto et al. | |
| 2002/0041278 | A1 | 4/2002 | Matsueda | |
| 2002/0075214 | A1 | 6/2002 | Kim | |
| 2002/0075248 | A1 | 6/2002 | Morita et al. | |
| 2002/0075249 | A1 | 6/2002 | Kubota et al. | |
| 2002/0113766 | A1 | 8/2002 | Keeney et al. | |
| 2003/0063077 | A1 | 4/2003 | Koyama | |
| 2004/0090435 | A1 | 5/2004 | Kim | |
| 2005/0024512 | A1 * | 2/2005 | Moini et al. | 348/294 |
| 2005/0024971 | A1 | 2/2005 | Lambert | |
| 2005/0025197 | A1 | 2/2005 | Yu | |
| 2005/0077957 | A1 | 4/2005 | Kasai et al. | |
| 2005/0110738 | A1 | 5/2005 | Kim et al. | |
| 2005/0122300 | A1 | 6/2005 | Makuuchi et al. | |
| 2006/0125754 | A1 | 6/2006 | Rao et al. | |
| 2006/0181645 | A1 | 8/2006 | Sarika | |
| 2006/0192737 | A1 | 8/2006 | Goto et al. | |
| 2006/0226899 | A1 | 10/2006 | Kasai et al. | |
| 2007/0070061 | A1 | 3/2007 | Koyama | |
| 2007/0085809 | A1 | 4/2007 | Wei et al. | |
| 2007/0085963 | A1 | 4/2007 | Huang et al. | |
| 2008/0111773 | A1 | 5/2008 | Tsuge | |
| 2008/0122987 | A1 | 5/2008 | Chang et al. | |
| 2008/0231573 | A1 | 9/2008 | Goto et al. | |
| 2008/0252369 | A1 | 10/2008 | Kasai et al. | |
| 2008/0303577 | A1 | 12/2008 | Higuchi | |
| 2010/0225635 | A1 * | 9/2010 | Murahashi et al. | 345/213 |
| 2011/0254822 | A1 * | 10/2011 | Anzai et al. | 345/211 |
| 2012/0194740 | A1 | 8/2012 | Chang et al. | |
| 2012/0223904 | A1 * | 9/2012 | Arnold et al. | 345/173 |

FOREIGN PATENT DOCUMENTS

| | | |
|---|---|---|
| JP | 3-296714 | 12/1991 |
| JP | 6-208346 | 7/1994 |
| JP | 6-324651 | 11/1994 |
| JP | 8-76723 | 3/1996 |
| JP | 08-184804 | 7/1996 |
| JP | 08-185144 | 7/1996 |
| JP | 8-202320 | 8/1996 |
| JP | 8-278771 | 10/1996 |
| JP | 9-15557 | 1/1997 |
| JP | 9-281930 | 10/1997 |
| JP | 9-312569 | 10/1997 |
| JP | 9-312569 | 12/1997 |
| JP | 10-339861 | 12/1998 |
| JP | 2002-23712 | 1/2002 |
| JP | 2002-32048 | 1/2002 |
| JP | 2002-40997 | 2/2002 |
| JP | 2002-043943 | 2/2002 |
| JP | 2002-72979 | 3/2002 |
| JP | 2003-108074 | 4/2003 |
| JP | 2004-511022 | 4/2004 |
| JP | 2004-165948 | 6/2004 |
| JP | 2005-117547 | 4/2005 |
| JP | 2005-157321 | 6/2005 |
| JP | 2005-351959 | 12/2005 |
| JP | 2006-119225 | 5/2006 |
| JP | 2007-316675 | 12/2007 |
| JP | 2008-139861 | 6/2008 |
| JP | 2008-268473 | 11/2008 |
| JP | 2009-8891 | 1/2009 |
| JP | 2009-104106 | 5/2009 |
| JP | 2009-128532 | 6/2009 |
| JP | 2009-205000 | 9/2009 |
| JP | 2009-205001 | 9/2009 |
| JP | 2009-210838 | 9/2009 |
| JP | 2010-078869 | 4/2010 |
| JP | 2010-078870 | 4/2010 |
| JP | 2010-081254 | 4/2010 |
| JP | 2010-081255 | 4/2010 |
| TW | 511063 | 11/2002 |
| TW | 580682 | 3/2004 |
| TW | 200417961 | 9/2004 |
| TW | 200519825 | 6/2005 |
| TW | 200521458 | 7/2005 |
| TW | 1248327 | 1/2006 |
| TW | 200620219 | 6/2006 |
| TW | 200634687 | 10/2006 |
| TW | 200717436 | 5/2007 |
| TW | 200806022 | 1/2008 |
| WO | WO 01/39163 | 5/2001 |

OTHER PUBLICATIONS

International Search Report.

English language International Search Report of PCT/JP2008/059679 dated Aug. 26, 2008.

U.S. Office Action dated Sep. 25, 2012 for copending U.S. Appl. No. 12/225,182.

International Search Report dated Mar. 17, 2009, issued in corresponding Application No. PCT/JP2009/051987.

* cited by examiner

FIG. 30

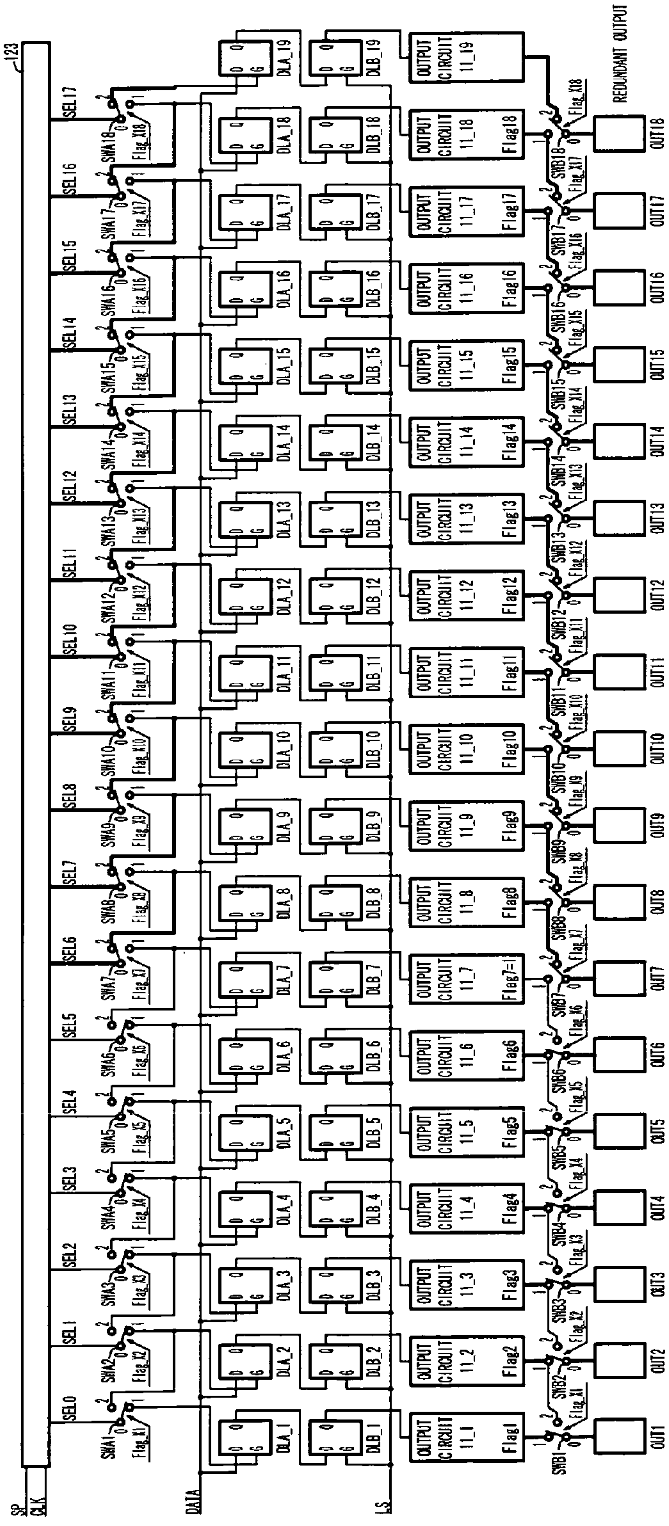

Flag_X 1 = Flag1
Flag_X 2 = Flag1 + Flag2
Flag_X 3 = Flag1 + Flag2 + Flag3
Flag_X 4 = Flag1 + Flag2 + Flag3 + Flag4
Flag_X 5 = Flag1 + Flag2 + Flag3 + Flag4 + Flag5
Flag_X 6 = Flag1 + Flag2 + Flag3 + Flag4 + Flag5 + Flag6
Flag_X 7 = Flag1 + Flag2 + Flag3 + Flag4 + Flag5 + Flag6 + Flag7
Flag_X 8 = Flag1 + Flag2 + Flag3 + Flag4 + Flag5 + Flag6 + Flag7 + Flag8
Flag_X 9 = Flag1 + Flag2 + Flag3 + Flag4 + Flag5 + Flag6 + Flag7 + Flag8 + Flag9
Flag_X10 = Flag1 + Flag2 + Flag3 + Flag4 + Flag5 + Flag6 + Flag7 + Flag8 + Flag9 + Flag10
Flag_X11 = Flag1 + Flag2 + Flag3 + Flag4 + Flag5 + Flag6 + Flag7 + Flag8 + Flag9 + Flag10 + Flag11
Flag_X12 = Flag1 + Flag2 + Flag3 + Flag4 + Flag5 + Flag6 + Flag7 + Flag8 + Flag9 + Flag10 + Flag11 + Flag12
Flag_X13 = Flag1 + Flag2 + Flag3 + Flag4 + Flag5 + Flag6 + Flag7 + Flag8 + Flag9 + Flag10 + Flag11 + Flag12 + Flag13
Flag_X14 = Flag1 + Flag2 + Flag3 + Flag4 + Flag5 + Flag6 + Flag7 + Flag8 + Flag9 + Flag10 + Flag11 + Flag12 + Flag13 + Flag14
Flag_X15 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15
Flag_X16 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16
Flag_X17 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17
Flag_X18 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17 + Flag18

SEL 0 = DQ3B · DQ2B · DQ1B
SEL 1 = DQ3B · DQ2B · DQ1
SEL 2 = DQ3B · DQ2 · DQ1B
SEL 3 = DQ3B · DQ2 · DQ1
SEL 4 = DQ3 · DQ2B · DQ1B
SEL 5 = DQ3 · DQ2B · DQ1
SEL 6 = DQ3 · DQ2 · DQ1B

FIG. 41

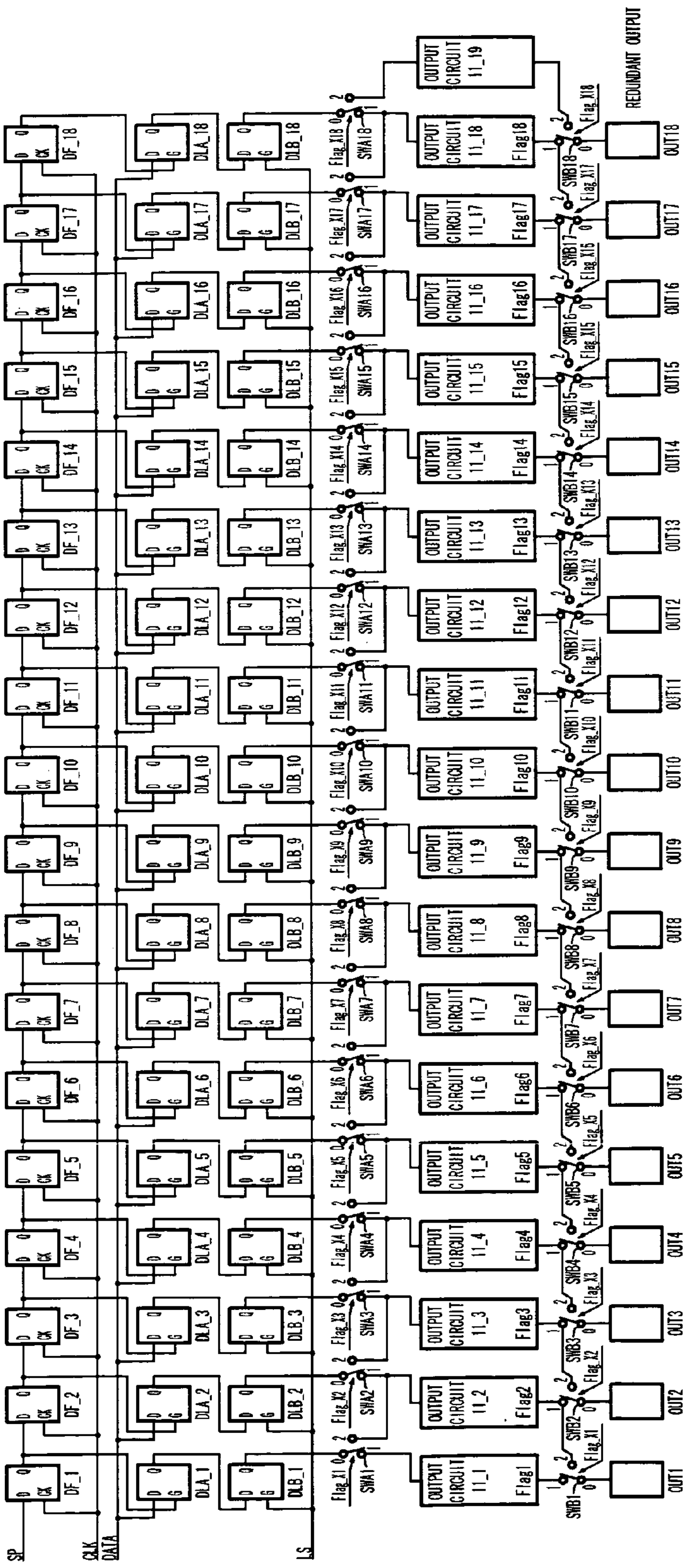

Flag_X 1 = Flag1
Flag_X 2 = Flag1 + Flag2
Flag_X 3 = Flag1 + Flag2 + Flag3
Flag_X 4 = Flag1 + Flag2 + Flag3 + Flag4
Flag_X 5 = Flag1 + Flag2 + Flag3 + Flag4 + Flag5
Flag_X 6 = Flag1 + Flag2 + Flag3 + Flag4 + Flag5 + Flag6
Flag_X 7 = Flag1 + Flag2 + Flag3 + Flag4 + Flag5 + Flag6 + Flag7
Flag_X 8 = Flag1 + Flag2 + Flag3 + Flag4 + Flag5 + Flag6 + Flag7 + Flag8
Flag_X 9 = Flag1 + Flag2 + Flag3 + Flag4 + Flag5 + Flag6 + Flag7 + Flag8 + Flag9
Flag_X10 = Flag1 + Flag2 + Flag3 + Flag4 + Flag5 + Flag6 + Flag7 + Flag8 + Flag9 + Flag10
Flag_X11 = Flag1 + Flag2 + Flag3 + Flag4 + Flag5 + Flag6 + Flag7 + Flag8 + Flag9 + Flag10 + Flag11
Flag_X12 = Flag1 + Flag2 + Flag3 + Flag4 + Flag5 + Flag6 + Flag7 + Flag8 + Flag9 + Flag10 + Flag11 + Flag12
Flag_X13 = Flag1 + Flag2 + Flag3 + Flag4 + Flag5 + Flag6 + Flag7 + Flag8 + Flag9 + Flag10 + Flag11 + Flag12 + Flag13
Flag_X14 = Flag1 + Flag2 + Flag3 + Flag4 + Flag5 + Flag6 + Flag7 + Flag8 + Flag9 + Flag10 + Flag11 + Flag12 + Flag13 + Flag14
Flag_X15 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15
Flag_X16 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16
Flag_X17 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17
Flag_X18 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17 + Flag18

F I G. 4 7

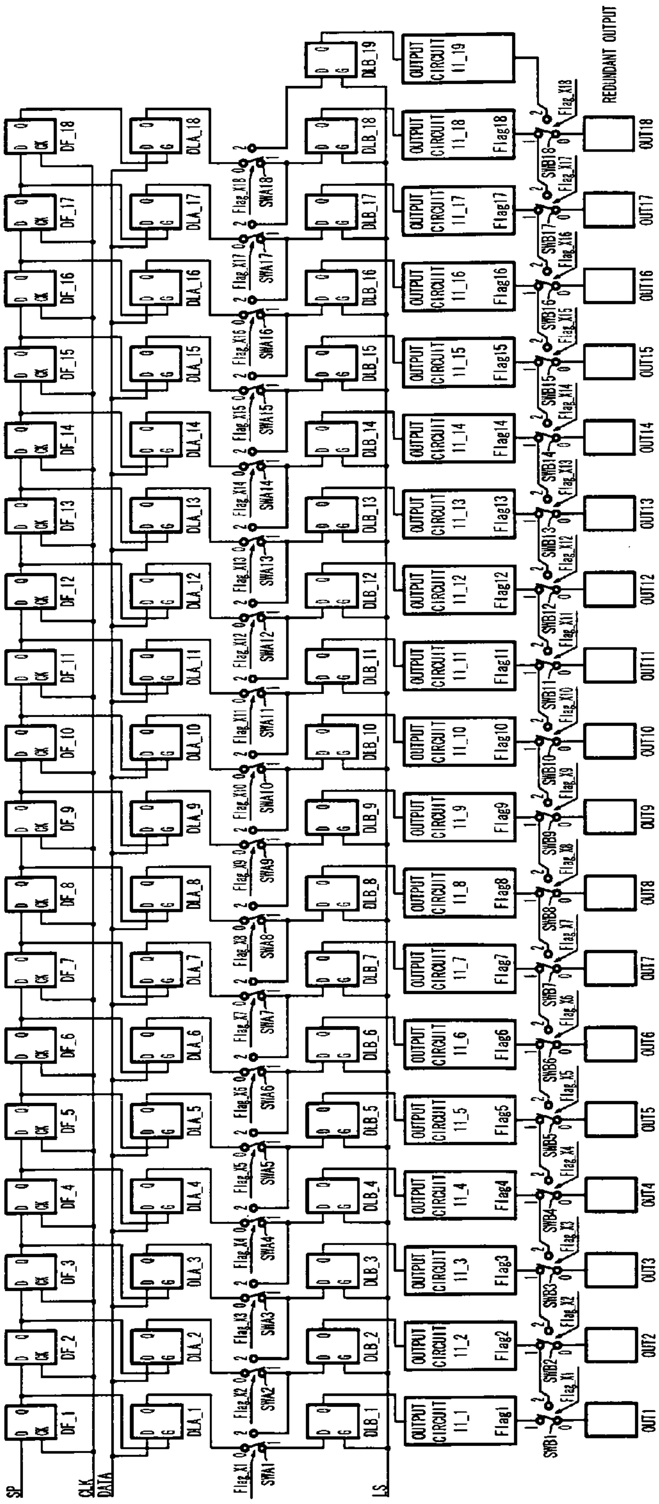

Flag_X 1 = Flag1
Flag_X 2 = Flag1 + Flag2
Flag_X 3 = Flag1 + Flag2 + Flag3
Flag_X 4 = Flag1 + Flag2 + Flag3 + Flag4
Flag_X 5 = Flag1 + Flag2 + Flag3 + Flag4 + Flag5
Flag_X 6 = Flag1 + Flag2 + Flag3 + Flag4 + Flag5 + Flag6
Flag_X 7 = Flag1 + Flag2 + Flag3 + Flag4 + Flag5 + Flag6 + Flag7
Flag_X 8 = Flag1 + Flag2 + Flag3 + Flag4 + Flag5 + Flag6 + Flag7 + Flag8
Flag_X 9 = Flag1 + Flag2 + Flag3 + Flag4 + Flag5 + Flag6 + Flag7 + Flag8 + Flag9
Flag_X10 = Flag1 + Flag2 + Flag3 + Flag4 + Flag5 + Flag6 + Flag7 + Flag8 + Flag9 + Flag10
Flag_X11 = Flag1 + Flag2 + Flag3 + Flag4 + Flag5 + Flag6 + Flag7 + Flag8 + Flag9 + Flag10 + Flag11
Flag_X12 = Flag1 + Flag2 + Flag3 + Flag4 + Flag5 + Flag6 + Flag7 + Flag8 + Flag9 + Flag10 + Flag11 + Flag12
Flag_X13 = Flag1 + Flag2 + Flag3 + Flag4 + Flag5 + Flag6 + Flag7 + Flag8 + Flag9 + Flag10 + Flag11 + Flag12 + Flag13
Flag_X14 = Flag1 + Flag2 + Flag3 + Flag4 + Flag5 + Flag6 + Flag7 + Flag8 + Flag9 + Flag10 + Flag11 + Flag12 + Flag13 + Flag14
Flag_X15 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15
Flag_X16 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16
Flag_X17 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17
Flag_X18 = Flag1 + Flag2 + Flag3 + Flag4 + Flag5 + Flag6 + Flag7 + Flag8 + Flag9 + Flag10 + Flag11 + Flag12 + Flag13 + Flag14 + Flag15 + Flag16 + Flag17 + Flag18

F I G. 5 8
CONVENTIONAL ART

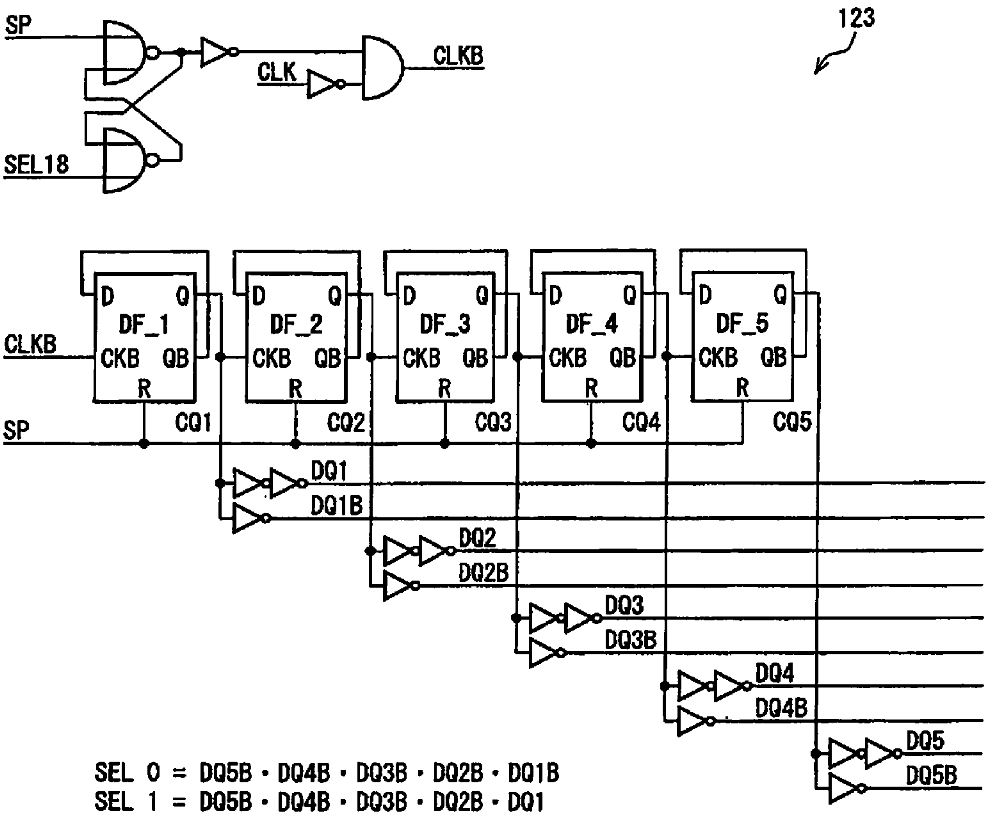

SEL 0 = DQ5B · DQ4B · DQ3B · DQ2B · DQ1B
SEL 1 = DQ5B · DQ4B · DQ3B · DQ2B · DQ1
SEL 2 = DQ5B · DQ4B · DQ3B · DQ2 · DQ1B
SEL 3 = DQ5B · DQ4B · DQ3B · DQ2 · DQ1
SEL 4 = DQ5B · DQ4B · DQ3 · DQ2B · DQ1B
SEL 5 = DQ5B · DQ4B · DQ3 · DQ2B · DQ1
SEL 6 = DQ5B · DQ4B · DQ3 · DQ2 · DQ1B
SEL 7 = DQ5B · DQ4B · DQ3 · DQ2 · DQ1
SEL 8 = DQ5B · DQ4 · DQ3B · DQ2B · DQ1B
SEL 9 = DQ5B · DQ4 · DQ3B · DQ2B · DQ1
SEL10 = DQ5B · DQ4 · DQ3B · DQ2 · DQ1B
SEL11 = DQ5B · DQ4 · DQ3B · DQ2 · DQ1
SEL12 = DQ5B · DQ4 · DQ3 · DQ2B · DQ1B
SEL13 = DQ5B · DQ4 · DQ3 · DQ2B · DQ1
SEL14 = DQ5B · DQ4 · DQ3 · DQ2 · DQ1B
SEL15 = DQ5B · DQ4 · DQ3 · DQ2 · DQ1
SEL16 = DQ5 · DQ4B · DQ3B · DQ2B · DQ1B
SEL17 = DQ5 · DQ4B · DQ3B · DQ2B · DQ1
SEL18 = DQ5 · DQ4B · DQ3B · DQ2 · DQ1B

DRIVE CIRCUIT AND DISPLAY DEVICE

TECHNICAL FIELD

The present invention relates to: a display-device driving circuit that self-detects failures and carries out self-repairs; and a display device including such a driving circuit.

BACKGROUND ART

In recent years, as liquid crystal panels, etc. have been made larger in size and higher in definition, liquid crystal driving semiconductor integrated circuits have evolved to have a larger number of liquid crystal driving output terminals and to output more levels of gray-scale voltage through the output terminals. For example, some of the currently mainstream liquid crystal driving semiconductor integrated circuits each include approximately 500 output terminals through each of which 256 levels of gray-scale voltage can be outputted. Furthermore, liquid crystal driving semiconductor integrated circuits each including 1,000 or more output terminals are currently under development. Further, as liquid crystal panels are enabled to show more colors, liquid crystal driving semiconductor integrated circuits capable of outputting 1,024 levels of gray-scale voltage are also under development.

The configuration of a conventional liquid crystal driving semiconductor integrated circuit is described below with reference to FIG. 53. FIG. 53 is a block diagram showing the configuration of a conventional liquid crystal driving semiconductor integrated circuit.

A liquid crystal driving semiconductor integrated circuit 101 of FIG. 53 can output m levels of gray-scale voltage through each of the n liquid crystal driving signal output terminals. First, the configuration of the liquid crystal driving semiconductor integrated circuit 101 is described. The liquid crystal driving semiconductor integrated circuit 101 externally includes: a clock input terminal 102; a gray-scale data input terminal 103 including a plurality of signal input terminals; a LOAD signal input terminal 104; and reference supply terminals, namely a V0 terminal 105, a V1 terminal 106, a V2 terminal 107, a V3 terminal 108, and a V4 terminal 109. The liquid crystal driving semiconductor integrated circuit 101 further includes n liquid crystal driving signal output terminals 111-1 to 111-*n* (such liquid crystal driving signal output terminals being hereinafter referred to as "signal output terminals"; the liquid crystal driving signal output terminals 111-1 to 111-*n* being sometimes referred to collectively as "signal output terminals 111"). Further, the liquid crystal driving semiconductor integrated circuit 101 includes a reference supply correction circuit 121, pointer shift-register circuits 123, a latch circuit section 124, hold circuits 125, D/A converter (digital-analog converter; hereinafter referred to as "DAC") circuits 126, and output buffers 127. Further, the pointer shift-register circuits 123 are constituted by n shift register circuits 123-1 to 123-*n*. Furthermore, the latch circuit section 124 is constituted by n latch circuits 124-1 to 124-*n*, and the hold circuits 125 are constituted by n hold circuits 125-1 to 125-*n*. Further, the DAC circuits 126 are constituted by n DAC circuits 126-1 to 126-*n*. In addition, the output buffers 127 are constituted by n output buffers 127-1 to 127-*n* each constituted by an operational amplifier.

Next, the operation of the liquid crystal driving semiconductor integrated circuit 101 is described. The pointer shift-register circuits 123 select the first to nth latch circuits 124-1 to 124-*n* in sequence in accordance with a clock input signal inputted through the clock input terminal 102. When selected by the pointer shift-register circuits 123, the latch circuits 124 store therein gray-scale data inputted through the gray-scale data input terminal 103, respectively. It should be noted that the gray-scale data correspond to each separate latch circuit 124; in other words, the gray-scale data are data, synchronized with the clock input signal, which correspond to each separate signal output terminal 111. Further, the latch circuits 124-1 to 124-*n* send, to the hold circuits respectively connected thereto, different values of gray-scale data corresponding to each separate signal output terminal 111. Upon receiving the gray-scale data, the hold circuits 125 send the gray-scale data as digital data to the DAC circuits 126-1 to 126-*n*, respectively, in accordance with a data LOAD signal.

At this point, the DAC circuits 126-1 to 126-*n* each select a voltage from the m levels of gray-scale voltage in accordance with the gray-scale data sent from the hold circuits 125, and then send the voltages to the output buffers 127-1 to 127-*n*, respectively. It should be noted that each of the DAC circuits 126 can output the m levels of gray-scale voltage, depending on voltages inputted through the reference supply terminals, namely the V0 to V4 terminals 105 to 109. Next, the output buffers 127 buffer the gray-scale voltages sent from the DAC circuits 126, and then send the gray-scale voltages as liquid crystal driving signals to the signal output terminals 111-1 to 111-*n*, respectively.

Next, a specific example of a configuration of shift registers 123, latch circuits 124, and hold circuits 125 is described with reference to FIG. 54.

FIG. 54 shows the configuration of a liquid crystal driving semiconductor integrated circuit 101 including eighteen liquid crystal driving signal output terminals OUT1 to OUT18. The liquid crystal driving semiconductor integrated circuit 101 includes: pointer shift registers DF_1 to DF_18 (hereinafter sometimes referred to collectively as "pointer shift registers DF"), which correspond to the point shift-register circuits 123 of FIG. 53; latch circuits DLA_1 to DLA_18 (hereinafter sometimes referred to collectively as "latch circuits DLA"), which correspond to the latch circuits 124 of FIG. 53; hold circuits DLB_1 to DLB_18 (hereinafter sometimes referred to collectively as "hold circuits DLB"), which correspond to the holds circuits 125 of FIG. 53; and output circuits 11_1 to 11_18, which correspond to the DAC circuits 126 and output buffers 127 of FIG. 53. The liquid crystal driving semiconductor integrated circuit 101 receives an operation start signal (SP signal) indicative of the timing of start of the pointer shift registers through a start pulse signal line (SP signal line) and receives an operation clock signal through a clock signal line (CLK signal line), and these signals correspond to the shift clock input signal of FIG. 53. The liquid crystal driving semiconductor integrated circuit 101 receives gray-scale data through a DATA signal line, and the data correspond to the gray-scale data of FIG. 53. The liquid crystal driving semiconductor integrated circuit 101 receives a data LOAD signal through an LS signal line, and this signal correspond to the data LOAD signal of FIG. 53.

As shown in FIG. 54, the pointer shift registers DF are each constituted by a D flip-flop, and the latch circuits DLA and the hold circuits DLB are each constituted by a D latch. Furthermore, the liquid crystal driving semiconductor integrated circuit 101 includes as many pointer shift registers DF, latch circuits DLA, and hold circuits DLB as the liquid crystal driving signal output terminals OUT.

FIG. 55 is a timing chart showing the operation of the pointer shift register circuits 123. Among the shift register circuits 123, first, the pointer shift register DF_1 receives a "H" SP signal indicative of the start of operation of the integrated circuit 101 through its input section D. The pointer shift register DF_1 loads the value "H" of the SP signal in response to a rise in the CLK signal, and then outputs a "H" selection signal through its output section Q. As shown in FIG. 55, at the next rising edge of the CLK signal, the SP signal is "L" and, accordingly, the selection signal from the pointer shift register DF_1 through its output section Q becomes "L", too. It should be noted, in FIG. 55, that Q (DF_1) to Q (DF_18) denote selection signals from the pointer shift registers DF_1 to DF_18, respectively.

The pointer shift registers DF_1 to DF_18 constitute a shift register by having their output sections Q connected to the input sections D of the next pointer shift registers, respectively. That is, before the selection signal Q (DF_1) from the pointer shift register DF_1 becomes "L", the pointer shift register DF_2 outputs a "H" selection signal Q (DF_2) in response to a rise in the CLK signal. After that, the selection signal Q (DF_1) becomes "L". This operation process is repeated for each of the pointer shift registers DF_2 to DF_18. As shown in FIG. 55, in synchronization with falls rises in the CLK signal, the pointer shift registers DF send the selection signals in sequence to the latch circuits DLA connected to the output sections Q of the pointer shift registers DF, respectively.

As described above, as many shift register circuits 123, latch circuits 124, hold circuits 125, DAC circuits 126, and output buffers 127 are required as the liquid crystal driving signal output terminals 111. In the case of 1,000 liquid crystal driving signal output terminals 111, 1,000 latch circuits 124, 1,000 hold circuits 125, 1,000 DAC circuits 126, and 1,000 output buffers 127 are required accordingly.

The configuration of another conventional liquid crystal driving semiconductor integrated circuit is described below with reference to FIG. 56. FIG. 56 is a block diagram showing the configuration of another conventional liquid crystal driving semiconductor integrated circuit. A liquid crystal driving semiconductor integrated circuit 101' of FIG. 56 differs from the liquid crystal driving semiconductor integrated circuit 101 of FIG. 53 only in the configuration of a pointer circuit 123'. In the following, therefore, only the configuration of the pointer circuit 123' is described, and the same members as those shown in FIG. 53 are given the same reference numerals and, as such, are not described.

The pointer circuit 123' is constituted by a counter and a decoder. Furthermore, the latch circuits 124 are constituted by n latch circuits 124-1 to 124-*n*, and the hold circuits 125 are constituted by n hold circuits 125-1 to 125-*n*. Further, the DAC circuits 126 are constituted by n DAC circuits 126-1 to 126-*n*. In addition, the output buffers 127 are constituted by n output buffers 127-1 to 127-*n* each constituted by an operational amplifier.

Next, the operation of the liquid crystal driving semiconductor integrated circuit 101' is described. The pointer circuit 123' selects the first to nth latch circuits 124-1 to 124-*n* in sequence in accordance with counting of a clock input signal inputted through the clock input terminal 102. When selected by the pointer circuit 123', the latch circuits 124 store therein gray-scale data inputted through the gray-scale data input terminal 103. It should be noted that the gray-scale data correspond to each separate latch circuit 124; in other words, the gray-scale data are data, synchronized with the clock input signal, which correspond to each separate signal output terminal 111. Further, the latch circuits 124-1 to 124-*n* send, to the hold circuits respectively connected thereto, different values of gray-scale data corresponding to each separate signal output terminal 111. Upon receiving the gray-scale data, the hold circuits 125 send the gray-scale data as digital data to the DAC circuits 126-1 to 126-*n*, respectively, in accordance with a data LOAD signal.

At this point, the DAC circuits 126-1 to 126-*n* each select a voltage from the m levels of gray-scale voltage in accordance with the gray-scale data sent from the hold circuits 125, and then send the voltages to the output buffers 127-1 to 127-*n*, respectively. It should be noted that each of the DAC circuits 126 can output the m levels of gray-scale voltage, depending on voltages inputted through the reference supply terminals, namely the V0 to V4 terminals 105 to 109. Next, the output buffers 127 buffer the gray-scale voltages sent from the DAC circuits 126, and then send the gray-scale voltages as liquid crystal driving signals to the signal output terminals 111-1 to 111-*n*, respectively.

Next, a specific example of a configuration of a liquid crystal driving semiconductor integrated circuit 101' including a pointer circuit 123', latch circuits 124, and hold circuits 125 is described with reference to FIG. 57.

FIG. 57 shows eighteen liquid crystal driving signal output terminals OUT1 to OUT18 for illustrative purposes. The latch circuits DLA_1 to DLA_18 (hereinafter sometimes referred to collectively as "latch circuits-DLA") correspond to the latch circuits 124 of FIG. 56. The hold circuits DLB_1 to DLB_18 (hereinafter sometimes referred to collectively as "hold circuits DLB") correspond to the hold circuits 125 of FIG. 56. The output circuits 11_1 to 11_18 correspond to the DAC circuits 126 and output buffers 127 of FIG. 56.

Further, a start signal inputted through a SP signal line and indicating the timing of start of the counter and a clock signal inputted through a CLK signal line correspond to the shift clock input signal of FIG. 56. A data LOAD signal inputted through an LS signal, line corresponds to the data LOAD signal of FIG. 56.

FIG. 58 shows the configuration of the pointer circuit 123'. The pointer circuit 123' is constituted by a set/reset circuit, a counter, and a decoder.

Upon receiving an operation start signal (SP signal) through a start pulse signal line (SP signal line), a clock signal (CLK signal) through a clock signal line (CLK signal line), and a selection signal (SEL signal) through a selection signal line SEL18 to be described later, the set/reset circuit generates an operation clock signal (CLKB signal) for the counter 123_2 and outputs it through a counter clock signal line (CLKB signal line).

The counter is constituted by five D flip-flops DF_1 to DF_5 (hereinafter sometimes referred to collectively as "DFFs"). The counter 123_2 receives the CLKB signal and the SP signal, and then generates DQ 1 to DQ 5 and DQ 1B to DQ 5B in accordance with CQ 1 to CQ 5 sent from the DFFs, respectively.

The decoder performs arithmetical operations according to logical expressions shown in FIG. 58 to generate selection signals to be outputted to selection signal lines SEL0 to SEL17 (SEL signal lines) of FIG. 57. It should be noted that the decoder is not particularly limited in specific configuration, so long as it can perform logical operations as shown in FIG. 58.

FIG. 59 is a timing chart showing the operation of the pointer circuit 123'. In the pointer circuit 123', the input of the operation clock signal to the counter 123_2 through the CLKB signal line is started when the SP signal becomes "H". The CLKB signal is an inversion signal of the CLK signal.

The counter 123_2 counts up at a falling edge of the operation clock signal inputted through the CLKB signal line. However, the DFFs are reset during a period of time when the operation start signal (SP signal) inputted through the start pulse signal line (SP signal line) is "H". Therefore, CQ 1 to CQ 5 outputted from the DFFs are all "L". During this period, the decoder 123_3 outputs a "H" selection signal to the selection signal line SEL0. After the SP signal becomes "L", the counter 123_2 counts up at a falling edge of the operation clock signal (CLKB signal) inputted through the counter clock signal line (CLKB signal line). Accordingly, CQ 1 becomes "H", whereby the decoder 123_3 comes to output a "H" selection signal to the selection signal line SEL1. Hereafter, every time the counter 123_2 counts up, the decoder 123_3 comes to output "H" selection signals to the selection signal lines SEL2 to SEL17 in sequence. When the decoder 123_3 comes to output a "H" selection signal to the selection signal line SEL18, the set/reset circuit 123_1 is reset to stop receiving the operation clock signal through the CLKB signal line. Accordingly, the counter 123_2 stops, too.

Since display devices such as liquid crystal panels have been made larger in size and higher in definition in recent years as mentioned above, a full-specification high definition television (HDTV) includes 1,920 data lines. Because a display driving semiconductor integrated circuit needs to supply R, G, and B gray-scale voltage signals for each data line, the display driving semiconductor integrated circuit needs to include 5,760 (=1,920×3 [R, G, and B]) liquid crystal driving signal output terminals. In this case, the number of display driving semiconductor integrated circuits required is 8, assuming that each of the display driving semiconductor integrated circuits has 720 liquid crystal driving signal output terminals.

In general, display driving semiconductor integrated circuits are tested as wafers, tested for shipping after packaging, and tested for displays after being mounted on liquid crystal panels. Furthermore, those semiconductor integrated circuits which may show initial defects are eliminated by screening tests such as burn-in tests and stress tests. Therefore, no display devices that are shipped to the market include display driving semiconductor integrated circuits which cause defective displays. However, a defective display occurs infrequently during use of a display device due to an extremely small defect or extraneous matter that was not judged as a defect during a pre-shipment test or screening test. For example, even if the probability of occurrence of a defective display in one data line of a display driving semiconductor integrated circuit after shipment is 0.01 ppm (one part per 100 million), the probability of occurrence of a defective display in a full-specification HDTV having 5,760 data lines is 57.6 ppm (57.6 parts per million). This means that one out of approximately 17,361 full-specification HDTVs shows a defective display. The larger in size and higher in definition HDTVs become, the higher the probability of occurrence of a defective display becomes.

In the case of occurrence of such a defective display, it is necessary to recall the display devices and repair the display driving semiconductor integrated circuits. It surely takes substantial cost to swiftly recall the display devices and repair them and, what is more, the display devices' brand image is damaged.

Disclosed in this regard is a conventional technique for avoiding a failure in a display driving semiconductor integrated circuit by providing the display driving semiconductor integrated circuit with a spare circuit that is used to replace a defective circuit and switching from the defective circuit to the spare circuit.

Specifically, Patent Literature 1 discloses a method for avoiding a defective display due to a defective shift register by making a display driving semiconductor integrated circuit have shift registers each provided with a spare circuit parallel thereto, self-inspecting the shift registers, and selecting a nondefective one of the circuits parallel to each other in accordance with a result of the detection. Furthermore, Patent Literature 2 discloses a method for switching from a defective DAC circuit to a spare DAC circuit by providing a selector at each of the input and output of each DAC circuit and switching the selector in accordance with information stored in a RAM and indicating the location of a defective DAC circuit.

CITATION LIST

Patent Literature 1

Japanese Patent Application Publication, Tokukaihei, No. 6-208346 A (Publication Date: Jul. 26, 1994)

Patent Literature 2

Japanese Patent Application Publication, Tokukaihei, No. 8-278771 A (Publication Date: Oct. 22, 1996)

SUMMARY OF INVENTION

However, although Patent Literature 1 discloses a method for detecting a defect in a shift register by providing a spare circuit parallel to the shift register and a self-repairing method for switching from a defective shift register to a spare shift register, Patent Literature 1 discloses neither a method for detecting defects in other output circuits such as DAC circuits nor a self-repairing method.

Further, although Patent Literature 2 discloses a configuration for detecting a defective DAC circuit and switching from the defective DAC circuit to a spare DAC circuit, it is necessary, in this configuration, to connect wires so that the output of the spare DAC circuit can be used to replace any of the outputs of all the other DAC circuits. This results in complicated wires connected to the spare DAC circuit on the circuit board. This means an increase in size of the circuit board on which the DAC circuits are mounted.

The present invention provides a driving circuit, capable of self-repairing a defective video signal output section, which has more simplified wires connected to video signal output sections.

A driving circuit according to the present invention is a driving circuit for driving a display panel, the driving circuit including: m (m being a natural number of 2 or more) output terminals connected to the display panel; m+1 output circuit blocks, provided for each separate one of the output terminals, which include (i) output circuits for outputting output signals for driving the display panel and (ii) output buffers, constituted by operational amplifiers, which buffer the output signals outputted from the output circuits and then output the output signals to the output terminals, respectively, the (m+1) th one of the output circuit blocks being a spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the plurality of output terminals; control means for controlling switching of the driving circuit between normal operation and self-detection repairing operation, for causing input signals to be inputted into the plurality of output circuits during the normal operation, and for causing a first test input signal to be inputted into the plurality of output circuits and a second test input signal to be inputted into the spare output circuit during the self-detection repairing operation; and self-repairing means for, after having been switched by the control means to the self-detection repairing operation, self-repairing the driving circuit if the driving circuit is defective, the self-repairing means including: comparing means for comparing the output signals outputted from the output circuits with the output signal outputted from the spare output circuit; decision means for determining, in accordance with a result of comparison made by the comparing means, whether any of the output circuits is defective or not; connection switching means for, when the decision means has determined all the output circuits to be good, connecting the hth (h being a natural number of m or less) output circuit to the hth output terminal, and for, when the decision means has determined the ith (i being a natural number of m or less) output circuit to be defective, connecting the jth (j being a natural number of i−1 or less) output circuit to the jth output terminal and connecting the (k+1)th (k being a natural number of i or more to m or less) output circuit to the kth output terminal; and selecting means for, when the decision means has determined all the output circuits to be good, selecting the hth output circuit as an output circuit for loading that one of the input signals which corresponds to the hth output terminal, and for, when the decision means has determined the ith output circuit to be defective, selecting the jth output circuit as an output circuit for loading that one of the input signals which corresponds to the jth output terminal and selecting the (k+1)th output circuit as an output circuit for loading that one of the input signals which corresponds to the kth output terminal, the comparing means being constituted by the operational amplifiers of the output circuit blocks, the operational amplifiers of the output circuit blocks being controlled by switching control of the control means so that (i) the operational amplifiers switch to serving as the output buffers during the normal operation by receiving the output signals from the output circuits through positive input terminals and having their outputs negatively fed back through negative input terminals and (ii) the operational amplifiers switch to serving as the comparing means during the self-detection repairing operation by receiving the output signals from the output circuits through the positive input terminals and receiving the output signal from the spare output circuit through the negative input terminals.

According to the foregoing configuration, the driving circuit according to the present invention is a driving circuit for driving a display panel, the driving circuit including: m (m being a natural number of 2 or more) output terminals connected to the display panel; and m+1 output circuit blocks, provided for each separate one of the output terminals, which include (i) output circuits for outputting output signals for driving the display panel and (ii) output buffers, constituted by operational amplifiers, which buffer the output signals outputted from the output circuits and then output the output signals to the output terminals, respectively.

The (m+1)th one of the output circuit blocks is a spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the plurality of output terminals.

The control means controls switching of the driving circuit between normal operation and self-detection repairing operation, causes input signals to be inputted into the plurality of output circuits during the normal operation, and causes a first test input signal to be inputted into the plurality of output circuits and a second test input signal to be inputted into the spare output circuit during the self-detection repairing operation.

After having been switched by the control means to the self-detection repairing operation, the self-repairing means self-repairs the driving circuit if the driving circuit is defective. The self-repairing means includes: comparing means for comparing the output signals outputted from the output circuits with the output signal outputted from the spare output circuit; decision means for determining, in accordance with a result of comparison made by the comparing means, whether any of the output circuits is defective or not; connection switching means; and selecting means.

When the decision means has determined all the output circuits to be good, the connection switching means connects the hth (h being a natural number of m or less) output circuit to the hth output terminal. That is, video signals from the first and second video signal output sections are outputted to the first and second output terminals, respectively. Similarly, video signals from the subsequent third to mth video signal output sections are outputted to the third to mth output terminals, respectively.

On the other hand, when the decision means has determined the ith (i being a natural number of m or less) output circuit to be defective, the connection switching means connects the jth (j being a natural number of i−1 or less) output circuit to the jth output terminal and connecting the (k+1)th (k being a natural number of i or more to m or less) output circuit to the kth output terminal. Therefore, the video signal output section determined to be defective is not connected to any of the output terminals. For example, when the seventh video signal output section has been determined to be defective, video signals from the first to sixth video signal output sections are outputted to the first to sixth output terminals, respectively, and video signals from the eighth to (m+1)th video signal output sections are outputted to the seventh to mth output terminals, respectively. Therefore, the video signal from the seventh video signal output section determined by the decision section to be defective is not outputted to any of the output terminals.

Furthermore, when the ith output circuit has been determined to be defective, the connection switching means connects the (k+1)th output circuit to the kth output terminal. That is, the connection switching means switches in sequence from connecting the output terminals to the output circuits, to which the output terminals would be connected if all the output circuits were determined to be good, to connecting the output terminals to output circuits adjacent to the output circuits. This makes it possible to suppress complexity of wiring between the output circuits and the output terminals and, as a result, to suppress an increase in size of the circuit board.

Further, when the decision means has determined all the output circuits to be good, the selecting means selects the hth output circuit as an output circuit for loading that one of the input signals which corresponds to the hth output terminal. Thus, when the decision means has determined all the output circuits to be good, the hth output circuit is connected to the hth output terminal; therefore, video signals corresponding to the output terminals are outputted from the output circuits to the output terminals, respectively. That is, the first and second output circuits load input signals corresponding to the first and second output terminals, respectively. Similarly, the subsequent third to mth output circuits load input signals corresponding to the third to mth output terminals, respectively. It should be noted here that since the first to mth output terminals are in connection with the first to mth output circuits, the first to mth output terminals have their corresponding input signals outputted from the output circuits, respectively.

On the other hand, when the ith output circuit has been determined to be defective, the selecting means selects the jth (j being a natural number of i−1 or less) output circuit as an output circuit for loading that one of the input signals which corresponds to the jth output terminal and selects the (k+1)th output circuit as an output circuit for loading that one of the input signals which corresponds to the kth output terminal.

For example, when the decision means has determined the seventh output circuit to be defective, the selecting means selects the first to seventh output circuits as output circuits for loading input signals corresponding to the first to seventh output terminals and selects the eighth to (m+1)th output circuits as video signal output sections for loading input signals corresponding to the seventh to mth output terminals.

Moreover, since the connection switching means has switched connections between the output circuits and the output terminals as mentioned above, the output terminals have their corresponding video signals outputted from the output circuits excluding the seventh output circuit, respectively.

As described above, the driving circuit according to the present invention includes the decision means for determining the quality of each of the output circuits, and the connection switching means switches connections between the output terminals and the output circuits, as mentioned above, in accordance with a result of determination made by the decision means. That is, the driving circuit according to the present invention determines the quality of each of its output circuits and, if it detects a failure in any of its output circuits, carries out self-repairs by itself or, in other words, can use the normal output circuits to output video signals to the output terminals, without being repaired by a human being.

Thus, the driving circuit of the present invention can bring about an effect of being capable of self-repairing a defective output circuit detected, if any, and having more simplified wires connected to the output circuits.

The driving circuit according to the present invention is preferably configured so as to further include m+1 latch circuits, connected to the output circuits respectively, which latch the input signals that are loaded into the output circuits, wherein: the selecting means is a shift register, having m+1 terminals connected to the latch circuits, which outputs selection signals for selecting which of the latch circuits latches its corresponding one of the input signals; when the decision means has determined all the output circuits to be good, the shift register selects the hth latch circuit as a latch circuit for latching that one of the input signals which corresponds to the hth output terminal; and when the decision means has determined the ith output circuit to be defective, the shift register selects the jth latch circuit as a latch circuit for latching that one of the input signals which corresponds to the jth output terminal and selects the (k+1)th latch circuit as a latch circuit for latching that one of the input signals which corresponds to the kth output terminal.

According to the foregoing configuration, the driving circuit includes m+1 latch circuits that latch the input signals that are loaded into the output circuits. The latch circuits are in connection with the m+1 output circuits, respectively. The shift register, serving as the selecting means, uses a selection signal to select a latch circuit connected to the output circuit into which an input signal is loaded. Then, the latch circuit thus selected by the selection signal from the shift register latches the input signal and supplies it to the output circuit connected thereto.

This enables a configuration in which an output circuit is selected through the internal operation of a shift register.

The driving circuit according to the present invention is preferably configured such that: the output terminals are each composed of a plurality of sub-output terminals whose number is equal to the number of primary colors of each display pixel of the display panel; the output circuits are each composed of a plurality of sub-output circuits whose number is equal to the number of primary colors; and when the decision means has determined that any of the output circuits has a defect in at least one of its sub-output circuits, the decision means determines that output circuit to be defective.

According to the configuration, the output terminals are each composed of a plurality of sub-output terminals whose number is equal to the number of primary colors, and the output circuits are each composed of a plurality of sub-output circuits whose number is equal to the number of primary colors. For example, when the display colors are constituted by three primary colors R, G, and B, the output terminals are each constituted by a set of three sub-output terminals, and the output circuits are each constituted by a set of three sub-output circuits.

Moreover, when the decision means has determined that any of the output circuits has a defect in at least one of its sub-output circuits, the output circuit including a defective sub-output circuit is disconnected from all the output terminals and connection terminals, and the connections of the output circuits to the output terminals and the connection terminals are switched in sequence so that the output terminals and the connection terminals are connected to output circuits adjacent to the output circuits to which the output terminals and the connection terminals had been connected before the failure was detected, respectively.

This makes it possible to switch the connections of the output circuits to the output terminals and the connection terminals in units of the number of primary colors by which the display colors are constituted. Therefore, a driving circuit for driving a color display device can be provided with a self-repairing function without complicated circuit board wiring.

The driving circuit according to the present invention is preferably configured such that the number of primary colors is 3.

The foregoing configuration makes it possible, for example, to drive a display device whose display colors are constituted by three primary colors R, G, and B.

The driving circuit according to the present invention is preferably configured such that: the output terminals are each composed of a plurality of sub-output terminals whose number is equal to a natural number multiple of the number of primary colors of each display pixel of the display panel; the latch circuits are each composed of a plurality of sub-latch circuits whose number is equal to the natural number multiple of the number of primary colors; the output circuits are each composed of a plurality of sub-output circuits whose number is equal to the natural number multiple of the number of primary colors; when the decision means has determined that any of the output circuits has a defect in at least one of its sub-output circuits, the decision means determines that output circuit to be defective.

According to the configuration, the output terminals are each composed of a plurality of sub-output terminals whose number is equal to a natural number multiple of the number of primary colors, and the output circuits and the latch circuits are each composed of a plurality of sub-output circuits and sub-latch circuits whose number is equal to the natural number multiple of the number of primary colors, respectively.

For example, when the display colors are constituted by three primary colors R, G, and B and two types of gray-scale voltage are outputted as video signals corresponding each primary colors, the output terminals may each be constituted by a set of six sub-output terminals, and the output circuits may each be constituted by a set of six sub-output circuits.

Moreover, when the decision means has determined that any of the output circuits has a defect in at least one of its sub-output circuits, the output circuit including a defective output section is disconnected from all the output terminals and connection terminals, and the connections of the output circuits to the output terminals and the connection terminals are switched in sequence so that the output terminals and the connection terminals are connected to output circuits adjacent to the output circuits to which the output terminals and the connection terminals had been connected before the failure was detected, respectively.

This makes it possible to switch the connections of the output circuits to the output terminals and the connection terminals in units of a natural number multiple of the number of primary colors by which the display colors are constituted. Therefore, a driving circuit for driving a color display device in which gray-scale voltages corresponding to each primary color are set by a plurality of signals can be provided with a self-repairing function without complicated circuit board wiring.

The driving circuit according to the present invention is preferably configured such that the number of primary colors is 3 and the natural number is 2.

The foregoing configuration makes it possible, for example, to drive a display device whose display colors are constituted by three primary colors R, G, and B and in which gray-scale voltages corresponding to each of the three primary colors are set by two signals.

The driving circuit according to the present invention is preferably configured such that: the selecting means includes a plurality of connection terminals connected to the sub-output circuits in units of the number of primary colors; and the plurality of sub-output circuits are connected to any of the plurality of connection terminals in units of the number of primary colors.

The foregoing configuration enables dot inversion drive of a display device, for example.

The driving circuit according to the present invention is preferably configured to further include m+1 latch circuits, connected to the output circuits respectively, which latch the input signals that are loaded into the output circuits, wherein: the selecting means is a pointer circuit, having m terminals to be connected to the latch circuits, which switches connections between the m terminals and the latch circuits to select which of the latch circuits latches its corresponding one of the input signals; when the decision means has determined all the output circuits to be good, the pointer circuit selects the hth latch circuit as a latch circuit for latching that one of the input signals which corresponds to the hth output terminal; and when the decision means has determined the ith output circuit to be defective, the pointer circuit selects the jth latch circuit as a latch circuit for latching that one of the input signals which corresponds to the jth output terminal and selects the (k+1)th latch circuit as a latch circuit for latching that one of the input signals which corresponds to the kth output terminal.

According to the foregoing configuration, the driving circuit includes m+1 latch circuits that latch the input signals that are loaded into the output circuits. The latch circuits are in connection with the m+1 output circuits, respectively. The pointer circuit, serving as the selecting means, has m terminals to be connected to the latch circuits, and switches connections between the m terminals and the latch circuits to select a latch circuit connected to the output circuit into which an input signal is loaded. Then, the latch circuit thus selected by being connected to the pointer circuit latches the input signal and supplies it to the output circuit connected thereto.

This enables a configuration in which an output circuit is selected by switching connections between a pointer circuit and latch circuits.

The driving circuit according to the present invention is preferably configured such that: the output terminals are each composed of a plurality of sub-output terminals whose number is equal to the number of primary colors of each display pixel of the display panel; the latch circuits are each composed of a sub-latch circuits whose number is equal to the number of primary colors; the output circuits are each composed of a plurality of sub-output circuits whose number is equal to the number of primary colors; and when the decision means has determined that any of the output circuits has a defect in at least one of its sub-output circuits, the decision means determines that output circuit to be defective.

According to the foregoing configuration, the output terminals are each composed of a plurality of sub-output terminals whose number is equal to the number of primary colors, and the output circuits are each composed of a plurality of sub-output circuits whose number is equal to the number of primary colors.

For example, when the display colors are constituted by three primary colors R, G, and B, the output terminals are each constituted by a set of three sub-output terminals, and the output circuits are each constituted by a set of three sub-output sections. More specifically, the output terminals are each composed of a sub-output terminal corresponding to R, a sub-output terminal corresponding to G, and a sub-output terminal corresponding to B, and the output circuits are each composed of a sub-output circuit corresponding to R, a sub-output circuit corresponding to G, and a sub-output circuit corresponding to B.

Moreover, when the decision means has determined that any of the output circuits has a defect in at least, one of its sub-output circuits, the output circuit including a defective sub-output circuit is disconnected from all the output terminals and connection terminals, and the connections of the output circuits to the output terminals and the connection terminals are switched in sequence so that the output terminals and the connection terminals are connected to output circuits adjacent to the output circuits to which the output terminals and the connection terminals had been connected before the failure was detected, respectively.

This makes it possible to switch the connections of the output circuits to the output terminals and the connection terminals in units of the number of primary colors by which the display colors are constituted. Therefore, a driving circuit for driving a color display device can be provided with a self-repairing function without complicated circuit board wiring.

The driving circuit according to the present invention is preferably configured such that the number of primary colors is 3.

The foregoing configuration makes it possible, for example, to drive a display device whose display colors are constituted by three primary colors R, G, and B.

The driving circuit according to the present invention is preferably configured such that: the output terminals are each composed of a plurality of sub-output terminals whose number is equal to an integer multiple of the number of primary colors of each display pixel of the display panel; the latch circuits are each composed of a plurality of sub-latch circuits whose number is equal to the integer multiple of the number of primary colors; the output circuits are each composed of a plurality of sub-output circuits whose number is equal to the integer multiple of the number of primary colors; when the decision means has determined that any of the output circuits has a defect in at least one of its sub-output circuits, the decision means determines that output circuit to be defective.

According to the foregoing configuration, the output terminals are each composed of a plurality of sub-output terminals whose number is equal to an integer multiple of the number of primary colors, and the output circuits are each composed of a plurality of sub-output circuits whose number is equal to the integer multiple of the number of primary colors For example, when the display colors are constituted by three primary colors R, G, and B and two types of gray-scale voltage are outputted as video signals corresponding each primary colors, the output terminals may each be constituted by a set of six sub-output terminals, and the output circuits may each be constituted by a set of six sub-output circuits.

Moreover, when the decision means has determined that any of the output circuits has a defect in at least one of its output sections, the output circuit including a defective sub-output circuit is disconnected from all the output terminals and connection terminals, and the connections of the output circuits to the output terminals and the connection terminals are switched in sequence so that the output terminals and the connection terminals are connected to output circuits adjacent to the output circuits to which the output terminals and the connection terminals had been connected before the failure was detected, respectively.

This makes it possible to switch the connections of the output circuits to the output terminals and the connection terminals in units of an integer multiple of the number of primary colors by which the display colors are constituted. Therefore, a driving circuit for driving a color display device in which gray-scale voltages corresponding, to each primary color are set by a plurality of signals can be provided with a self-repairing function without complicated circuit board wiring.

The driving circuit according to the present invention is preferably configured such that the number of primary colors is 3 and the integer is 2.

The foregoing configuration makes it possible, for example, to drive a display device whose display colors are constituted by three primary colors R, G, and B and in which gray-scale voltages corresponding to each of the three primary colors are set by two signals.

The driving circuit according to the present invention is preferably configured such that: the selecting means includes a plurality of connection terminals connected to the sub-latch circuits in units of the number of primary colors; and the plurality of sub-latch circuits are connected to any of the plurality of connection terminals in units of the number of primary colors.

The foregoing configuration enables dot inversion drive of a display device, for example.

The driving circuit according to the present invention is preferably configured to further include: m latch circuits for loading the input signals corresponding to the output terminals; and m hold circuits, connected to the latch circuits respectively, which after all the latch circuits have loaded the input signals, receive the input signals from the latch circuits and send the input signals to the output circuits, wherein: when the decision means has determined all the output circuits to be good, the selecting means connects the hth hold circuit to the hth output circuit; and when the decision means has determined the ith output circuit to be defective, the selection means connects the jth hold circuit to the jth output circuit and connects the kth hold circuit to the (k+1)th output circuit.

According to the foregoing configuration, the latch circuits and the hold circuits are capable of loading input signals to store them therein and outputting them to the output circuits. The m latch circuits are in connection with the m hold circuits, respectively, and the m hold circuits can be switchably connected to the m+1 output circuits. Each of the latch circuits latches an input signal, and each of the hold circuits stores therein an input signal latched by a latch circuit. Then, after all the latch circuits and hold circuits have latched input signals and stored them therein, the hold circuits output, in accordance with control signals, the stored input signals to the output circuits connected thereto.

This makes it possible to select an output circuit by switching connections between hold circuits and output circuits.

The driving circuit according to the present invention is preferably configured to further include: m latch circuits for loading the input signals corresponding to the output terminals; and m+1 hold circuits, connected to the outputs circuits respectively, which after all the latch circuits have loaded the input signals, receive the input signals from the latch circuits and send the input signals to the output circuits, wherein: when the decision means has determined all the output circuits to be good, the selecting means connects the hth latch circuit to the hth hold circuit; and when the decision means has determined the ith output circuit to be defective, the selection means connects the jth latch circuit to the jth hold circuit and connects the kth latch circuit to the (k+1)th hold circuit.

According to the foregoing configuration, the latch circuits and the hold circuits are capable of loading input signals to store them therein and outputting them to the output circuits. The m+1 hold circuits are in connection with the m+1 output circuits, respectively, and the m latch circuits can be switchably connected to the m+1 hold circuits. Each of the latch circuits latches an input signal, and each of the hold circuits stores therein an input signal latched by a latch circuit. Then, after all the latch circuits and hold circuits have latched input signals and stored them therein, the hold circuits output, in accordance with control signals, the stored input signals to the output circuits connected thereto.

This makes it possible to select an output circuit by switching connections between latch circuits and hold circuits.

The driving circuit according to the present invention is preferably configured such that: the output terminals are each composed of a plurality of sub-output terminals whose number is equal to the number of primary colors of each display pixel of the display panel; the output circuits are each composed of a plurality of sub-output circuits whose number is equal to the number of primary colors; the latch circuits are each composed of a plurality of sub-latch circuits whose number is equal to the number of primary colors; the hold circuits are each composed of a plurality of sub-hold circuits whose number is equal to the number of primary colors; when the decision means has determined that any of the output circuits has a defect in at least one of its sub-output circuits, the decision means determines that output circuit to be defective.

According to the foregoing configuration, the output terminals are each composed of a plurality of sub-output terminals whose number is equal to the number of primary colors; the video signal output sections are each composed of a plurality of output sections whose number is equal to the number of primary colors; the latch circuits are each composed of a plurality of sub-latch circuits whose number is equal to the number of primary colors; and the hold circuits are each composed of a plurality of sub-hold circuits whose number is equal to the number of primary colors.

For example, when the display colors are constituted by three primary colors R, G, and B, the output terminals are each constituted by a set of three sub-output terminals, and the output circuits are each constituted by a set of three sub-output circuits. More specifically, the output terminals are each composed of a sub-output terminal corresponding to R, a sub-output terminal corresponding to G, and a sub-output terminal corresponding to B; the output circuits are each composed of a sub-output circuit corresponding to R, a sub-output circuit corresponding to G, and a sub-output circuit corresponding to B; and the latch circuits are each composed of a sub-latch circuit corresponding to R, a sub-latch circuit corresponding to G, and a sub-latch circuit corresponding to B.

Moreover, when the decision means has determined that any of the output circuits has a defect in at least one of its sub-output circuits, the output circuit including a defective sub-output circuit is disconnected from all the output terminals and connection terminals, and the connections of the output circuits to the output terminals and the connection terminals are switched in sequence so that the output terminals and the connection terminals are connected to output circuits adjacent to the output circuits to which the output terminals and the connection terminals had been connected before the failure was detected, respectively.

This makes it possible to switch the connections of the output circuits to the output terminals and the connection terminals in units of the number of primary colors by which the display colors are constituted. Therefore, a driving circuit for driving a color display device can be provided with a self-repairing function without complicated circuit board wiring.

The driving circuit according to the present invention is preferably configured such that the number of primary colors is 3.

The foregoing configuration makes it possible, for example, to drive a display device whose display colors are constituted by three primary colors R, G, and B.

The driving circuit according to the present invention is preferably configured such that: the output terminals are each composed of a plurality of sub-output terminals whose number is equal to an integer multiple of the number of primary colors of each display pixel of the display panel; the latch circuits are each composed of a plurality of sub-latch circuits whose number is equal to the integer multiple of the number of primary colors; the hold circuits are each composed of a plurality of sub-hold circuits whose number is equal to the integer multiple of the number of primary colors; the output circuits are each composed of a plurality of sub-output circuits whose number is equal to the integer multiple of the number of primary colors; when the decision means has determined that any of the output circuits has a defect in at least one of its sub-output circuits, the decision means determines that output circuit to be defective.

According to the foregoing configuration, the output terminals are each composed of a plurality of sub-output terminals whose number is equal to an integer multiple of the number of primary colors; the output circuits are each composed of a plurality of sub-output circuits whose number is equal to the integer multiple of the number of primary colors; the latch circuits are each composed of a plurality of sub-latch circuits whose number is equal to the integer multiple of the number of primary colors; and the hold circuits are each composed of a plurality of sub-hold circuits whose number is equal to the integer multiple of the number of primary colors.

For example, when the display colors are constituted by three primary colors R, G, and B and two types of gray-scale voltage are outputted as video signals corresponding each primary colors, the output terminals may each be constituted by a set of six sub-output terminals, and the output circuits may each be constituted by a set of six sub-output circuits. Similarly, the latch circuits may each be constituted by a set of six sub-latch circuits, and the hold circuits may each be constituted by a set of six sub-hold circuits.

Moreover, when the decision means has determined that any of the output circuits has a defect in at least one of its sub-output circuits, the output circuit including a defective sub-output circuit is disconnected from all the output terminals and latch circuits, and the connections of the output circuits to the output terminals and the latch circuits are switched in sequence so that the output terminals and the latch circuits are connected to output circuits adjacent to the output circuits to which the output terminals and the latch circuits had been connected before the failure was detected, respectively.

This makes it possible to switch the connections of the output circuits to the output terminals and the latch circuits in units of an integer multiple of the number of primary colors by which the display colors are constituted. Therefore, a driving circuit for driving a color display device in which gray-scale voltages corresponding to each primary color are set by a plurality of signals can be provided with a self-repairing function without complicated circuit board wiring.

The driving circuit according to the present invention is preferably configured such that the number of primary colors is 3 and the integer is 2.

The foregoing configuration makes it possible, for example, to drive a display device whose display colors are constituted by three primary colors R, G, and B and in which gray-scale voltages corresponding to each of the three primary colors are set by two signals.

The driving circuit according to the present invention is preferably configured such that: the selecting means includes a plurality of connection terminals connected to the sub-latch circuits in units of the number of primary colors; and the plurality of sub-latch circuits are connected to any of the plurality of connection terminals in units of the number of primary colors.

The foregoing configuration enables dot inversion drive of a display device, for example.

A display device according to the present invention preferably includes such a driving circuit.

The foregoing configuration allows the display device according to the present invention to reconfigure the driving circuits solely of normal circuits by disconnecting a failed output circuit, if any, i.e., to carry out self-repairs.

Moreover, the display device according to the present invention, configured such that the connections of the output circuits to the output terminals and the latch circuits are switched in sequence so that the output terminals and the latch circuits are connected to output circuits adjacent to the output circuits to which the output terminals and latch circuits had been connected before the failure was detected, respectively, can suppress complexity of wiring, and therefore can be provided with a self-repairing function without an increase in size of the circuit board.

BRIEF DESCRIPTION OF DRAWINGS

FIG. 30 shows the configuration of the integrated circuit for self-repairing operation in accordance with Embodiment 4.

FIG. 41 shows the configuration of an integrated circuit for normal operation in accordance with Embodiment 7.

FIG. 47 shows the configuration of an integrated circuit for normal operation in accordance with Embodiment 10.

FIG. 58 shows the configuration of a pointer circuit.

REFERENCE SIGNS LIST

1_1 to 1_20 Operation amplifier (comparing means)

2*a*, 2*b* Switch

3_1 to 3_20 Decision circuit (decision means)

4_1 to 4_20 Decision flag

5_1 to 5_20 Pull-up/pull-down circuit

10 Integrated circuit (driving circuit)

20, 20', 20" Shift register (selecting means)

11_1 to 11_24 Output circuit (output section)

DAC_1 to DAC_18 Digital-analog converter

DF_1 to DF_27 D flip-flop

DLA_1 to DLA_19 Latch circuit

DLA_R1 to DLA_R8 Latch circuit

DLA_G1 to DLA_G8 Latch circuit

DLA_B1 to DLA_B8 Latch circuit

DLB_1 to DLB_19 Hold circuit

DLB_R1 to DLB_R8 Hold circuit

DLB_G1 to DLB_G8 Hold circuit

DLB_B1 to DLB_B8 Hold circuit

OUT1 to OUT18 Output terminal (output terminal, sub-output terminal)

SWA1 to SWA28 Switch

SWB1 to SWB18 Switch

DESCRIPTION OF EMBODIMENTS

Embodiments of the present invention are described below with reference to the drawings.

Embodiment 1

Embodiment 1 of the present invention is described below with reference to FIGS. 1 through 19.

(Configuration of a Self-Repairing Circuit)

Figure 53:
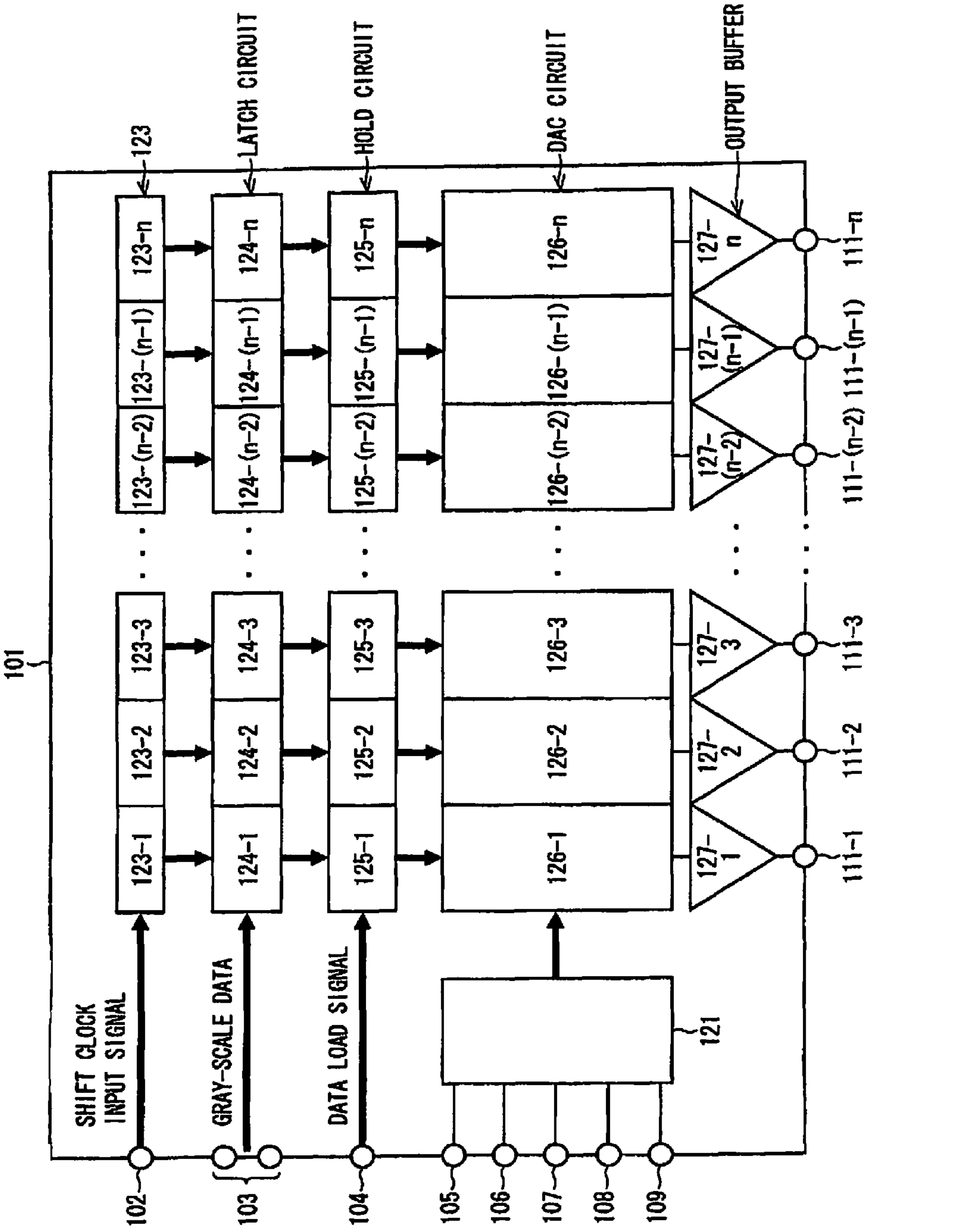
FIG. 53 CONVENTIONAL ART
FIG. 53 is a block diagram showing the configuration of a conventional example of a liquid crystal driving semiconductor integrated circuit.

First, the configuration of a display driving semiconductor integrated circuit (hereinafter referred to as "integrated circuit") 10 in accordance with the present embodiment is described with reference to FIG. 1. For simplicity of explanation, the integrated circuit 10 is exemplified by an eighteen-output integrated circuit corresponding to the conventional example shown in FIG. 53. However, the number of outputs from the integrated circuit 10 is not limited to 18.

Figure 1:
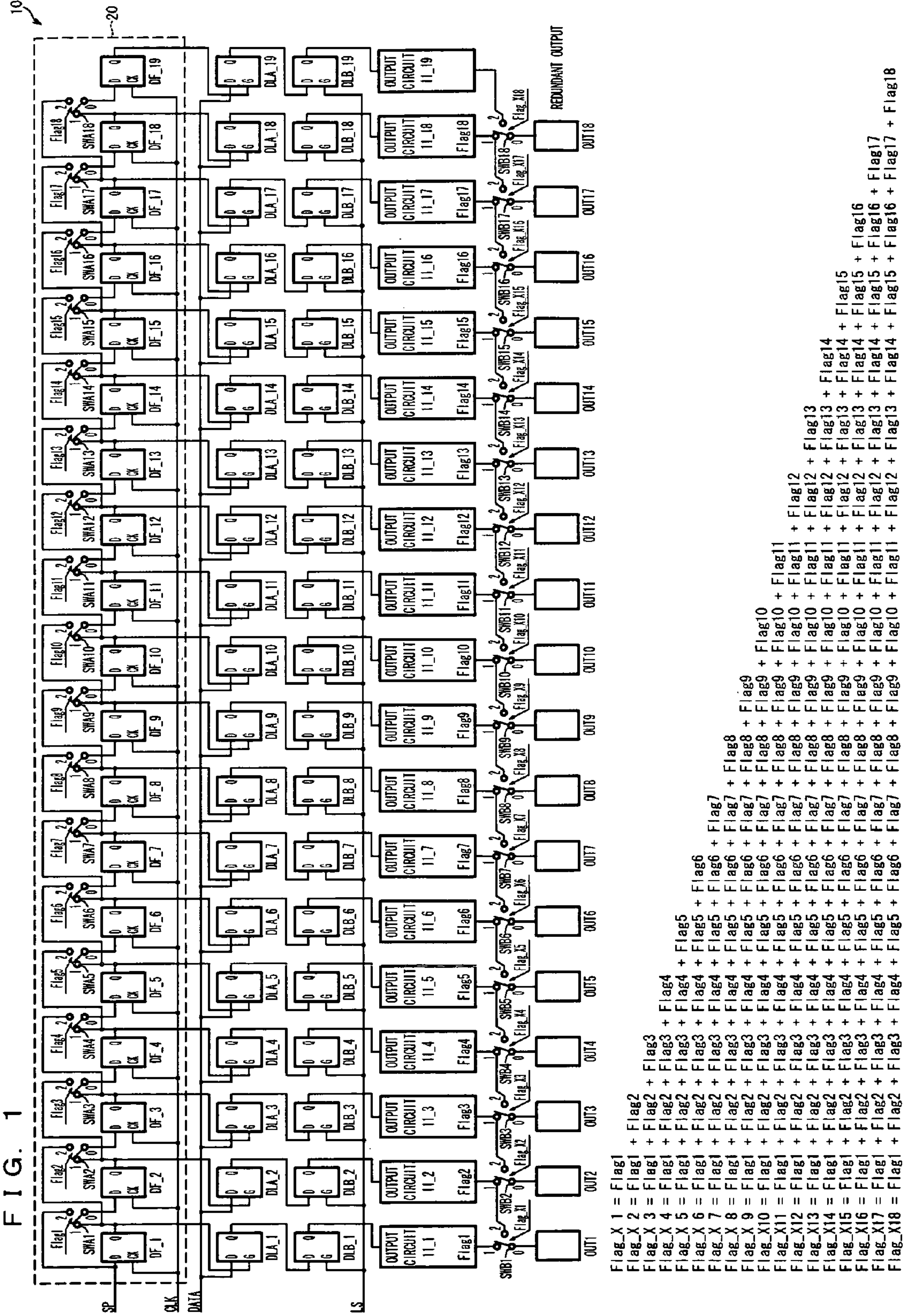
FIG. 1 is a block diagram showing the configuration of an integrated circuit for normal operation in accordance with Embodiment 1 of the present invention.

FIG. 1 is a block diagram showing the configuration of the integrated circuit 10 (driving circuit) for normal operation in accordance with the present embodiment. As shown in FIG. 1, the integrated circuit 10 includes: liquid crystal driving signal output terminals OUT1 to OUT18 (hereinafter abbreviated as "output terminals OUT1 to OUT18 or sometimes referred to collectively as "output terminals OUT"); a D flip-flop_1 to a D flip-flop_19 (hereinafter abbreviated as "DF_1 to DF_19" or sometimes referred to collectively as "DFs"); latch circuits DLA_1 to DLA_18 and a spare latch circuit DLA_19 (all the latch circuits including the spare latch circuit being hereinafter sometimes referred to collectively as "latch circuits DLA"); hold circuits DLB_1 to DLB_18 and a spare hold circuit DLB_19 (all the hold circuits including the spare hold circuit being hereinafter sometimes referred to collectively as "hold circuits DLB"); output circuits 11_1 to 11_18 and a spare output circuit 11_19 (all the output circuits including the spare output circuit being hereinafter sometimes referred to collectively as "output circuits 11"); eighteen switches SWA1 to SWA18 (hereinafter sometimes referred to collectively as "switches SWA); and eighteen switches SWB1 to SWB18 (hereinafter sometimes referred to collectively as "switches SWB). It should be noted that the integrated circuit 10 serves to drive video signal lines of a display device through the output terminals OUT and may be provided in the display device.

The DFs, connected in series, constitute a shift register 20 (selecting section). As such, the shift register 20 sends pulse signals to the latch circuits DLA in sequence through the DFs, respectively, in accordance with a start pulse signal (hereinafter referred to as "SP signal") inputted through an SP signal line and a clock signal (hereinafter referred to as "CLK signal") inputted through a CLK signal line, thereby selecting which of the latch circuits DLA loads gray-scale data.

At this point, the latch circuits DLA receive the pulse signals (hereinafter referred to as "selection signals") in sequence, thereby loading gray-scale data corresponding to the output terminals OUT through a DATA signal line in sequence in synchronization with the timing of input of the selection signals, respectively. After loading the gray-scale data, the latch circuits DLA send the gray-scale data to the hold circuits DLB connected thereto, respectively. Upon receiving the gray-scale data, the hold circuits DLB hold the gray-scale data, and then send the held gray-scale data to the output circuits 11 connected thereto, respectively, in accordance with a data LOAD signal (hereinafter referred to as "LS signal") inputted through an LS signal line.

Each of the output circuits 11 includes: a DAC (digital-analog converter) circuit (not shown) for converting gray-scale data into a gray-scale voltage signal; an operational amplifier (not shown) that serves as a buffer circuit; a decision circuit for determining the quality of operation of the output circuit; and a decision flag for indicating the quality of operation as determined by the decision circuit.

Each of the output circuits 11 outputs Flag indicative of its quality. Taking one of the output circuits 11 as an example, the output circuit 11_1 outputs Flag1 indicative of “1” when the output circuit 11_1 becomes defective and outputs Flag1 indicative of “0” when the output circuit 11_1 is normal. Similarly, the output circuits 11_2 to 11_18 output Flag2 to Flag18 indicative of their quality, respectively. It should be noted that circuitry and operation for determining the quality of operation for each of the output circuits are described later.

As shown in FIG. 1, the switches SWA1 to SWA18 each switch from one input to another for the DFs under control of the values of Flag1 to Flag18 outputted from the output circuits 11, respectively. Specifically, when Flagi from the ith output circuit 11_*i* is “1”, the input of the (i+1)th DF_(i+1) is connected to the input of the ith DF_i; and when Flagi is “0”, the input of the $(i_{+i})$th DF_(i+1) is connected to the output of the ith DF_i. It should be noted that i is an integer that satisfies the relationship $1 \leq i \leq 18$. The same applies to the description below. Taking the switch SWA7 as an example, the switch SWA7 is controlled by the value of Flag7 outputted from the output circuit 11_7; and when Flag7 is “1”, the switch SWA7 connects the input of DF_8 to the input of DF_7. On the other hand, when Flag7 is “0”, the switch SWA7 connects the input of DF_8 to the output of DF_7.

Further, as shown in FIG. 1, the switches SWB1 to SWB18 (connection switching section) switch from connecting their corresponding output terminals OUT1 to OUT18 to one output to another under control of the values of Flag_X1 to Flag_X18 as calculated from Flag1 to Flag18, respectively. It should be noted here that Flag_X1 to Flag_X18 are calculated by a control circuit (not shown) according to logical expressions shown in FIG. 1. The operation of the switches SWB is explained in concrete terms as follows: When Flag_Xi obtained by combining Flag1 to Flagi according a logical expression OR is “1”, the ith switch SWBi connects the ith output terminal OUTi to the output of the (i+1)th output circuit 11_*i*+1. On the other hand, when Flag_Xi is “0”, the ith switch SWBi connects the ith output terminal OUTi to the output of the ith output circuit 11_*i*. Taking the switch SWB7 as an example, the switch SWB7 is controlled by the value of Flag_X7; and when Flag_X7 is “1”, the switch SWB7 connects the output terminal OUT7 to the output of the output circuit 11_8. On the other hand, when Flag_X7 is “0”, the switch SWB7 connects the output terminal OUT7 to the output of the output circuit 11_7.

In the integrated circuit 10 of FIG. 1, the latch circuits DLA_1 to DLA_18, which latch incoming gray-scale data, and the hold circuits DLB_1 to DLB_18 correspond one-to-one with each separate output terminal OUT. However, when the incoming gray-scale data is 6-bit data, six latch circuits DLA and six hold circuits DLB are needed for each separate output terminal OUT; and when the incoming gray-scale data is 8-bit data, eight latch circuits DLA and eight hold circuits DLB are needed for each separate output terminal OUT. In the present embodiment, for simplicity of explanation, one latch circuit DLA and one hold circuit DLB correspond to each separate output terminal OUT.

(Normal Operation)

Next, the operation of the integrated circuit 10 without a defective output circuit, i.e. normal operation, is described below.

In the absence of a defective output circuit, Flag1 to Flag18 in the output circuits 11_1 to 11_18 are all “0”. Accordingly, Flag_X1 to Flag_X18, obtained by combining Flag1 to Flag18 according to the logical expressions OR respectively, are all “0”, too. Therefore, the switches SWA1 to SWA18 and switches SWB1 to SWB18 in the integrated circuit 10 both make connections as shown in FIG. 1, whereby the integrated circuit 10 is configured in the same manner as the conventional circuit of FIG. 54.

Figure 2:
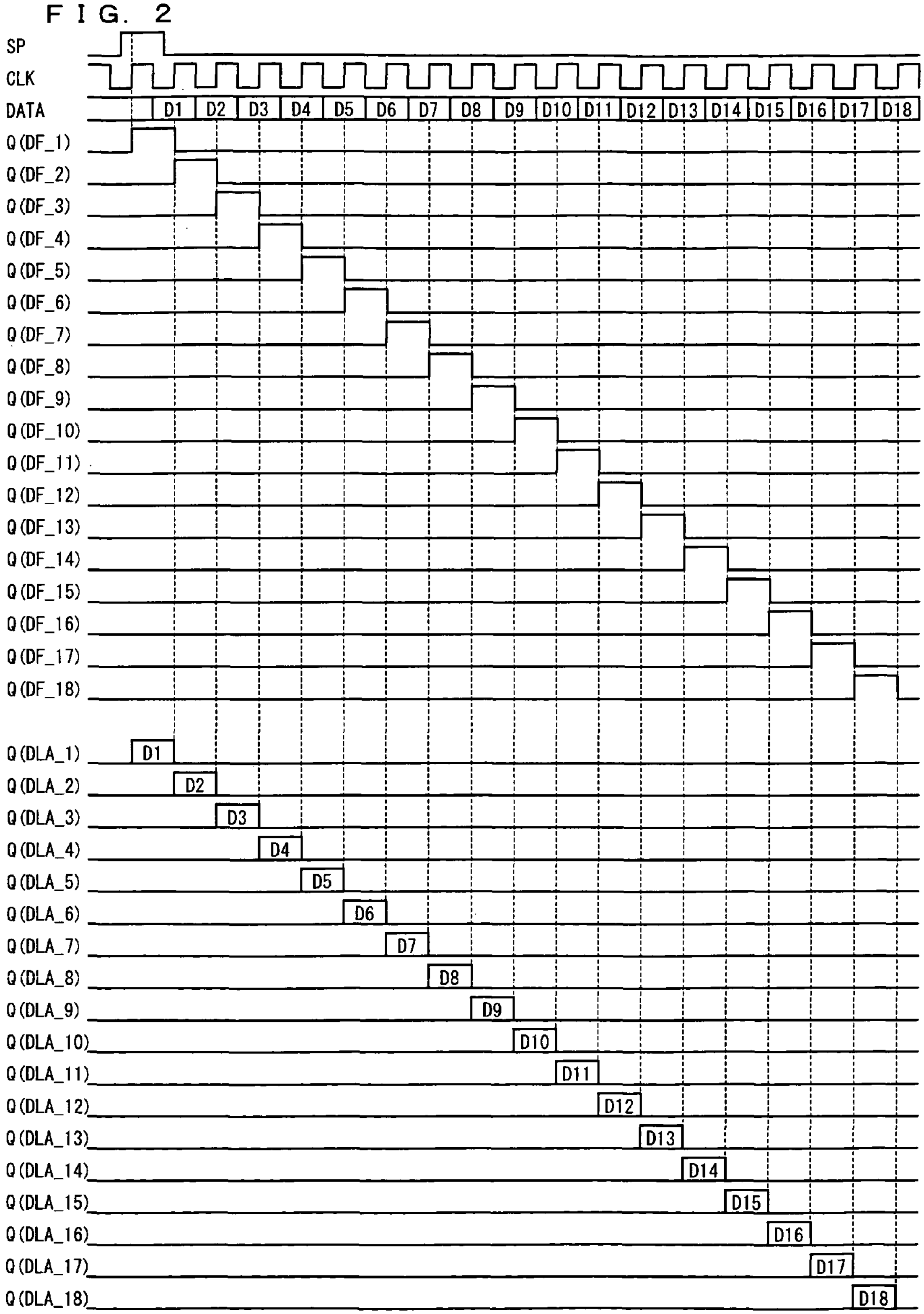
FIG. 2 is a timing chart showing the operation of the integrated circuit without a defective output circuit in accordance with Embodiment 1 of the present invention.

The normal operation of the integrated circuit 10 is described below with reference to FIG. 2. FIG. 2 is a timing chart showing the operation of the integrated circuit 10 without a defective output circuit.

First, DF_1 receives a “H” SP signal indicative of the start of operation of the integrated circuit 10 through its input section D. DF_1 loads the value “H” of the SP signal in response to a rise in the CLK signal, and then outputs a “H” selection signal through its output section Q. As shown in FIG. 2, at the next rising edge of the CLK signal, the SP signal is “L” and, accordingly, the selection signal from DF_1 through its output section Q becomes “L”, too. It should be noted, in FIG. 2, that Q (DF_1) to Q (DF_18) denote selection signals from DF_1 to DF_18, respectively.

The DFs constitute a shift register 20 by having their output sections Q connected to the input sections D of the next DFs, respectively. That is, before the selection signal Q (DF_1) from DF_1 becomes “L”, DF_2 outputs a “H” selection signal Q (DF_2) in response to a rise in the CLK signal. After that, the selection signal Q (DF_1) becomes “L”. This operation process is repeated for each of DF_2 to DF_18. As shown in FIG. 2, in synchronization with rises in the CLK signal, the DFs send the selection signals in sequence to the latch circuits DLA connected to the output sections Q of the DFs, respectively.

Next, the latch circuit DLA_1 receives the selection signal from DF_1 through its gate terminal G. While receiving a “H” selection signal through its gate section G, the latch circuit DLA_1 loads gray-scale data through its input section D and sends the loaded gray-scale data to the hold circuit DLB_1 through the output section Q of the latch circuit DLA_1. At this point, the latch circuit DLA_1 holds gray-scale data D1 at the time of a fall in the received selection signal and, even after the received selection signal becomes “L”, sends the held gray-scale data D1 to the hold circuit DLB_1 through the output section Q. It should be noted that the CLK signal and the gray-scale data are in synchronization with each other and, for every fall in the CLK signal, the integrated circuit 10 receives gray-scale data corresponding to the output terminals OUT in sequence. It should be noted, in FIG. 2, that D1 to D18 denote gray-scale data corresponding to the output terminals OUT1 to OUT18, respectively. It should also be noted, in FIG. 2, that Q (DLA_1) to Q (DLA_18) denote outputs from the latch circuits DLA through their output sections Q, respectively.

Further, as with the latch circuit DLA_1, the latch circuits DLA_2 to DLA_18 load gray-scale data D2 to D18 in sequence through the DATA signal line while the selection signals from DF_2 to DF_18 are “H” and, even after the selection signals become “L”, send the gray-scale data D2 to D18 to the hold circuits DLB connected thereto, respectively. At this point, the hold circuits DLB_1 to DLB_18 receive the gray-scale data D1 to D18 from the latch circuits DLA through the input sections D of the hold circuits DLB_1 to DLB_18, respectively. It should be noted, in FIG. 2, that Q (DLA_1) to Q (DLA_18) denote signals outputted from the latch circuits DLA_1 to DLA_18 through their output sections Q, respectively.

Although FIG. 2 does not show the subsequent operation, after all the latch circuits DLA load the gray-scale data D1 to D18, respectively, the integrated circuit 10 sends a "H" LS signal to the hold circuits DLB through their gate sections G. Upon receiving the "H" LS signal, the hold circuits DUB output the gray-scale data D1 to D18, which have been inputted through their input sections D, through their output sections Q, respectively. Thus, the output circuits 11_1 to 11_18 receive the gray-scale data D1 to D18 loaded in sequence by the latch circuits DLA_1 to DLA_18, respectively. Then, the output circuits 11_1 to 11_18 convert the gray-scale data D1 to D18 into gray-scale voltages, buffer the gray-scale voltages, and then send the gray-scale voltages, which correspond to the gray-scale data D1 to D18, to the output terminals OUT1 to OUT18, respectively.

It should be noted that the spare circuits, i.e. DF_19, the latch circuit DLA_19, and the hold circuit DLB_19, also operate upon receiving the CLK signal and the LS signal. However, the output circuit 11_19, connected to none of the output terminals OUT1 to OUT18, does not affect the waveform of an output from any of the output terminals OUT1 to OUT18. Therefore, the foregoing description omits to mention the operation of the spare circuits, i.e. DF_19, the latch circuit DLA_19, and the hold circuit DLB_19.

(Self-Repairing Operation)

Figure 3:
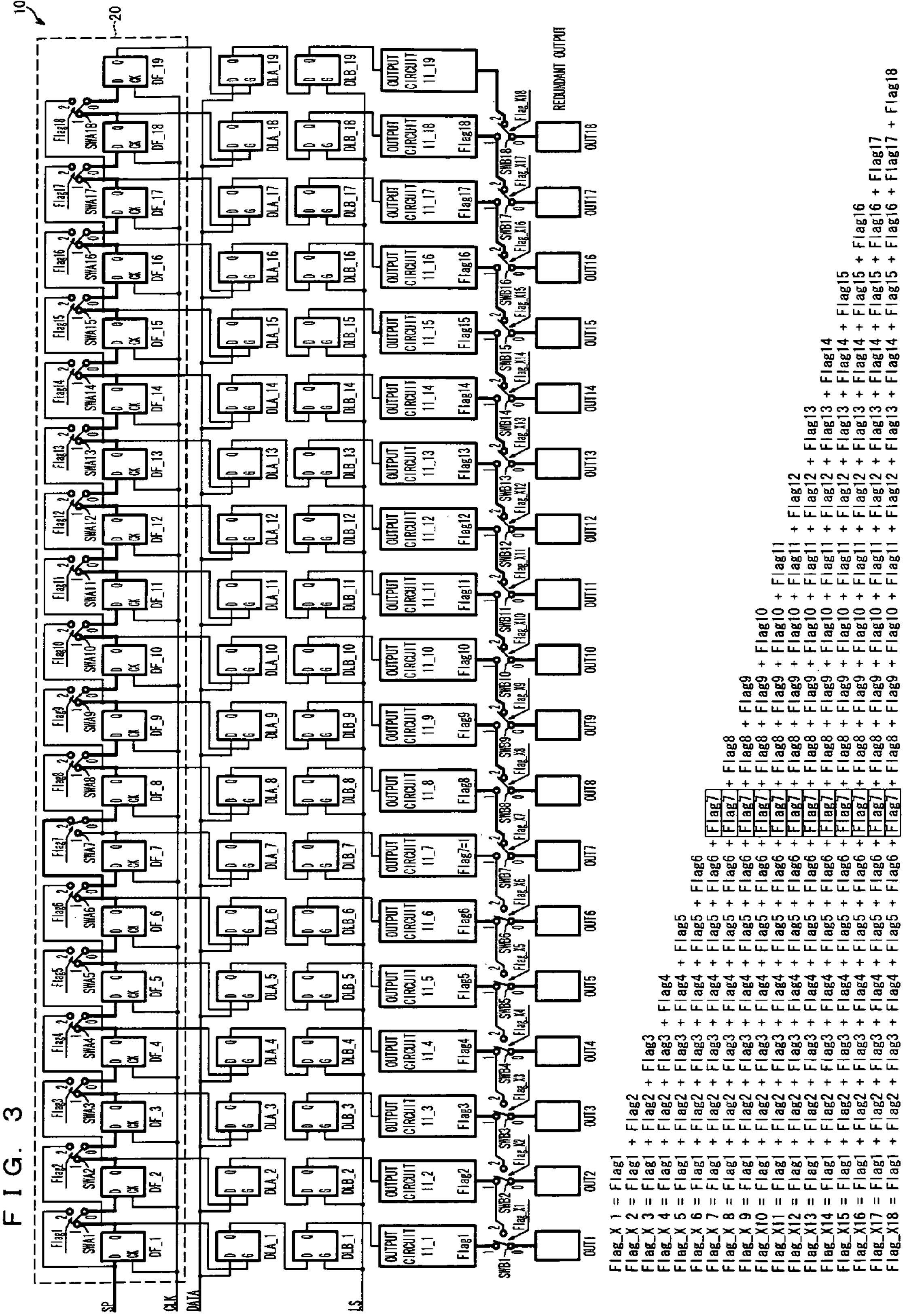
FIG. 3 is a block diagram showing the configuration of the integrated circuit for self-repairing operation in accordance with Embodiment 1 of the present invention.
Figure 4:
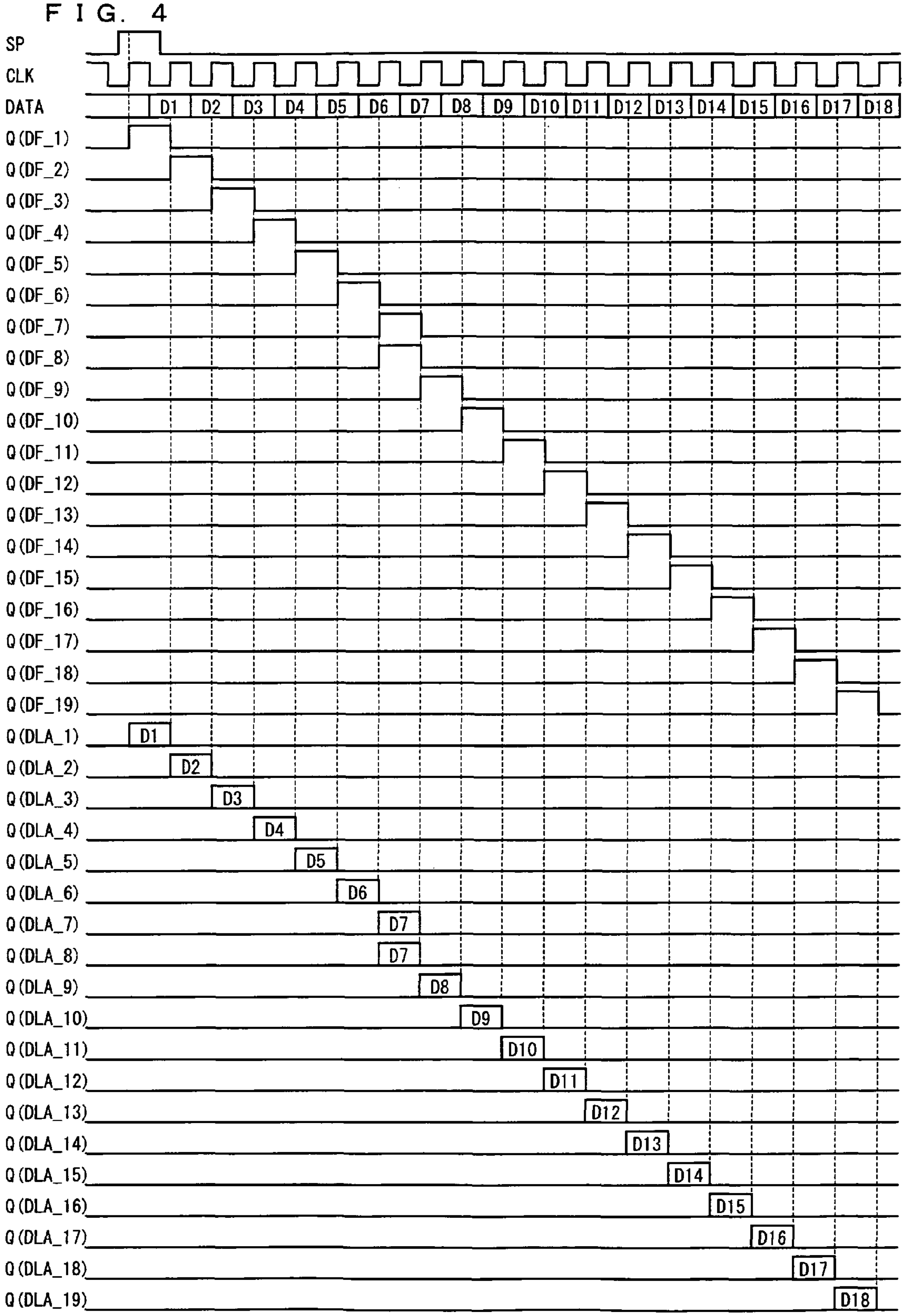
FIG. 4 is a timing chart showing the operation of the integrated circuit with a defective output circuit in accordance with Embodiment 1 of the present invention.

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 3 and 4. FIG. 3 shows the configuration of the integrated circuit 10 for self-repairing operation in accordance with the present embodiment, and FIG. 4 is a timing chart showing the operation of the integrated circuit 10 with a defective output circuit.

First, as shown in FIG. 3, the integrated circuit 10 has Flag7 set to "1" in the presence of a defect in the output circuit 11_7. Further, according to the logical expressions OR (see FIG. 1), Flag_X1 to Flag_X6 are "0", and Flag_X7 to Flag_X18, each constituted by incorporating Flag7, are "1".

Since Flag_X1 to Flag_X6 are "0", the switches SWA1 to SWA6 and the switches SWB1 to SWB6 operate in the same manner as in the case of normal operation previously mentioned. Therefore, the following description omits to mention the operation in DF1 to DF_6, the latch circuits DLA_1 to DLA_6, the hold circuits DLB_1 to DLB_6, and the output circuits 11_1 to 11_6.

Meanwhile, since Flag7 has been set to "1", SWA7 has switched from connecting the input section D of DF_8 to the output section Q of the DF_7 to connecting the input section D of DF_8 to the output section Q of DF_6. As a result of this switch in SWA7, DF_7 and DF_8 send selection signals to the latch circuits DLA_7 and DLA_8, respectively, at the same time or, in other word, in synchronization with the timing of input of the gray-scale data D7, as shown in FIG. 4. Thus, the latch circuits DLA_7 and DLA_8 both load the gray-scale data D7. Further, DF_9 to DF_19 send selection signals to the latch circuits DLA_9 and DLA_19 in synchronization with the timing of input of the gray-scale data D8 to D18, respectively. Thus, the latch circuit DLA_9 loads the gray-scale data D8, and the latch circuit DLA_10 loads the gray-scale data D9. Similarly, the subsequent latch circuits DLA_11 to DLA_19 load the gray-scale data D10 to D18, respectively. In this way, the latch circuits DLA_8 and DLA_19 load the gray-scale data D7 to D18, respectively, in a one-stage-shifted manner in comparison with normal operation. It should be noted, in FIG. 4, that Q (DF_1) to Q (DF_19) denote selection signals from the DFs, respectively, and Q (DLA_1) to Q (DLA_19) denote outputs from the latch circuits DLA through their output sections Q, respectively.

Further, since Flag_X7 is "1", the switch SWB7 has switched from connecting the output terminal OUT7 to the output of the output circuit 11_7 to connecting the output terminal OUT7 to the output of the output circuit 11_8. Therefore, none of the output terminals OUT receives a gray-scale voltage from the defective output circuit 11_7. Furthermore, the output terminal OUT7 receives a gray-scale voltage corresponding to the gray-scale data D7 from the output circuit 11_8. Furthermore, since Flag_X8 to Flag_X18 are "1", the switches SWB8 to SWB18 connect the output terminal OUT8 to the output circuit 11_9, the output terminal OUT9 to the output circuit 11_10 and, similarly, the subsequent output terminals OUT10 to OUT18 to the output circuits 11_11 to 11_19, respectively. As a result, the output terminals OUT1 to OUT18 receive gray-scale voltages corresponding to the gray-scale data D1 to D18, respectively.

As described above, the configuration capable of self-repairing is realized by: (i) disconnecting a defective output circuit 11, a defective latch circuit DLA, or a defective hold circuit DLB, if detected, by switching from connecting the input section D of each DF to one output to another and switching connections between the output circuits 11_1 to 11_19 and the output terminals OUT1 to OUT18, so as to shift from one normal circuit to another in sequence; and (ii) adding the spare circuits.

(Detection of a Failure in an Output Circuit)

The following describes a method for detecting a failure in the output circuits 11_1 to 11_18 of the integrated circuit 10. This failure detection method is carried out by comparing reference voltages in the respective operational amplifiers of the output circuits 11_1 to 11_18 with voltages from the respective DAC circuits of the output circuits 11_1 to 11_18. Examples of the method for detecting a failure in the output circuits 11_1 to 11_18 include: a "first failure detection method" that makes a determination by comparing a voltage from the DAC circuit of the spare output circuit 11_19 with the voltages from the respective DAC circuits of the output circuits 11_1 to 11_18; and a "second failure detection method" that makes a determination by comparing the voltages from the respective DAC circuits of the output circuits 11_1 to 11_18 with each other.

(First Failure Detection Method)

The "first failure detection method", which makes a determination by comparing a voltage from the DAC circuit of the spare output circuit 11_19 with the voltages from the respective DAC circuits of the output circuits 11_1 to 11_18, is described below with reference to FIGS. 5 through 12.

Figure 5:
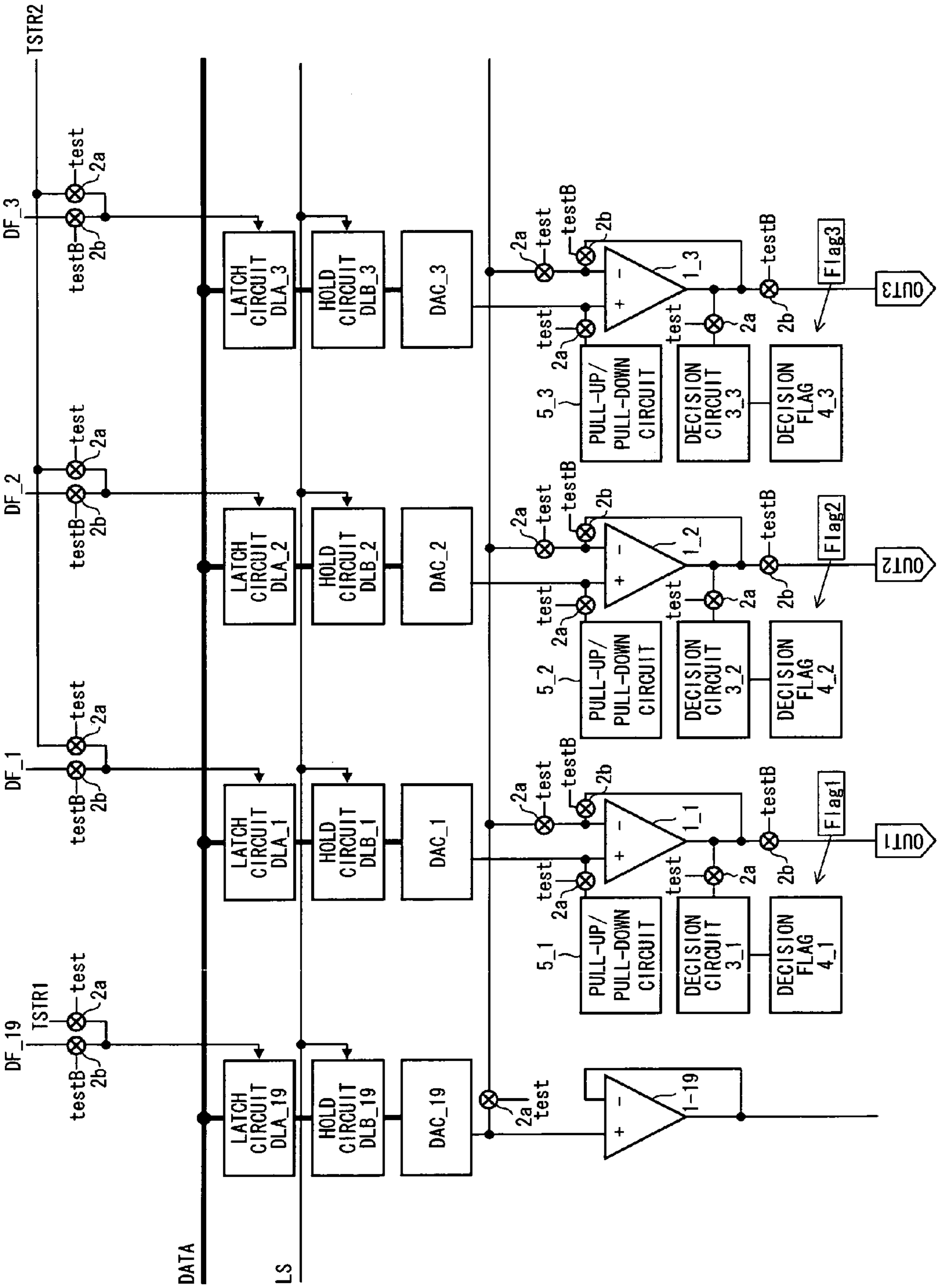
FIG. 5 is a block diagram showing a configuration for detecting a failure in usual output circuits with use of a spare output circuit in accordance with Embodiment 1 of the present invention.

FIG. 5 shows a configuration for detecting a failure in the usual output circuits 11_1 to 11_18 with use of the spare output circuit 11_19. In FIG. 5, a block corresponding to the output circuit 11_1 of FIG. 1 is constituted by DAC_1, an operational amplifier 1_1, switches 2*a* and 2*b*, a decision circuit 3_1, a decision flag 4_1, and a pull-up/pull-down circuit 5_1. A block corresponding to the output circuit 11_2 of FIG. 1 is constituted by DAC_2, an operational amplifier 1_2, switches 2*a* and 2*b*, a decision circuit 3_2, a decision flag 4_2, and a pull-up/pull-down circuit 5_2. A block corresponding to the output circuit 11_3 of FIG. 1 is constituted by DAC_3, an operational amplifier 1_3, switches 2*a* and 2*b*, a decision circuit 3_3, a decision flag 4_3, and a pull-up/pull-down circuit 5_3. A block corresponding to the spare output circuit 11_19 of FIG. 1 is constituted by DAC_19 and the operational amplifier 1_19.

Of the circuits of FIG. 5, incorporated as part of the integrated circuit 10 of FIG. 1 for self-repairing operation, each output circuit 11 is in connection with a switch capable of switching between outputs from the two adjacent output circuits. For example, the output terminal OUT1 is in connection with a switch capable of switching between outputs from the output circuits 11_1 and 11_2, and the output terminal OUT2 is in connection with a switch capable of switching between outputs from the output circuits 11_2 and 11_3.

Although FIG. 5 shows only the output circuits 11_1 to 11_3 and the spare output circuit 11_19 for convenience of explanation, the detection of a failure is carried out for all the usual output circuits 11_1 to 11_18. The output circuits 11_1 to 11_18 include the same circuits as those included in the output circuits 11_1 to 11_3.

The integrated circuit 10 includes latch circuits DLA_1 to DLA_3, hold circuits DLB_1 to DLB_3, output circuits 11_1 to 11_3, and a plurality of switches 2*a* and 2*b*. The integrated circuit 10 further includes spare circuits, i.e. a latch circuit DLA_19, a hold circuit DLB_19, and an output circuit 11_19.

The latch circuits DLA_1 to DLA_3 receive gray-scale data corresponding to the output terminals OUT1 to OUT3 through the DATA signal line, respectively. Furthermore, the output circuits 11_1 to 11_3 receive the gray-scale data through the hold circuits DLB_1 to DLB_3, and then convert the digital gray-scale data into gray-scale voltage signals, respectively.

Further, each of the switches 2*a* switches between ON and OFF in accordance with a test signal, and each of the switches 2*b* switches between ON and OFF in accordance with a testB signal. It should be noted that each of the switches 2*a* and 2*b* is turned "ON" upon receiving a "H" signal and turned "OFF" upon receiving a "L" signal.

(Operation that is Carried Out when the Presence or Absence of a Defect is not Determined)

Next, the operation that is carried out when the presence or absence of a defect is not determined, i.e. the normal operation of the display device for outputting gray-scale voltages for display driving, is described with reference to FIG. 5.

In the case of normal operation, the test signal is "L" and the testB signal is "H". Accordingly, the switch 2*a* is "OFF" and the switch 2*b* is "ON". Thus, the latch circuits DLA_1 to DLA_3 receive selection signals from DF_1 to DF_3, respectively, and the latch circuit DLA_19 receives a selection signal from DF_19.

In synchronization with the received selection signals, the latch circuits DLA_1 to DLA_19 obtain their corresponding gray-scale data from the DATA signal line through their gray-scale data input terminals, respectively. The hold circuits DLB_1 to DLB_19 output, in accordance with the LS signal, the gray-scale data obtained by the latch circuits DLA_1 to DLA_19, respectively.

Next, DAC_1 to DAC_19 receive the gray-scale data from the hold circuits DLB_1 to DLB_19, respectively. Then, DAC_1 to DAC_19 convert the digital gray-scale data into gray-scale voltages and send the gray-scale voltages to the operational amplifiers 1_1 to 1_19 through the positive input terminals of the operational amplifiers 1_1 to 1_19, respectively. At this point, where the switches 2*b* are ON, the operational amplifiers 1_1 to 1_19 have their outputs negatively fed back to their negative input terminals. Thus, the operational amplifiers 1_1 to 1_19 operate as voltage followers. As such, the operational amplifiers 1_1 to 1_19 serve as buffer circuits for the gray-scale voltages sent from DAC_1 to DAC_19, thus supplying the corresponding output terminals OUT1 to OUT19 with the gray-scale voltages received by the operational amplifiers 1_1 to 1_19 through their positive input terminals.

Assuming that a block having a latch circuit DLA, a hold circuit DLA, DAC, and an operational amplifier connected in series for each output terminal OUT as described above is an output circuit block (video signal output section), each output circuit block is intended to receive gray-scale data through its gray-scale data input terminal, convert the gray-scale data into a gray-scale voltage for driving the display device, and send the gray-scale voltage to the display device through the corresponding output terminal OUT.

(Switch to an Operation-Checking Test)

In the case of a switch to an operation-checking test for checking the operation of DAC_1 to DAC_3, the test signal is at "H" and the testB signal is at "L". First, the switches 2*a* are turned "ON", whereby the spare latch circuit DLA_19 receives a TSTR1 signal, i.e. an STR signal for operation-checking testing, and the latch circuits DLA_1 to DLA_3 receive a TSTR2 signal, i.e. an STR signal for operation-checking testing. Furthermore, the operational amplifiers 1_1 to 1_3 receive the gray-scale voltage from the spare DAC_19 through their negative input terminals. Further, since the switches 2*b* are OFF, the operational amplifiers 1_1 to 1_3 have their outputs stopped from being negatively fed back to their negative input terminals. As a result, the operational amplifiers 1_1 to 1_3 serve as comparators for comparing output voltages from DAC_1 to DAC_3, which are in serial connection with the positive input terminals of the operational amplifiers 1_1 to 1_3 respectively, with an output voltage from the spare DAC circuit DAC_19.

It should be noted that the test signal and the testB signal are sent from a control circuit (not shown) for controlling the switch to an operation-checking test and the operation of an operation-checking test. Further, the control circuit serves also as a circuit for, during an operation-checking test, controlling gray-scale data that are inputted through the DATA signal line and an LS. Furthermore, the control circuit may be identical to or different from the control circuit for controlling gray-scale data, an LS signal, and a CLK signal during normal operation.

(Operation-Checking Test 1 Based on the First Failure Detection Method)

Figure 6:
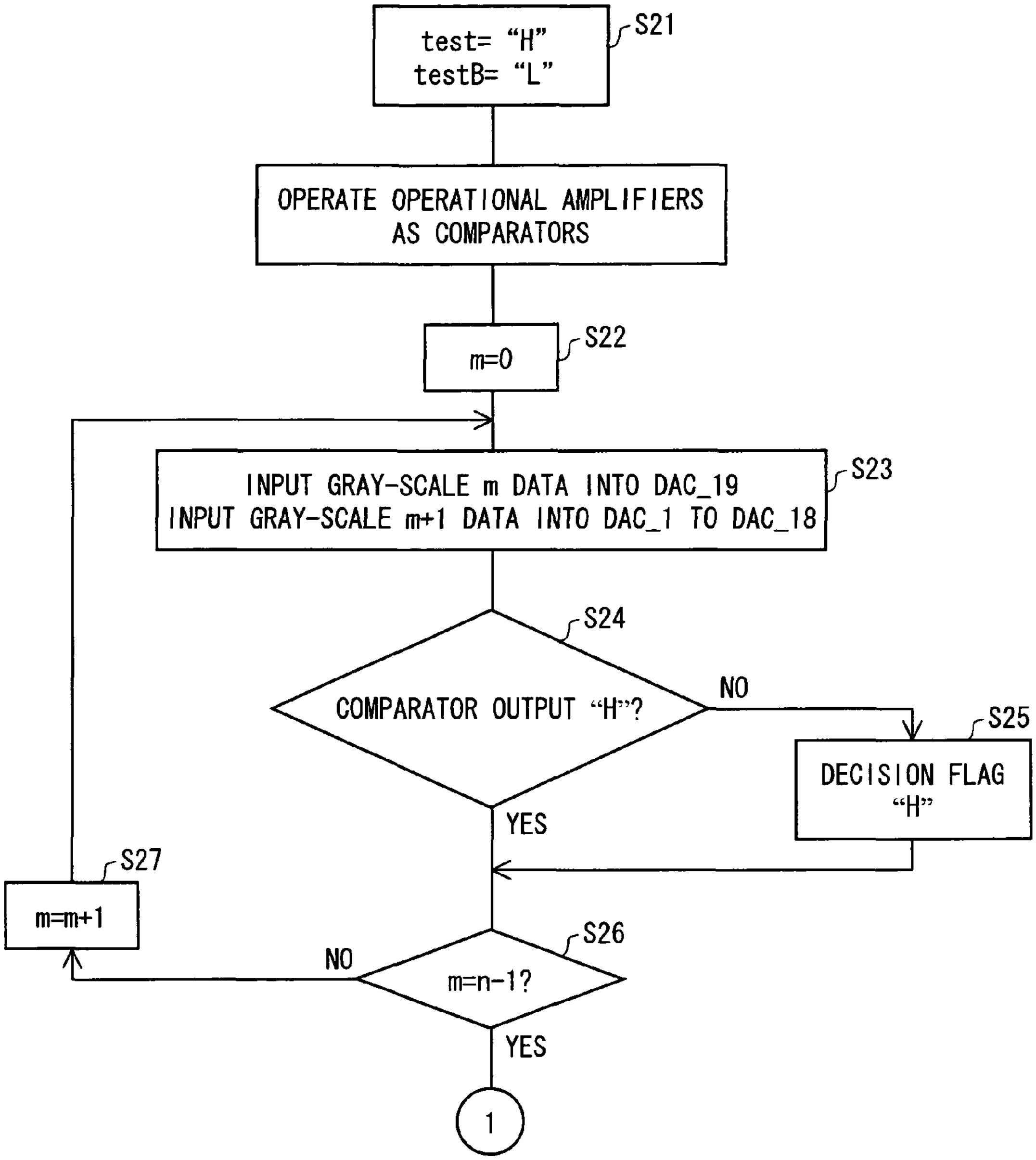
FIG. 6 is a flow chart showing the first procedure in operation-checking test based on a first failure detection method in accordance with Embodiment 1 of the present invention.

Next, the first procedure in operation-checking test is described below with reference to FIG. 6. FIG. 6 is a flow chart showing the first procedure in operation-checking test based on the first failure detection method.

Although FIG. 5 shows only the output circuits 11_1 to 11_3 and the spare output circuit 11_19 as mentioned above, the detection of a failure is carried out for all the usual output circuits 11_1 to 11_18 of FIG. 1. The following describes a method for detecting a failure in the output circuits 11_1 to 11_18 by determining the presence or absence of a defect in DAC_1 to DAC_18 included in the output circuits 11_1 to 11_18.

It should be noted that the output circuits 11_1 to 11_18 of FIG. 1 are configured to include operational amplifiers 1_1 to 1_18, decision circuits 3_1 to 3_18, decision flags 4_1 to 4_18, and pull-up/pull-down circuits 5_1 to 5_18, respectively.

In Step S21 (hereinafter referred to as "S21") shown in FIG. 6, the test signal is set to "H" and the testB signal is set to "L". In S21, the operation amplifiers 1_1 to 1_18 start to serve as comparators as previously mentioned.

Next, in S22, the counter m of a control circuit (not shown) is reset to 0, Furthermore, the control circuit makes the TSTR1 signal active and causes the spare latch circuit DLA_19 to load a level m of gray-scale data corresponding to the value of the counter m or, in this example, a level 0 of gray-scale data through the DATA signal line. Furthermore, the control circuit makes the TSTR2 signal active and stores a level m+1 of gray-scale data (obtained by adding 1 to the value of the counter m) or, in this example, a level 1 of gray-scale data in the latch circuits DLA_1 to DLA_18 through the DATA signal line.

Next, the spare hold circuit DLB_19 obtains the level 0 of gray-scale data from the latch circuit DLA_19 in accordance with the LS signal. Furthermore, DAC_19 receives the gray-scale data from the hold circuit DLB_19, and then sends the level 0 of gray-scale data to the operational amplifiers 1_1 to 1_18 through the negative input terminals (S23). Meanwhile, the hold circuits DLB_1 to DLB_18 obtain the level 1 of gray-scale data from the latch circuit DLA_1 to DLA_18 in accordance with the LS. Furthermore, DAC_1 to DAC_18 receive the gray-scale data from the hold circuits DLB_1 to DLB_18. DAC_1 to DAC_18 send the level 1 of gray-scale data to the operational amplifiers 1_1 to 1_18 through the positive input terminals serially connected to DAC_1 to DAC_18, respectively (S23). It should be noted that the integrated circuit of the present invention outputs n levels of gray-scale voltage, the lowest of which is a level 0 of gray-scale voltage and the highest of which is a level n of gray-scale voltage.

Next, the operational amplifiers 1_1 to 1_18 compare the gray-scale voltages sent from DAC_1 to DAC_18 through the positive input terminals with the gray-scale voltage sent from DAC_19 through the negative input terminals (S24). Specifically, the operational amplifiers 1_1 to 1_18 receive the level 1 of gray-scale voltage through their positive input terminals and receive the level 0 of gray-scale voltage through their negative input terminals. Since the level 1 of gray-scale voltage is higher than the level 0 of gray-scale voltage, the operational amplifiers 1_1 to 1_18 output "H"-level signals if DAC_1 to DAC_18 are normal. On the other hand, when the operational amplifiers 1_1 to 1_18 output "L"-level signals, DAC_1 to DAC_18 are defective.

Next, the decision circuits 3_1 to 3_18 receive the output signals from the operational amplifiers 1_1 to 1_18, and then compare the levels of the received signals with expected values stored in the decision circuits 3_1 to 3_18, respectively. It should be noted that the expected values stored in the decision circuits 3_1 to 3_18 are values supplied from the control circuit. In this operation-checking test 1, the expected values stored in the decision circuits 3_1 to 3_18 are at the "H" level.

If the signals sent from the operational amplifiers 1_1 to 1_18 are at the same "H" level as the expected values stored in the decision circuits 3_1 to 3_18, the decision circuits 3_1 to 3_18 determine DAC_1 to DAC_18 to be normal. On the other hand, if the signals sent from the operational amplifiers 1_1 to 1_18 are at the "L" level, the decision circuits 3_1 to 3_18 determine DAC_1 to DAC_18 to be defective, and then send "H" flags to the decision flags 4_1 to 4_18. Upon receiving the "H" flags from the decision circuits 3_1 to 3_18, the decision flags 4_1 to 4_18 store the "H" flags in their respective internal memories. (S25)

It should be noted that the decision circuits 3_1 to 3_18 may be configured to receive the output signals from the operational amplifiers 1_1 to 1_18 and, if the received signals are at the "H" level, send "L" flags to the decision flags 4_1 to 4_18 or, if the received signals are at the "L" level, send "H" flags to the decision flags 4_1 to 4_18. In this case, once the decision flags 4_1 to 4_18 receive "H" flags from the decision circuits 3_1 to 3_18, the decision flags 4_1 to 4_18 keep on holding the "H" flags even if they receive "L" flags from the decision circuits 3_1 to 3_18 later. Alternatively, the decision circuits 3_1 to 3_18 may be configured such that once they determine the presence of a defect and send "H" flags to the decision flags 4_1 to 4_18, the decision circuits 3_1 to 3_18 do not carry out any further operation for determining the presence or absence of a defect.

Next, the control circuit determines whether or not the value of the counter m is n−1 (S26). When the value of the counter m is n−1 or less, the value of the counter m is increased by 1, and Steps S23 to S25 are repeated until the value of m becomes n−1. It should be noted here that n is the number of levels of gray scale that can be outputted by the integrated circuit 10.

(Operation-checking Test 2 Based on the First Failure Detection Method)

Figure 7:
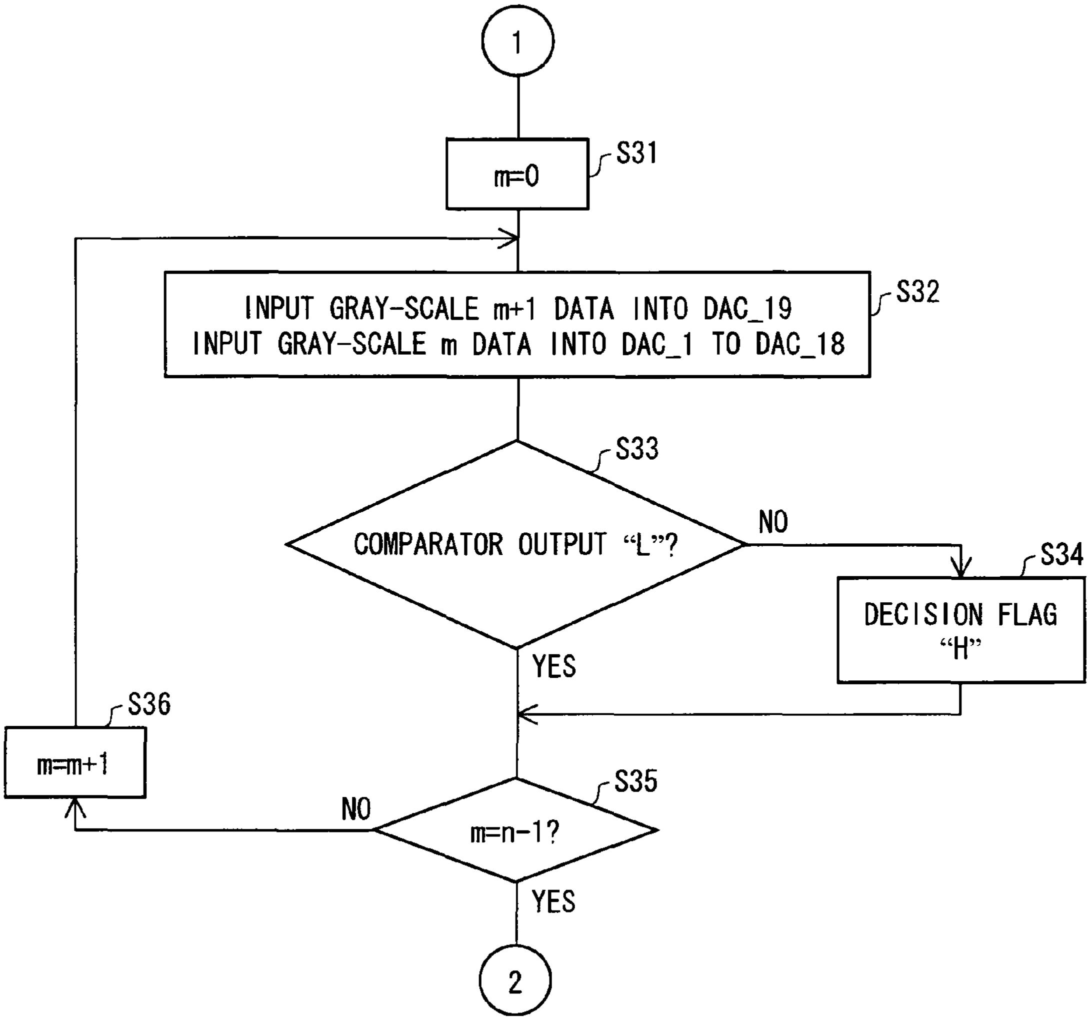
FIG. 7 is a flow chart showing the second procedure in operation-checking test based on the first failure detection method in accordance with Embodiment 1 of the present invention.

Next, the second procedure in operation-checking test is described below with reference to FIG. 7. FIG. 7 is a flow chart showing the second procedure in operation-checking test based on the first failure detection method.

It should be noted first that since the operational amplifiers 1_1 to 1_18 always receive a higher level of gray-scale voltage through their positive input terminals than through their negative input terminals during the operation-checking test 1, the decision circuits 3_1 to 3_18 are certain to output "L" flags indicative of normal even when DAC_19 has such a failure as to output only a low voltage or DAC_1 to DAC_18 have such a failure as to output only high voltages.

Therefore, the operation-checking test 2 is carried out by allowing the operational amplifiers 1_1 to 1_18 to receive lower gray-scale voltages through their positive input terminals than through their negative input terminals.

First, after completion of the operation-checking test 1, the value of the counter m is reset to 0 (S31). Next, the control circuit makes the TSTR1 signal active and causes the spare latch circuit DLA_19 to load a level m+1 of gray-scale data (obtained by adding 1 to the value of the counter m) or, in this example, a level 1 of gray-scale data through the DATA signal line. Next, the control circuit makes the TSTR2 signal active and causes the latch circuits DLA_1 to DLA_18 to load a level m of gray-scale data corresponding to the counter m or, in this example, a level 0 of gray-scale data through the DATA signal line.

At this point, as in S23 of the operation-checking test 1, DAC_19 receives, through the hold circuit DLB_19, the gray-scale data stored in the latch circuit DLA_19. Furthermore, DAC_19 sends the level m+1 of gray-scale voltage (which corresponds to the received gray-scale data) or, in this example, the level 1 of gray-scale voltage to the operational amplifiers 1_1 to 1_18 through the negative input terminals. Meanwhile, DAC_1 to DAC_18 receive, through the hold circuits DLB_1 to DLB_18, the gray-scale data stored in the latch circuits DLA_1 to DLA_18. Furthermore, DAC_1 to DAC_18 send the level m of gray-scale voltage (which corresponds to the received gray-scale data) or, in this example, the level 0 of gray-scale voltage to the operational amplifiers 1_1 to 1_18 through the positive input terminals serially connected to DAC_1 to DAC_18, respectively (S32).

Next, the operational amplifiers 1_1 to 1_18 compare the level 0 of gray-scale voltage sent from DAC_1 to DAC_18 through the positive input terminals with the level 1 of gray-scale voltage sent from DAC_19 through the negative input terminals (S33). Since the level 1 of gray-scale voltage is higher than the level 0 of gray-scale voltage, the operational amplifiers 1_1 to 1_18 output "L" flag signals if DAC_1 to DAC_18 are normal. On the other hand, when the operational amplifiers 1_1 to 1_18 output signals at the "H" level, DAC_1 to DAC_18 are defective.

Next, the decision circuit 3_1 to 3_18 compare the levels of the output signals from the operational amplifiers 1_1 to 1_18 with expected values stored in the decision circuits 3_1 to 3_18, respectively. In this operation-checking test 2, the expected values stored in the decision circuits 3_1 to 3_18 are at the "L" level. If the signals sent from the operational amplifiers 1_1 to 1_18 are at the same "L" level as the expected values stored in the decision circuits 3_1 to 3_18, the decision circuits 3_1 to 3_18 determine DAC_1 to DAC_18 to be normal. On the other hand, if the signals sent from the operational amplifiers 1_1 to 1_18 are at the "H" level, the decision circuits 3_1 to 3_18 determine DAC_1 to DAC_18 to be defective, and then send "H" flags to the decision flags 4_1 to 4_18. Upon receiving the "H" flags from the decision circuits 3_1 to 3_18, the decision flags 4_1 to 4_18 store the "H" flags in their respective internal memories (S34). The steps S33 and S34 are repeated until the value of m becomes n−1 (S35, S36).

(Operation-Checking Test 3 Based on the First Failure Detection Method)

Figure 8:
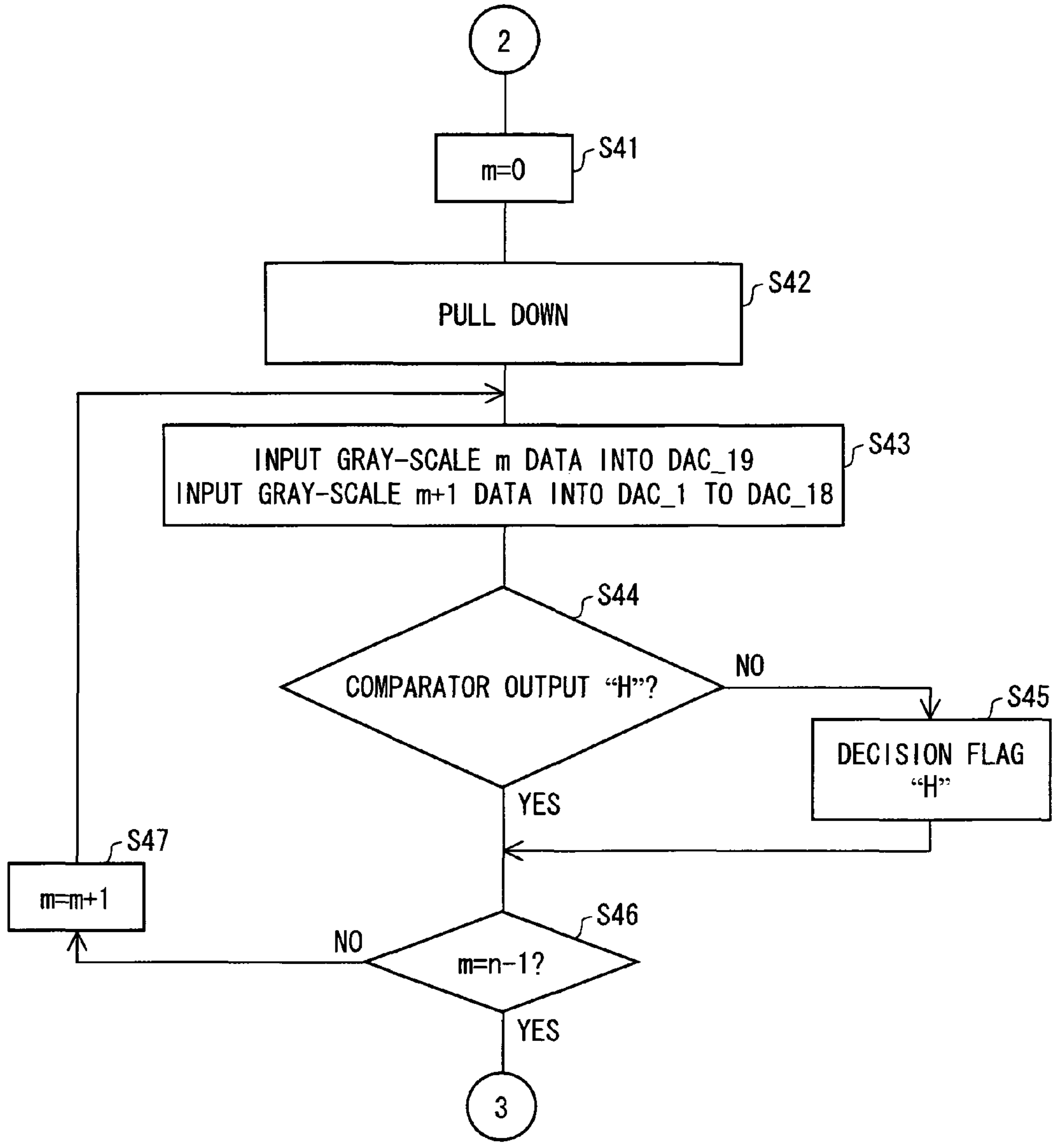
FIG. 8 is a flow chart showing the third procedure in operation-checking test based on the first failure detection method in accordance with Embodiment 1 of the present invention.

Next, the third procedure in operation-checking test is described below with reference to FIG. 8. FIG. 8 is a flow chart showing the third procedure in operation-checking test based on the first failure detection method.

When DAC_1 to DAC_18 have such a failure as to have their outputs open, the operational amplifiers 1_1 to 1_18 keep on holding the gray-scale voltages that they received as a result of the executed checking test. In such a case, it may be impossible to detect a failure by carrying out the operation-checking test 1 or 2. Therefore, the operation-checking test 3 is carried out by connecting the pull-up/pull-down circuits 5_1 to 5_18 to the positive input terminals of the operational amplifiers 1_1 to 1_18, respectively. Thus, when DAC_1 to DAC_18 have their outputs open, the operational amplifiers 1_1 to 1_18 receive low voltages through their positive input terminals. As a result, even when DAC_1 to DAC_18 have their outputs open or, in other words, even when there are no outputs from DAC_1 to DAC_18, the operational amplifiers 1 can be prevented from keeping on holding the gray-scale voltages that they received as a result of the executed checking test.

First, according to the specific procedure in operation-checking test 3 as shown in FIG. 8, the counter m is reset to 0 (S41). Next, the pull-up/pull-down circuits 5_1 to 5_18 pull down the positive input terminals of the operational amplifiers 1_1 to 1_18 (S42). The subsequent steps S43 to S47 are identical to Steps S23 to S27 of the operation-checking test 1 previously mentioned and, as such, are not described here.

By thus pulling down the positive input terminals of the operational amplifiers 1_1 to 1_18 and carrying out the procedure in operation-checking test 1, the operational amplifiers 1 are made to output "L"-level signals when DAC_1 to DAC_18 have their outputs open. As a result, the decision circuits 3_1 to 3_18 determine the presence of a failure in DAC_1 to DAC_18 in accordance with the received "L"-level signals, and the decision flags 4_1 to 4_18 store "H" flags therein.

(Operation-checking Test 4 Based on the First Failure Detection Method)

Figure 9:
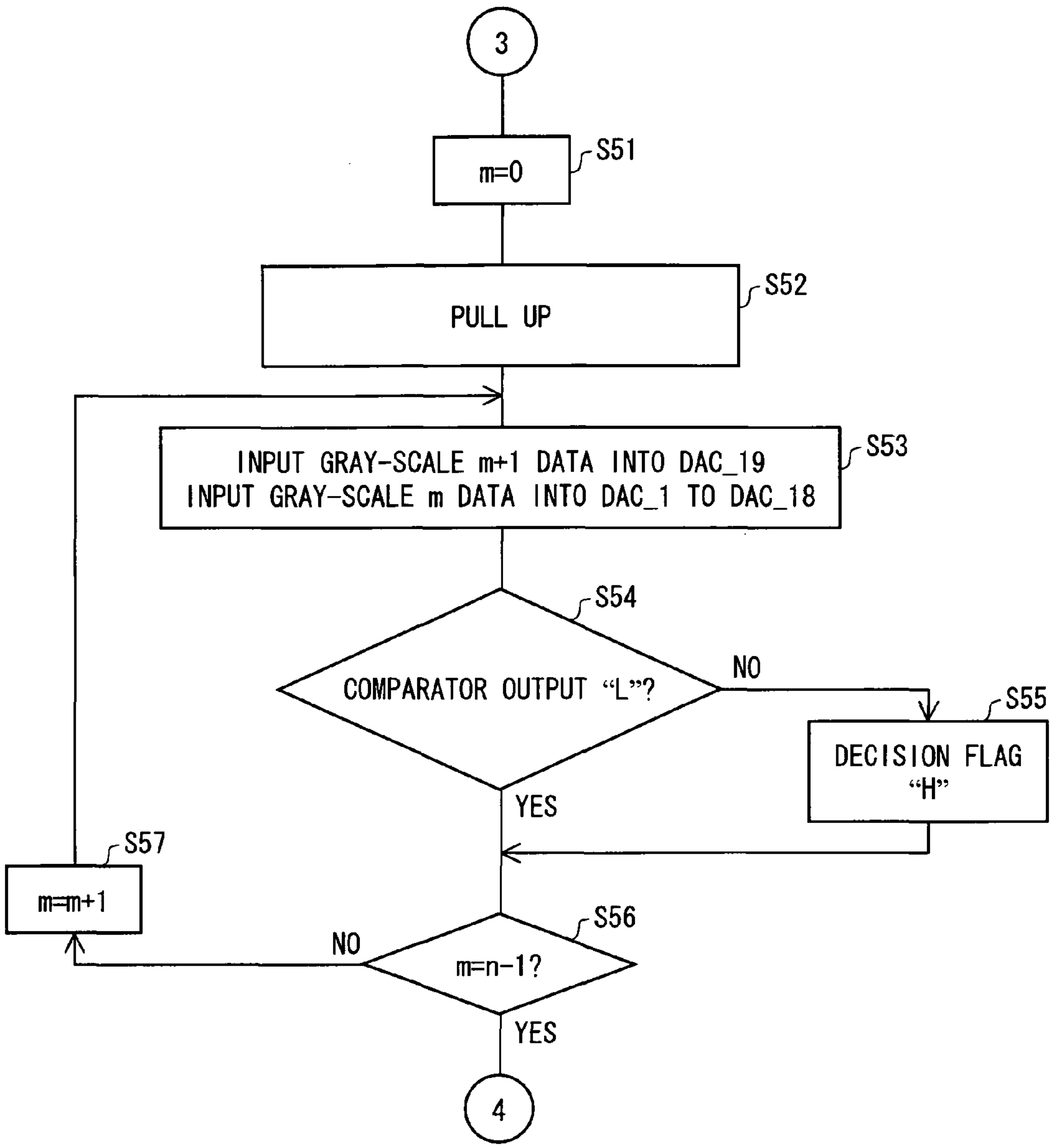
FIG. 9 is a flow chart showing the fourth procedure in operation-checking test based on the first failure detection method in accordance with Embodiment 1 of the present invention.

Next, the fourth procedure in operation-checking test is described below with reference to FIG. 9. FIG. 9 is a flow chart showing the fourth procedure in operation-checking test based on the first failure detection method.

It should be noted here that as with the operation-checking test 3, the operation-checking test 4 is carried out to cope with such a failure that the DAC_1 to DAC_18 have their outputs open. First, as shown in FIG. 9, the counter m is reset to 0 (S51). Next, the pull-up/pull-down circuits 5_1 to 5_18 pull up the positive input terminals of the operational amplifiers 1_1 to 1_18 (S52). The subsequent steps S53 to S57 are identical to Steps S32 to S36 of the operation-checking test 2 previously mentioned and, as such, are not described here.

By thus pulling up the positive input terminals of the operational amplifiers 1_1 to 1_18 and carrying out the procedure in operation-checking test 2, the operational amplifiers 1_1 to 1_18 are made to output "H"-level signals when DAC_1 to DAC_18 have their outputs open. As a result, the decision circuits 3_1 to 3_18 determine the presence of a failure in DAC_1 to DAC_18 in accordance with the received "H"-level signals, and the decision flags 4_1 to 4_18 store "H" therein.

(Operation-checking Test 5 Based on the First Failure Detection Method)

Figure 10:
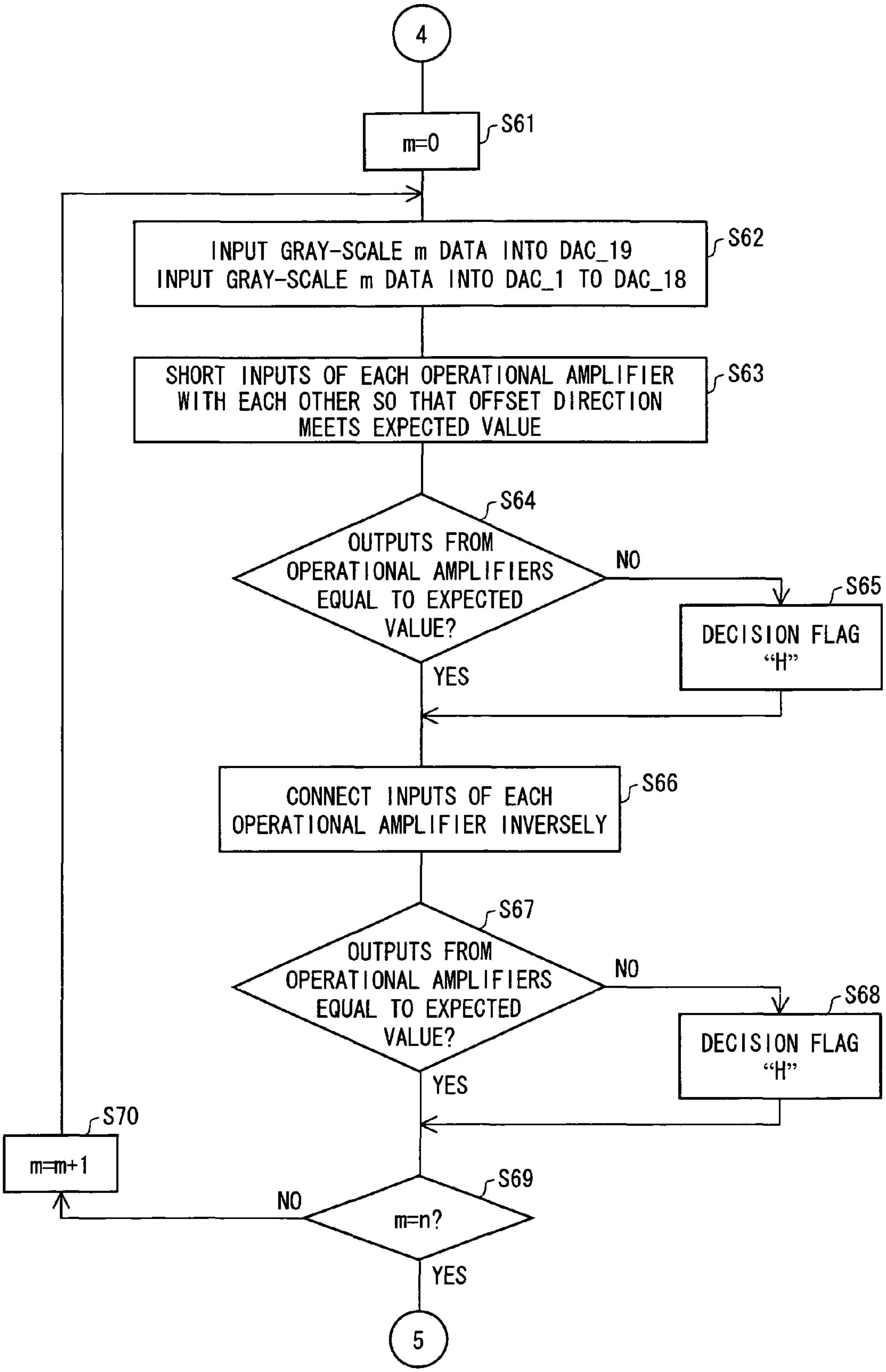
FIG. 10 is a flow chart showing the fifth procedure in operation-checking test based on the first failure detection method in accordance with Embodiment 1 of the present invention.

Next, the fifth procedure in operation-checking test is described below with reference to FIG. 10. FIG. 10 is a flow chart showing the fifth procedure in operation-checking test based on the first failure detection method.

There may occur such a failure in DAC_1 to DAC_18 that the two adjacent levels of gray scale are shorted. In the case of such a failure, each of DAC_1 to DAC_18 outputs a midpoint voltage between the two adjacent levels of gray scale shorted. In the case of such a failure, none of the gray-scale voltages that are outputted from DAC_1 to DAC_18 is a potential difference of one gradation or more in comparison with the normal case. Therefore, such a failure cannot be detected by carrying out the operation-checking tests 1 to 4. It should be noted here that the operation-checking test 5 is carried out to detect such a failure in DAC_1 to DAC_18 that the two adjacent levels of gray scale are shorted.

First, as shown in FIG. 10, the control circuit resets the counter m to 0 (S61). Next, the control circuit makes TSTR1 and TSTR2 active, and the latch circuit DLA_19 and the latch circuits DLA_1 to DLA_18 receive a level m of gray-scale data or, in this example, a level 0 of gray-scale data through the DATA signal line. Next, DAC_19 and DAC_1 to DAC_18 obtain the level 0 of gray-scale data from the latch circuit DLA_19 and the latch circuits DLA_1 to DLA_18 through the hold circuit DLB_19 and the hold circuits DLB_1 to DLB_18. Furthermore, DAC_19 and DAC_1 to DAC_18 send the level 0 of gray-scale voltage to the operational amplifiers 1_1 to 1_18 through the positive and negative input terminals (S62).

Next, the positive and negative input terminals of each of the operational amplifiers 1_1 to 1_18 are shorted with each other by switches (not shown). It should be noted that when the absence of a failure in DAC_1 to DAC_18 was determined as a result of the operation-checking tests 1 and 2, the difference in input gray-scale voltage between the positive and negative input terminals is not a potential difference of one gradation or more. Therefore, the positive and negative input terminals being shorted with each other do not result in large current flow.

By thus shorting the positive and negative input terminals of each of the operational amplifiers 1_1 to 1_18 with each other, each of the operational amplifiers 1_1 to 1_18 is made to receive the same level of gray-scale voltage through its two input terminals. Since each of the operational amplifiers 1_1 to 1_18 originally has an input-output offset voltage, it ends up outputting either "H" or "L" even if it receives the same level of gray-scale voltage through its two input terminals. These levels of output from the operational amplifiers 1_1 to 1_18 with the positive and negative input terminals of each of the operational amplifiers 1_1 to 1_18 being shorted with each other are stored as expected values in the decision circuits 3_1 to 3_18 (S63).

Next, the switches (not shown) are turned OFF, whereby the positive and negative input terminals of each of the operational amplifiers 1_1 to 1_18 are no longer shorted with each other. At this point, the operational amplifiers 1_1 to 1_18 receive the level 0 of gray-scale voltage from DAC_1 to DAC_18 through the positive input terminals and receive the level 0 of gray-scale voltage from DAC_19 through the negative input terminals. If there is no failure in DAC_19 or DAC_1 to DAC_18, the outputs from the operational amplifiers 1_1 to 1_18 are equal to the expected values stored in the decision circuits 3_1 to 3_18 in S63. Therefore, the decision circuits 3_1 to 3_18 compare the outputs from the operational amplifiers 1_1 to 1_18 with the expected values stored in the decision circuits 3_1 to 3_18 in S63, respectively (S64). If the values of the outputs from the operational amplifiers 1_1 to 1_18 are not equal to the expected values, the decision circuits 3_1 to 3_18 send "H" flags to the decision flags 4_1 to 4_18, respectively (S65).

Next, the switches (not shown) are used to switch between inputs of the operational amplifiers 1_1 to 1_18 so that the operational amplifiers 1_1 to 1_18 receive the gray-scale voltage from DAC_19 through the positive input terminals and receive the gray-scale voltages from DAC_1 to DAC_18 through the negative input terminals (S66). Then, the same step as S64 is carried out (S67). In S67, if the outputs from the operational amplifiers 1_1 to 1_18 are not equal to the expected values stored in the decision circuits 3_1 to 3_18, the decision circuits 3_1 to 3_18 send "H" flags to the decision flags 4_1 to 4_18, respectively (S68). By thus switching between the positive and negative input terminals, a failure in DAC_1 to DAC_18 can be detected, regardless of whether the expected values stored in the decision circuits 3_1 to 3_18 are at the "H" or "L" level.

These steps S62 to S68 are repeated while increasing the value of the counter m by 1 until the value of the counter m becomes n (S69, S70).

(Self-Repairing Based on the First Failure Detection Method)

Figure 11:
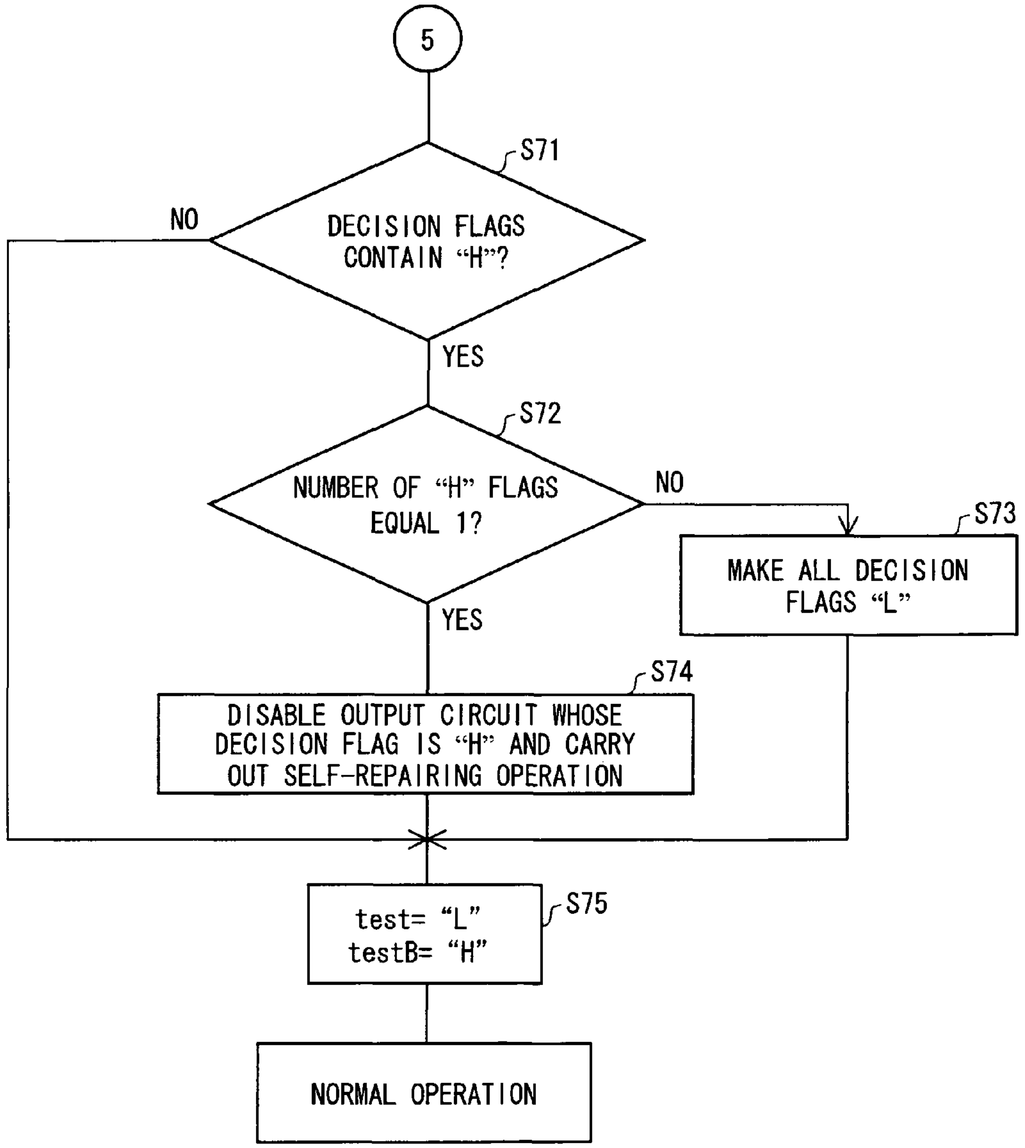
FIG. 11 is a flow chart showing steps of a procedure for self-repairing after the first failure detection method in accordance with Embodiment 1 of the present invention.

Next, repairs that are carried out when the decision flags 4_1 to 4_18 have "H" flags stored therein or, in other words, when the decision circuits 3_1 to 3_18 have determined the presence of a failure in any of DAC_1 to DAC_18 as a result of the operation-checking tests 1 to 5 are described below with reference to FIG. 11. FIG. 11 is a flow chart showing steps of a procedure for the aforementioned self-repairing means to carry out self-repairs.

When the decision circuits 3_1 to 3_18 have determined DAC_1 to DAC_18 to be defective, the decision circuits 3_1 to 3_18 send "H" flags to the decision flags 4_1 to 4_18. Furthermore, upon receiving the "H" flags from the decision circuits 3_1 to 3_18, the decision flags 4_1 to 4_18 store the "H" flags therein. It should be noted here that the control circuit detects whether or not the decision flags 4_1 to 4_18 have "H" flags recorded therein (S71). When the control circuit have discovered that the decision flags 4_1 to 4_18 have no "H" flags stored therein, the control circuit proceeds to S75. On the other hand, when the control circuit have discovered that the decision flags 4_1 to 4_18 have "H" flags stored therein, the control circuit confirms the number of "H" flags stored in each of the decision flags 4_1 to 4_18. When each of the decision flags 4_1 to 4_18 has a plurality of "H" flags stored therein, the control circuit proceeds to S73. On the other hand, when each of the decision flags 4 has one "H" flag stored therein, the control circuit proceeds to S74 (S72).

In S74, that one of DAC_1 to DAC_18 which corresponds to that one of the decision flags 4_1 to 4_18 which has one "H" flag stored therein is disabled, and the whole corresponding output circuit is repaired (S74). Specifically, the decision flags 4_1 to 4_18 send their stored flags as Flag1 to Flag18 to the switches SWA1 to SWA18, respectively, and to the control circuit for calculating Flag_X1 to Flag_X18.

Next, S73 is described. When each of the decision flags 4_1 to 4_18 has a plurality of "H" flags stored therein, it is probable that the spare DAC_19 is defective. Therefore, in S73, the control circuit causes all the flags stored in the decision flags 4_1 to 4_18 to be "L" flags, and then proceeds to S75. Next, if NO in S71, the control circuit switches the test signal to "L" and the testB signal to "H" after S73 or S74, and then shifts to normal operation (S75).

Figure 12:
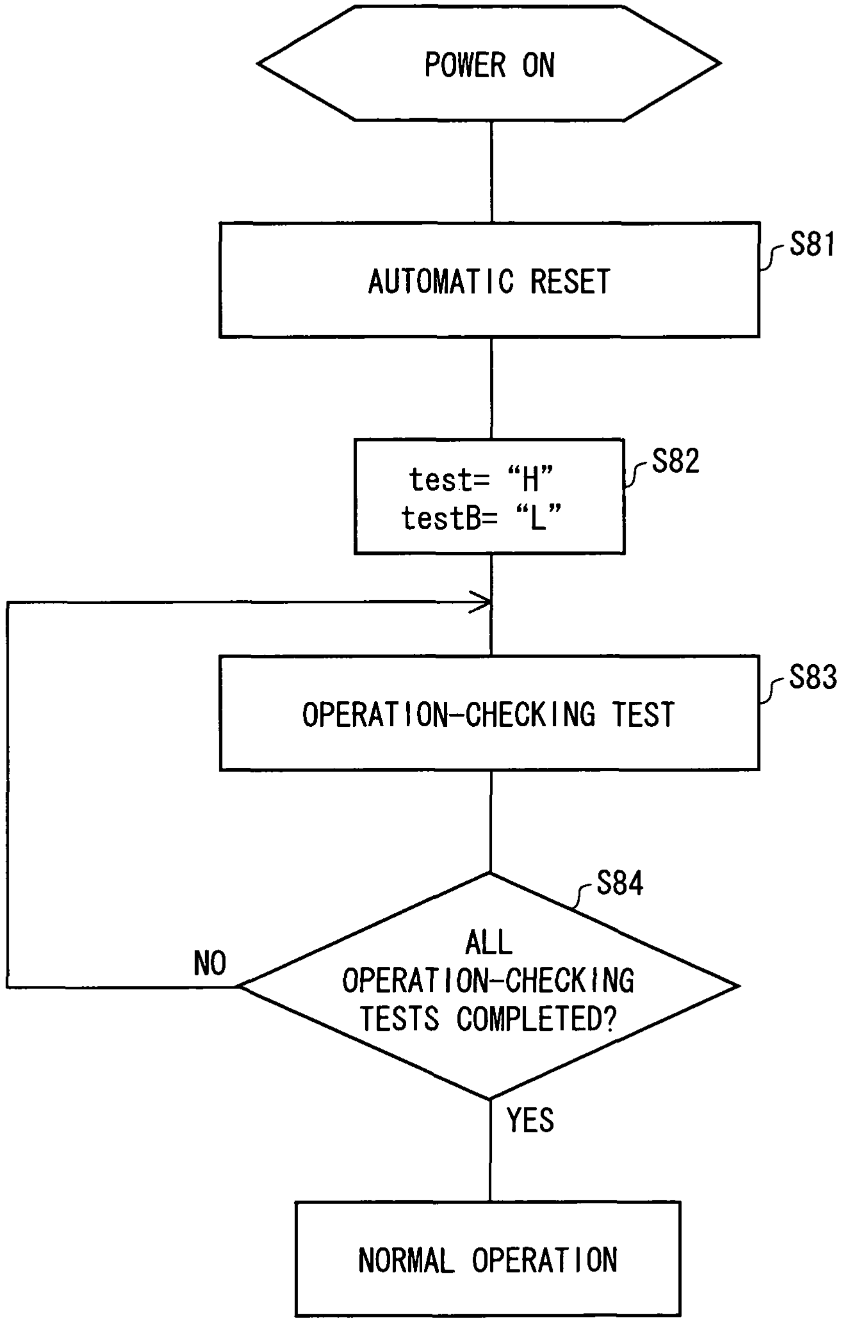
FIG. 12 is a flow chart showing steps in a process of transition from powering on of a display device to normal operation through an operating-checking test in accordance with Embodiment 1 of the present invention.

Next, a procedure for transition from powering on of the display device, in which the integrated circuit 10 is mounted, to normal operation through an operating-checking test is described below with reference to FIG. 12. FIG. 12 is a flow chart showing steps in a process of transition from powering on of the display device to normal operation through an operating-checking test.

First, as shown in FIG. 12, the display device is powered on to reset the integrated circuit 10, whereby all the flags stored in the decision flags 4_1 to 4_18 become "L" flags (S81). Next, the control circuit makes the test signal "H" and the testB signal "L" to switch the integrated circuit 10 into the operation-checking testing state (S82). Next, the control circuit and the integrated circuit 10 carry out the aforementioned operation-checking tests (S83). Furthermore, the control circuit confirms whether or not all the operation-checking tests 1 to 5 have been completed, self-repairs a defective circuit, if any, and then shifts to normal operation (S84).

(Second Failure Detection Method)

The "second failure detection method", which determines the presence or absence of a defect by comparing the voltages from the output circuits with each other, is described below with reference to FIGS. 13 through 19. The second failure detection method is described only in terms of points of difference to the first failure detection method, with the exclusion of points of overlap with the first failure detection method.

First, the difference between the first and second failure detection methods is briefly described. The first failure detection method compares the output from the spare DAC_19 with the outputs from DAC_1 to DAC_18 in the operational amplifiers 1_1 to 1_18. Meanwhile, the second failure detection method compares the outputs from pairs of two adjacent DACs with each other in the operational amplifiers 1_1 to 1_20.

Figure 13:
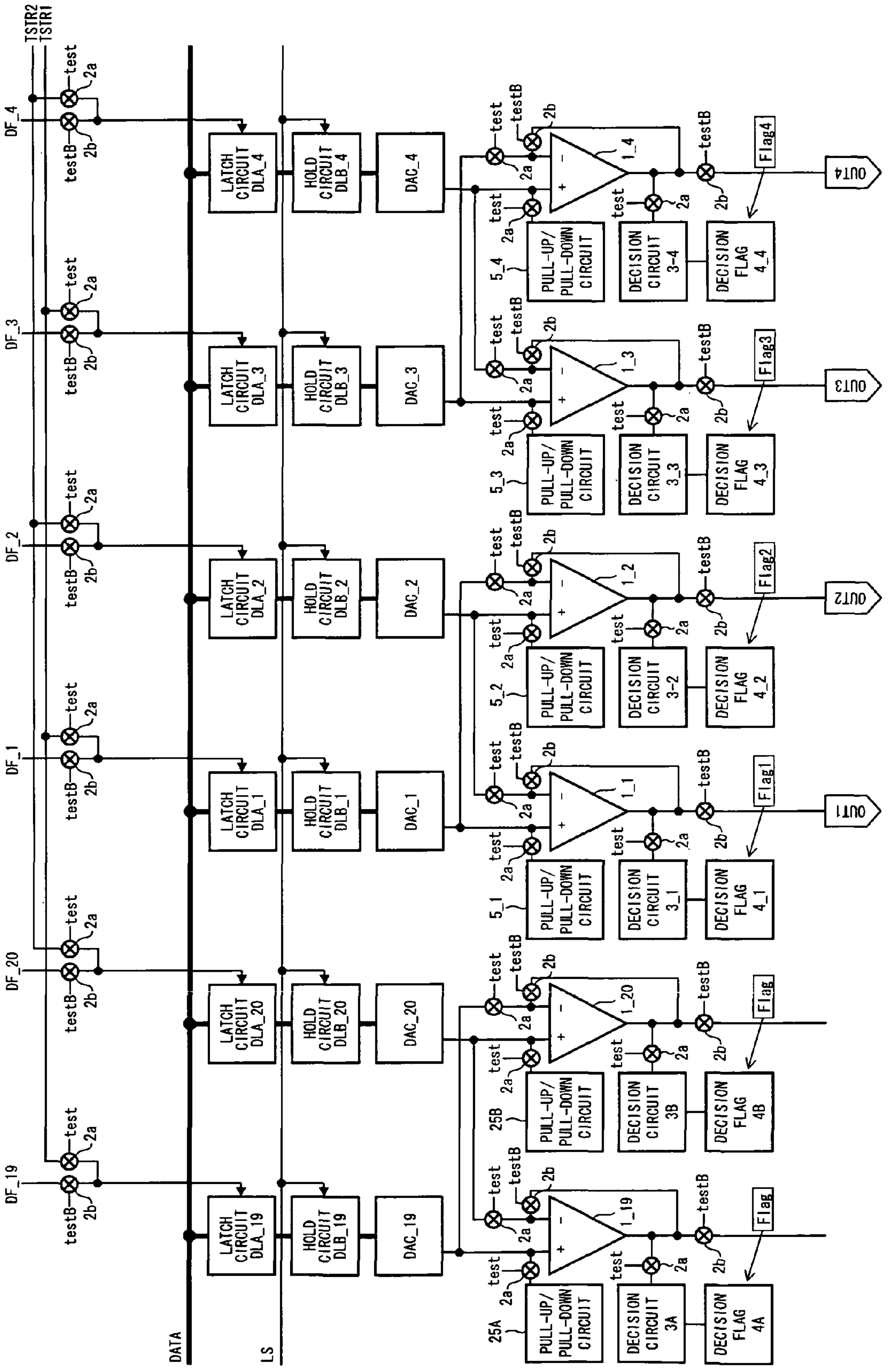
FIG. 13 is a block diagram showing a configuration for detecting a failure in pairs of two adjacent output circuits in accordance with Embodiment 1 of the present invention.

FIG. 13 shows a configuration for detecting a failure in pairs of two adjacent ones of the output circuits 11_1 to 11_20. In FIG. 13, a block corresponding to the output circuit 11_1 of FIG. 1 is constituted by DAC_1, an operational amplifier 1_1, switches 2*a* and 2*b*, a decision circuit 3_1, a decision flag 4_1, and a pull-up/pull-down circuit 5_1. A block corresponding to the output circuit 11_2 of FIG. 1 is constituted by DAC_2, an operational amplifier 1_2, switches 2*a* and 2*b*, a decision circuit 3_2, a decision flag 4_2, and a pull-up/pull-down circuit 5_2. A block corresponding to the output circuit 11_3 of FIG. 1 is constituted by DAC_3, an operational amplifier 1_3, switches 2*a* and 2*b*, a decision circuit 3_3, a decision flag 4_3, and a pull-up/pull-down circuit 5_3. A block corresponding to the output circuit 11_4 of FIG. 1 is constituted by DAC_4, an operational amplifier 1_4, switches 2*a* and 2*b*, a decision circuit 3_4, a decision flag 4_4, and a pull-up/pull-down circuit 5_4. A block corresponding to the spare output circuit 11_19 of FIG. 1 is constituted by DAC_19, an operational amplifier 1_19, switches 2*a* and 2*b*, a decision circuit 3A, a decision flag 4A, and a pull-up/pull-down circuit 25A.

FIG. 1 does not show a latch circuit DLA_20, a hold circuit DLB_20, or an output circuit 11_20: however, in carrying out the second failure detection method, the integrated circuit 10 of FIG. 1 includes a block constituted by a latch circuit DLA_20, a hold circuit DLB_20, and an output circuit 11_20. The output circuit 11_20 is configured to include DAC_20, an operational amplifier 1_20, switches 2*a* and 2*b*, a decision circuit 3B, a decision flag 4B, and a pull-up/pull-down circuit 25B.

Of the circuits of FIG. 13, incorporated as part of the integrated circuit 10 of FIG. 1 for self-repairing operation, each output circuit is in connection with a switch capable of switching between outputs from the two adjacent output circuits 11. For example, the output terminal OUT1 is in connection with a switch capable of switching between outputs from the output circuits 11_1 and 11_2, and the output terminal OUT2 is in connection with a switch capable of switching between outputs from the output circuits 11_2 and 11_3.

Although FIG. 13 shows only the output circuits 11_1 to 11_4 and the spare output circuits 11_19 and 11_20 for convenience of explanation, the detection of a failure is carried out for all the usual output circuits 11_1 to 11_2-G18.

The integrated circuit 10 includes latch circuits DLA_1 to DLA_4, hold circuits DLB_1 to DLB_4, output circuits 11_1 to 11_4, and a plurality of switches 2*a* and 2*b*. The integrated circuit 10 further includes output circuits 11_19 and 11_20 configured to include spare latch circuits DLA_19 and DLA_20, spare hold circuits DLB_19 and DLB_20, spare DAC circuits DAC_19 and DAC_20, operational amplifiers 1_19 and 1_20, and pull-up/pull-down circuits 25A and 25B, respectively.

Each of the operational amplifiers 1_1 to 1_20 receives, through its positive input terminal, an output from that one of DAC_1 to DAC_20 which is in serial connection with it. Furthermore, each of the operational amplifiers 1_1 to 1_20 receives, through its negative input terminal, an output from that one of DAC_1 to DAC_20 which is in serial connection with the operational amplifier paired with it. Specifically, as shown in FIG. 13, the operational amplifier 1_1 receives an output from DAC_1 through its positive input terminal and receives an output from DAC_2 through its negative input terminal via a switch 2*a*. Similarly, the operational amplifier 1_2 receives an output from DAC_2 through its positive input terminal and receives an output from DAC_1 through its negative input terminal via a switch 2*a*.

Further, the operational amplifier 1_19 receives an output from DAC_19 through its positive input terminal and receives an output from DAC_20 through its negative input terminal via a switch 2*a*. Furthermore, the operational amplifier 1_20 receives an output from DAC_20 through its positive input terminal and receives an output from DAC_19 through its negative input terminal via a switch 2*a*.

(Operation that is Carried Out when the Presence or Absence of a Defect is not Determined)

During the normal operation of the integrated circuit 10, the control circuit sets the test signal at the "L" level and the testB signal at the "H" level, as in the case of the first failure detection method. Thus, DAC_1 to DAC_18 receive gray-scale data from the hold circuits DLB_1 to DLB_18, convert the gray-scale data into gray-scale voltages, and then send the gray-scale voltages to the operational amplifiers 1_1 to 1_18 through the positive input terminals of the operational amplifiers 1_1 to 1_18, respectively. At this point, where the switches 2*b* are ON, the operational amplifiers 1_1 to 1_18 have their outputs negatively fed back to their negative input terminals. Thus, the operational amplifiers 1_1 to 1_18 operate as voltage followers. As such, the operational amplifiers 1_1 to 1_18 buffer the gray-scale voltages sent from DAC_1 to DAC_18, thus sending the gray-scale voltages to the corresponding output terminals OUT1 to OUT18.

(Switch to an Operation-Checking Test)

A switch in the integrated circuit 10 to an operation-checking test is started by the control circuit's setting the test signal at the "H" level and the testB signal at the "L" level. First, the switches 2*a* are turned "ON", whereby the latch circuit DLA_19 and the odd-numbered latch circuits DLA (latch circuits DLA_1 and DLA_3) receive a TSTR1 signal. Further, the latch circuit DLA_20 and the even-numbered latch circuits (latch circuits DLA_2 and DLA_4) receive a TSTR2 signal. Furthermore, since the switches 2*a* are "ON", the odd-numbered operational amplifiers (operational amplifiers 1_1 and 1_3) receive, through their negative input terminals, outputs from the even-numbered DACs (DAC_2 and DAC_4) paired with them, and the even-numbered operational amplifiers (operational amplifiers 1_2 and 1_4) receive, through their negative input terminals, outputs from the odd-numbered DACs (DAC_1 and DAC_3) paired with them, respectively. Further, since the testB signal is at the "L" level, the switches 2*b* are "OFF". Thus, the operational amplifiers 1_1 to 1_4 have their outputs stopped from being negatively fed back to their negative input terminals. As a result, each of the operational amplifiers 1_1 to 1_4 serves as a comparator for making a comparison between an output from that one of DAC_1 to DAC_4 which is in serial connection with it and an output from that one of DAC_1 to DAC_4 which is paired with it.

(Operation-Checking Test 1 Based on the Second Failure Detection Method)

Figure 14:
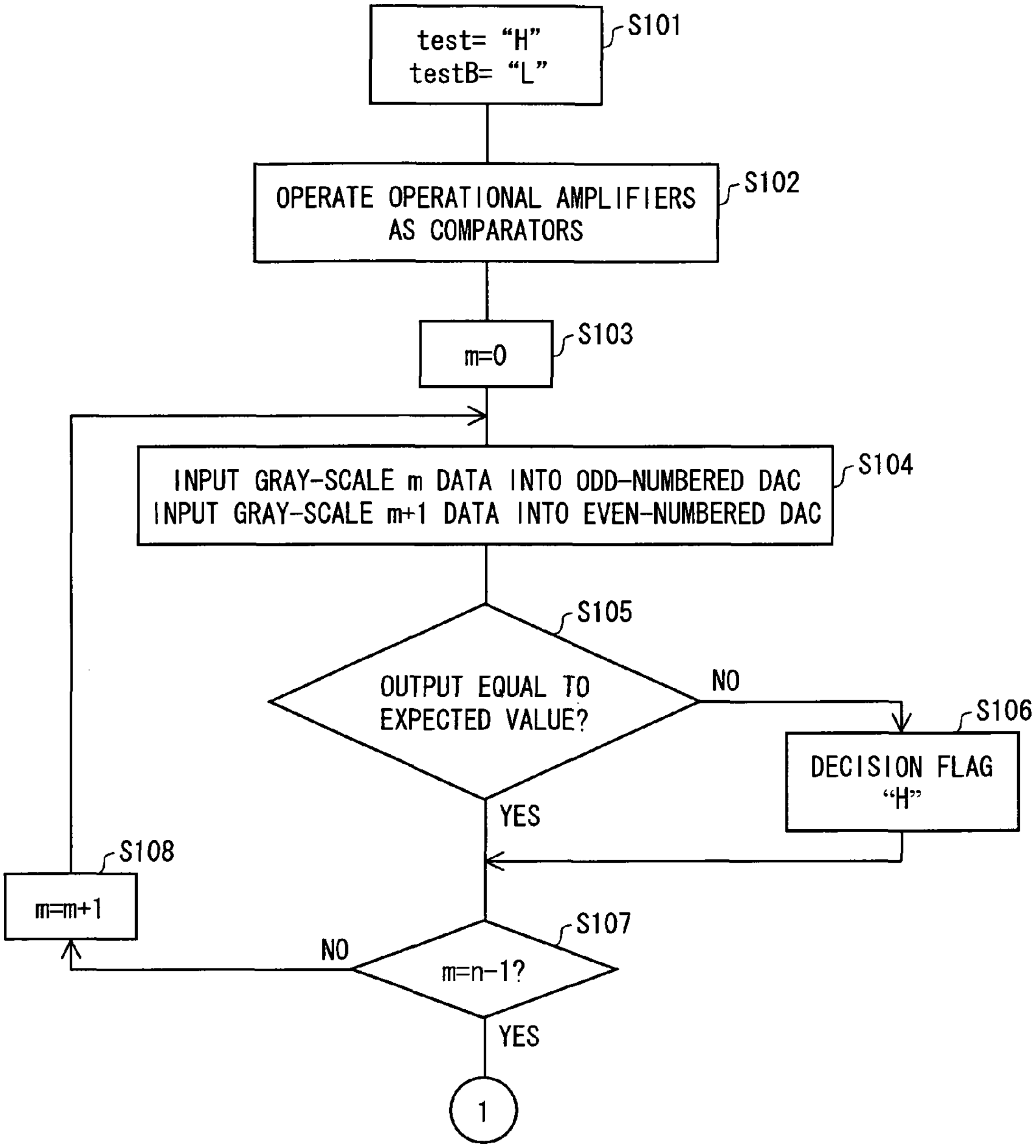
FIG. 14 is a flow chart showing the first procedure in operation-checking test based on a second failure detection method in accordance with Embodiment 1 of the present invention.

Next, the first procedure in operation-checking test based on the second failure detection method is described below with reference to FIG. 14. FIG. 14 is a flow chart showing the first procedure in operation-checking test based on the second failure detection method.

Although FIG. 13 shows only the output circuits 11_1 to 11_4 and the spare output circuits 11_19 and 11_20 as mentioned above, the detection of a failure is carried out for all the usual output circuits 11_1 to 11_18 of FIG. 1. The following describes a method for detecting a failure in the output circuits 11_1 to 11_18 by determining the presence or absence of a defect in DAC_1 to DAC_18 included in the output circuits 11_1 to 11_18.

It should be noted that the output circuits 11_1 to 11_18 of FIG. 1 are configured to include operational amplifiers 1_1 to 1_18, decision circuits 3_1 to 3_18, decision flags 4_1 to 4_18, and pull-up/pull-down circuits 5_1 to 5_18, respectively.

First, the control circuit sets the test signal at the "H" level and the testB signal at the "L" level (S101). Thus, the operational amplifiers 1_1 to 1_18 operate as comparators (S102). Next, the control circuit sets the expected values of the odd-numbered decision circuits (decision circuits 3_1, 3_3, . . . ) at the "L" level. At the same time, the control circuit sets the expected values of the even-numbered decision circuits (decision circuits 3_2, 3_4, . . . ) at the "H" level.

Next, the control circuit resets its counter m to 0 (S103). Furthermore, the control circuit makes TSTR1 active, and the latch circuit DLA_19 and the odd-numbered latch circuits (DLA_1, DLA_3, . . . ) receive a level m of gray-scale data through the DATA signal line. Further, the control circuit makes TSTR2 active, and the latch circuit DLA_20 and the even-numbered latch circuits (DLA_2, DLA_4, . . . ) receive a level m+1 of gray-scale data through the data bus (S104).

Let it be assumed here that the value of the counter m is 0. Then, each of the odd-numbered operational amplifiers (1_1, 1_3, . . . ) receives a level 0 of gray-scale voltage through its positive input terminal from that one of the odd-numbered DACs (DAC_1, DAC_3, . . . ) which is in serial connection with it. Further, each of the odd-numbered operational amplifiers receives a level 1 of gray-scale voltage through its negative input terminal from that one of the even-numbered DACs (DAC_2, DAC_4, . . . ) which is paired with it. If DAC_1 to DAC_18, each of which is in connection with the respective input terminals of its corresponding two of the operational amplifiers 1_1 to 1_18, are normal, the odd-numbered operational amplifiers 1 produce "L" outputs. Meanwhile, each of the even-numbered operational amplifiers receives a level 1 of gray-scale voltage through its positive input terminal from that one of the even-numbered DACs which is in serial connection with it. Further, each of the even-numbered operational amplifiers (operational amplifiers 1_2, 1_4, . . . ) receives a level 0 of gray-scale voltage through its negative input terminal from that one of the odd-numbered DACs which is paired with it. If DAC_1 to DAC_18, each of which is in connection with the respective input terminals of its corresponding two of the operational amplifiers 1_1 to 1_18, are normal, the even-numbered operational amplifiers produce "H" outputs.

Next, the decision circuits 3_1 to 3_18 determine whether the levels of the output signals from the operational amplifiers 1_1 to 1_18 are equal to the expected values stored in the decision circuits 3_1 to 3_18, respectively (S105). If the outputs from the operational amplifiers 1_1 to 1_18 are not equal to the expected values, the decision circuits 3_1 to 3_18 output "H" flags to the decision flags 4_1 to 4_18, respectively (S106). These steps S104 to S106 are repeated while increasing the value of the counter m by 1 until the value of the counter m becomes n−1 (S107, S108).

(Operation-Checking Test 2 Based on the Second Failure Detection Method)

Figure 15:
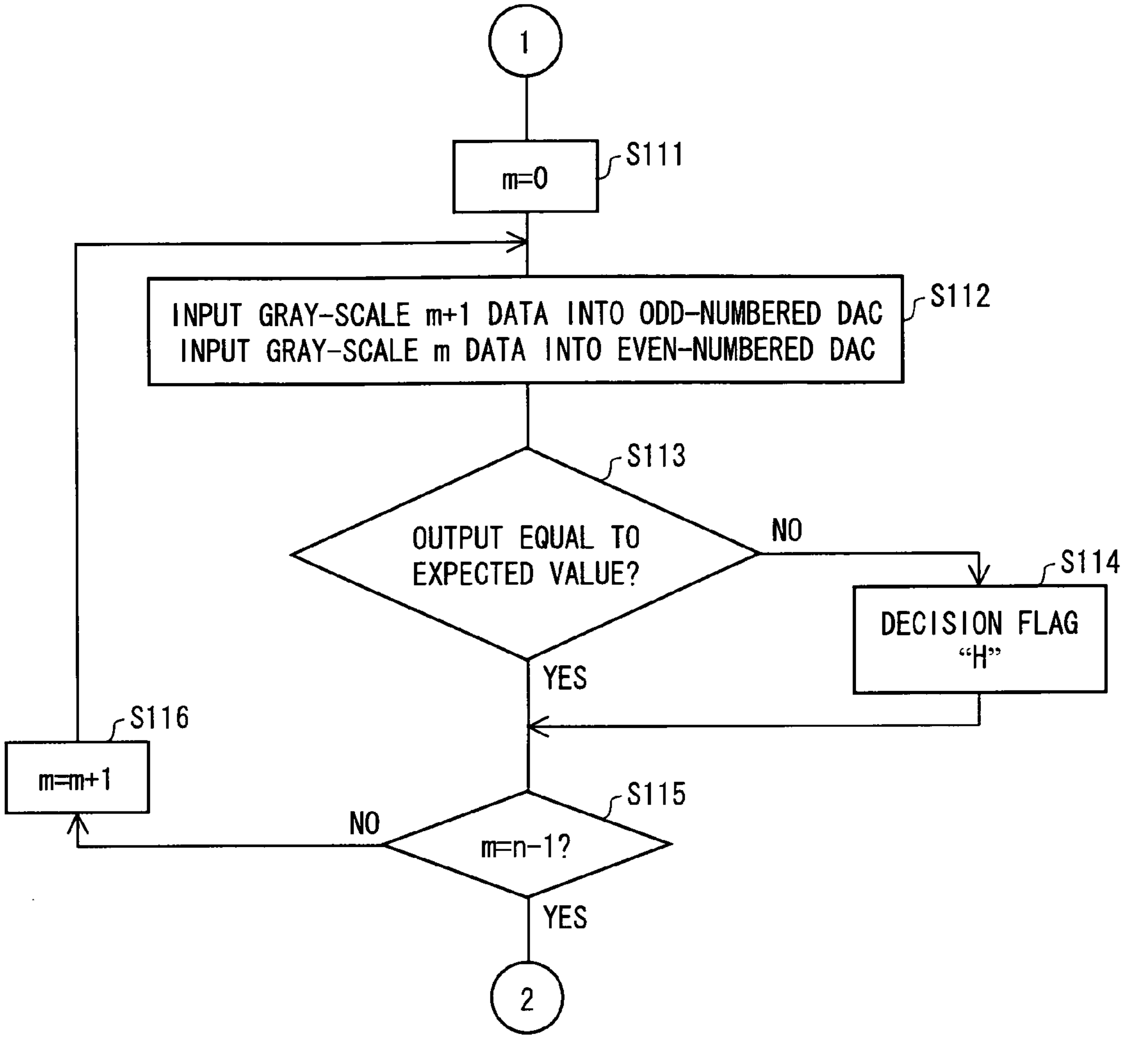
FIG. 15 is a flow chart showing the second procedure in operation-checking test based on the second failure detection method in accordance with Embodiment 1 of the present invention.

Next, the second procedure in operation-checking test based on the second failure detection method is described below with reference to FIG. 15. FIG. 15 is a flow chart showing the second procedure in operation-checking test based on the second failure detection method.

The operation-checking test 2 based on the second failure detection method is opposite in gray-scale voltage relationship between the odd-numbered circuits and the even-numbered circuits to the operation-checking test 1 based on the second failure detection method and, in other respects, is identical to the operation-checking test based on the second failure detection method.

First, the control circuit sets the expected values of the odd-numbered decision circuits at "H" and, at the same time, sets the expected values of the even-numbered decision circuits at "L". Furthermore, the control circuit resets its counter m to 0 (S111).

Next, the control circuit makes TSTR1 active, and the latch circuit DLA_19 and the odd-numbered latch circuits receive a level m+1 of gray-scale data through the data bus. Further, the control circuit makes TSTR2 active, and the latch circuit DLA_20 and the even-numbered latch circuits receive a level m of gray-scale data through the data bus (S112).

Let it be assumed here that the value of the counter m is 0. Then, each of the odd-numbered operational amplifiers receives a level 1 of gray-scale voltage through its positive input terminal from that one of the odd-numbered DACs which is in serial connection with it. Further, each of the odd-numbered operational amplifiers receives a level 0 of gray-scale voltage through its negative input terminal from that one of the even-numbered DACs which is paired with it. If DACs, each of which is in connection with the respective input terminals of its corresponding two of the operational amplifiers, are normal, the odd-numbered operational amplifiers produce "H" outputs. Meanwhile, each of the even-numbered operational amplifiers receives a level 0 of gray-scale voltage through its positive input terminal from that one of the even-numbered DACs which is in serial connection with it. Further, each of the even-numbered operational amplifiers receives a level 1 of gray-scale voltage through its negative input terminal from that one of the odd-numbered DACs which is paired with it. If DACs, each of which is in connection with the respective input terminals of its corresponding two of the operational amplifiers, are normal, the even-numbered operational amplifiers 1 produce "L" outputs.

Next, the decision circuits 3 compare the levels of the output signals from the operational amplifiers with the expected values stored in the decision circuits 3, respectively (S113). If the outputs from the operational amplifiers 1_1 to 1_18 are not equal to the expected values, the decision circuits 3_1 to 3_18 output "H" flags to the decision flags 4_1 to 4_18, respectively. These steps S112 to S114 are repeated while increasing the value of the counter m by 1 until the value of the counter m becomes n−1 (S115, S116).

(Operation-Checking Test 3 Based on the Second Failure Detection Method)

Figure 16:
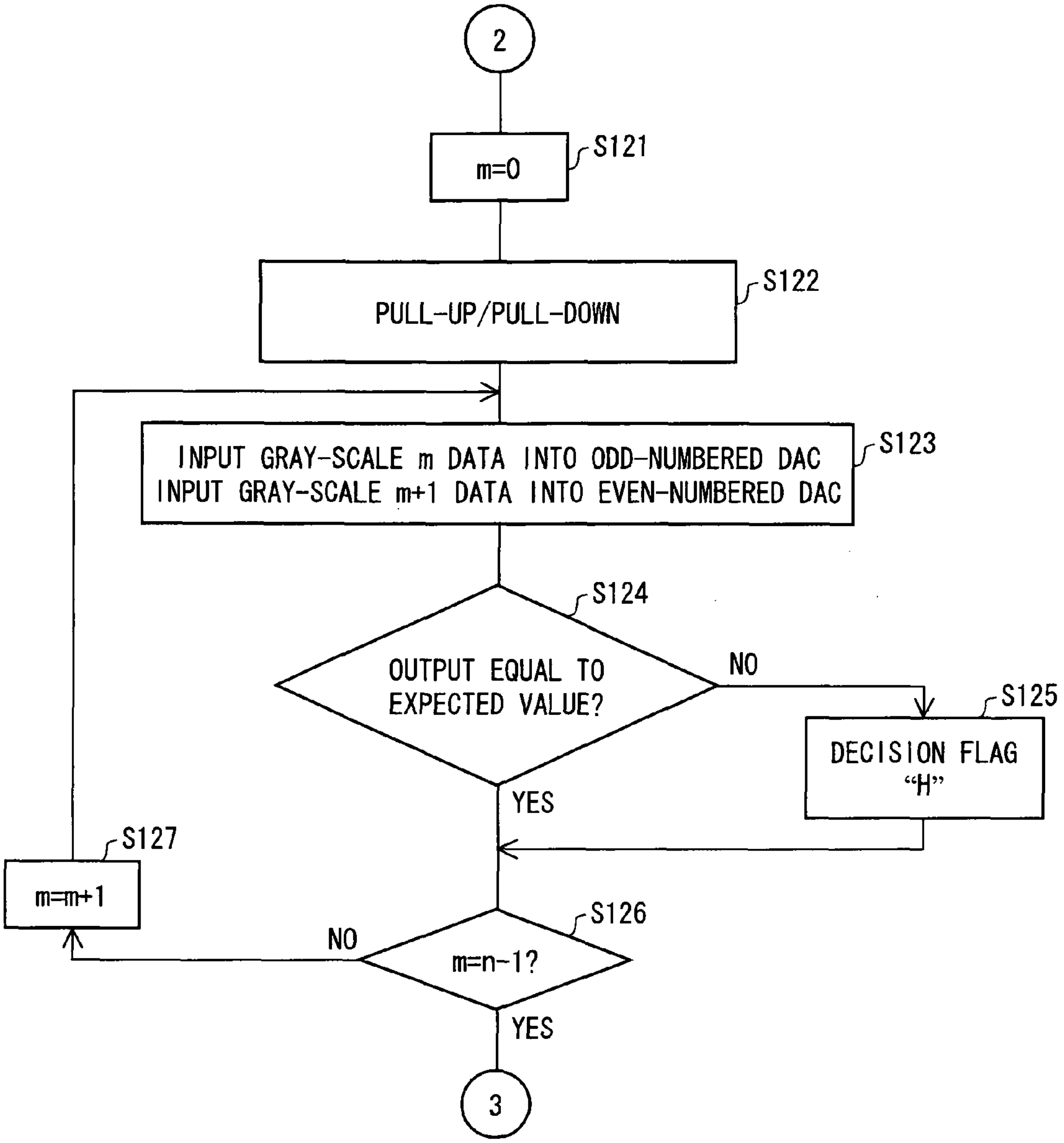
FIG. 16 is a flow chart showing the third procedure in operation-checking test based on the second failure detection method in accordance with Embodiment 1 of the present invention.

Next, the third procedure in operation-checking test based on the second failure detection method is described below with reference to FIG. 16. FIG. 16 is a flow chart showing the third procedure in operation-checking test based on the second failure detection method.

As explained in "Operation-checking Test 3 Based on the First Failure Detection Method", when DAC_1 to DAC_18 have such a failure as to have their outputs open, the operational amplifiers 1_1 to 1_18 keep on holding the gray-scale voltages that they received as a result of the executed checking test. In such a case, it may be impossible to detect a failure by carrying out the operation-checking test 1 or 2 based on the second failure detection method.

First, as in the operation-checking tests 1 and 2, the control circuit resets its counter m to 0 (S121). It should be noted here that the integrated circuit 10 has its pull-up/pull-down circuits 5_1 to 5_18 connected to the positive input terminal of the operational amplifiers 1_1 to 1_18, respectively. Next, the control circuit controls the pull-up/pull-down circuits 5_1 to 5_18 so that they pull up the positive input terminals of the odd-numbered operational amplifiers (S122). As a result, when the odd-numbered DACs have their outputs open, the odd-numbered operational amplifiers receive high voltages through their positive input terminals. At the same time, the control circuit controls the pull-up/pull-down circuits 5_1 to 5_18 so that they pull down the positive input terminals of the even-numbered operational amplifiers (S122). As a result, when the even-numbered DACs have their outputs open, the even-numbered operational amplifiers 1 receive low voltages through their positive input terminals.

The subsequent steps S123 to S127 are the same as those of the operation-checking test 1 according to the second embodiment and, as such, are not described here.

(Operation-Checking Test 4 Based on the Second Failure Detection Method)

Figure 17:
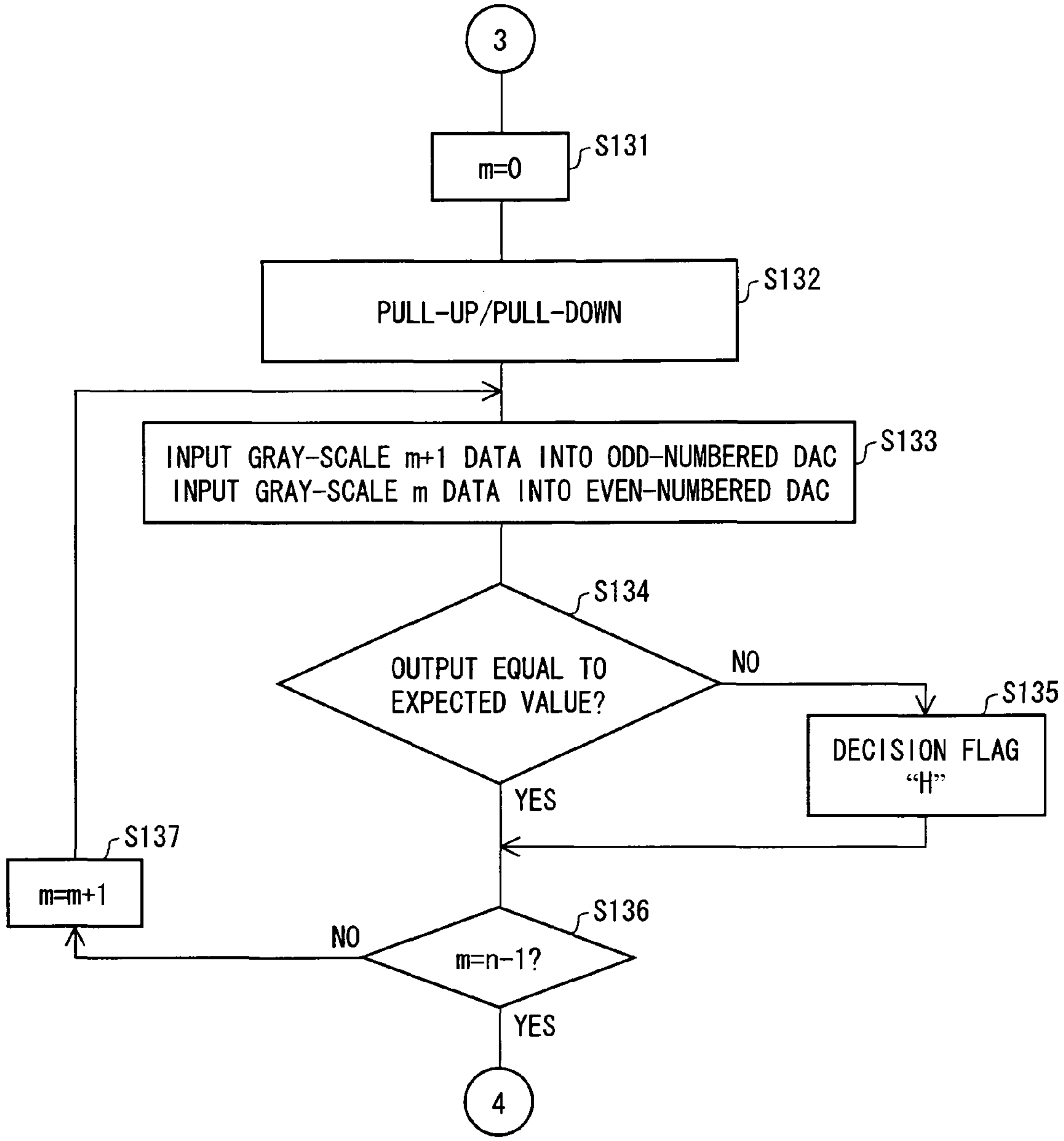
FIG. 17 is a flow chart showing the fourth procedure in operation-checking test based on the second failure detection method in accordance with Embodiment 1 of the present invention.

Next, the fourth procedure in operation-checking test based on the second failure detection method is described below with reference to FIG. 17. FIG. 17 is a flow chart showing the fourth procedure in operation-checking test based on the second failure detection method.

The operation-checking test 4 is carried out to detect a similar failure to the operation-checking test 3. First, as in the previous operation-checking tests, the control circuit resets its counter m to 0 (S131). Next, the control circuit controls the pull-up/pull-down circuits 5_1 to 5_18 so that they pull down the positive input terminals of the odd-numbered operational amplifiers (S132). As a result, when the odd-numbered DACs have their outputs open, the odd-numbered operational amplifiers receive low voltages through their positive input terminals. At the same time, the control circuit controls the pull-up/pull-down circuits 5_1 to 5_18 so that they pull up the positive input terminals of the even-numbered operational amplifiers 1 (S132). As a result, when the even-numbered DACs have their outputs open, the even-numbered operational amplifiers receive high voltages through their positive input terminals.

The subsequent steps S133 to S137 are the same as those of the operation-checking test 2 according to the second embodiment and, as such, are not described here.

(Operation-checking Test 5 Based on the Second Failure Detection Method)

Figure 18:
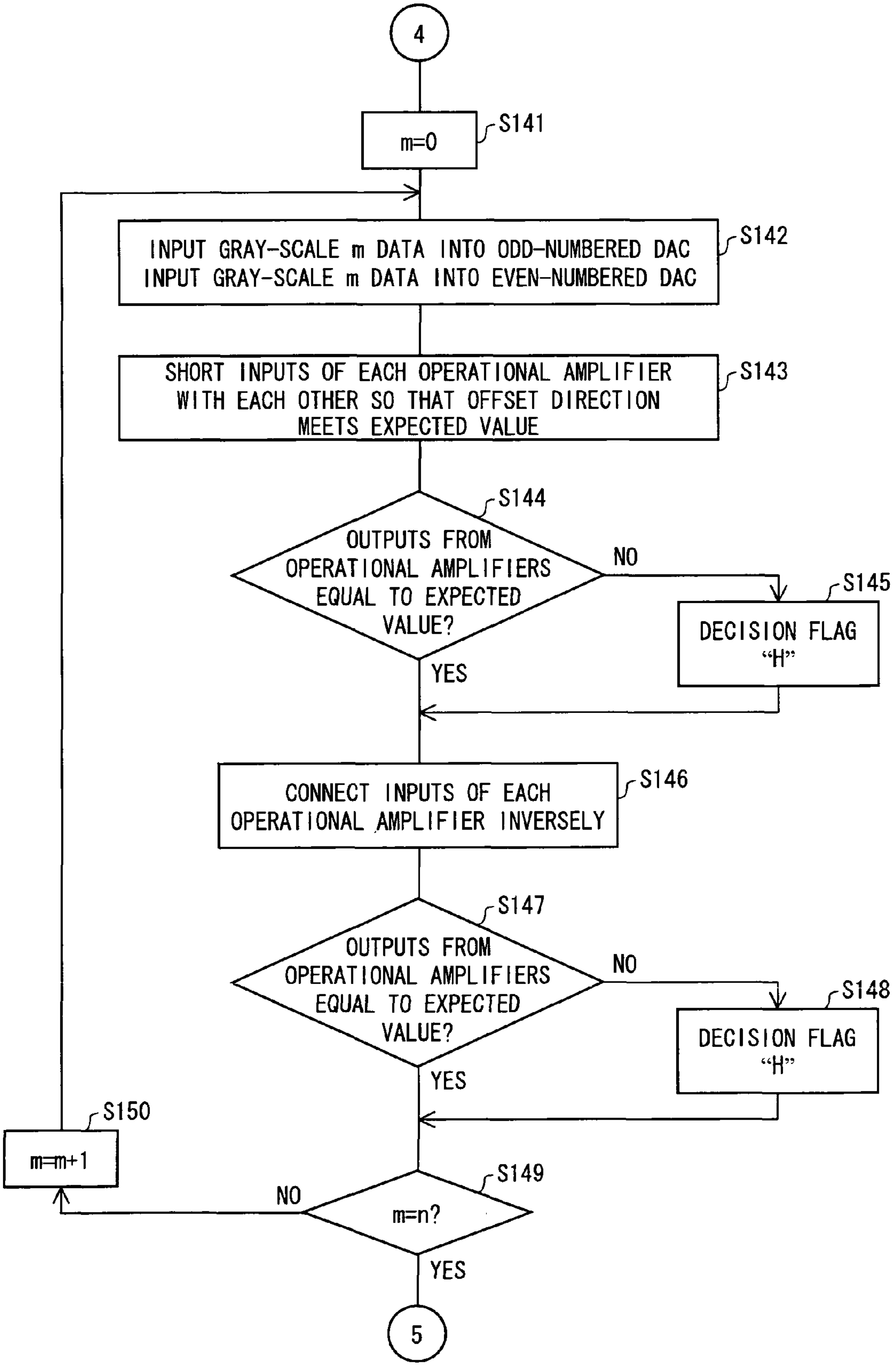
FIG. 18 is a flow chart showing the fifth procedure in operation-checking test based on the second failure detection method in accordance with Embodiment 1 of the present invention.

Next, the fifth procedure in operation-checking test based on the second failure detection method is described below with reference to FIG. 18. FIG. 18 is a flow chart showing the fifth procedure in operation-checking test based on the second failure detection method.

As explained in "Operation-checking Test 5 Based on the First Failure Detection Method", there may occur such a failure in DAC_1 to DAC_18 that the two adjacent levels of gray scale are shorted. The operation-checking test 5 based on the second failure detection method is carried out to detect such a failure.

First, as shown in FIG. 18, the control circuit resets its counter m to 0 (S141). Next, the control circuit makes TSTR1 and TSTR2 active and, furthermore, the latch circuit DLA_19, the latch circuit DLA_20, and the latch circuits DLA_1 to DLA_18 receive a level m of gray-scale data through the data bus. Furthermore, the LS signal is made active, whereby the odd-numbered DACs and the even-numbered DACs come to output the same level m of gray-scale voltage (S142). Next, the control circuit causes the positive and negative input terminals of each of the operational amplifiers 1_1 to 1_18 to be shorted with each other through switches (not shown). By thus shorting the positive and negative input terminals of each of the operational amplifiers 1_1 to 1_18 with each other, each of the operational amplifiers 1_18- to 1_18 is made to receive the same level of gray-scale voltage through its positive and negative input terminals. Next, these levels of output from the operational amplifiers with the positive and negative input terminals of each of the operational amplifiers 1_1 to 1_18 being shorted with each other are stored as expected values in the decision circuits 3 (S143).

Next, the switches (not shown) are turned OFF, whereby the positive and negative input terminals of each of the operational amplifiers 1_1 to 1_18 are no longer shorted with each other. At this point, each of the odd-numbered operational amplifiers receives a level m of gray-scale voltage through its positive input terminal from that one of the odd-numbered DACs which is in serial connection with it, and receives a level m of gray-scale voltage through its negative input terminal from that one of the even-numbered DACs which is paired with it. Meanwhile, each of the even-numbered operational amplifiers receives a level m of gray-scale voltage through its positive input terminal from that one of the even-numbered DACs which is in serial connection with it, and receives a level m of gray-scale voltage through its negative input terminal from that one of the odd-numbered DACs which is paired with it. At this point, the decision circuits 3_1 to 3_18 compare the outputs from the operational amplifiers 1_1 to 1_18 with the expected values stored in the decision circuits 3_1 to 3_18, respectively (S144). If the outputs from the operational amplifiers 1_1 to 1_18 are not equal to the expected values, the decision circuits 3_1 to 3_18 send "H" flags to the decision flags 4_1 to 4_18, respectively. Furthermore, upon receiving the "H" flags from the decision circuits 3_1 to 3_18, the decision flags 4_1 to 4_18 store the "H" flags therein.

Next, the control circuit uses the switches (not shown) to switch between signals that the operational amplifiers 1_1 to 1_18 receive from DAC_1 to DAC_18 through the positive input terminals and signals that the operational amplifiers 1_1 to 1_18 receive from DAC_1 to DAC_18 through the negative input terminals (S146). Then, the same step as S144 is carried out (S147). Further, as in S145, if the outputs from the operational amplifiers 1_1 to 1_18 are not equal to the expected values stored in the decision circuits 3_1 to 3_18, the decision circuits 3_1 to 3_18 send "H" flags to the decision flags 4_1 to 4_18, respectively (S148).

These steps S142 to S148 are repeated while increasing the value of the counter m by 1 until the value of the counter m becomes n (S149, S150).

(Self-Repairing Based on the Second Failure Detection Method)

Figure 19:
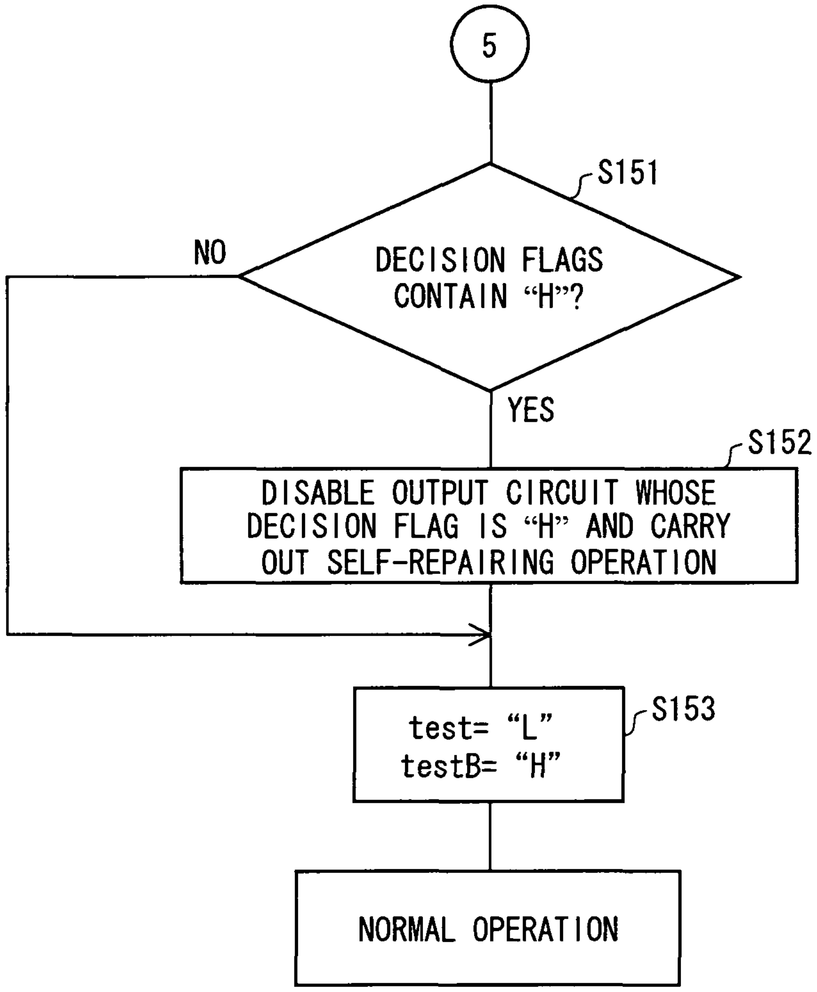
FIG. 19 is a flow chart showing steps of a procedure for self-repairing after disabling an output circuit determined to be defective in accordance with Embodiment 1 of the present invention.

Next, repairs that are carried out when the decision flags 4 have "H" flags stored therein or, in other words, when the decision circuits 3_1 to 3_18 have determined the presence of a failure in any of DAC_1 to DAC_18 as a result of the operation-checking tests 1 to 5 are described below with reference to FIG. 19. FIG. 19 is a flow chart showing steps of a procedure for disabling an output circuit determined to be defective and carrying out self-repairs.

First, the control circuit detects whether or not the decision flags 4_1 to 4_18 have "H" flags stored therein (S151). When the control circuit have discovered that the decision flags 4_1 to 4_18 have no "H" flags stored therein, the control circuit proceeds to S153. On the other hand, when the control circuit have detected a "H" flag stored in any of the decision flags 4_1 to 4_18, the control circuit disables an output circuit corresponding to that decision flag and an output circuit paired with that output circuit, and then repairs the whole output circuits (S152). It should be noted that S152 also includes the process by which the decision flags 4_1 to 4_18 send their stored flags as Flag1 to Flag18 to the switches SWA1 to SWA18, respectively, and to the control circuit for calculating Flag_X1 to Flag_X18.

Next, the control circuit sets the test signal to "L" and the testB signal to "H", and then shifts to normal operation (S153).

It should be noted that the second failure detection method determines the presence or absence of a defect in a pair of two output circuits and therefore needs to disable two or more output circuits.

For this reason, in the case of the first embodiment of self-repairing, it is necessary to prepare two spare output circuits. In the case of the second embodiment of self-repairing to be described later, a set of three output circuits is disabled; therefore, it is difficult to apply the second failure detection method to the second embodiment of self-repairing. In this case, therefore, it is desirable to disable a set of six output circuits as in the third embodiment to be described later.

Embodiment 2

Embodiment 2 of the present invention is described below with reference to FIGS. 20 through 23. It should be noted that Embodiment 2, showing a configuration that is a modification of Embodiment 1, is described in terms of points of difference to Embodiment 1, with the exclusion of points of overlap with Embodiment 1.

(Configuration of a Self-Repairing Circuit)

First, the configuration of an integrated circuit 10 for carrying out self-repairs by replacing a defective output circuit with a good output circuit in accordance with the present embodiment is described with reference to FIG. 20. As in Embodiment 1, the integrated circuit 10 is an eighteen-output integrated circuit. However, the number of outputs from the integrated circuit 10 is not limited to 18.

Figure 20:
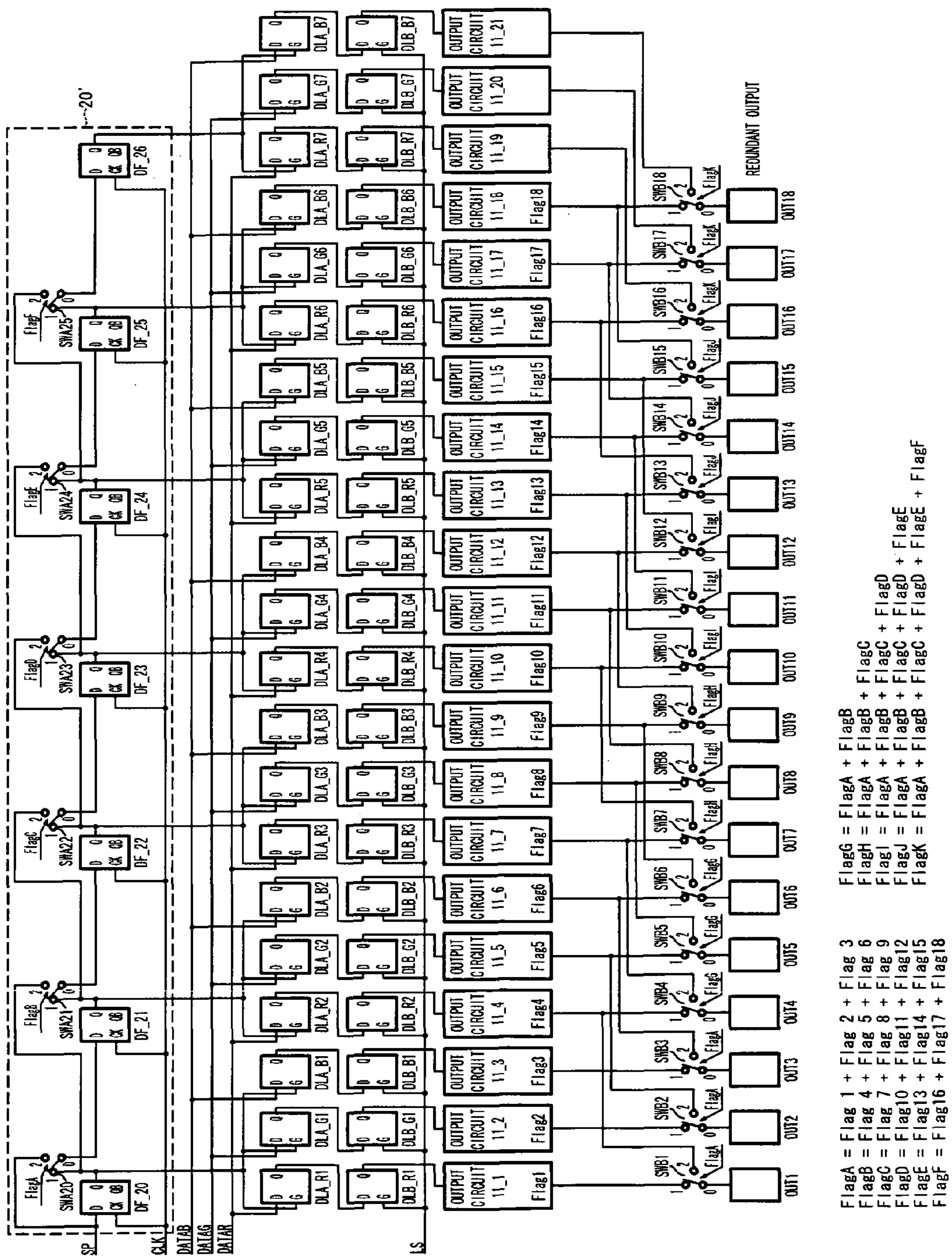
FIG. 20 is a block diagram showing the configuration of an integrated circuit for normal operation in accordance with Embodiment 2 of the present invention.

FIG. 20 is a block diagram showing the configuration of the integrated circuit 10 for normal operation in accordance with the present embodiment. As shown in FIG. 20, the integrated circuit 10 includes: output terminals OUT1 to OUT18; DF_20 to DF_26 (hereinafter sometimes referred to collectively as "DFs"); latch circuits DLA_R1 to DLA_R6, DLA_G1 to DLA_G6, and DLA_B1 to DLA_B6 and spare latch circuits DLA_R7, DLA_G7, and DLA_B7 (all the latch circuits including the spare latch circuits being hereinafter sometimes referred to collectively as "latch circuits DLA"); hold circuits DLB_R1 to DLB_R6, DLB_G1 to DLB_G6, and DLB_B1 to DLB_B6 and spare hold circuits DLB_R7, DLB_G7, and DLB_B7 (all the hold circuits including the spare hold circuit being hereinafter sometimes referred to collectively as "hold circuits DLB"); output circuits 11_1 to 11_18 and spare output circuits 11_19 to 11_21 (all the output circuits including the spare output circuits being hereinafter sometimes referred to collectively as "output circuits 11"); switches SWA20 to SWA25; and switches SWB1 to SWB18.

In the present embodiment, the sub-output circuits as set forth in the claims correspond to separate output circuits 11 (output circuits 11_1, 11_2, and 11_3, respectively), and the sub-latch circuits as set forth in the claims correspond to separate latch circuits DLA (e.g., the latch circuits DLA_R1, DLA_G1, and DLA_B1, respectively). Each of the output circuits as set forth in the claim corresponds to a block composed of output circuits 11 arranged in a row to correspond to the three primary colors R, G, and B, by which the display colors are constituted (e.g., a block composed of the output circuits 11_1 to 11_3), and each of the latch circuits as set forth in the claims corresponds a block composed of latch circuits DLA arranged in a row to correspond to the three primary colors R, G, and B (e.g., a block composed of the latch circuits DLA_R1, DLA_G1, and DLA_B1).

Further, the sub-output terminals as set forth in the claims correspond to the output terminals OUT1 to OUT18, respectively, and each of the output terminals as set forth in the claims corresponds to a set of three output terminals (e.g., OUT1 to OUT3).

It should be noted that the output circuits 11 of the integrated circuit 10 are identical in internal circuitry to the output circuits 11 of the integrated circuit 10 of Embodiment 1 and, as such, each include: a DAC circuit (not shown) for converting gray-scale data into a gray-scale voltage signal; an operational amplifier (not shown) that serves as a buffer circuit; a decision circuit for determining the quality of operation of the output circuit; and a decision flag for indicating the quality of operation as determined by the decision circuit.

The integrated circuit 10 according to the present embodiment receives gray-scale data of the three primary colors, i.e. red (R), green (G), and blue (B), by which the display colors are constituted, through three signal lines, namely a DATAR signal line, a DATAG signal line, and a DATAB signal line, respectively. That is, the integrated circuit 10 is configured to drive a color display device whose display colors are constituted by the three colors R, G, and B.

The latch circuits DLA_R1 to DLA_R7 have their input sections D connected to the DATAR signal line. The latch circuits DLA_G1 to DLA_G7 have their input sections D connected to the DATAG signal line. The latch circuits DLA_B1 to DLA_B7 have their input sections D connected to the DATAB signal line.

The DFs, connected in series, constitute a shift register 20'. As such, the shift register 20' sends selection signals to the latch circuits DLA in sequence through the DFs, respectively, in accordance with an SP signal inputted through an SP signal line and a CLK signal inputted through a CLK signal line, thereby selecting which of the latch circuits DLA loads gray-scale data.

Further, the latch circuits DLA_R1, DLA_G1, and DLA_B1 have their gate sections G connected to the output section Q of DF_20. The latch circuits DLA_R2, DLA_G2, and DLA_B2 have their gate sections G connected to the output section Q of DF_21. The latch circuits DLA_R3, DLA_G3, and DLA_B3 have their gate sections G connected to the output section Q of DF_22. The latch circuits DLA_R4, DLA_G4, and DLA_B4 have their gate sections G connected to the output section Q of DF_23. The latch circuits DLA_R5, DLA_G5, and DLA_B5 have their gate sections G connected to the output section Q of DF_24. The latch circuits DLA_R6, DLA_G6, and DLA_B6 have their gate sections G connected to the output section Q of DF_25. The latch circuits DLA_R7, DLA_G7, and DLA_B7 have their gate sections G connected to the output section Q of DF_26.

The latch circuits DLA extract gray-scale data corresponding the output terminals OUT from the received gray-scale data, and then send the extracted gray-scale data to the hold circuits DLB connected thereto, respectively. The hold circuits DLB hold the gray-scale data sent from the latch circuits DLA, and then send the gray-scale data to the output circuits 11 connected thereto, respectively. As with the output circuits 11 according to Embodiment 1, the output circuits 11 according to the present embodiment include DAC circuits, buffer circuits, decision circuits, and decision flags, respectively, and are configured to output Flag1 to Flag18 indicative of results of determination of the quality of the output circuits 11_1 and 11_18. It should be noted that each of Flag1 to Flag18 indicates "0" when its corresponding output circuit is good and indicates "1" when its corresponding output circuit is defective.

As shown in FIG. 20, the switches SWA20 to SWA25 each switch from one input to another for the DF_21 to DF_26 under control of the values of FlagA to FlagF as calculated from Flag1 to Flag18, respectively. It should be noted here that FlagA to FlagF are calculated according to logical expressions shown in FIG. 20. Taking the switches SWA20 and SWA21 as an example for concrete descriptions, when FlagA is "0", the switch SWA20 connects the input section D of DF_21 to the output section Q of DF_20. On the other hand, when FlagA is "1", the switch SWA20 connects the input section D of DF_21 to the input section D of DF_20. Further, when FlagB is "0", the switch SWA21 connects the input section D of DF_22 to the output section Q of DF_21. On the other hand, when FlagB is "1", the switch SWA21 connects the input section D of DF_22 to the output section of DF_20.

Similarly, when FlagC to FlagF are "0", the switches SWA22 to SWA25 connect the input sections D of DF_23 to DF_26 to the output sections Q of DF_22 to DF_25 placed one stage ahead, respectively. On the other hand, when FlagC to FlagF are "1", the switches SWA22 to SWA25 connect the input sections D of DF_23 to DF_26 to the output sections Q of DF_21 to DF_24 placed two stage ahead, respectively.

Further, as shown in FIG. 20, the switches SWB1 to SWB18 switch from connecting their corresponding output terminals OUT1 to OUT18 to one output to another. Specifically, the switches SWB1 to SWB3 switch from connecting their corresponding output terminals OUT1 to OUT3 to one output to another under control of the value of FlagA. The switches SWB4 to SWB6 switch from connecting their corresponding output terminals OUT4 to OUT6 to one output to another under control of the value of FlagG. The switches SWB7 to SWB9 switch from connecting their corresponding output terminals OUT7 to OUT9 to one output to another under control of the value of FlagH. The switches SWB10 to SWB12 switch from connecting their corresponding output terminals OUT10 to OUT12 to one output to another under control of the value of FlagI. The switches SWB13 to SWB15 switch from connecting their corresponding output terminals OUT13 to OUT15 to one output to another under control of the value of FlagJ. The switches SWB16 to SWB18 switch from connecting their corresponding output terminals OUT16 to OUT18 to one output to another under control of the value of FlagK. It should be noted here that FlagG to FlagK are calculated according to logical expressions shown in FIG. 20.

The operation of the switches SWB is explained in concrete terms as follows: When Flag (any of FlagA and FlagG to FlagK) that is inputted to the ith switch SWBi is "0", the ith switch SWBi connects the ith output circuit 11_*i* to the ith output terminal OUTi. On the other hand, when Flag that is inputted is "1", the ith switch SWBi connects the (i+3)th output circuit 11_*i*+3 to the ith output terminal OUTi. Taking the switch SWB7 as an example, the switch SWB7 is controlled by the value of FlagH; and when FlagH is "1", the switch SWB7 connects the output terminal OUT7 to the output circuit 11_10. On the other hand, when FlagH is "0", the switch SWB7 connects the output terminal OUT7 to the output of the output circuit 11_7.

(Normal Operation)

Next, the operation of the integrated circuit 10 without a defective output circuit, i.e. normal operation, is described below.

In the absence of a defective output circuit, Flag1 to Flag18 in the output circuits 11_1 to 11_18 are all "0". Accordingly, FlagA to FlagK, obtained by combining Flag1 to Flag18 according to the logical expressions OR respectively, are all "0", too. Therefore, the switches SWA20 to SWA25 and switches SWB1 to SWB18 in the integrated circuit 10 both make connections as shown in FIG. 20.

Figure 21:
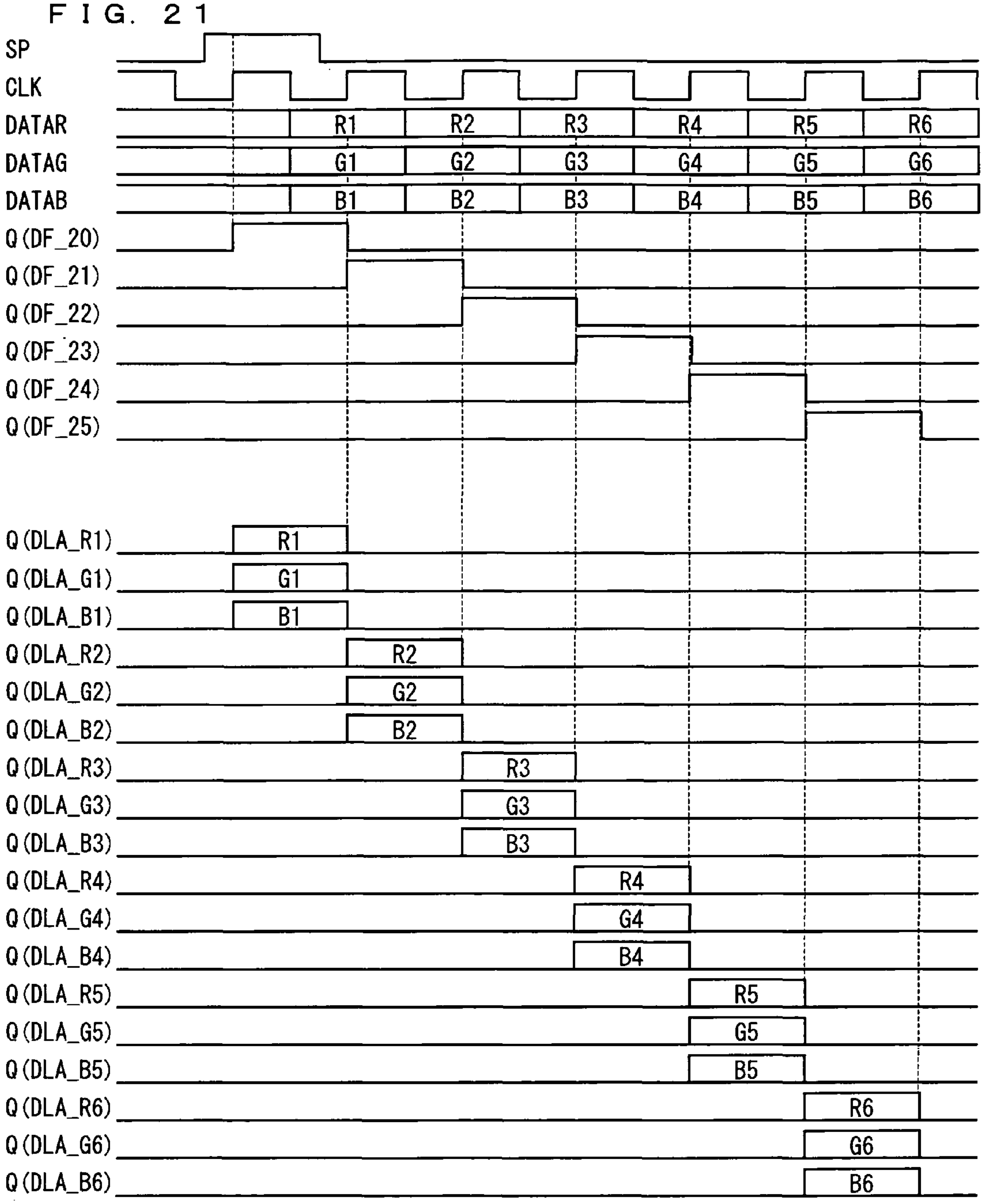
FIG. 21 is a timing chart showing the operation of the integrated circuit without a defective output circuit in accordance with Embodiment 2 of the present invention.

The normal operation of the integrated circuit 10 is described below with reference to FIG. 21. FIG. 21 is a timing chart showing the operation of the integrated circuit 10 without a defective output circuit.

First, DF_20 receives a "H" SP signal indicative of the start of operation of the integrated circuit 10 through its input section D. DF_20 loads the value "H" of the SP signal in response to a rise in the CLK signal, and then outputs a "H" selection signal through its output section Q. As shown in FIG. 21, at the next rising edge of the CLK signal, the SP signal is "L" and, accordingly, the selection signal from DF_20 through its output section Q becomes "L", too. It should be noted, in FIG. 21, that Q (DF_20) to Q (DF_25) denote selection signals from DF_20 to DF_25, respectively.

The DF_20 to DF_25 constitute a shift register 20' by having their output sections Q connected to the input sections D of the next DFs, respectively. That is, before the selection signal Q (DF_20) from DF_20 becomes "L", DF_21 outputs a "H" selection signal Q (DF_21) in response to a fall in the CLK signal. After that, the selection signal Q (DF_20) becomes "L". This operation process is repeated for each of DF_20 to DF_25. As shown in FIG. 21, in synchronization with falls in the CLK signal, the DFs send the selection signals in sequence to the latch circuits DLA connected to the output sections Q of the DFs, respectively.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, as shown in FIG. 21, shifts from R1 to R2 and so forth, shifts from G1 to G2 and so forth, or shifts from B1 to B2 and so forth are made in synchronization with the timing of falls in the CLK signal. Each of the latch circuits DLA loads gray-scale data through its input section D and outputs the gray-scale data through its output section Q, while receiving a "H" selection signal through its gate section G. That is, while the selection signal lines from the DFs are "H", the latch circuits DLA_R1 to DLA_R6, DLA_G1 to DLA_G6, and DLA_B1 to DLA_B6 load incoming gray-scale data and output the gray-scale data through their output sections Q, respectively. It should be noted, in FIG. 21, that Q (DLA_R1) to Q (DLA_B6) denote outputs from the latch circuits DLA through their output sections Q, respectively.

Thus, with the latch circuits DLA_R1 to DLA_R6 being selected in sequence in synchronization with the timing of shifting of the gray-scale data inputted through the data signal line DATAR, the latch circuits DLA load gray-scale data corresponding to the output terminals OUT, respectively. That is, the latch circuits DLA_R1 to DLA_R6 load gray-scale data R1 to R6 in sequence in accordance with the selection signals sent in sequence from the DFs, respectively. Similarly, the latch circuits DLA_G1 to DLA_G6 load gray-scale data G1 to G6 in sequence in accordance with the selection signals sent in sequence from the DFs, respectively. Similarly, the latch circuits DLA_B1 to DLA_B6 load gray-scale data B1 to B6 in sequence in accordance with the selection signals sent in sequence from the DFs, respectively.

Although FIG. 21 does not show the subsequent operation, after all the latch circuits DLA load the gray-scale data, respectively, the integrated circuit 10 sends a "H" LS signal to the hold circuits DLB through their gate sections G. Upon receiving the "H" LS signal, the hold circuits DLB output the gray-scale data, which have been inputted through their input sections D, through their output sections Q, respectively. Thus, the output circuits 11_1 to 11_18 receive the gray-scale data R1 to R6, G1 to G6, and B1 to B6 loaded in sequence by the latch circuits DLA, respectively. Then, the output circuits 11_1 to 11_18 convert the gray-scale data into gray-scale voltages, buffer the gray-scale voltages, and then send the gray-scale voltages to the output terminals OUT1 to OUT18 connected thereto, respectively.

It should be noted that the spare circuits, i.e. DF_26, the latch circuits DLA_R7, DLA_G7, and DLA_B7, and the hold circuits DLB_R7, DLB_G7, and DLB_B7, also operate upon receiving the CLK signal and the LS signal. However, the output circuit 11_19 to 11_21, connected to none of the output terminals OUT1 to OUT18, do not affect the waveform of an output from any of the output terminals OUT1 to OUT18. Therefore, the foregoing description omits to mention the operation of the spare circuits, i.e. DF_26, the latch circuits DLA_R7, DLA_G7, and DLA_B7, and the hold circuits DLB_R7, DLB_G7, and DLB_B7.

(Self-Repairing Operation)

Figure 22:
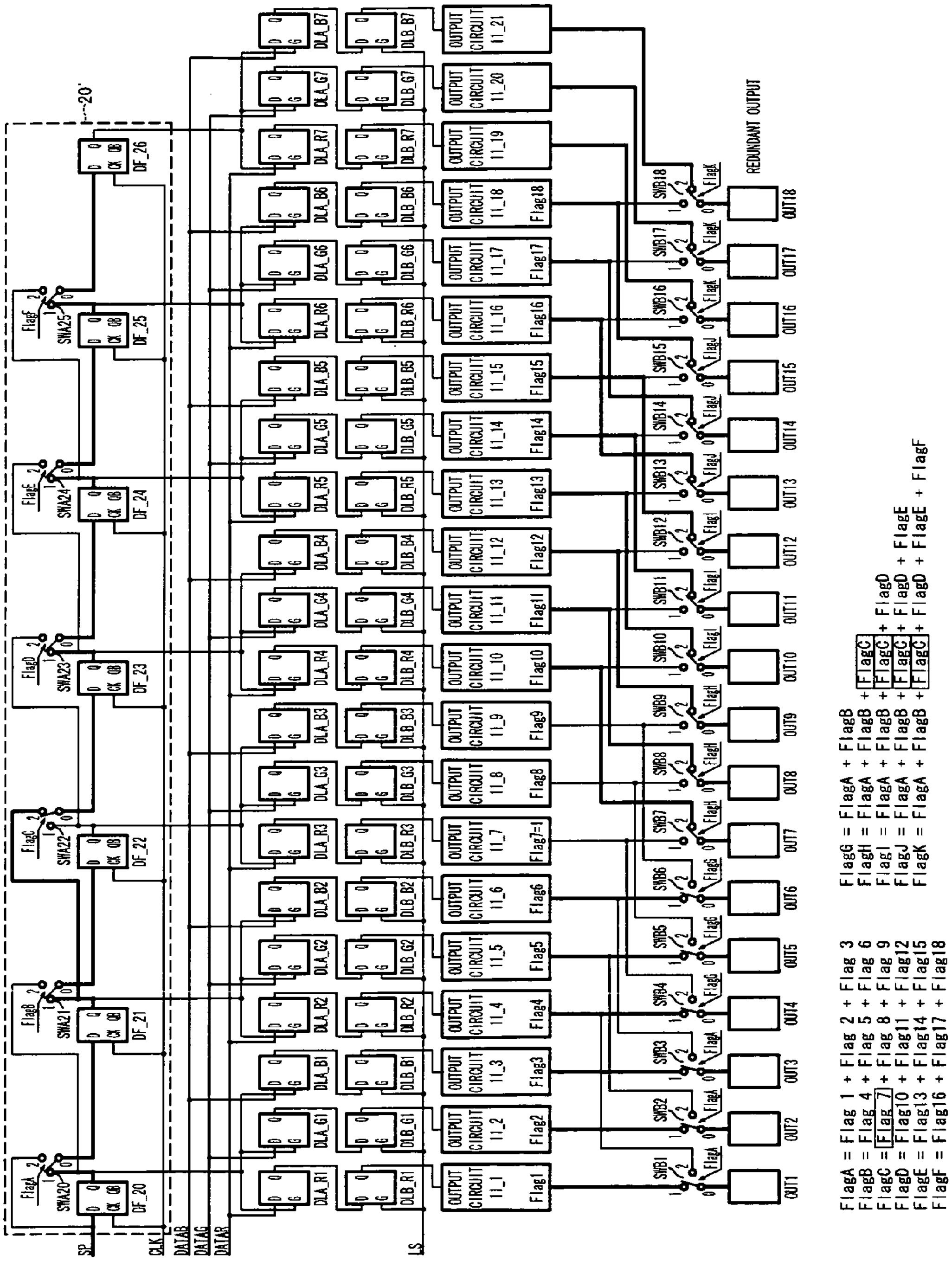
FIG. 22 is a block diagram showing the state of the integrated circuit for self-repairing operation in accordance with Embodiment 2 of the present invention.
Figure 23:
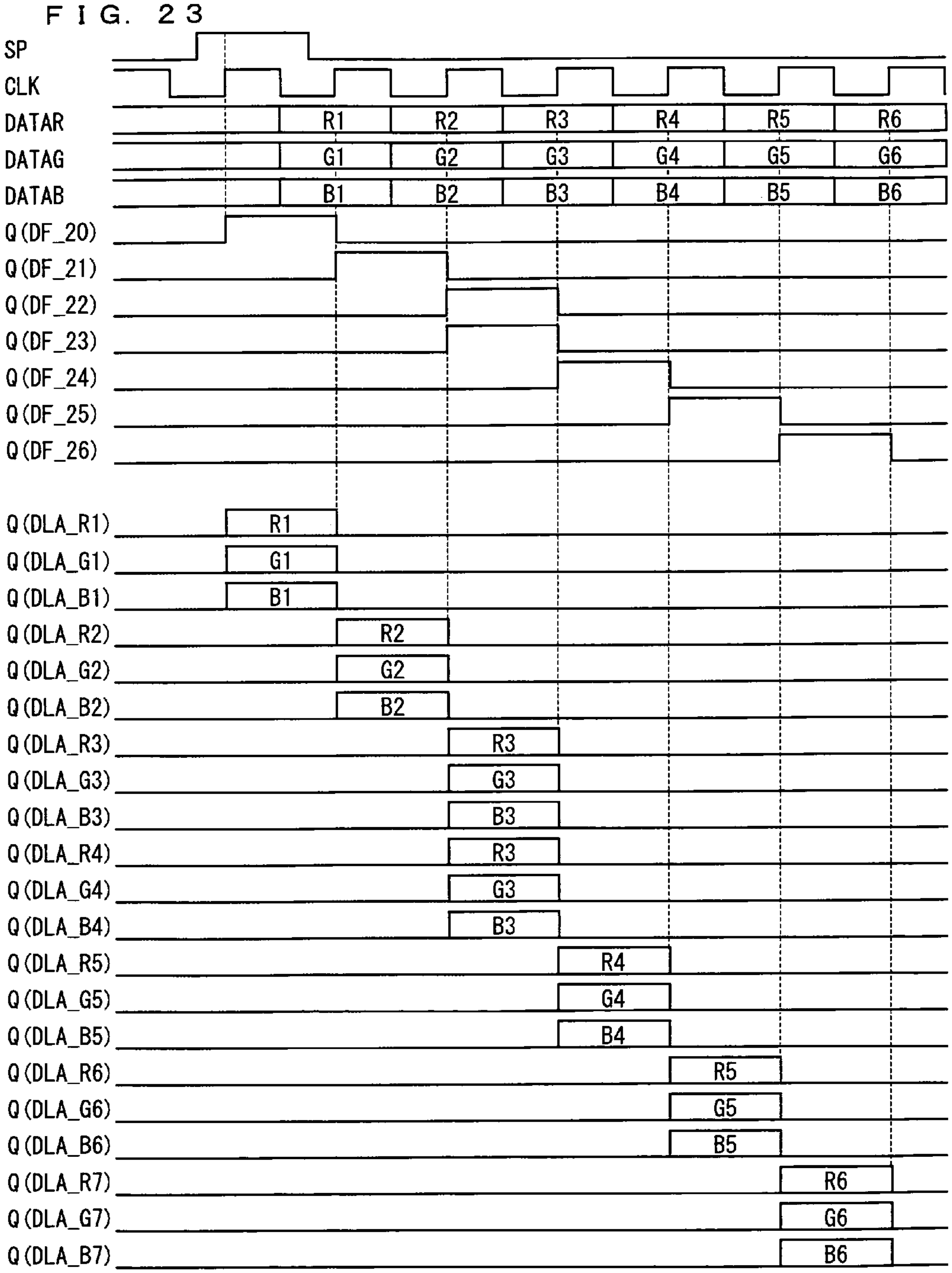
FIG. 23 is a timing chart showing the operation of the integrated circuit with a defective output circuit in accordance with Embodiment 2 of the present invention.

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 22 and 23. FIG. 22 shows the configuration of the integrated circuit 10 for self-repairing operation in accordance with the present embodiment, and FIG. 23 is a timing chart showing the operation of the integrated circuit 10 with a defective output circuit.

First, as shown in FIG. 22, the integrated circuit 10 has Flag7 set to "1" in the presence of a defect in the output circuit 11_7. Further, according to the logical expressions OR (see FIG. 20), FlagA, FlagB, and FlagD to FlagG are "0", and FlagC and FlagH to FlagK, each constituted by incorporating Flag7, are "1".

Since FlagA, FlagB, and FlagD to FlagG are "0", the switches SWA20 and SWA21 and the switches SWB1 to SWB6 operate in the same manner as in the case of normal operation previously mentioned. Therefore, the following description omits to mention the operation in DF_20 and DF_21, the latch circuits DLA_R1, DLA_R2, DLA_G1, DLA_G2, DLA_B1, and DLA_B2, the hold circuits DLB_R1, DLB_R2, DLB_G1, DLB_G2, DLB_B1, and DLB_B2, and the output circuits 11_1 to 11_6.

Meanwhile, since FlagC and FlagH to FlagK are "1", SWA22 has switched from connecting the input section D of DF_23 to the output section Q of the DF_22 to connecting the input section D of DF_23 to the output section Q of DF_21, as shown in FIG. 22. As a result of this switch in SWA22, DF_22 and DF_23 send selection signals to the latch circuits DLA_R3. DLA_G3, and DLA_B3 and the latch circuits DLA_R4, DLA_G4, and DLA_B4, respectively, at the same time or, in other word, in synchronization with the timing of input of the gray-scale data R3, G3, and B3, as shown in FIG. 23. Thus, the latch circuits DLA_R3 and DLA_R4 both load the gray-scale data R3. Similarly, the latch circuits DLA_G3 and DLA_G4 both load the gray-scale data G3, and the latch circuits DLA_B3 and DLA_B4 both load the gray-scale data B3. Further, DF_24 to DF_26 send selection signals to the latch circuits DLA_R5 to DLA_R7, DLA_G5 to DLA_G7, and DLA_B5 to DLA_B7 in sequence in synchronization with the timing of input of the gray-scale data R4 to R6, G4 to G6, and B4 to B6, respectively. Thus, the latch circuits DLA_R5 to DLA_R7, DLA_G5 to DLA_G7, and DLA_B5 to DLA_B7 load the gray-scale data R4 to R6, G4 to G6, and B4 to B6 in accordance with the received selection signals, respectively. It should be noted, in FIG. 23, that Q (DF_20) to Q (DF_26) denote selection signals from the DFs, respectively, and Q (DLA_R1) to Q (DLA_B7) denote outputs from the latch circuits DLA through their output sections Q, respectively.

Further, since FlagH is "1", the switches SWB7 to SWB9 have switched from connecting the output terminals OUT7 to OUT9 to the outputs of the output circuits 11_7 to 11_9 to connecting the output terminals OUT7 to OUT9 to the outputs of the output circuits 11_10 to 11_12, respectively. Therefore, none of the output terminals OUT receive gray-scale voltages corresponding to the gray-scale data R3, G3, and B3 from the defective output circuits 11_7 to 11_9. Furthermore, the output terminals OUT7 to OUT9 receives gray-scale voltages corresponding to the gray-scale data R3, G3, and B3 from the output circuits 11_10 to 11_12, respectively. Furthermore, since FlagI to FlagK are "1", the switches SWB10 to SWB18 connect the output terminal OUT10 to the output circuit 11_13, the output terminal OUT11 to the output circuit 11_14 and, similarly, the subsequent output terminals OUT12 to OUT18 to the output circuits 11_15 to 11_21, respectively. As a result, the output terminals OUT1 to OUT18 receive gray-scale voltages corresponding to the gray-scale data R1 to B6, respectively.

As described above, the configuration capable of self-repairing is realized by: (i) disconnecting a defective output circuit 11, a defective latch circuit DLA, or a defective hold circuit DLB, if detected, by switching from connecting the input section D of each DF to one output to another and switching connections between the output circuits 11_1 to 11_19 and the output terminals OUT1 to OUT18, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 (11_1, 11_4, . . . ) corresponding to R, by which the display colors are constituted, uses its operational amplifier to compare a voltage outputted from its DAC circuit with a voltage outputted from the DAC circuit of the output circuit 11_19. Similarly, each of the output circuits 11 (11_2, 11_5, . . . ) corresponding to G, by which the display colors are constituted, uses its operational amplifier to compare a voltage outputted from its DAC circuit with a voltage outputted from the DAC circuit of the output circuit 11_20, and each of the output circuits 11 (11_3, 11_6, corresponding to B, by which the display colors are constituted, uses its operational amplifier to compare a voltage outputted from its DAC circuit with a voltage outputted from the DAC circuit of the output circuit 11_21. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Embodiment 3

Embodiment 3 of the present invention is described below with reference to FIGS. 24 through 27. It should be noted that Embodiment 3, showing a configuration that is a modification of Embodiment 1, is described in terms of points of difference to Embodiment 1, with the exclusion of points of overlap with Embodiment 1.

(Configuration of a Self-Repairing Circuit)

First, the configuration of an integrated circuit 10 for carrying out self-repairs by replacing a defective output circuit with a good output circuit in accordance with the present embodiment is described with reference to FIG. 24. As in Embodiment 1, the integrated circuit 10 is an eighteen-output integrated circuit. However, the number of outputs from the integrated circuit 10 is not limited to 18.

Figure 24:
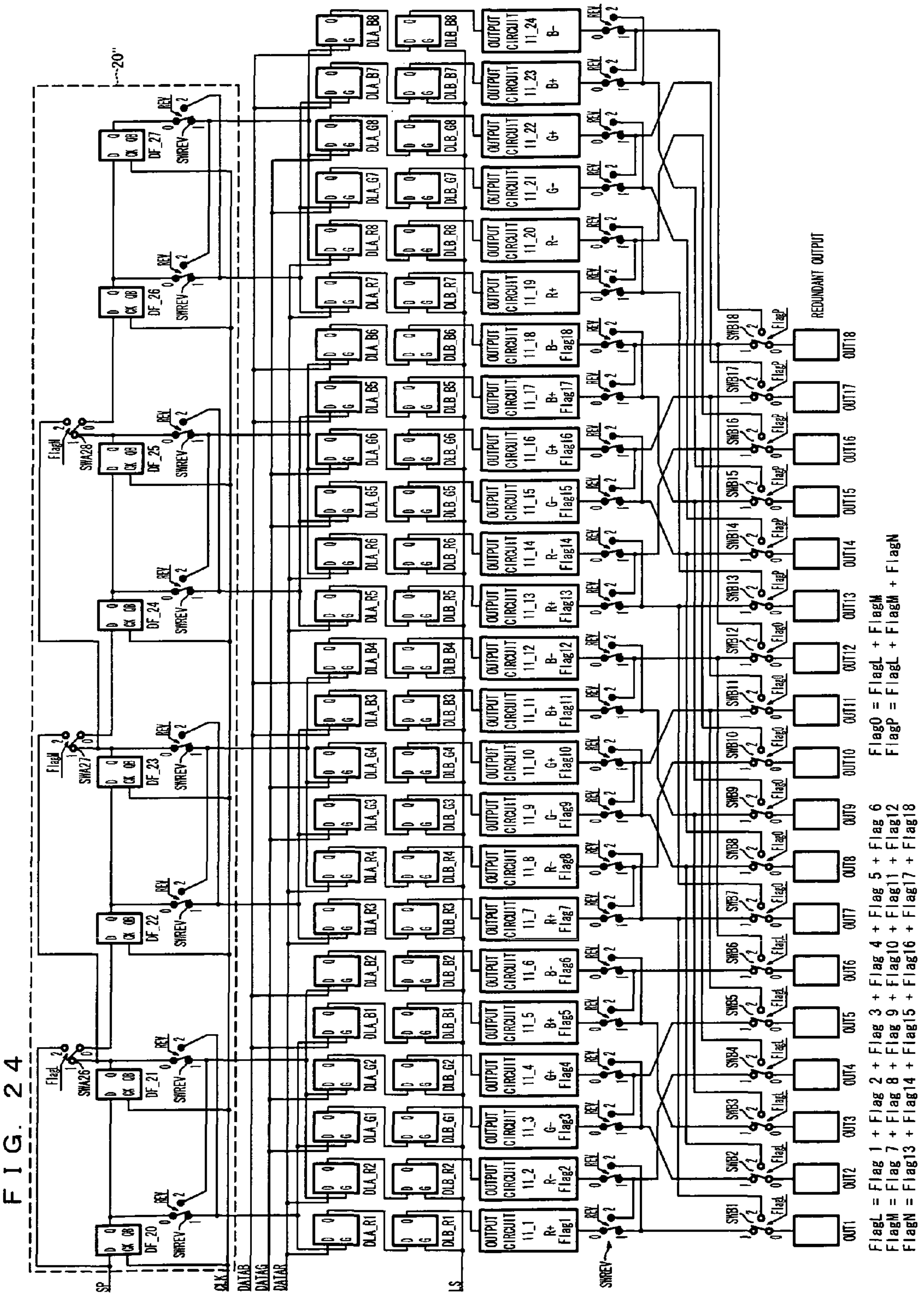
FIG. 24 is a block diagram showing the configuration of an integrated circuit for normal operation in accordance with Embodiment 3 of the present invention.

FIG. 24 is a block diagram showing the configuration of the integrated circuit 10 for normal operation in accordance with the present embodiment. As shown in FIG. 24, the integrated circuit 10 includes: output terminals OUT1 to OUT18; DF_20 to DF_27 (hereinafter sometimes referred to collectively as "DFs"); latch circuits DLA_R1 to DLA_R6, DLA_G1 to DLA_G6, and DLA_B1 to DLA_B6 and spare latch circuits DLA_R7, DLA_G7, DLA_B7, DLA_R8, DLA_G8, and DLA_B8 (all the latch circuits including the spare latch circuits being hereinafter sometimes referred to collectively as "latch circuits DLA"); hold circuits DLB_R1 to DLB_R6, DLB_G1 to DLB_G6, and DLB_B1 to DLB_B6 and spare hold circuits DLB_R7, DLB_G7, DLB_B7, DLB_R8, DLB_G8, and DLB_B8 (all the hold circuits including the spare hold circuit being hereinafter sometimes referred to collectively as "hold circuits DLB"); output circuits 11_1 to 11_18 and spare output circuits 11_19 to 11_24 (all the output circuits including the spare output circuits being hereinafter sometimes referred to collectively as "output circuits 11"); switches SWA26 to SWA28; switches SWB1 to SWB18; and thirty-two switches SWREV.

In the present embodiment, the sub-output circuits as set forth in the claims correspond to separate output circuits 11 (output circuits 11_1, 11_2, and 11_3, respectively), and the sub-latch circuits as set forth in the claims correspond to separate latch circuits DLA (e.g., the latch circuits DLA_R1, DLA_G1, DLA_B1, DLA_R2, DLA_G2, and DLA_B2, respectively). Each of the output circuits as set forth in the claim corresponds to a block composed of output circuits 11 arranged in a row to correspond to positive and negative gray-scale voltages for each of the three primary colors R, G, and B, by which the display colors are constituted (e.g., a block composed of the output circuits 11_1 to 11_6), and each of the latch circuits as set forth in the claims corresponds a block composed of latch circuits arranged in a row to correspond to positive and negative gray-scale voltages for each of the three primary colors R, G, and B (e.g., a block composed of the latch circuits DLA_R1, DLA_G1, DLA_B1, DLA_R2, DLA_G2, and DLA_B2).

Further, in the present embodiment, the sub-output terminals as set forth in the claims correspond to the output terminals OUT1 to OUT18, respectively, and each of the output terminals as set forth in the claims corresponds to a set of six output terminals (e.g., OUT1 to OUT6).

Further, a pointer circuit 133 has connection terminals that can be connected to SWA20 to SWA25 respectively. The sub-connection terminals as set forth in the claims correspond to separate connection terminals, respectively, and the connection terminals as set forth in the claims correspond to sets of two connection terminals disposed to correspond to the respective output circuits.

It should be noted that the output circuits 11 of the integrated circuit 10 are identical in internal circuitry to the output circuits 11 of the integrated circuit 10 of Embodiment 1 and, as such, each include: a DAC circuit (not shown) for converting gray-scale data into a gray-scale voltage signal; an operational amplifier (not shown) that serves as a buffer circuit; a decision circuit for determining the quality of operation of the output circuit; and a decision flag for indicating the quality of operation as determined by the decision circuit.

Each of the output circuits 11 of the integrated circuit 10 is a circuit that corresponds only to either a positive dot-inversion driving voltage output or a negative dot-inversion driving voltage output. In FIG. 24, the odd-numbered output circuits 11_1, 11_3, 11_5, . . . correspond to positive voltage outputs, and the even-numbered output circuits 11_2, 11_4, 11_6, . . . correspond to negative voltage outputs. Moreover, in order to carry out dot inversion drive, it is necessary to be able to output both positive and negative voltages to each output terminal OUT. Accordingly, the integrated circuit 10 controls switching of the switches SWREV in accordance with a control signal REV to change the timing of sampling of gray-scale data by changing connections of the selection signal lines to the output circuits and the output terminals, thus realizing the switch between positive and negative voltages.

The integrated circuit 10 according to the present embodiment receives gray-scale data of the three primary colors, i.e. red (R), green (G), and blue (B), by which the display colors are constituted, through three signal lines, namely a DATAR signal line, a DATAG signal line, and a DATAB signal line, respectively. That is, the integrated circuit 10 is configured to drive a color display device whose display colors are constituted by the three colors R, G, and B.

The latch circuits DLA_R1 to DLA_R8 have their input sections D connected to the DATAR signal line. The latch circuits DLA_G1 to DLA_G8 have their input sections D connected to the DATAG signal line. The latch circuits DLA_B1 to DLA_B8 have their input sections D connected to the DATAB signal line.

The DFs, connected in series, constitute a shift register 20". As such, the shift register 20" sends selection signals to the latch circuits DLA in sequence through the DFs, respectively, in accordance with an SP signal inputted through an SP signal line and a CLK signal inputted through a CLK signal line, thereby selecting which of the latch circuits DLA loads gray-scale data.

Further, the latch circuits DLA_R1, DLA_G1, and DLA_B1 have their gate sections G connected to the output section Q of DF_20. The latch circuits DLA_R2, DLA_G2, and DLA_B2 have their gate sections G connected to the output section Q of DF_21. The latch circuits DLA_R3, DLA_G3, and DLA_B3 have their gate sections G connected to the output section Q of DF_22. The latch circuits DLA_R4, DLA_G4, and DLA_B4 have their gate sections G connected to the output section Q of DF_23. The latch circuits DLA_R5, DLA_G5, and DLA_B5 have their gate sections G connected to the output section Q of DF_24. The latch circuits DLA_R6, DLA_G6, and DLA_B6 have their gate sections G connected to the output section Q of DF_25. The latch circuits DLA_R7, DLA_G7, and DLA_B7 have their gate sections G connected to the output section Q of DF_26. The latch circuits DLA_R8, DLA_G8, and DLA_B8 have their gate sections G connected to the output section Q of DF_27.

The latch circuits DLA extract gray-scale data corresponding the output terminals OUT from the received gray-scale data, and then send the extracted gray-scale data to the hold circuits DLB connected thereto, respectively. The hold circuits DLB hold the gray-scale data sent from the latch circuits DLA, and then send the gray-scale data to the output circuits 11 connected thereto, respectively. The output circuits 11 according to the present embodiment include decision circuits and decision flags, respectively, and are configured to output Flag1 to Flag18 indicative of results of determination of the quality of the output circuits 11_1 and 11_18. It should be noted that each of Flag1 to Flag18 indicates "0" when its corresponding output circuit is good and indicates "1" when its corresponding output circuit is defective.

As shown in FIG. 24, the switches SWA26 to SWA28 each switch from one input to another for the DF_22, DF_24, and DF_26 under control of the values of FlagL to FlagN as calculated from Flag1 to Flag18, respectively. It should be noted here that FlagL to FlagN are calculated according to logical expressions shown in FIG. 24. Specifically, when FlagL is "0", the switch SWA26 connects the input section D of DF_22 to the output section Q of DF_21. On the other hand, when FlagL is "1", the switch SWA26 connects the input section D of DF_22 to the input section D of DF_20.

Similarly, when FlagM and FlagN are "0", the switches SWA27 to SWA28 connect the input sections D of DF_24 and DF_26 to the output sections Q of DF_23 and DF_25 placed one stage ahead, respectively. On the other hand, when FlagM and FlagN are "1", the switches SWA27 to SWA28 connect the input sections D of DF_24 and DF_26 to the output sections Q of DF_22 and DF_24 placed two stage ahead, respectively.

Further, as shown in FIG. 24, the switches SWB1 to SWB18 switch from connecting their corresponding output terminals OUT1 to OUT18 to one output to another. Specifically, the switches SWB1 to SWB6 switch from connecting their corresponding output terminals OUT1 to OUT6 to one output to another under control of the value of FlagL. The switches SWB7 to SWB12 switch from connecting their corresponding output terminals OUT7 to OUT12 to one output to another under control of the value of FlagO. The switches SWB13 to SWB18 switch from connecting their corresponding output terminals OUT13 to OUT18 to one output to another under control of the value of FlagP. It should be noted here that FlagO and FlagP are calculated according to logical expressions shown in FIG. 24.

(Normal Operation)

Next, the operation of the integrated circuit 10 without a defective output circuit, i.e. normal operation, is described below.

In the absence of a defective output circuit, Flag 1 to Flag18 in the output circuits 11_1 to 11_18 are all "0". Accordingly, FlagL to FlagP, obtained by combining Flag1 to Flag18 according to the logical expressions OR respectively, are all "0", too. Therefore, the switches SWA26 to SWA28 and switches SWB1 to SWB18 in the integrated circuit 10 both make connections as shown in FIG. 24.

Figure 25:
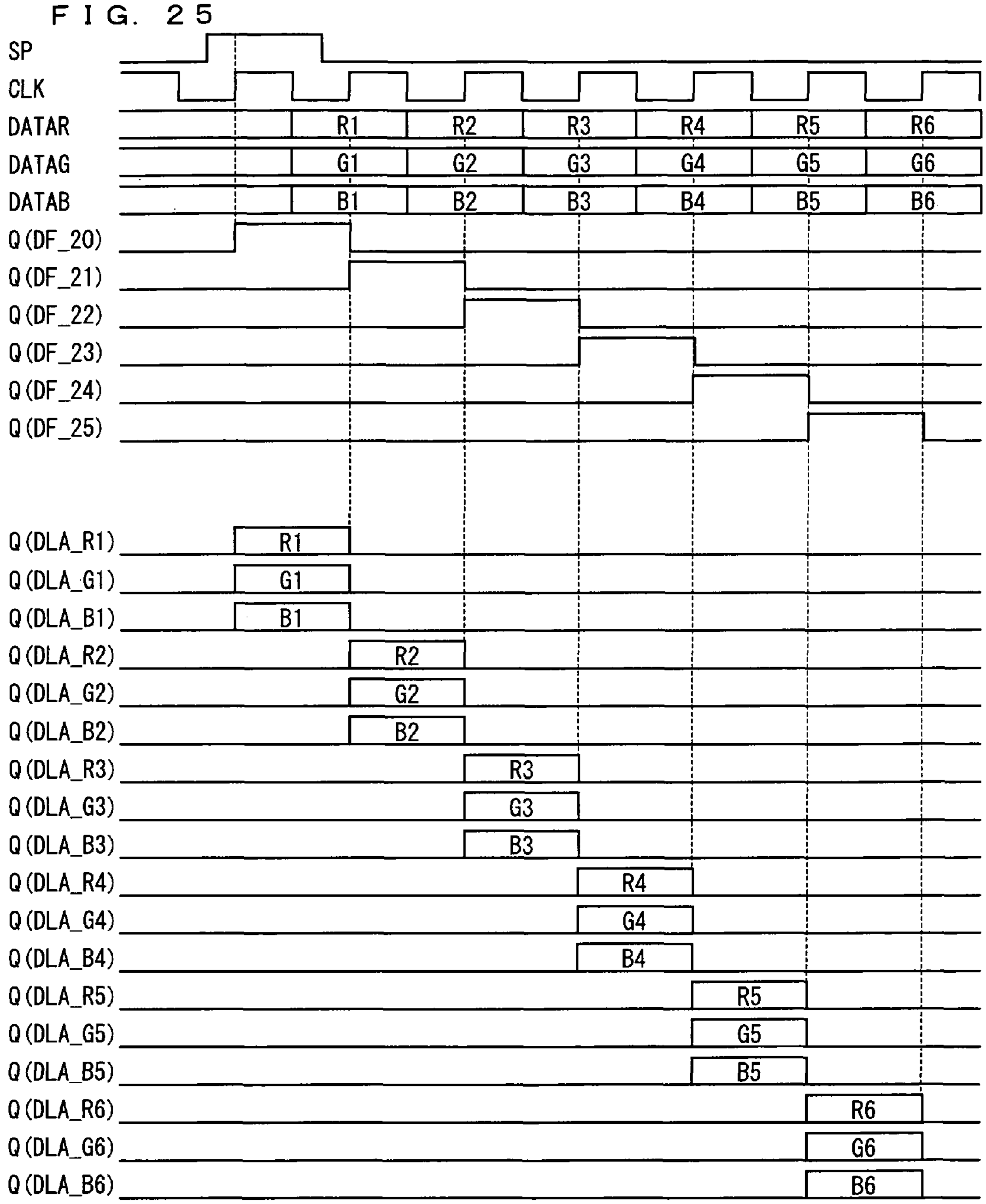
FIG. 25 is a timing chart showing the operation of the integrated circuit without a defective output circuit in accordance with Embodiment 3 of the present invention.

The normal operation of the integrated circuit 10 is described below with reference to FIG. 25. FIG. 25 is a timing chart showing the operation of the integrated circuit 10 without a defective output circuit.

First, DF_20 receives a "H" SP signal indicative of the start of operation of the integrated circuit 10 through its input section D. DF_20 loads the value "H" of the SP signal in response to a rise in the CLK signal, and then outputs a "H" selection signal through its output section Q. As shown in FIG. 25, at the next rising edge of the CLK signal, the SP signal is "L" and, accordingly, the selection signal from DF_20 through its output section Q becomes "L", too. It should be noted, in FIG. 25, that Q (DF_20) to Q (DF_25) denote selection signals from DF_20 to DF_25, respectively.

The DF_20 to DF_27 constitute a shift register 20" by having their output sections Q connected to the input sections D of the next DFs, respectively. That is, before the selection signal Q (DF_20) from DF_20 becomes "L", DF_21 outputs a "H" selection signal Q (DF_2) in response to a rise in the CLK signal. After that, the selection signal Q (DF_20) becomes "L". This operation process is repeated for each of DF_20 to DF_25. As shown in FIG. 25, in synchronization with rises in the CLK signal, the DFs send the selection signals in sequence to the latch circuits DLA connected to the output sections Q of the DFs, respectively.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, as shown in FIG. 25, shifts from R1 to R2 and so forth, shifts from G1 to G2 and so forth, or shifts from B1 to B2 and so forth are made in synchronization with the timing of falls in the CLK signal. Each of the latch circuits DLA loads gray-scale data through its input section D and outputs the gray-scale data through its output section Q, while receiving a "H" selection signal through its gate section G. That is, while the selection signal lines from the DFs are "H", the latch circuits DLA_R1 to DLA_R6, DLA_G1 to DLA_G6, and DLA_B1 to DLA_B6 load incoming gray-scale data and output the gray-scale data through their output section Q, respectively. It should be noted, in FIG. 25, that Q (DLA_R1) to Q (DLA_B6) denote outputs from the latch circuits DLA through their output sections Q, respectively.

Thus, with the latch circuits DLA_R1 to DLA_R6 being selected in sequence in synchronization with the timing of shifting of the gray-scale data inputted through the data signal line DATAR, the latch circuits DLA load gray-scale data corresponding to the output terminals OUT, respectively. That is, the latch circuits DLA_R1 to DLA_R6 load gray-scale data R1 to R6 in sequence in accordance with the selection signals sent in sequence from the DFs, respectively. Similarly, the latch circuits DLA_G1 to DLA_G6 load gray-scale data C1 to G6 in sequence in accordance with the selection signals sent in sequence from the DFs, respectively. Similarly, the latch circuits DLA_B1 to DLA_B6 load gray-scale data B1 to B6 in sequence in accordance with the selection signals sent in sequence from the DFs, respectively.

Although FIG. 25 does not show the subsequent operation, after all the latch circuits DLA load the gray-scale data, respectively, the integrated circuit 10 sends a "H" signal to the hold circuits DLB through their gate sections G. Upon receiving the "H" LS signal, the hold circuits DLB output the gray-scale data, which have been inputted through their input sections D, through their output sections Q, respectively. Thus, the output circuits 11_1 to 11_18 receive the gray-scale data R1 to R6, G1 to G6, and B1 to B6 loaded in sequence by the latch circuits DLA, respectively. Then, the output circuits 11_1 to 11_18 convert the gray-scale data into gray-scale voltages, buffer the gray-scale voltages, and then send the gray-scale voltages to the output terminals OUT1 to OUT18 connected thereto, respectively.

It should be noted that the spare circuits, i.e. DF_26 and DF_27, the latch circuits DLA_R7, DLA_G7, DLA_B7, DLA_R8, DLA_G8, and DLA_B8, the hold circuits DLB_R7, DLB_G7, DLB_B7, DLB_R8, DLB_G8, and DLB_B8, and the output circuits 11_19 to 11_24, also operate upon receiving the CLK signal and the LS signal. However, the output circuit 11_19 to 11_24, connected to none of the output terminals OUT1 to OUT18, do not affect the waveform of an output from any of the output terminals OUT1 to OUT18. Therefore, the foregoing description omits to mention the operation of the spare circuits, i.e. DF_26 and DF_27, the latch circuits DLA_R7, DLA_G7, DLA_B7, DLA_R8, DLA_G8, and DLA_B8, the hold circuits DLB_R7, DLB_G7, DLB_B7, DLB_R8, DLB_G8, and DLB_B8, and the output circuits 11_19 to 11_24.

(Self-Repairing Operation)

Figure 26:
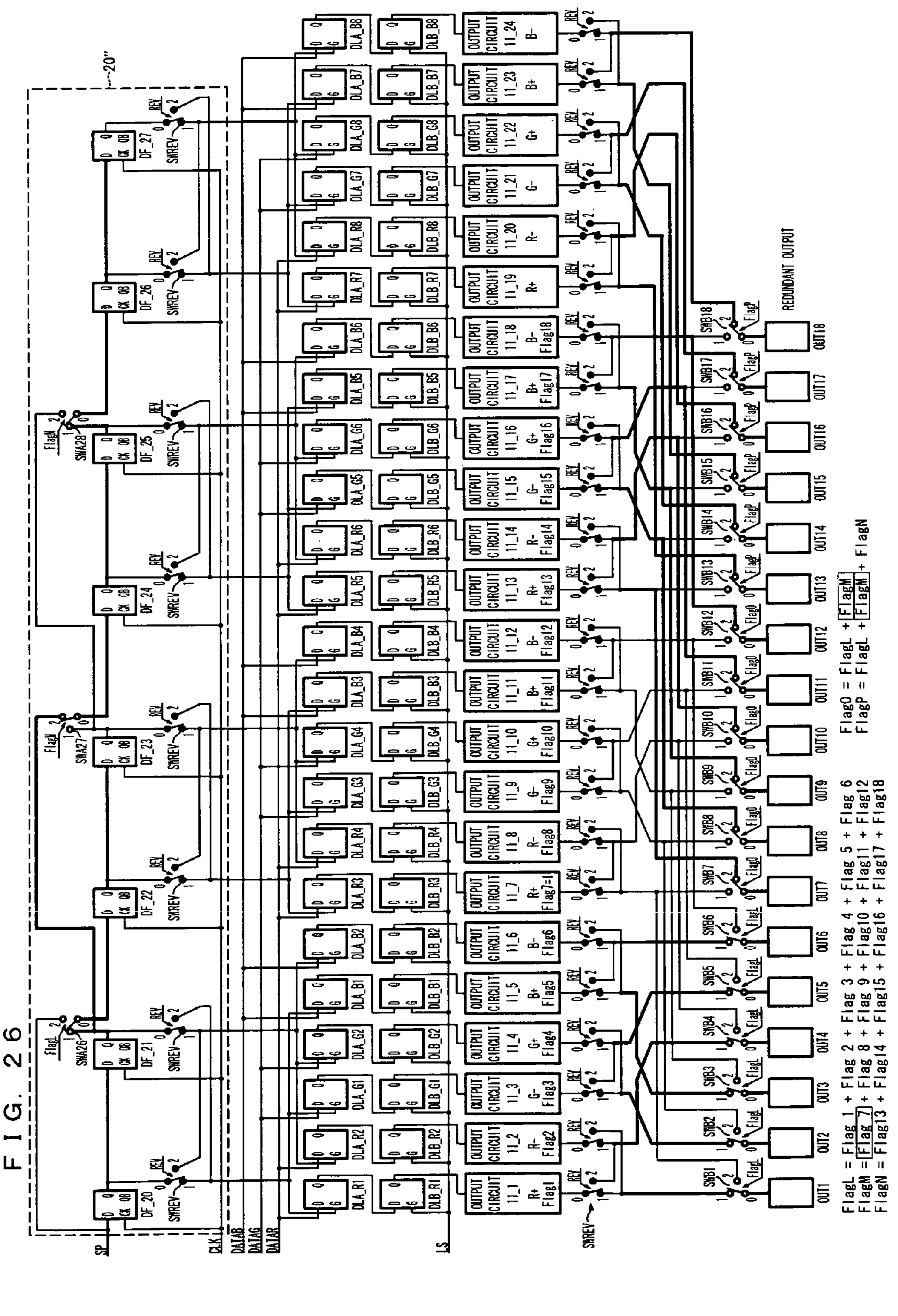
FIG. 26 is a block diagram showing the state of the integrated circuit for self-repairing operation in accordance with Embodiment 3 of the present invention.
Figure 27:
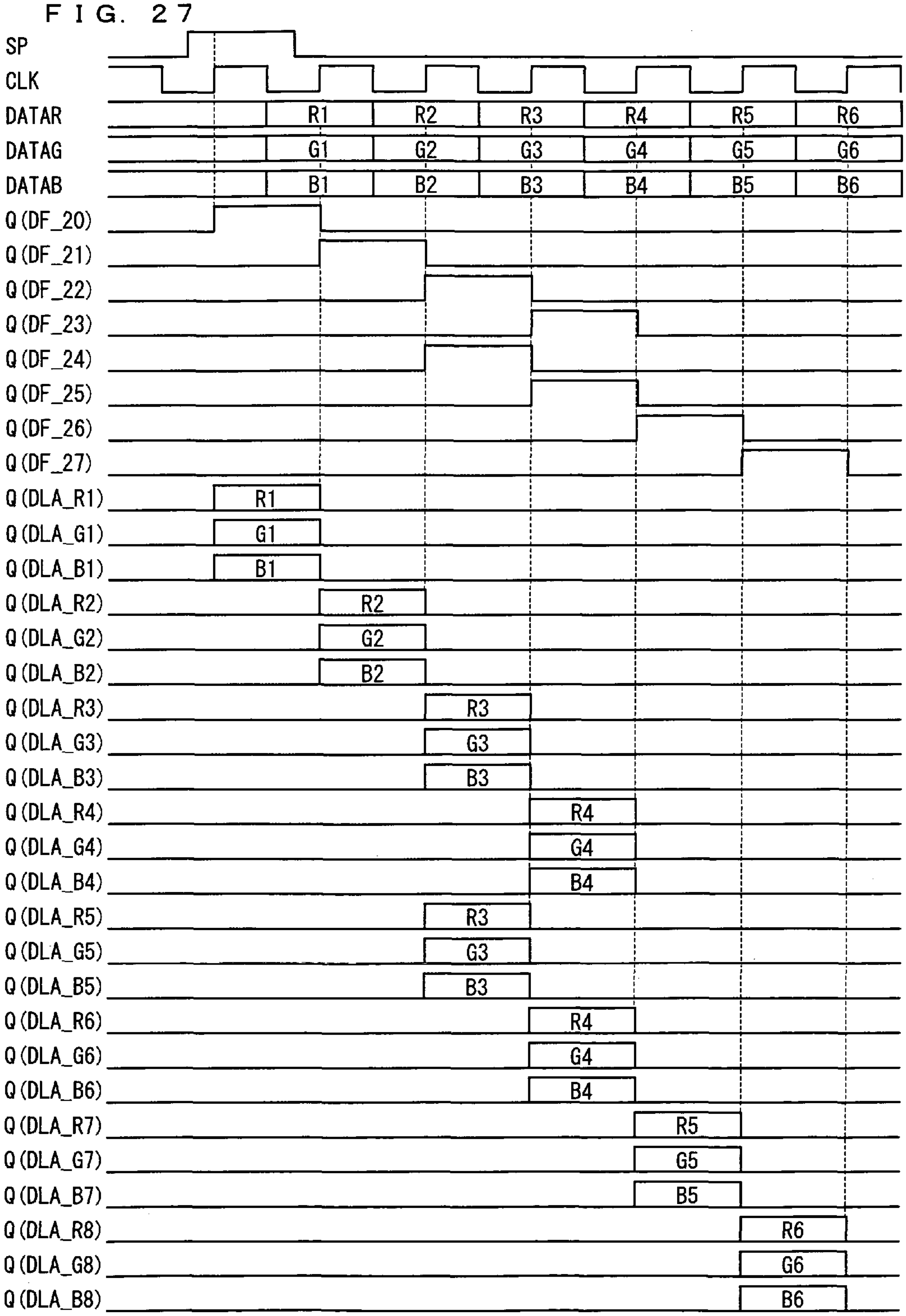
FIG. 27 is a timing chart showing the operation of the integrated circuit with a defective output circuit in accordance with Embodiment 3 of the present invention.

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 26 and 27. FIG. 26 shows the configuration of the integrated circuit 10 for self-repairing operation in accordance with the present embodiment, and FIG. 27 is a timing chart showing the operation of the integrated circuit 10 with a defective output circuit.

First, as shown in FIG. 26, the integrated circuit 10 has Flag7 set to "1" in the presence of a defect in the output circuit 11_7. Further, according to the logical expressions OR (see FIG. 24), FlagL and FlagN are "0", and FlagM, FlagO, and FlagP, each constituted by incorporating Flag7, are "1".

Since FlagL and FlagN are "0", the switches SWA26 and SWA28 and the switches SWB1 to SWB6 operate in the same manner as in the case of normal operation previously mentioned. Therefore, the following description omits to mention the operation in DF_20 and DF_21, the latch circuits DLA_R1, DLA_R2, DLA_G1, DLA_G2, DLA_B1, and DLA_B2, the hold circuits DLB_R1, DLB_R2, DLB_G1, DLB_G2, DLB_B1, and DLB_B2, and the output circuits 11_1 to 11_6.

Meanwhile, since FlagM, FlagO, and FlagP are "1", SWA27 has switched from connecting the input section D of DF_24 to the output section Q of the DF_23 to connecting the output section D of DF_24 to the output section Q of DF_21, as shown in FIG. 26. As a result of this switch in SWA27, DF_22 and DF_24 send selection signals to the latch circuits DLA_R3, DLA_G3, and DLA_B3 and the latch circuits DLA_R5, DLA_G5, and DLA_B5, respectively, at the same time or, in other word, in synchronization with the timing of input of the gray-scale data R3, G3, and B3, as shown in FIG. 27. Thus, the latch circuits DLA_R3 and DLA_R5 both load the gray-scale data R3. Similarly, the latch circuits DLA_G3 and DLA_G5 both load the gray-scale data G3, and the latch circuits DLA_B3 and DLA_B5 both load the gray-scale data B3. Further, as a result of this switch in SWA27, DF_23 and DF_25 send selection signals to the latch circuits DLA_R4, DLA_G4, and DLA_B4 and the latch circuits DLA_R6, DLA_G6, and DLA_B6, respectively, at the same time or, in other word, in synchronization with the timing of input of the gray-scale data R4, G4, and B4, as shown in FIG. 27. Thus, the latch circuits DLA_R4 and DLA_R6 both load the gray-scale data R4. Similarly, the latch circuits DLA_G4 and DLA_G6 both load the gray-scale data G4, and the latch circuits DLA_B4 and DLA_B6 both load the gray-scale data B4.

Further, DF_26 sends a selection signal to the latch circuits DLA_R7, DLA_G7, and DLA_B7 in synchronization with the timing of input of the gray-scale data R5, G5, and B5, and DF_27 sends a selection signal to the latch circuits DLA_R8, DLA_G8, and DLA_B8 in synchronization with the timing of input of the gray-scale data R6, G6, and B6. Thus, the latch circuits DLA_R7, DLA_R8, DLA_G7, DLA_G8, DLA_B7, and DLA_B8 load the gray-scale data R5, R6, G5, G6, B5, and B6 in accordance with the received selection signals, respectively. It should be noted, in FIG. 27, that Q (DF_20) to Q (DF_27) denote selection signals from the DFs, respectively, and Q (DLA_R1) to Q (DLA_B8) denote outputs from the latch circuits DLA through their output sections Q, respectively.

Further, since FlagO is "1", the switches SWB7 to SWB12 have switched from connecting the output terminals OUT7 to OUT12 to the outputs of the output circuits 11_7 to 11_12 to connecting the output terminals OUT7 to OUT12 to the outputs of the output circuits 11_13 to 11_18, respectively. Therefore, none of the output terminals OUT receive gray-scale voltages corresponding to the gray-scale data R3, G3, B3, R4, G4, and B4 from the defective output circuits 11_7 to 11_12. Furthermore, the output terminals OUT7 to OUT12 receive gray-scale voltages corresponding to the gray-scale data R3, G3, B3, R4, G4, and B4 from the output circuits 11_13 to 11_18, respectively. Furthermore, since FlagP is "1", the switches SWB13 to SWB18 connect the output terminal OUT13 to the output circuit 11_19, the output terminal OUT14 to the output circuit 11_21, the output terminal OUT15 to the output circuit 11_23, the output terminal OUT16 to the output circuit 11_20, the output terminal OUT17 to the output circuit 11_22, and the output terminal OUT18 to the output circuit 11_24. As a result, the output terminals OUT1 to OUT18 receive gray-scale voltages corresponding to the gray-scale data R1 to B6, respectively.

As described above, the configuration capable of self-repairing is realized by: (i) disconnecting a defective output circuit 11, a defective latch circuit DLA, or a defective hold circuit DLB, if detected, by switching from connecting the input section D of each DF to one output to another and switching connections between the output circuits 11_1 to 11_19 and the output terminals OUT1 to OUT18, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 receives an output voltage from the DAC of a spare output circuit 11 identical in primary color, by which the display colors are constituted, and identical in polarity of gray-scale voltage for dot inversion drive to the output circuit 11. Then, the output circuit 11 uses its operational amplifier to compare the voltage received from the DAC of the spare output circuit with a voltage outputted from the DAC of the output circuit 11. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Furthermore, the integrated circuit 10 according to the present embodiment may detect a failure in its output circuits 11 by using the first failure detection method described in Embodiment 1. Specifically, each of the output circuits 11 uses its operational amplifier to compare a voltage outputted from its DAC circuit with a voltage outputted from the DAC circuit of an output circuit 11 paired with the output circuit 11. Referring to FIG. 24, the output circuit 11_1 uses its operational amplifier to compare a voltage outputted from its DAC with a voltage outputted from the DAC of the output circuit 11_2, and the output circuit 11_2 uses its operational amplifier to compare a voltage outputted from its DAC with a voltage outputted from the DAC of the output circuit 11_1. The same applies to the output circuits 11_3 and 11_4, the output circuits 11_5 and 11_6, . . . . Thus, the decision circuits of the output circuits 11 determine the quality of the output circuits 11 in accordance with results of the comparisons made by the operational amplifiers, and the output circuits 11 send Flag1 to Flag 18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag 18 are the same as those previously mentioned.

Embodiment 4

Embodiment 4 of the present invention is described below with reference to FIGS. 28 through 31.

(Configuration of a Self-Repairing Circuit)

First, the configuration of a display driving semiconductor integrated circuit (hereinafter referred to as "integrated circuit") 10 capable of self-repairing in accordance with the present embodiment is described with reference to FIG. 28. For simplicity of explanation, a configuration of eighteen outputs is described as in the description of the conventional integrated circuit of FIG. 54. However, the integrated circuit 10 is not limited to a configuration of eighteen outputs.

Figure 28:
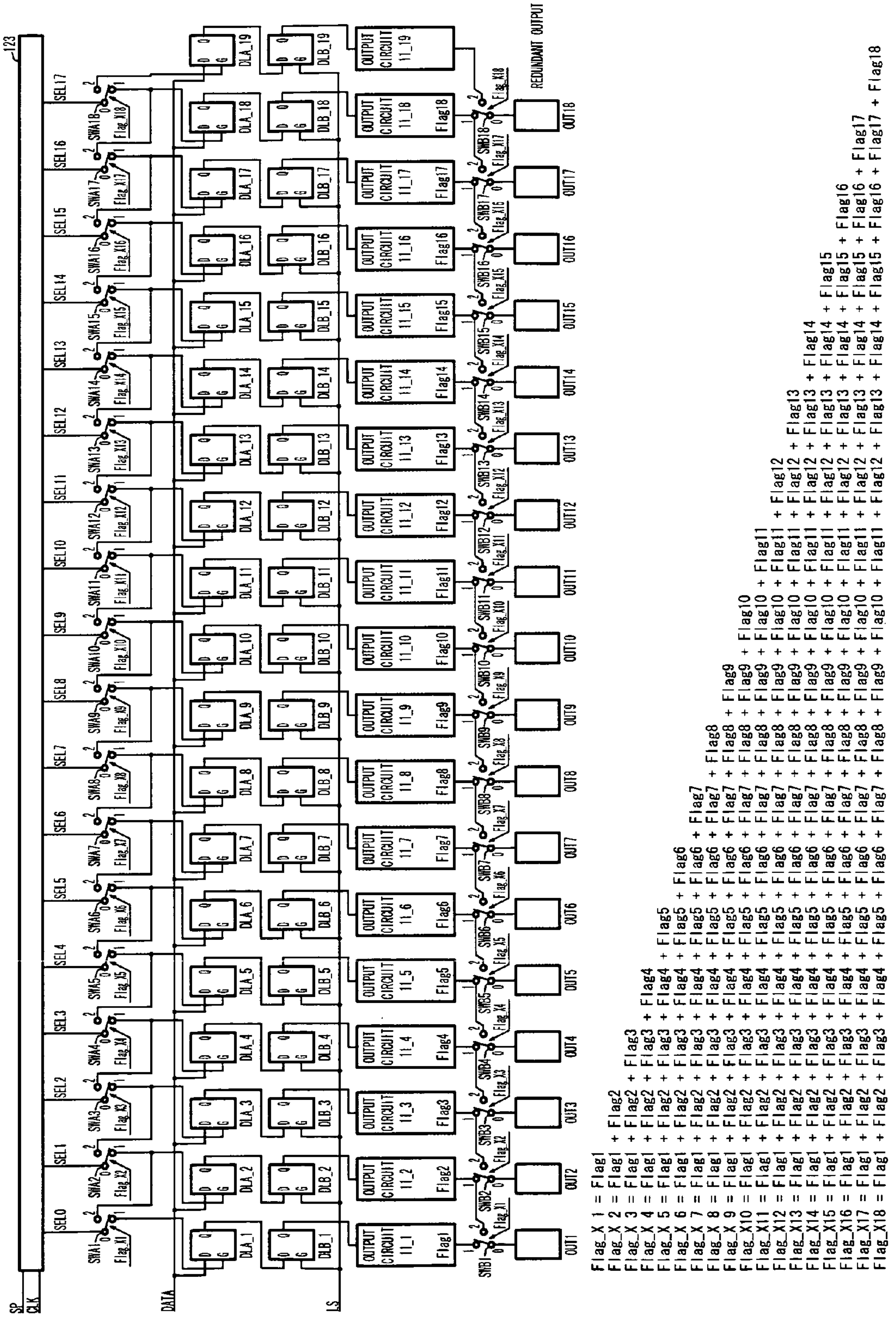
FIG. 28 shows the configuration of an integrated circuit for normal operation in accordance with Embodiment 4.

FIG. 28 shows the configuration of the integrated circuit for normal operation in accordance with the present embodiment. The integrated circuit 10 includes: a pointer circuit 123; switches SWA1 to SWA18 (hereinafter sometimes referred to collectively as "switches SWA"); latch circuits DLA_1 to DLA_18 (hereinafter sometimes referred to collectively as "latch circuits DLA"); hold circuits DLB_1 to DLB_18 (hereinafter sometimes referred to collectively as "hold circuits DLB"); output circuits 11_1 to 11_18 (hereinafter sometimes referred to collectively as "output circuits 11"); switches SWB1 to SWB18 (hereinafter sometimes referred to collectively as "switches SWB"); signal output terminals OUT1 to OUT18 (hereinafter referred to as "output terminals OUT1 to OUT18"); a spare latch circuit DLA_19; a spare hold circuit DLB_19; and a spare output circuit 11_19.

The integrated circuit 10 is connected to a display device (not shown) through the output terminals OUT1 to OUT18 to drive the display device.

The pointer circuit 123 (selecting section) is identical in configuration to the conventional pointer circuit of FIG. 58. The pointer circuit 123 is constituted by a set/reset circuit 123_1, a counter 123_2, and a decoder 123_3. The pointer circuit 123 includes connection terminals that can be connected to SWA1 to SWA18 respectively.

Upon receiving an operation start signal (SP signal) through a start pulse signal line (SP signal line), a clock signal (CLK signal) through a clock signal line (CLK signal line), and a selection signal (SEL signal) through a selection signal line SEL18 to be described later, the set/reset circuit 123_1 generates an operation clock (CLKB signal) for the counter 123_2 and outputs it through a counter clock signal line (CLKB signal line).

The counter 123_2 is constituted by five D flip-flops DF_1 to DF_5 (hereinafter sometimes referred to collectively as "DFFs"). The counter 123_2 receives the CLKB signal and the SP signal, and then generates DQ 1 to DQ 5 and DQ 1B to DQ 5B in accordance with CQ 1 to CQ 5 sent from the DFFs, respectively.

The decoder 123_3 performs arithmetical operations according to logical expressions shown in FIG. 58 to generate selection signals (SEL signals) to be outputted to selection signal lines (signal lines SEL0 to SEL18) of FIG. 28. It should be noted that the decoder 123_3 is not particularly limited in specific configuration, so long as it can perform logical operations as shown in FIG. 58.

The latch circuits DLA_1 to DLA_18 receive gray-scale data through the DATA signal line. The latch circuits DLA_1 to DLA_18 extract, from the received gray-scale data, gray-scale data corresponding video signals to be outputted through the output terminals OUT1 to OUT18, and then send the extracted gray-scale data to the hold circuits DLB_1 to DLB_18, respectively. The hold circuits DLB_1 to DLB_18 hold the gray-scale data sent from the latch circuits DLA_1 to DLA_18, and then send the gray-scale data to the output circuits 11, respectively, in accordance with a data load signal (hereinafter referred to as "LS signal") inputted through an LS signal line.

Each of the output circuits 11 includes: a DAC (digital-analog converter) circuit for converting gray-scale data into a gray-scale voltage signal; an operational amplifier that serves as a buffer circuit; a decision circuit (decision section) for determining the quality of operation of the output circuit; and a decision flag for indicating the quality of operation as determined by the decision circuit. It should be noted, in FIG. 28, that the decision flag of an output, circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Furthermore, as shown in FIG. 28, the integrated circuit 10 includes the spare latch circuit DLA_19, the spare hold circuit DLB_19, and the spare output circuit 11_19.

Each of the switches SWA1 to SWA18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA1 to SWA18 are determined by the values of Flag_X1 to Flag_X18, respectively. Flag_X1 to Flag_X18 are determined by combinations of Flag1 to Flag18, and the combinations are shown as logical expressions in the lower part of FIG. 28.

Although not shown, there is no particular limit on the specific configuration for generating Flag_X1 to Flag_X18, so long as it can perform logical operations as shown in FIG. 28.

When the values of Flag_X1 to Flag_X18 are "0", SWA1 to SWA 18 connect their terminals 0 to their terminals 1, respectively. On the other hand, when the values of Flag1 to Flag18 are "1", SWA1 to SWA18 connect their terminals 0 to their terminals 2, respectively. For example, when the value of Flag1 is "0", i.e., when the operation of the output circuit 11_1 is good, Flag_X1 is "0" according to the logical expression shown in FIG. 28, whereby SWA1 connects its terminal 0 to its terminal 1. On the other hand, when the value of Flag1 is "1", i.e., when the operation of the output circuit 11_1 is defective, Flag_X1 is "1" according to the logical expression shown in FIG. 28, whereby SWA1 connects its terminal 0 to its terminal 2. The states of connection are similarly determined in SWB1 to SWB18. In FIG. 28, the signals (Flag1 to Flag18) for determining the states of the switches SWA1 to SWA18 and SWB1 to SWB18 are indicated by arrows. It should be noted that Flag_X1 to Flag_X18 are determined by a control section (not shown). Moreover, the selecting means as set forth in the claims is constituted by a control section (not shown), the pointer circuit 123, and SWA1 to SWA18. Moreover, the connection switching means as set forth in the claims is constituted by a control section (not shown) and SWB1 to SWB18.

DLA_1 to DLA_18 and DLB_1 to DLB_18, which latch digital signals representing gray-scale data inputted through the DATA signal line, are each shown as a single circuit in FIG. 28. However, when the incoming gray-scale data is 6-bit data, six latch circuits DLA_1 to six latch circuits DLA_18 and six hold circuits DLB_1 to six hold circuits DLB_18 are needed; and when the incoming gray-scale data is 8-bit data, eight latch circuits DLA_1 to eight latch circuits DLA_18 and eight hold circuits DLB_1 to eight hold circuits DLB_18 are needed. To avoid complexity of explanation, the latch circuits DLA_1 to DLA_18 and the hold circuits DLB_1 to DLB_18 are each represented by a single circuit.

(Normal Operation)

Next, the operation of the integrated circuit 10 without a defective output circuit, i.e. normal operation, is described below with reference to FIGS. 28 and 29.

As mentioned above, FIG. 28 shows the configuration of the integrated circuit 10 for normal operation in accordance with the present embodiment. FIG. 29 is a timing chart showing the operation of the integrated circuit 10 without a defective output circuit.

Figure 56:
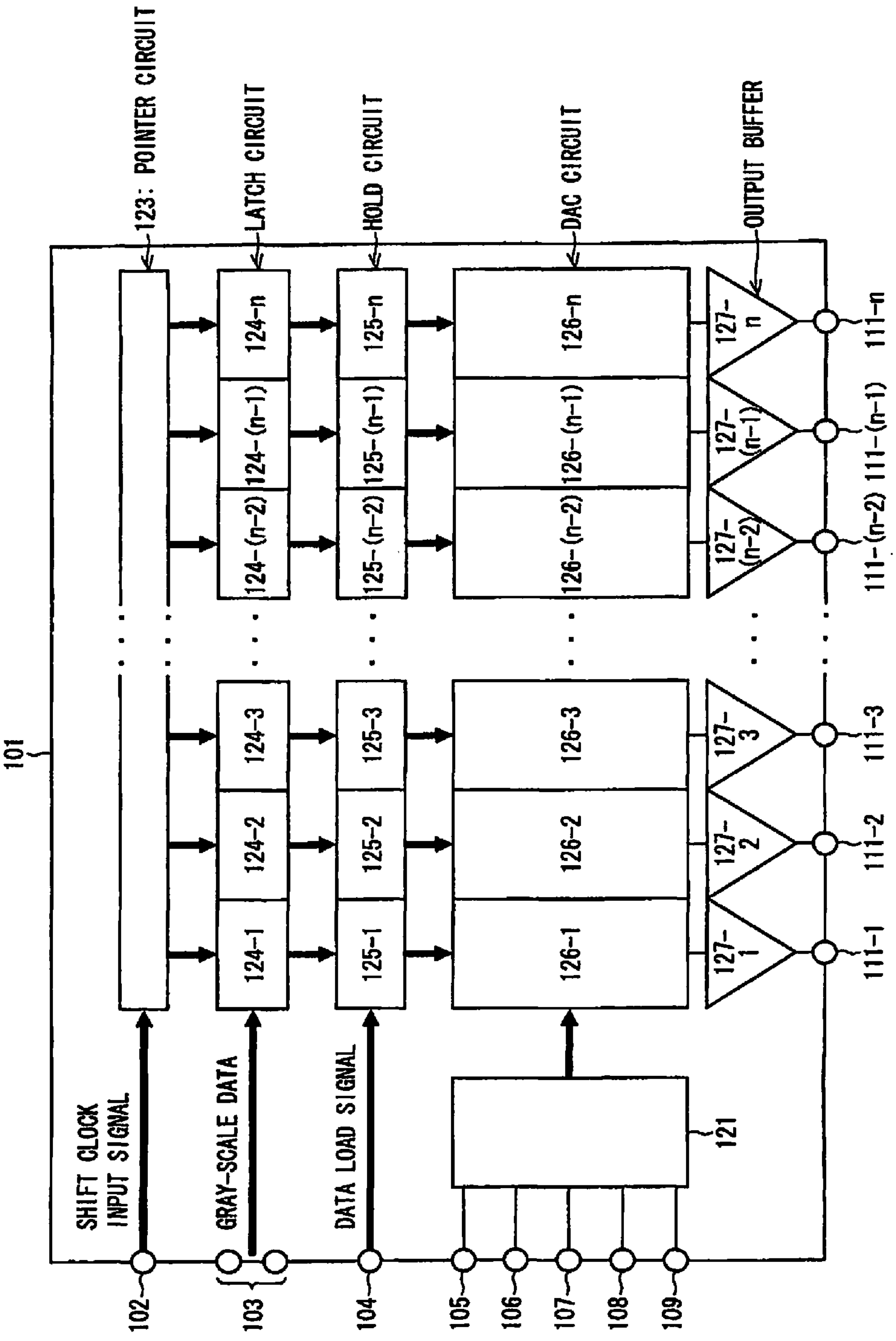
FIG. 56 CONVENTIONAL ART
FIG. 56 is a block diagram showing the configuration of a conventional liquid crystal driving semiconductor integrated circuit.
Figure 57:
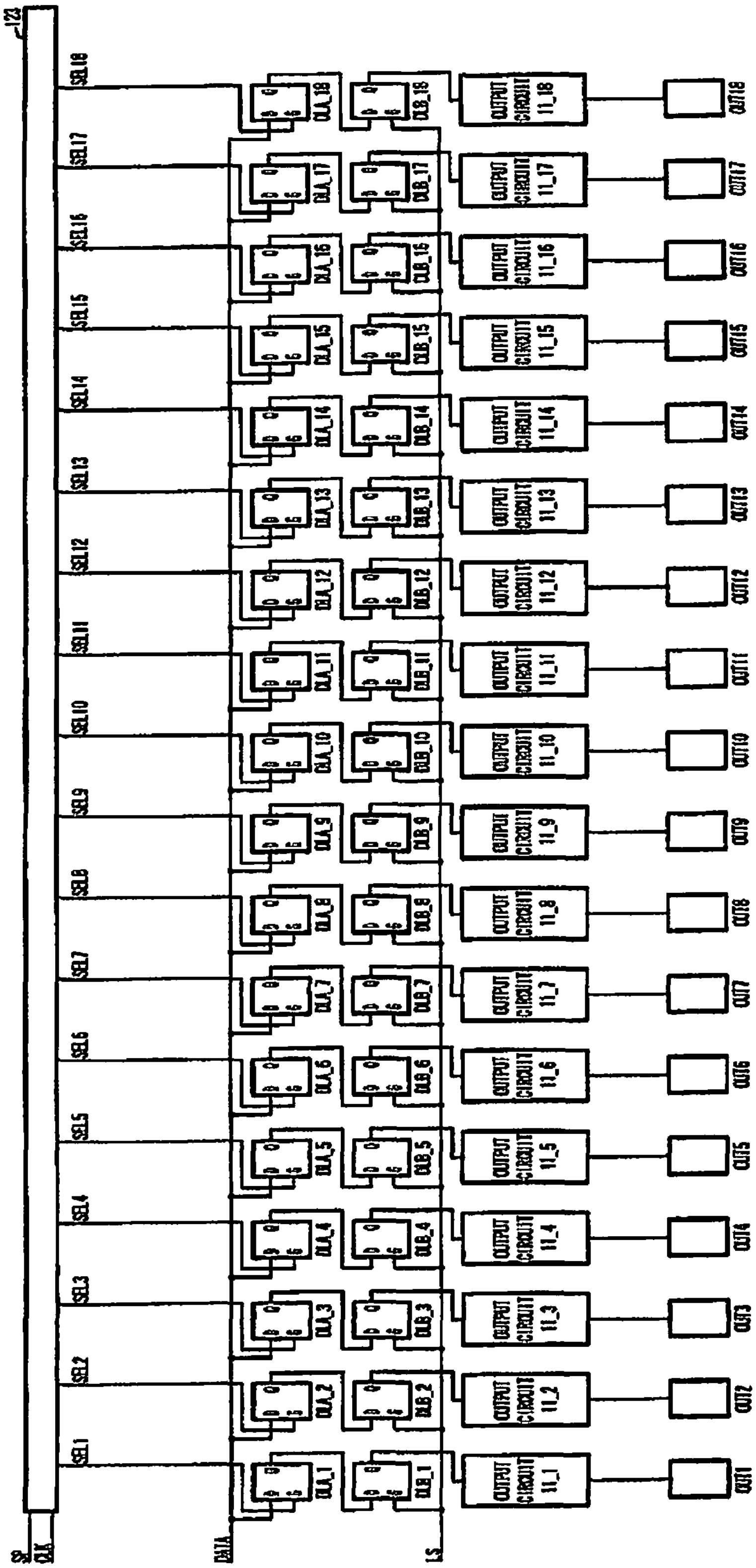
FIG. 57 CONVENTIONAL ART
FIG. 57 specifically shows the configuration of a liquid crystal driving semiconductor integrated circuit including a pointer circuit, latch circuits, and hold circuits.
Figure 59:
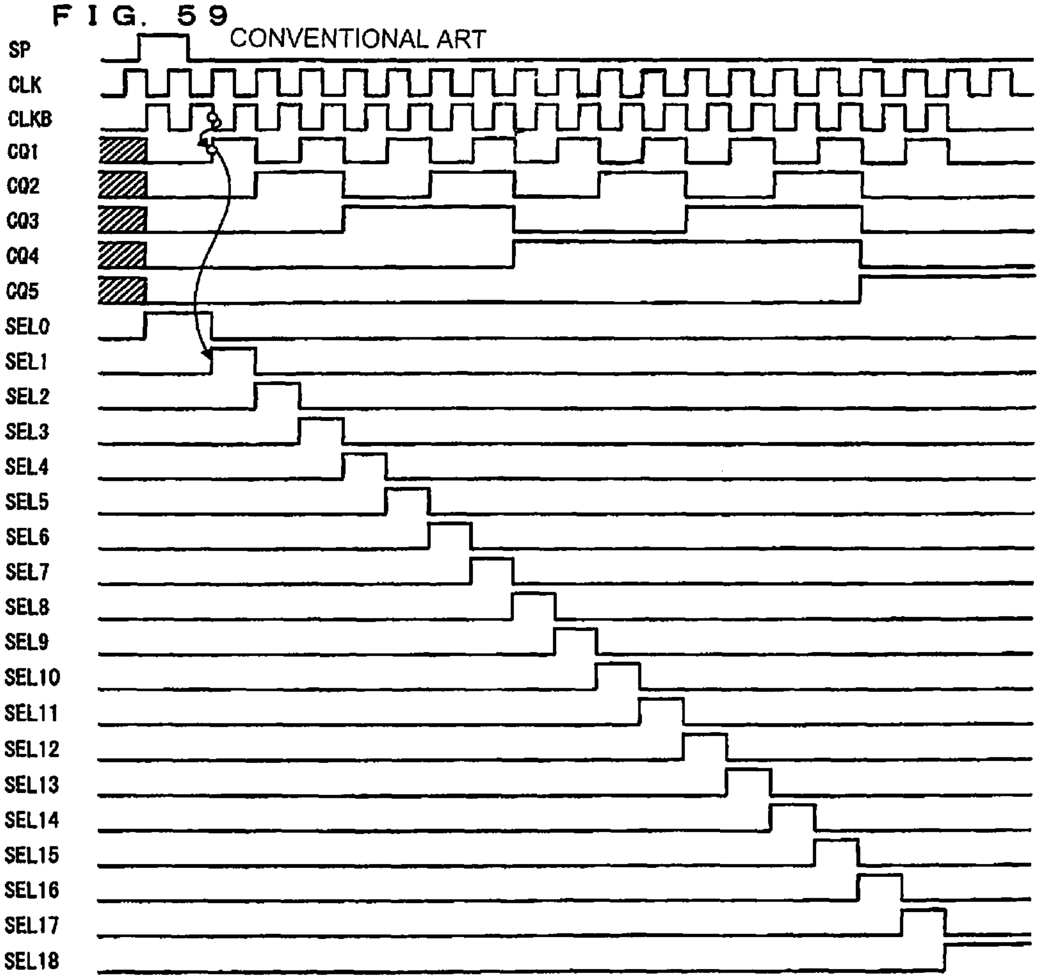
FIG. 59 CONVENTIONAL ART
FIG. 59 is a timing chart showing the operation of a pointer circuit.

In the absence of a defective output circuit, Flag1 to Flag18 in the output circuits 11_1 to 11_18 are all "0". Accordingly, Flag_X1 to Flag_X18, constituted by the ORs of combinations of Flag1 to Flag18 respectively, are all "0", too. Therefore, as shown in FIG. 28, each of the switches SWA1 to SWA18 in the integrated circuit 10 has its terminal 0 connected to its terminal 1, whereby the integrated circuit 10 is configured in the same manner as the conventional circuit of FIG. 56.

The following describes the operation of the integrated circuit 10. First, the pointer circuit 123 of the integrated circuit 10 receives an operation start pulse signal through the SP signal line. Further, the pointer circuit 123 receives a clock signal through the CLK signal line. The pointer circuit 123 has eighteen connection terminals and, upon receiving the SP signal, outputs selection signals to the selection signal lines SEL0 to SEL17 through the connection terminals. Each of the selection signals serves as a signal for selecting which of the latch circuits latches incoming gray-scale data. As shown in FIG. 29, the selection signal lines SEL0 to SEL17 take turns generating a pulse (i.e. a "H" signal) for each and every single clock pulse.

The latch circuits receive gray-scale data through the DATA signal line. Shifting of the gray-scale data received through the DATA signal line is performed at every falling edge of the CLK signal. That is, as shown in FIG. 29, shifts from D1 to D2, from D2 to D3, and so forth are made in synchronization with the timing of falls in the CLK signal. Each of the latch circuits loads a signal through its input section D and outputs the signal through its output section Q, while receiving a "H" signal through its gate G. That is, while the selection signals from the selection signal lines SEL1 to SEL17 are "H", the latch circuits DLA_1 to DLA_18 load incoming gray-scale data and output the gray-scale data through their output sections Q, respectively.

Thus, with the latch circuits DLA_1 to DLA_18 being selected in sequence in synchronization with the timing of shifting of the gray-scale data, the latch circuits DLA load gray-scale data corresponding to video signals to be outputted through the output terminals corresponding to the latch circuits, respectively. That is, the latch circuits DLA_1 to DLA_18 load gray-scale data "D1" to "D18" in sequence in accordance with the SEL0 to SEL17 pulses, respectively.

Further, the latch circuits DLA_1 to DLA_18 hold the loaded gray-scale data while the selection signals from the selection signal lines SEL0 to SEL17 are "L". For example, by the time the selection signal from SEL0 becomes "L", the latch circuit DLA_1 has been receiving the gray-scale data "D1" through the DATA signal line; therefore, the latch circuit DLA_1 holds "D1" at its output section Q thereafter. Similarly, when the selection signals from SEL1 to SEL17 become "L", DLA_2 to DLA_18 hold the gray-scale data "D2" to "D18" at their outputs Q, respectively. At this point, the hold circuits DLB_1 to DLB_18 receive the data, which have been held at the output sections Q of DLA_1 to DLA_18, through their input sections D, respectively.

Figure 29:
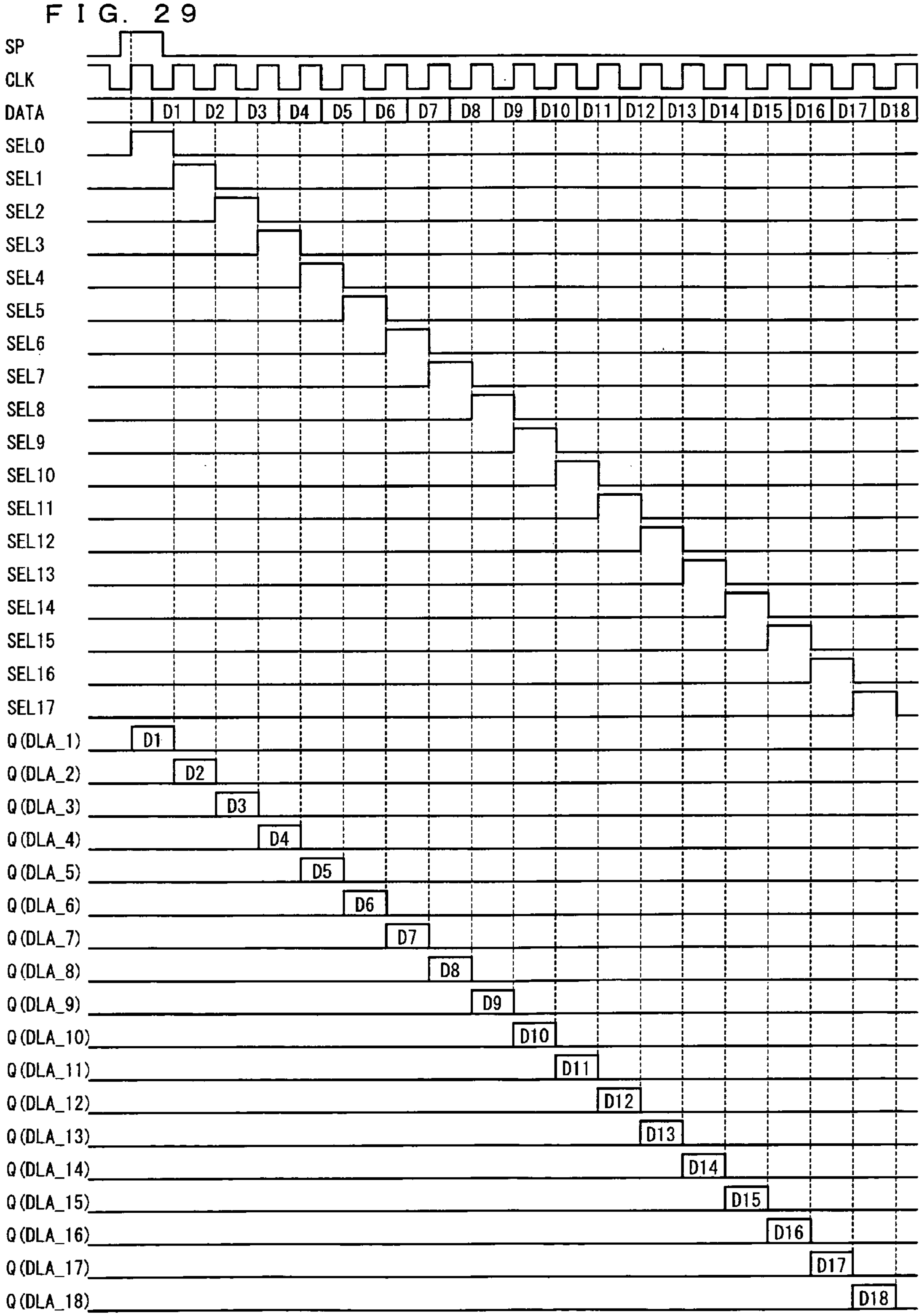
FIG. 29 is a timing chart showing the operation of the integrated circuit without a defective output circuit in accordance with Embodiment 4.

Although FIG. 29 does not show the subsequent operation, after DLA_1 to DLA_18 starts loading the gray-scale data in sequence, respectively, and DLA_18 finishes loading the data, the integrated circuit 10 of FIG. 28 inputs a "H" pulse" through the LS signal line. That is, the hold circuits DLB_1 to DLB_18 receive a "H" pulse through their gates G. Thus, DLB_1 to DLB_18 output the gray-scale data "D1" to "D18", which have been inputted through their input sections D, through their output sections Q, respectively. As a result of this operation, the output circuits 11 receive the gray-scale data "D1" to "D18" loaded in sequence by the DLA_1 to DLA_18, respectively. Then, the output circuits 11 convert the digital gray-scale data into gray-scale voltages (i.e., video signals), and then send the gray-scale voltages corresponding to the gray-scale data "D1" to "D18" through the corresponding output terminals OUT1 to OUT18, respectively.

It should be noted that the spare circuits, i.e. DF_19, DLA_19, and DLB_19, also operate upon receiving the CLK signal through the CLK signal line and a pulse through the LS signal line. However, the output circuit 11_19, connected to none of the output terminals OUT1 to OUT18, does not affect the waveform of an output from any of the output terminals OUT1 to OUT18. Therefore, the foregoing description omits to mention the operation of the spare circuits, i.e. DF_19, DLA_19, and DLB_19.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 30 and 31.

Figure 31:
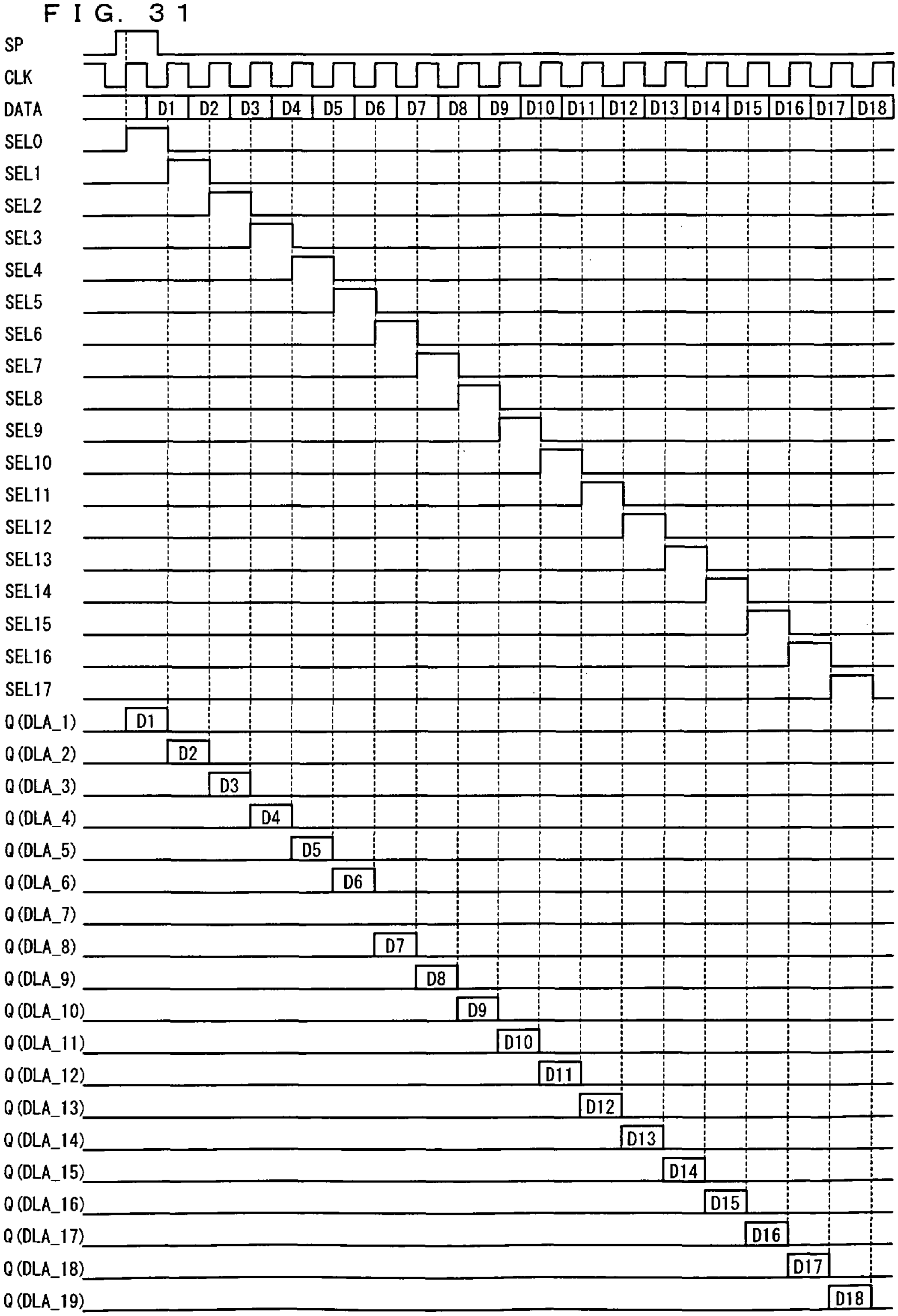
FIG. 31 is a timing chart showing the operation of the integrated circuit with a defective output circuit in accordance with Embodiment 4.

FIG. 30 shows the configuration of the integrated circuit 10 for self-repairing operation in accordance with the present embodiment, and FIG. 31 is a timing chart showing the operation of the integrated circuit 10 with a defective output circuit.

When the integrated circuit 10 has Flag7 set to "1" in the presence of an abnormality in the output circuit 11_7, Flag_X7 to Flag_X18, each calculated according to an OR including Flag7, become "1". For this reason, SWA7 to SWA18 change from connecting their terminals 0 to their terminals 1 to connecting their terminals 0 to their terminals 2, respectively. Thus, the selection signal line SEL6 is connected to the latch circuit DLA_8, and the gray-scale data "D7" is stored in DLA_8. Similarly, the selection signal line SEL7 is connected to the latch circuit DLA_9, and the gray-scale data "D8", which would normally be stored in DLA_8, is stored in DLA_9. The selection signal line SEL8 is connected to the latch circuit DLA_10, and the gray-scale data "D9", which would normally be stored in DLA_9, is stored in DLA_10. That is, the latch circuits DLA, the hold circuits DLB, and the output circuits 11 operate in a one-stage-shifted manner. Finally, "D18", which would normally be stored in DLA_18, is stored in the spare circuit DLA_19.

Thus, in the presence of an abnormality in the output circuit 11_7, the integrated circuit 10 according to the present invention uses the switches so that the output circuit 11_7 no longer receives any gray-scale data. At this point, as shown in FIG. 30, the switches SWA7 to SWA18, which are controlled by Flag_X7 to Flag_X18, have changed from connecting their terminals 0 to their terminals 1 to connecting their terminals 0 to their terminals 2, respectively; therefore, the output circuit 11_7 is no longer connected to any of the output terminals OUT1 to OUT18. Then, the output circuits are shifted in sequence to be connected to the output terminals as follows: the output circuit 11_8 is connected to the output terminal OUT7; and the output circuit 11_9 is connected to the output terminal OUT8. Finally, the spare output circuit 11_19 is connected to the output terminal OUT18.

As described above, the configuration capable of self-repairing is realized by: (i) disconnecting a defective output circuit, a defective latch circuit, or a defective hold circuit, if detected, by switching connections between the selection signal lines SEL0 to SEL17 extending from the pointer circuit 123 and the latch circuits DLA_1 to DLA_19 (and the hold circuits DLB_1 to DLB_19) and switching connections between the output circuits 11 and the output terminals OUT1 to OUT19, so as to shift from one normal circuit to another in sequence; and (ii) adding the spare circuits.

Embodiment 5

Embodiment 5 of the present invention is described below with reference to FIGS. 32 through 36.

(Configuration of a Self-Repairing Circuit)

First, the configuration of a display driving semiconductor integrated circuit (hereinafter referred to as "integrated circuit) 10 according to the present embodiment is described with reference to FIG. 32. As explained in FIG. 28 in [Embodiment 4], eighteen outputs are abstracted for explanation. However, the number of outputs from the integrated circuit 10 is not limited to 18.

Figure 32:
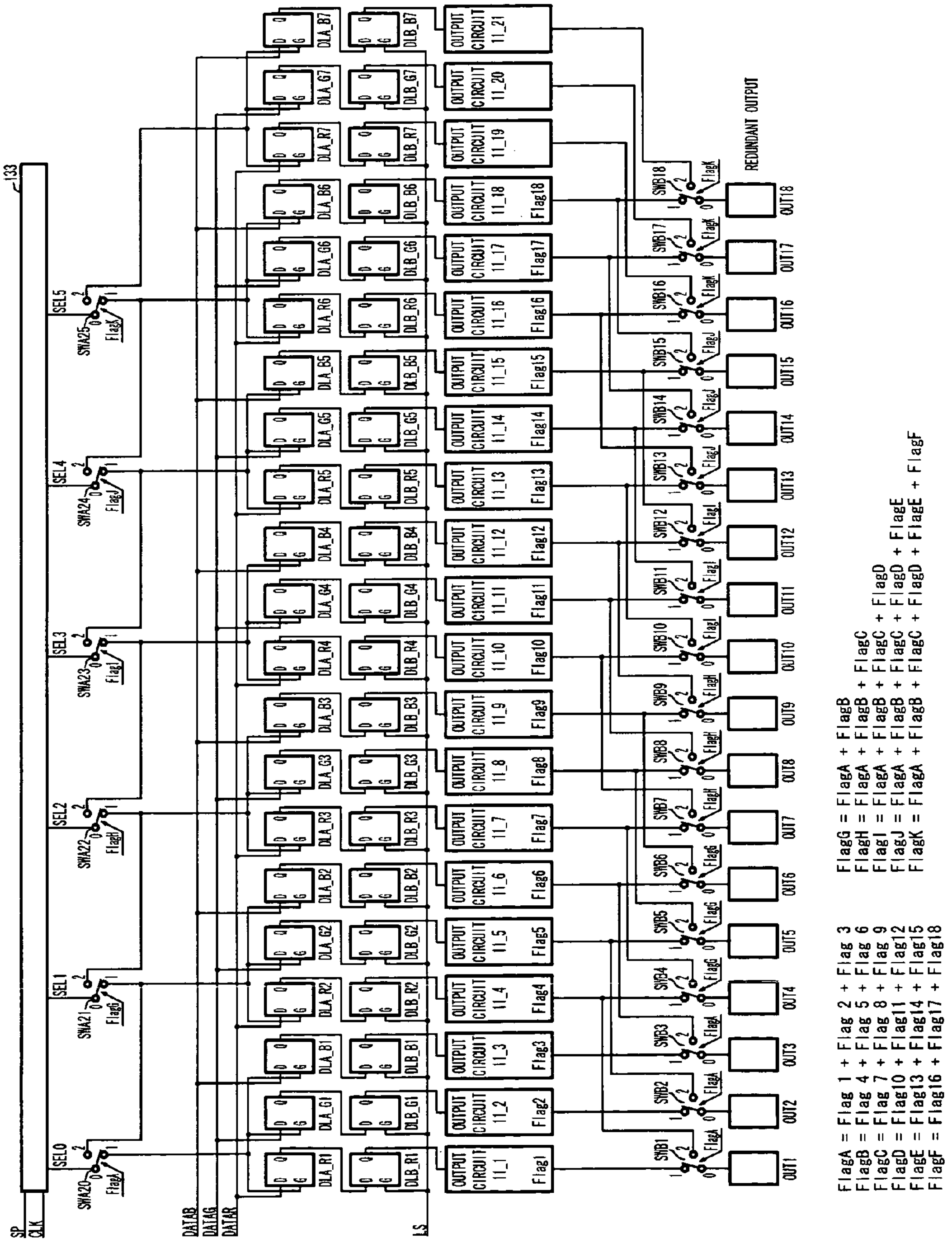
FIG. 32 shows the configuration of an integrated circuit for normal operation in accordance with Embodiment 5.

FIG. 32 shows the configuration of the integrated circuit for normal operation in accordance with the present embodiment. The integrated circuit 10 includes: a pointer circuit 133 (selecting section); switches SWA20 to SWA25; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; and signal output terminals OUT1 to OUT18 (hereinafter referred to as "output terminals OUT1 to OUT18").

The integrated circuit 10 is connected to a display device (not shown) through the output terminals OUT1 to OUT18 to drive the display device.

In the present embodiment, the sub-output circuits as set forth in the claims correspond to separate output circuits 11 (output circuits 11_1, 11_2, and 11_3, respectively), and the sub-latch circuits as set forth in the claims correspond to separate latch circuits DLA (e.g., the latch circuits DLA_R1, DLA_G1, and DLA_B1, respectively). Each of the output circuits as set forth in the claim corresponds to a block composed of output circuits 11 arranged in a row to correspond to the three primary colors R, G, and B, by which the display colors are constituted (e.g., a block composed of the output circuits 11_1 to 11_3), and each of the latch circuits as set forth in the claims corresponds a block composed of latch circuits DLA arranged in a row to correspond to the three primary colors R, G, and B (e.g., a block composed of the latch circuits DLA_R1, DLA_G1, and DLA_B1).

Further, the sub-output terminals as set forth in the claims correspond to the output terminals OUT1 to OUT18, respectively, and each of the output terminals as set forth in the claims corresponds to a set of three output terminals (e.g., OUT1 to OUT3).

Figure 33:
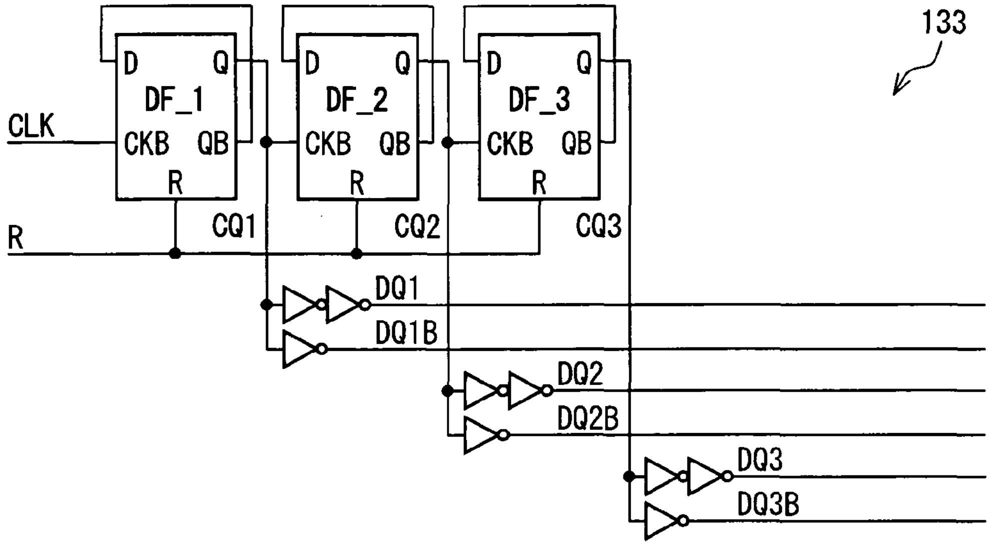
FIG. 33 shows the configuration of a pointer circuit in accordance with Embodiment 5.

FIG. 33 shows the configuration of the pointer circuit 133. The pointer circuit 133 according to the present embodiment generates signals SEL0 to SEL6 to be inputted into selection signal lines. The pointer circuit is constituted by a counter and a decoder. The pointer circuit 133 includes connection terminals that can be connected to SWA20 to SWA25 respectively.

The counter is constituted by three D flip-flops DF_1 to DF_3 (hereinafter sometimes referred to collectively as "DFFs"). The counter receives a CLK signal through the CLK signal line and a signal through a signal line R, and then generates DQ 1 to DQ 3 and DQ 1B to DQ 3B in accordance with CQ 1 to CQ 3 sent from the DFFs, respectively.

The decoder performs arithmetical operations according to logical expressions shown in FIG. 33 to generate selection signals to be outputted to selection signal lines SEL0 to SEL5 of FIG. 32. It should be noted that the decoder is not particularly limited in specific configuration, so long as it can perform logical operations as shown in FIG. 33.

The integrated circuit 10 according to the present embodiment receives gray-scale data of the three, primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 32, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Furthermore, as shown in FIG. 32, the integrated circuit includes: spare latch circuits DLA_R7, DLA_G7, and DLA_B7; spare hold circuits DLB_R7, DLB_G7, and DLB_B7; and spare output circuits 11_19 to 11_21.

Each of the switches SWA20 to SWA25 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA20 to SWA25 are determined by the values of FlagA, FlagG, FlagI, FlagJ, and FlagK, respectively. Further, the states of connection in SWB1 to SWB3, the states of connection in SWB4 to SWB6, the states of connection in SWB7 to SWB9, the states of connection in SWB10 to SWB12, the states of connection in SWB13 to SWB15, and the states of connection in SWB16 to SWB18 are determined by combinations of FlagA, FlagG, FlagH, FlagI, FlagJ, and FlagK, respectively. FlagA to FlagK are determined by combinations of Flag1 to Flag18, and the combinations are shown as logical expressions in the lower part of FIG. 32.

Although not shown, there is no particular limit on the specific configuration for generating FlagA to FlagK, so long as it can perform logical operations as shown in FIG. 32.

When the values of FlagA, FlagG, FlagH, FlagI, FlagJ, and FlagK are "0", SWA20 to SWA25 connect their terminals 0 to their terminals 1, respectively. On the other hand, when the values of FlagA, FlagG, FlagH, FlagI, FlagJ, and FlagK are "1", SWA20 to SWA25 connect their terminals 0 to their terminals 2, respectively. For example, when the values of Flag1 to Flag3 are "0", i.e., when the operation of the output circuits 11_1 to 11_3 is good, FlagA is "0" according to the logical expression shown in FIG. 32, whereby SWA20 connects its terminal 0 to its terminal 1. On the other hand, when any of the values of Flag1 to Flag3 is "1", i.e., when the operation of any of the output circuits 11_1 to 11_3 is defective, FlagA is "1", whereby SWA20 connects its terminal 0 to its terminal 2. In FIG. 32, the signals (FlagA to FlagK) for determining the states of the switches SWA20 to SWA25 and SWB1 to SWB18 are indicated by arrows. It should be noted that FlagA to FlagK are determined by a control section (not shown). Moreover, the selecting means as set forth in the claims is constituted by a control section (not shown), the pointer circuit 133, and SWA20 to SWA25. Moreover, the connection switching means as set forth in the claims is constituted by a control section (not shown) and SWB1 to SWB18.

Embodiment 4 expresses gray-scale data input as a single system; however, it is usual, as in the present embodiment, to input gray-scale data for each of the colors R, G, and B in carrying out a color display.

(Normal Operation)

Figure 34:
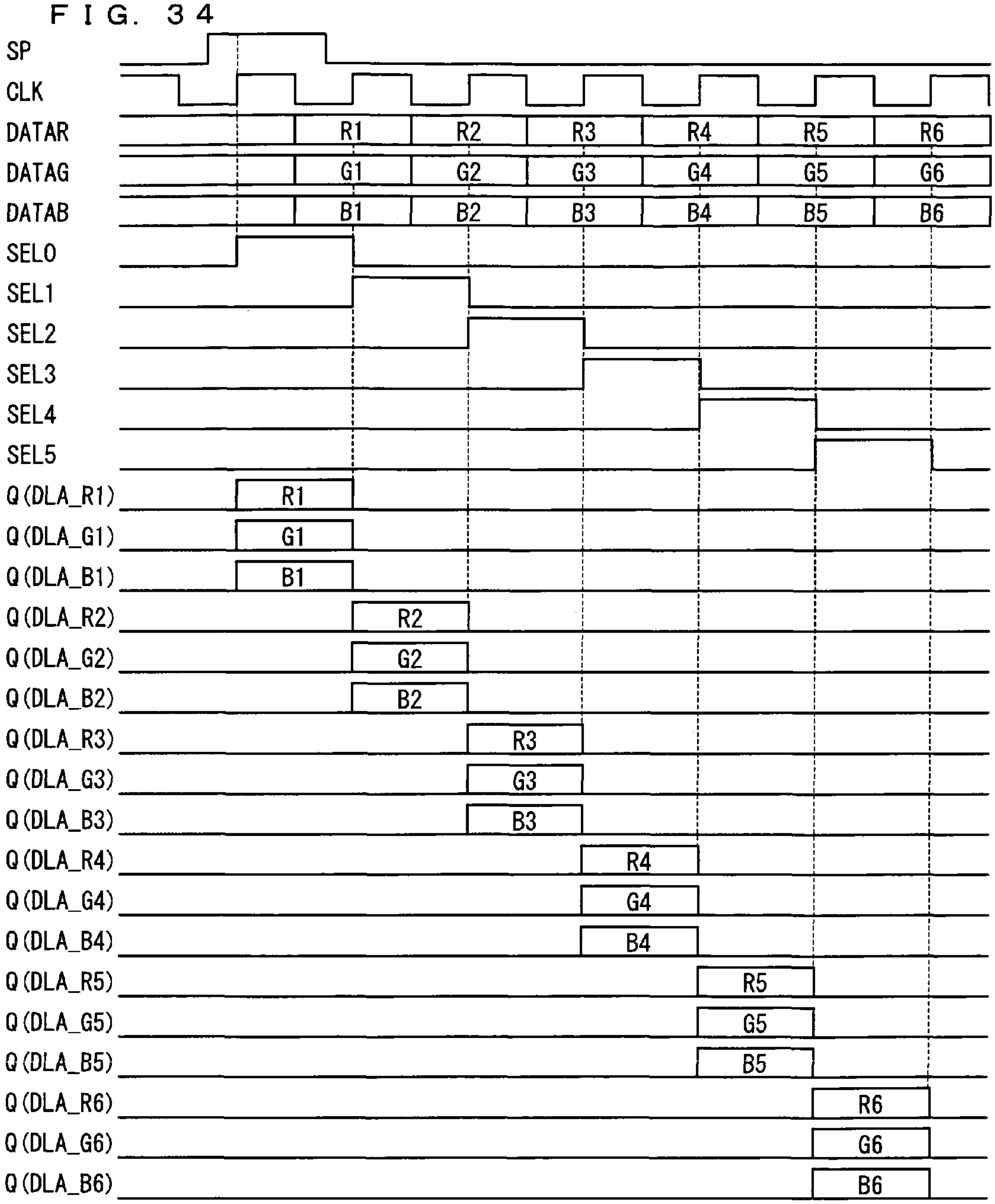
FIG. 34 is a timing chart showing the operation of the integrated circuit without a defective output circuit.

Next, the operation of the integrated circuit 10 without a defective output circuit, i.e. normal operation, is described below with reference to FIGS. 32 and 34.

As mentioned above, FIG. 32 shows the configuration of the integrated circuit 10 for normal operation in accordance with the present embodiment. FIG. 34 is a timing chart showing the operation of the integrated circuit 10 without a defective output circuit.

In the absence of a defective output circuit, Flag1 to Flag18 in the output circuits 11_1 to 11_18 are all "0". Accordingly, FlagA to FlagK, constituted by the ORs of combinations of Flag1 to Flag18 respectively, are all "0", too.

The following describes the operation of the integrated circuit 10. First, the pointer circuit 133 of the integrated circuit 10 receives an operation start pulse signal (SP signal) through the start pulse signal line (SP signal line). Further, the pointer circuit 133 receives a clock signal through the clock signal line (CLK signal line). The pointer circuit 123 has six connection terminals and, upon receiving the SP signal, outputs selection signals to the selection signal lines SEL0 to SEL5 through the connection terminals. Each of the selection signals serves as a signal for selecting which of the latch circuits latches incoming gray-scale data. As shown in FIG. 34, the selection signal lines SEL0 to SEL5 take turns generating a pulse (i.e. a "H" signal) for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, as shown in FIG. 34, shifts from R1 to R2 and so forth, shifts from G1 to G2 and so forth, or shifts from B1 to B2 and so forth are made in synchronization with the timing of falls in the CLK signal. Each of the latch circuits DLA loads a signal through its input section D and outputs the signal through its output section Q, while receiving a "H" selection signal through its gate G. That is, while the selection signals from the selection signal lines SEL1 to SEL5 are "H", the latch circuits DLA_R1 to DLA_R6, DLA_G1 to DLA_G6, and DLA_B1 to DLA_B6 load incoming gray-scale data and output the gray-scale data through their output sections Q, respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data "R1" to "R6" in sequence in accordance with the SEL0 to SEL5 pulses, respectively. Similarly, the latch circuits DLA_G1 to DLA_G6 load gray-scale data "G1" to "G6" in sequence in accordance with the SEL0 to SEL5 pulses, respectively. Similarly, the latch circuits DLA_B1 to DLA_B6 load gray-scale data "B1" to "B6" in sequence in accordance with the SEL0 to SEL5 pulses, respectively.

Further, the latch circuits DLA_R1 to DLA_R6 hold the loaded gray-scale data while the selection signals from the selection signal lines SEL0 to SEL5 are "L". For example, by the time the selection signal from SEL0 becomes "L", the latch circuit DLA_R1 has been receiving the gray-scale data "R1" through the DATAR signal line; therefore, the latch circuit DLA_R1 holds "R1" at its output section Q thereafter. Similarly, when the selection signals from SEL1 to SEL5 become "L", DLA_R2 to DLA_R6 hold the gray-scale data "R2" to "R6" at their outputs Q, respectively. At this point, the hold circuits DLB_R1 to DLB_R6 receive the data, which have been held at the output sections Q of DLA_R1 to DLA_R6, through their input sections D, respectively.

Further, the latch circuits DLA_G1 to DLA_G6 hold the loaded gray-scale data while the selection signals from the selection signal lines SEL0 to SEL5 are "L". For example, by the time the selection signal from SEL0 becomes "L", the latch circuit DLA_G1 has been receiving the gray-scale data "G1" through the DATAG signal line; therefore, the latch circuit DLA_G1 holds "G1" at its output section Q thereafter. Similarly, when the selection signals from SEL1 to SEL5 become "L", DLA_G2 to DLA_G6 hold the gray-scale data "G2" to "G6" at their outputs Q, respectively. At this point, the hold circuits DLB_G1 to DLB_G6 receive the data, which have been held at the output sections Q of DLA_G1 to DLA_G6, through their input sections D, respectively.

Further, the latch circuits DLA_B1 to DLA_B6 hold the loaded gray-scale data while the selection signals from the selection signal lines SEL0 to SEL5 are "L". For example; by the time the selection signal from SEL0 becomes "L", the latch circuit DLA_B1 has been receiving the gray-scale data "B1" through the DATAB signal line; therefore, the latch circuit DLA_B1 holds "B1" at its output section Q thereafter. Similarly, when the selection signals from SEL1 to SEL5 become "L", DLA_B2 to DLA_B6 hold the gray-scale data "B2" to "B6" at their outputs Q, respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 1 and, as such, is not described here.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 35 and 36.

Figure 35:
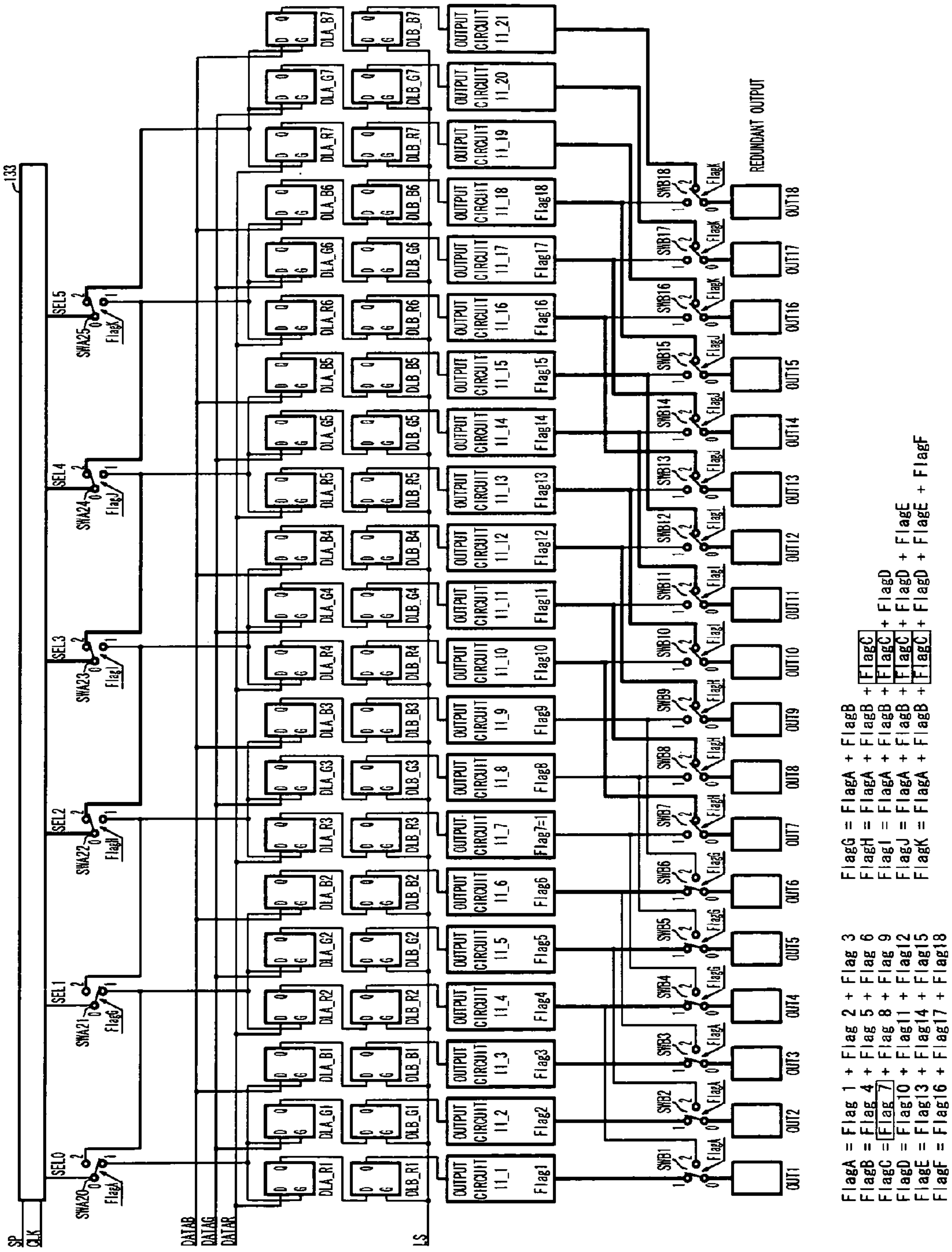
FIG. 35 shows the state of the integrated circuit for self-repairing operation in accordance with Embodiment 5.
Figure 36:
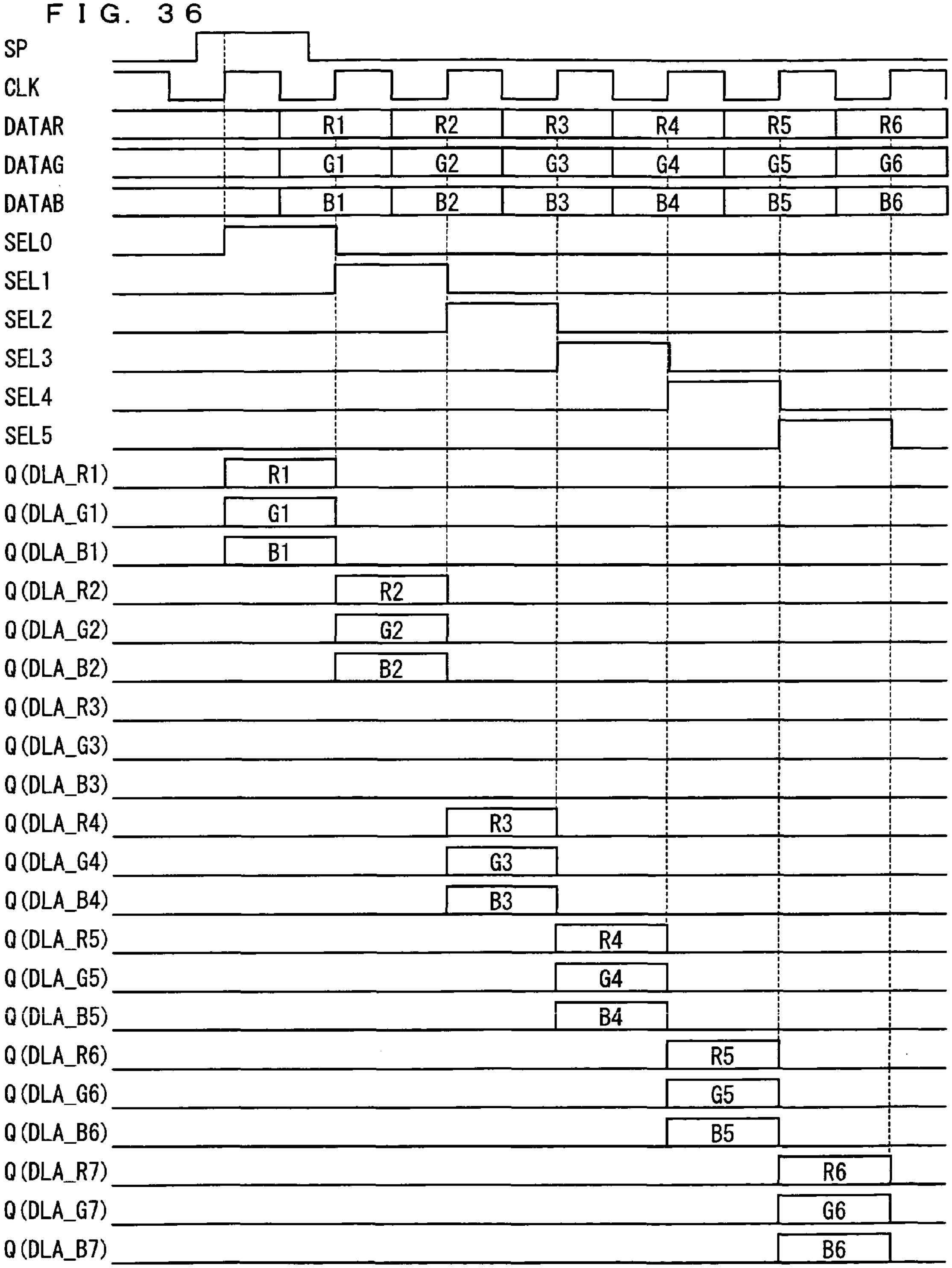
FIG. 36 is a timing chart showing the operation of the integrated circuit with a defective output circuit in accordance with Embodiment 5.

FIG. 35 shows the state of the integrated circuit 10 for self-repairing operation in accordance with the present embodiment, and FIG. 36 is a timing chart showing the operation of the integrated circuit 10 with a defective output circuit.

When the integrated circuit 10 has Flag7 set to "1" in the presence of an abnormality in the output circuit 11_7, FlagC to FlagK, each calculated according to an OR including Flag7, become "1". For this reason, SWA22 to SWA25 change from connecting their terminals 0 to their terminals 1 to connecting their terminals 0 to their terminals 2, respectively. Thus, the selection signal line SEL2 is connected to the latch circuits DLA_R4, DLA_G4, and DLA_B4, and the gray-scale data "R3", "G3", and "B3" are stored in DLA_R4, DLA_G4, and DLA_B4, respectively.

Similarly, the selection signal line SEL3 is connected to the latch circuits DLA_R5, DLA_G5, and DLA_B5, and the gray-scale data "R4", "G4", and "B4", which would normally be stored in DLA_R4, DLA_G4, and DLA_B4, are stored in the latch circuits DLA_R5, DLA_G5, and DLA_B5, respectively. Similarly, the selection signal line SEL4 is connected to the latch circuits DLA_R6, DLA_G6, and DLA_B6, and the gray-scale data "R5", "G5", and "B5", which would normally be stored in DLA_R5, DLA_G5, and DLA_B5, are stored in the latch circuits DLA_R6, DLA_G6, and DLA_B6, respectively.

That is, the latch circuits, each constituted by a latch circuit and a hold circuit, operate in a one-stage-shifted manner. Finally, the selection signal line SEL5 is connected to the latch circuits DLA_R7, DLA_G7, and DLA_B7, and "R6", "G6", and "B6", which would normally be stored in DLA_R6, DLA_G6, and DLA_B6, are stored in the spare latch circuits DLA_R7, DLA_G7, and DLA_B7 respectively.

Thus, in the presence of an abnormality in the output circuit 11_7, the integrated circuit 10 according to the present invention uses the switches so that the output circuits 11_7, 11_8, and 11_9 no longer receive any gray-scale data. At this point, as shown in FIG. 35, the switches SWA7 to SWA18, which are controlled by FlagH to FlagK, have changed from connecting their terminals 0 to their terminals 1 to connecting their terminals 0 to their terminals 2, respectively; therefore, the output circuits 11_7, 11_8, and 11_9 are no longer connected to any of the output terminals OUT1 to OUT18.

Then, the sets of three output circuits for outputting RGB gray-scale voltages are shifted in sequence to be connected to the output terminals as follows: the output circuits 11_10 to 11_12 are connected to the output terminals OUT7 to OUT9, respectively; and the output circuits 11_13 to 11_15 are connected to the output terminals OUT10 to OUT12, respectively. Finally, the spare output circuits 11_19 to 11_21 are connected to the output terminals OUT16 to OUT18, respectively.

As described above, the configuration capable of self-repairing is realized by: (i) disconnecting a defective output circuit, a defective latch circuit, or a defective hold circuit, if detected, by switching connections between the selection signal lines extending from the pointer circuit 133 and the latch circuits (and the hold circuits) and switching connections between the output circuits and the output terminals, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 (11_1, 11_4, . . . ) corresponding to R, by which the display colors are constituted, uses its operational amplifier to compare a voltage outputted from its DAC circuit with a voltage outputted from the DAC circuit of the output circuit 11_19. Similarly, each of the output circuits 11 (11_2, 11_5, . . . ) corresponding to G, by which the display colors are constituted, uses its operational amplifier to compare a voltage outputted from its DAC circuit with a voltage outputted from the DAC circuit of the output circuit 11_20, and each of the output circuits 11 (11_3, 11_6, . . . ) corresponding to B, by which the display colors are constituted, uses its operational amplifier to compare a voltage outputted from its DAC circuit with a voltage outputted from the DAC circuit of the output circuit 11_21. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Embodiment 6

Embodiment 6 of the present invention is described below with reference to FIGS. 37 through 40.

(Configuration of a Self-Repairing Circuit)

First, the configuration of a display driving semiconductor integrated circuit (hereinafter referred to as "integrated circuit) 10 according to the present embodiment is described with reference to FIG. 37. As explained in FIG. 28 in [Embodiment 4], eighteen outputs are abstracted for explanation. However, the number of outputs from the integrated circuit 10 is not limited to 18.

Figure 37:
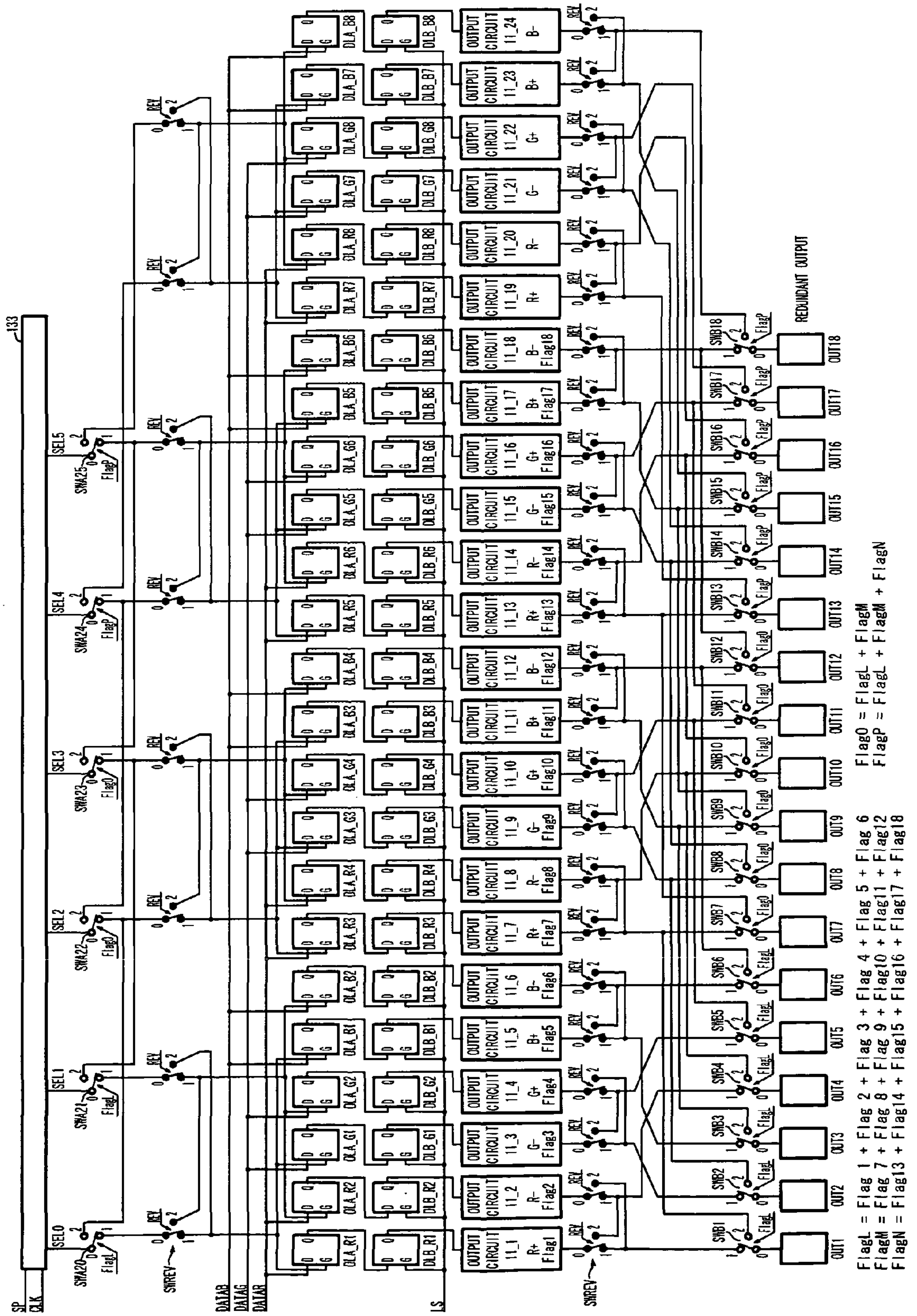
FIG. 37 shows the configuration of an integrated circuit for normal operation in accordance with Embodiment 6.

FIG. 37 shows the configuration of the integrated circuit for normal operation in accordance with the present embodiment. The integrated circuit 10 includes: a pointer circuit 133; switches SWA20 to SWA25; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; and signal output terminals OUT1 to OUT18 (hereinafter referred to as "output terminals OUT1 to OUT18").

The integrated circuit 10 is connected to a display device (not shown) through the output terminals OUT1 to OUT18 to drive the display device.

In the present embodiment, the sub-output circuits as set forth in the claims correspond to output circuits 11 (output circuits 11_1, 11_2, and 11_3, respectively), and the sub-latch circuits as set forth in the claims correspond to separate latch circuits DLA (e.g., the latch circuits DLA_R1, DLA_G1, DLA_B1, DLA_R2, DLA_G2, and DLA_B2, respectively). Each of the output circuits as set forth in the claim corresponds to a block composed of output circuits 11 arranged in a row to correspond to positive and negative gray-scale voltages for each of the three primary colors R, G, and B, by which the display colors are constituted (e.g., a block composed of the output circuits 11_1 to 11_6), and each of the latch circuits as set forth in the claims corresponds a block composed of latch circuits arranged in a row to correspond to positive and negative gray-scale voltages for each of the three primary colors R, G, and B (e.g., a block composed of the latch circuits DLA_R1, DLA_G1, DLA_B1, DLA_R2, DLA_G2, and DLA_B2).

Further, the sub-output terminals as set forth in the claims correspond to the output terminals OUT1 to OUT18, respectively, and each of the output terminals as set forth in the claims corresponds to a set of six output terminals (e.g., OUT1 to OUT6) disposed to correspond to the respective output circuits.

Further, the pointer circuit 133 includes connection terminals that can be connected to SWA20 to SWA25 respectively. Each of the connection terminals is connected to a block composed of latch circuits DLA, hold circuits DLB, and output circuits 11 in a unit of RGB (e.g., a block composed of the latch circuits DLA_R1, DLA_G1, and DLA_B1, the hold circuits DLB_R1, DLB_G1, and DLB_B1, and the output circuits 11_1, 11_3, and 11_5).

The integrated circuit 10 according to the present embodiment receives gray-scale data of the three primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 37, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Further, each of the output circuits 11_1 to 11_18 of the integrated circuit 10 is a circuit that corresponds only to either a positive dot-inversion driving voltage output or a negative dot-inversion driving voltage output. In FIG. 37, the odd-numbered output circuits 11_1, 11_3, 11_5, . . . correspond to positive voltage outputs, and the even-numbered output circuits 11_2, 11_4, 11_6, . . . correspond to negative voltage outputs. Moreover, in order to carry out dot inversion drive, it is necessary to be able to output both positive and negative voltages to each output terminal. Accordingly, the integrated circuit 10 controls switching of the switches SWREV in accordance with a control signal REV to change the timing of sampling of gray-scale data by changing connections of the selection signal lines to the output circuits and the output terminals, thus realizing the switch between positive and negative voltages.

Furthermore, as shown in FIG. 37, the integrated circuit 10 includes: spare latch circuits DLA_R7, DLA_G7, DLA_B7, DLA_R8, DLA_G8, and DLA_B8; spare hold circuits DLB_R7, DLB_G7, DLA_B7, DLB_R8, DLB_G8, and DLB_B8; and spare output circuits 11_19 to 11_24.

Each of the switches SWA20 to SWA25 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA20 and SWA21, the states of connection in SWA22 and SWA23, and the states of connection in SWA24 and SWA25 are determined by the values of FlagL, FlagO, and FlagP, respectively. Further, the states of connection in SWB1 to SWB6, the states of connection in SWB7 to SWB12, and the states of connection in SWB13 to SWB18, are determined by the values of FlagL, FlagO, and FlagP, respectively. FlagL to FlagP are determined by combinations of Flag1 to Flag18, and the combinations are shown as logical expressions in the lower part of FIG. 37.

Although not shown, there is no particular limit on the specific configuration for generating FlagL to FlagP, so long as it can perform logical operations as shown in FIG. 37.

When the values of FlagL, FlagO, and FlagP are "0", SWA20 to SWA25 connect their terminals 0 to their terminals 1, respectively. On the other hand, when the values of FlagL, FlagO, and FlagP are "1", SWA20 to SWA25 connect their terminals 0 to their terminals 2, respectively. For example, when the values of Flag1 to Flag6 are "0", i.e., when the operation of the output circuits 11_1 to 11_6 is goad, FlagL is "0" according to the logical expression shown in FIG. 37, whereby SWA20 connects its terminal 0 to its terminal 1. On the other hand, when any of the values of Flag1 to Flag6 is "1", i.e., when the operation of any of the output circuits 11_1 to 11_6 is defective, FlagL is "1", whereby SWA20 connects its terminal 0 to its terminal 2. In FIG. 37, the signals (FlagL to FlagN) for determining the states of the switches SWA20 to SWA25 and SWB1 to SWB18 are indicated by arrows. It should be noted that to FlagL to FlagN are determined by a control section (not shown). Moreover, the selecting means as set forth in the claims is constituted by a control section (not shown), the pointer circuit 133, and SWA20 to SWA25. Moreover, the connection switching means as set forth in the claims is constituted by a control section (not shown) and SWB1 to SWB18.

(Normal Operation)

Figure 38:
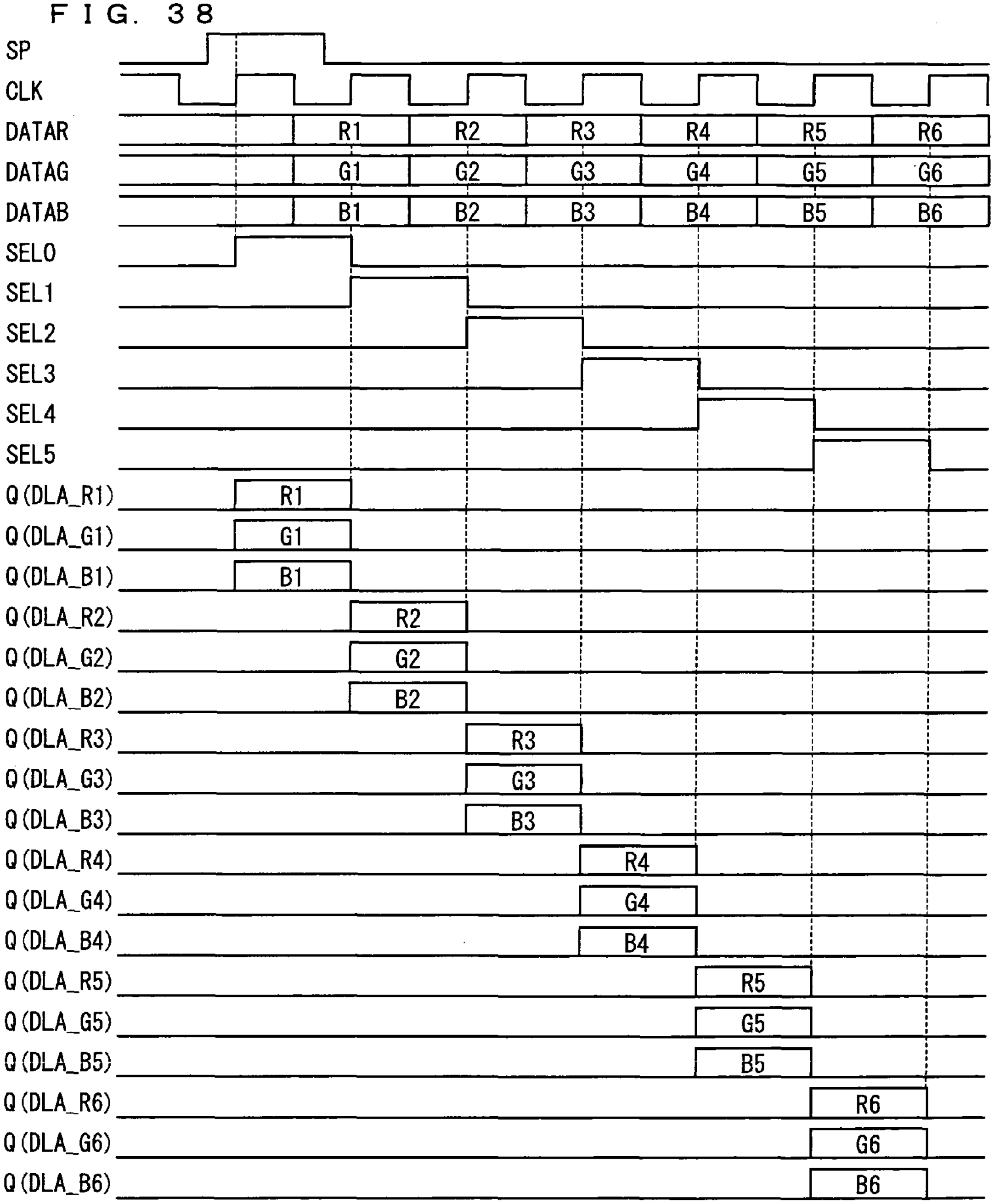
FIG. 38 is a timing chart showing the operation of the integrated circuit without a defective output circuit in accordance with Embodiment 6.

Next, the operation of the integrated circuit 10 without a defective output circuit, i.e. normal operation, is described below with reference to FIGS. 37 and 38.

As mentioned above, FIG. 37 shows the configuration of the integrated circuit 10 for normal operation in accordance with the present embodiment. FIG. 38 is a timing chart showing the operation of the integrated circuit 10 without a defective output circuit. The present embodiment describes a state in which each of the switches SWREV has connected its terminal 0 to its terminal 1.

In the absence of a defective output circuit, Flag 1 to Flag18 in the output circuits 11_1 to 11_18 are all "0". Accordingly, FlagL to FlagP, constituted by the ORs of combinations of Flag1 to Flag18 respectively, are all "0", too.

The following describes the operation of the integrated circuit 10. First, the pointer circuit 133 of the integrated circuit 10 receives an operation start pulse signal (SP signal) through the start pulse signal line (SP signal line). Further, the pointer circuit 133 receives a clock signal (CLK signal) through the clock signal line (CLK signal line). The pointer circuit 133 has six connection terminals and, upon receiving the SP signal, outputs selection signals to the selection signal lines SEL0 to SEL5 through the connection terminals. Each of the selection signals SEL serves as a signal for selecting which of the latch circuits latches incoming gray-scale data. As shown in FIG. 37, the selection signal lines SEL0 to SEL5 take turns generating a pulse (i.e. a "H" signal) for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, as shown in FIG. 38, shifts from R1 to R2 and so forth, shifts from G1 to G2 and so forth, or shifts from B1 to B2 and so forth are made in synchronization with the timing of falls in the CLK signal. Each of the latch circuits DLA loads a signal through its input section D and outputs the signal through its output section Q, while receiving a "H" selection signal through its gate G. That is, while the selection signals from the selection signal lines SEL1 to SEL5 are "H", the latch circuits DLA_R1 to DLA_R6, DLA_G1 to DLA_G6, and DLA_B1 to DLA_B6 load incoming gray-scale data and output the gray-scale data through their output sections Q, respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data "R1" to "R6" in sequence in accordance with the SEL0 to SEL5 pulses, respectively. Similarly, the latch circuits DLA_G1 to DLA_G6 load gray-scale data "G1" to "G6" in sequence in accordance with the SEL0 to SEL5 pulses, respectively. Similarly, the latch circuits DLA_B1 to DLA_B6 load gray-scale data "B1" to "B6" in sequence in accordance with the SEL0 to SEL5 pulses, respectively.

Further, the latch circuits DLA_R1 to DLA_R6 hold the loaded gray-scale data while the selection signals from the selection signal lines SEL0 to SEL5 are "L". For example, by the time the selection signal from SEL0 becomes "L", the latch circuit DLA_R1 has been receiving the gray-scale data "R1" through the DATAR signal line; therefore, the latch circuit DLA_R1 holds "R1" at its output section Q thereafter. Similarly, when the selection signals from SEL1 to SEL5 become "L", DLA_R2 to DLA_R6 hold the gray-scale data "R2" to "R6" at their outputs Q, respectively. At this point, the hold circuits DLB_R1 to DLB_R6 receive the data, which have been held at the output sections Q of DLA_R1 to DLA_R6, through their input sections D, respectively.

Further, the latch circuits DLA_G1 to DLA_G6 hold the loaded gray-scale data while the selection signals from the selection signal lines SEL0 to SEL5 are "L". For example, by the time the selection signal from SEL0 becomes "L", the latch circuit DLA_G1 has been receiving the gray-scale data "G1" through the DATAG signal line; therefore, the latch circuit DLA_G1 holds "G1" at its output section Q thereafter. Similarly, when the selection signals from SEL1 to SEL5 become "L", DLA_G2 to DLA_G6 hold the gray-scale data "G2" to "G6" at their outputs Q, respectively. At this point, the hold circuits DLB_G1 to DLB_G6 receive the data, which have been held at the output sections Q of DLA_G1 to DLA_G6, through their input sections D, respectively.

Further, the latch circuits DLA_B1 to DLA_B6 hold the loaded gray-scale data while the selection signals from the selection signal lines SEL0 to SEL5 are "L". For example, by the time the selection signal from SEL0 becomes "L", the latch circuit DLA_B1 has been receiving the gray-scale data "B1" through the DATAB signal line; therefore, the latch circuit DLA_B1 holds "B1" at its output section Q thereafter. Similarly, when the selection signals from SEL1 to SEL5 become "L", DLA_B2 to DLA_B6 hold the gray-scale data "B2" to "B6" at their outputs Q, respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 4 and, as such, is not described here.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIGS. 39 and 40.

Figure 39:
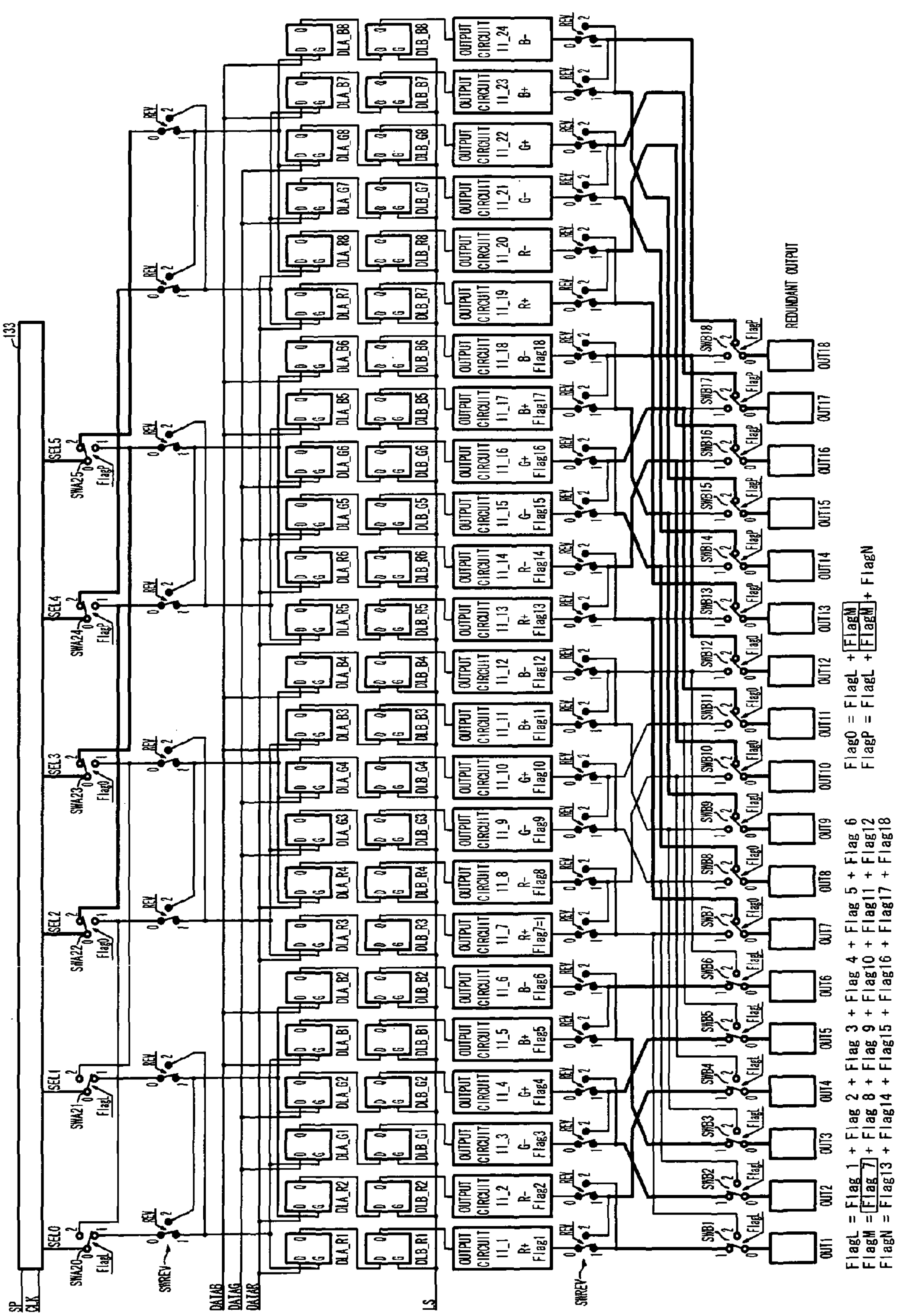
FIG. 39 shows the state of the integrated circuit for self-repairing operation in accordance with Embodiment 6.
Figure 40:
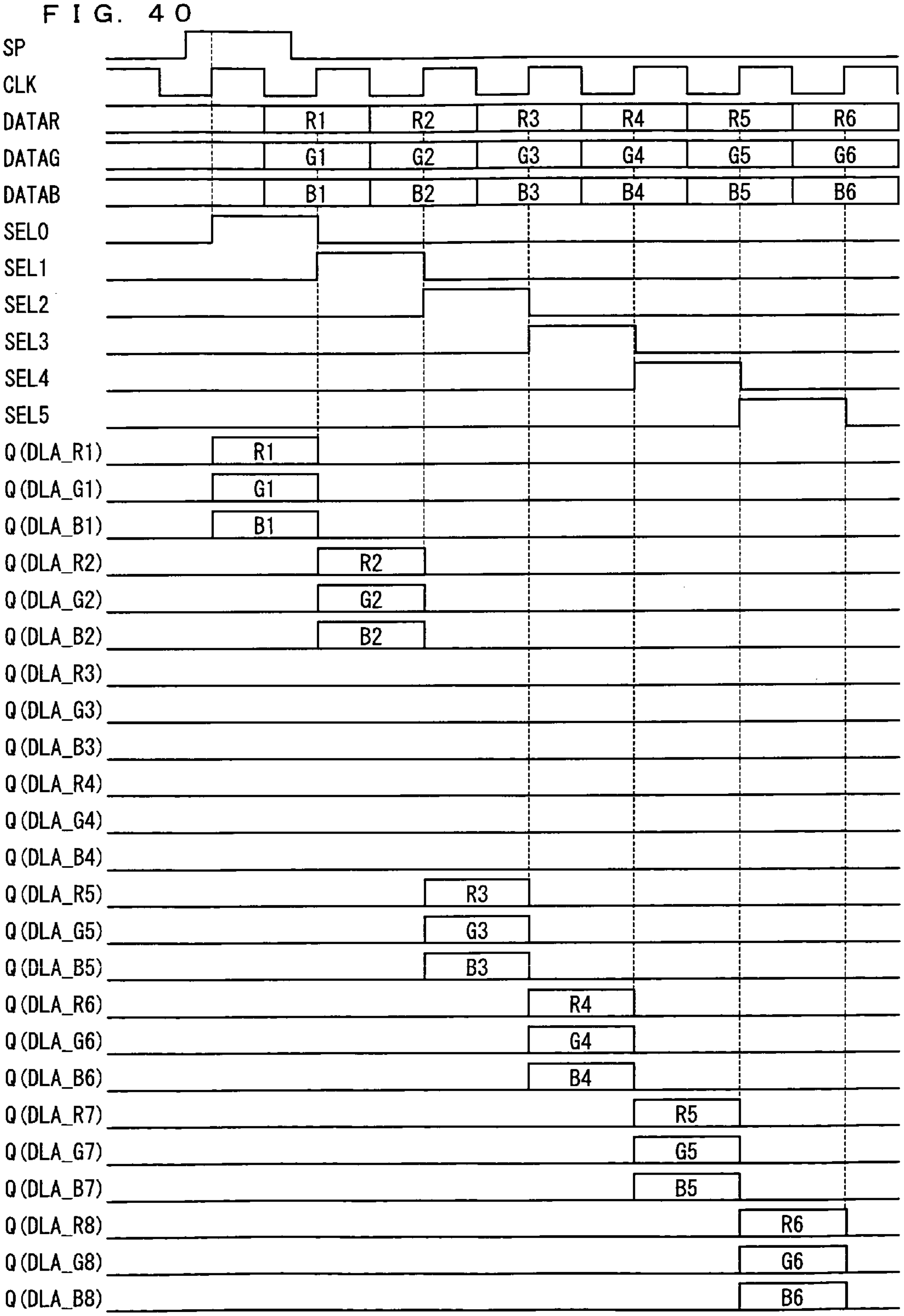
FIG. 40 is a timing chart showing the operation of the integrated circuit with a defective output circuit in accordance with Embodiment 6.

FIG. 39 shows the state of the integrated circuit 10 for self-repairing operation in accordance with the present embodiment, and FIG. 40 is a timing chart showing the operation of the integrated circuit 10 with a defective output circuit.

When the integrated circuit 10 has Flag7 set to "1" in the presence of an abnormality in the output circuit 11_7, FlagC to FlagK, each calculated according to an OR including Flag7, become "1". For this reason, SWA22 to SWA25 change from connecting their terminals 0 to their terminals 1 to connecting their terminals 0 to their terminals 2, respectively. Thus, the selection signal line SEL2 is connected to the latch circuits DLA_R5, DLA_G5, and DLA_B5, and the gray-scale data "R3", "G3", and "B3" are stored in DLA_R5, DLA_G5, and DLA_B5, respectively.

Similarly, SEL3 is connected to the gates of DLA_R6, DLA_G6, and DLA_B6. SEL4 is connected to the gates of DLA_R7, DLA_G7, and DLA_B7. SEL5 is connected to the gates of DLA_R8, DLA_G8, and DLA_B8.

Thus, the latch circuits operate in a one-stage-shifted manner as follows: the data "R3", "G3", and "B3", which would normally be stored in DLA_R3, DLA_G3, and DLA_B3, are stored in DLA_R5, DLA_G5, and DLA_B5, respectively; the data "R4", "G4", and "B4", which would normally be stored in DLA_R4, DLA_G4, and DLA_B4, are stored in the spare circuits DLA_R6, DLA_G6, and DLA_B6, respectively; the data "R5", "G5", and "B5", which would normally be stored in DLA_R5, DLA_G5, and DLA_B5, are stored in the spare circuits DLA_R7, DLA_G7, and DLA_B7, respectively; the data "R6", "G6", and "B6", which would normally be stored in DLA_R6, DLA_G6, and DLA_B6, are stored in the spare circuits DLA_R8, DLA_G8, and DLA_B8, respectively.

Thus, in the presence of an abnormality in the output circuit 11_7, the integrated circuit 10 according to the present invention uses the switches so that the output circuits 11_7, 11_8, 11_9, 11_10, 11_11, and 11_12 no longer receive any gray-scale data. At this point, as shown in FIG. 39, the switches SWA7 to SWA18, which are controlled by FlagO and FlagP, have changed from connecting their terminals 0 to their terminals 1 to connecting their terminals 0 to their terminals 2, respectively; therefore, the output circuits 11_7, 11_8, 11_9, 11_10, 11_11, and 11_12 are no longer connected to any of the output terminals OUT1 to OUT18.

Then, the sets of six output circuits for outputting positive and negative RGB gray-scale voltages are shifted in sequence to be connected to the output terminals as follows: the output circuits 11_13, 11_15, 11_17, 11_14, 11_16, and 11_18 are connected to the output terminals OUT7 to OUT12, respectively. Finally, the spare output circuits 11_19 to 11_24 are connected to the output terminals OUT13 to OUT18, respectively.

As described above, the configuration capable of self-repairing is realized by: (i) disconnecting a defective output circuit, a defective latch circuit, or a defective hold circuit, if detected, by switching connections between the selection signal lines extending from the pointer circuit 133 and the latch circuits (and the hold circuits) and switching connections between the output circuits and the output terminals, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 receives an output voltage from the DAC of a spare output circuit 11 identical in primary color, by which the display colors are constituted, and identical in polarity of gray-scale voltage for dot inversion drive. Then, the output circuit 11 uses its operational amplifier to compare the voltage received from the DAC of the spare output circuit with a voltage outputted from the DAC of the output circuit 11. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Furthermore, the integrated circuit 10 according to the present embodiment may detect a failure in its output circuits 11 by using the first failure detection method described in Embodiment 1. Specifically, each of the output circuits 11 uses its operational amplifier to compare a voltage outputted from its DAC circuit with a voltage outputted from the DAC circuit of an output circuit 11 paired with the output circuit 11. Referring to Fig. X, the output circuit 11_1 uses its operational amplifier to compare a voltage outputted from its DAC with a voltage outputted from the DAC of the output circuit 11_2, and the output circuit 11_2 uses its operational amplifier to compare a voltage outputted from its DAC with a voltage outputted from the DAC of the output circuit 11_1. The same applies to the output circuits 11_3 and 11_4, the output circuits 11_5 and 11_6, . . . . Thus, the decision circuits of the output circuits 11 determine the quality of the output circuits 11 in accordance with results of the comparisons made by the operational amplifiers, and the output circuits send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag 18 are the same as those previously mentioned.

Embodiments according to the present invention are described below with reference to the drawings.

Embodiment 7

Embodiment 7 of the present invention is described below with reference to FIGS. 41 and 42.

(Configuration of a Self-Repairing Circuit)

First, the configuration of a display driving semiconductor integrated circuit (hereinafter referred to as "integrated circuit") 10 capable of self-repairing in accordance with the present embodiment is described with reference to FIG. 41. For simplicity of explanation, a configuration of eighteen outputs is described as in the description of the conventional integrated circuit of FIG. 53. However, the integrated circuit 10 is not limited to a configuration of eighteen outputs.

FIG. 41 shows the configuration of the integrated circuit for normal operation in accordance with the present embodiment. The integrated circuit 10 includes: a D flip-flop_1 to a D flip-flop_18 (hereinafter abbreviated as "DF_1 to DF_18" or sometimes referred to collectively as "DFs"); switches SWA1 to SWA18 (hereinafter sometimes referred to collectively as "switches SWA); latch circuits DLA_1 to DLA_18 (hereinafter sometimes referred to collectively as "latch circuits DLA"); hold circuits DLB_1 to DLB_18 (hereinafter sometimes referred to collectively as "hold circuits DLB"); output circuits 11_1 to 11_18 (hereinafter sometimes referred to collectively as "output circuits 11"); switches SWB1 to SWB18 (hereinafter sometimes referred to collectively as "switches SWB); signal output terminals OUT1 to OUT18 (hereinafter referred to as "output terminals OUT1 to OUT18"); and a spare output circuit 11_19.

The integrated circuit 10 is connected to a display device (not shown) through the output terminals OUT1 to OUT18 to drive the display device.

In the present embodiment, the output circuits as set forth in the claims correspond to the output circuits 11, and the latch circuits and hold circuits as set forth in the claims correspond to the latch circuits DLA and the hold circuits DLB.

Figure 54:
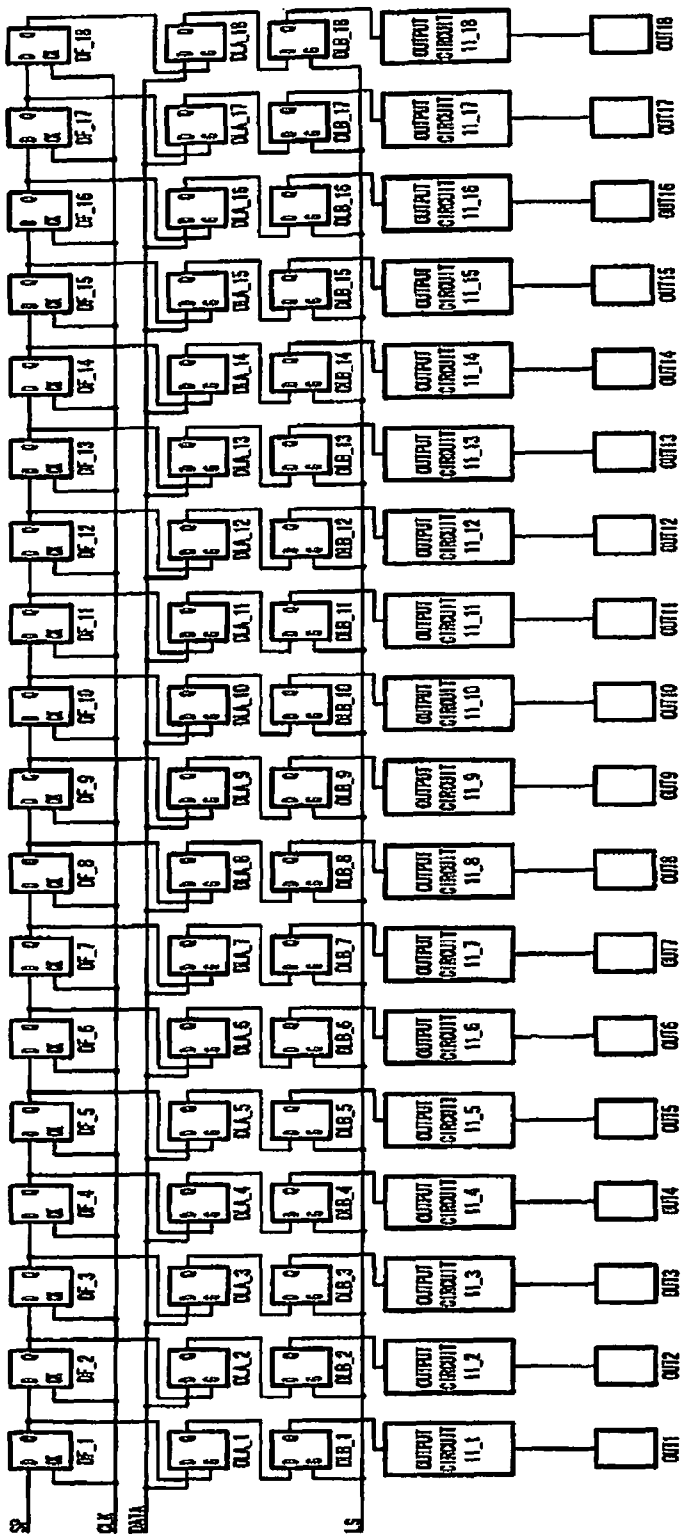
FIG. 54 PRIOR ART
FIG. 54 specifically shows the configuration of a conventional example of a liquid crystal driving semiconductor integrated circuit including shift registers, latch circuits, hold circuits, and output circuits.
Figure 55:
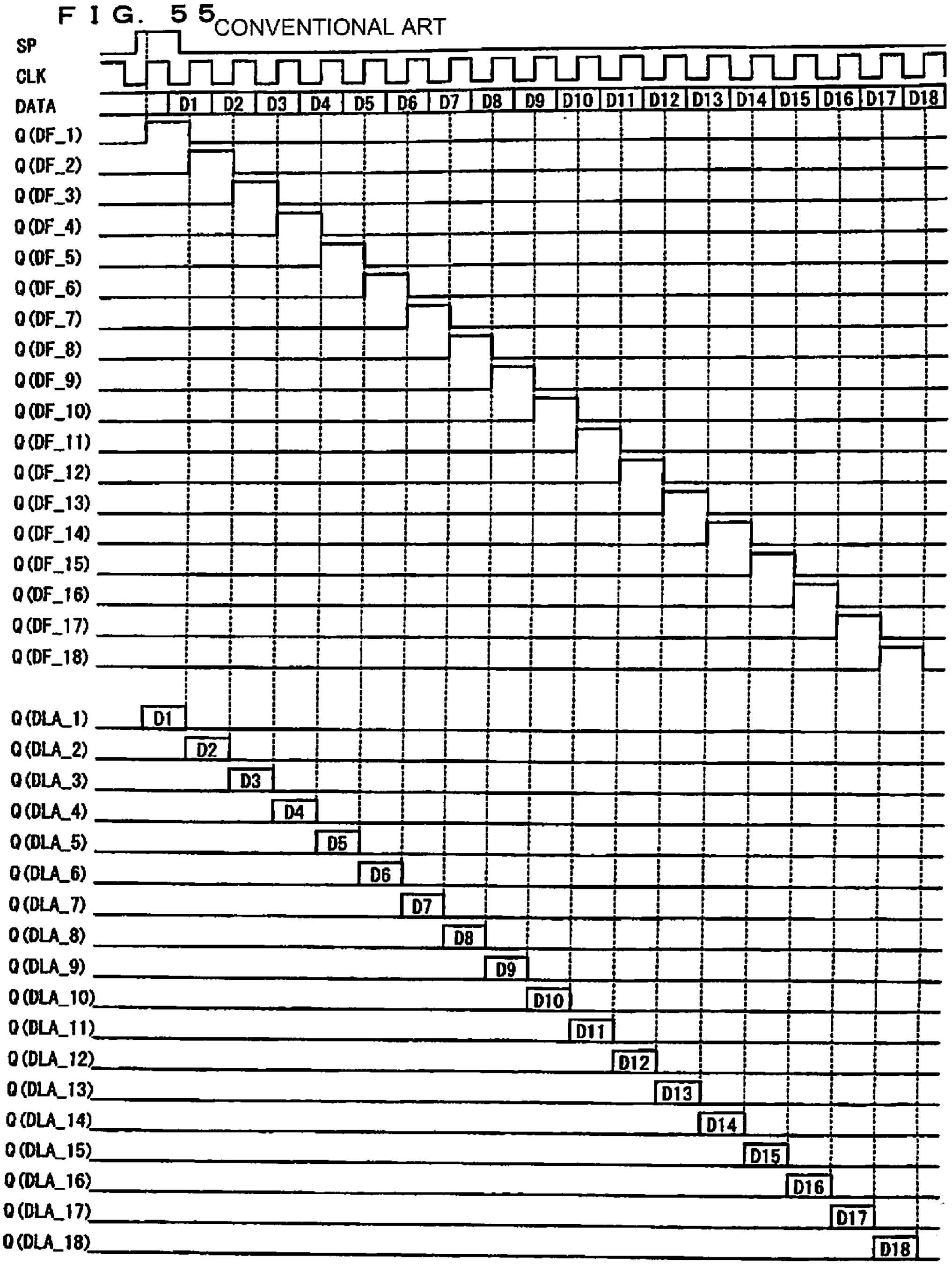
FIG. 55 CONVENTIONAL ART
FIG. 55 is a timing chart showing the operation of a conventional liquid crystal driving semiconductor integrated circuit.

DF_1 to DF_18 (selecting section) of the integrated circuit 10 constitute a pointer shift register circuit as with those of the conventional liquid crystal driving semiconductor integrated circuit 101 of FIG. 54 and operate as shown in the timing chart of FIG. 55.

Each of the output circuits 11 includes: a DAC (digital-analog converter) circuit for converting gray-scale data into a gray-scale voltage signal; an operational amplifier that serves as a buffer circuit; a decision circuit (decision section) for determining the quality of operation of the output circuit; and a decision flag for indicating the quality of operation as determined by the decision circuit. It should be noted, in FIG. 41, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

The switches SWA1 to SWA18 are provided between DLB_1 to DLB_18 and the output circuits 11_1 to 11_18. The switches SWB1 to SWB18 are provided between the output circuits 11_1 to 11_19 and the output terminals OUT1 to OUT18. Further, DLB_1 to DLB_18, connected to DLA_1 to DLA_18 respectively, form a block corresponding to a latch section.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA1 to SWA18 are determined by the values of Flag_X1 to Flag_X18, respectively. Flag_X1 to Flag_X18 are determined by combinations of Flag1 to Flag18, and the combinations are shown as logical expressions in the lower part of FIG. 41.

Although not shown, there is no particular limit on the specific configuration for generating Flag_X1 to Flag_X18, so long as it can perform logical operations as shown in FIG. 41.

When the values of Flag_X1 to Flag_X18 are "0", SWA1 to SWA18 connect their terminals 0 to their terminals 1, respectively. On the other hand, when the values of Flag1 to Flag18 are "1", SWA1 to SWA18 connect their terminals 0 to their terminals 2, respectively. For example, when the value of Flag1 is "0", i.e., when the operation of the output circuit 11_1 is good, Flag_X1 is "0" according to the logical expression shown in FIG. 41, whereby SWA1 connects its terminal 0 to its terminal 1. On the other hand, when the value of Flag1 is "1", i.e., when the operation of the output circuit 11_1 is defective, Flag_X1 is "1", whereby SWA1 connects its terminal 0 to its terminal 2. The states of connection are similarly determined in SWB1 to SWB18. In FIG. 41, the signals (Flag1 to Flag18) for determining the states of the switches SWA1 to SWA18 and SWB1 to SW are indicated by arrows. It should be noted that Flag_X1 to Flag_X18 are determined by a control section (not shown). Moreover, the connection switching means as set forth in the claims corresponds to a control section (not shown) and SWB1 to SWB18. Moreover, the selecting means as set forth in the claims corresponds to a control section (not shown) and SWA1 to SWA18.

The latch circuits DLA_1 to DLA_18 and hold circuits DLB_1 to DLB_18, which latch digital signals representing gray-scale data inputted through the DATA signal line, are each shown as a single circuit in FIG. 41. However, when the incoming gray-scale data is 6-bit data, six latch circuits DLA_1 to six latch circuits DLA_18 and six hold circuits DLB_1 to six hold circuits DLB_18 are needed; and when the incoming gray-scale data is 8-bit data, eight latch circuits DLA_1 to eight latch circuits DLA_18 and eight hold circuits DLB_1 to eight hold circuits DLB_18 are needed. To avoid complexity of explanation, the latch circuits DLA_1 to DLA_18 and the hold circuits DLB_1 to DLB_18 are each represented by a single circuit.

(Normal Operation)

Next, the operation of the integrated circuit 10 without a defective output circuit, i.e. normal operation, is described below with reference to FIG. 41. As mentioned above, FIG. 41 shows the configuration of the integrated circuit 10 for normal operation in accordance with the present embodiment.

In the absence of a defective output circuit, Flag1 to Flag 18 in the output circuits 11 are all "0". Accordingly, Flag_X1 to Flag_X18, constituted by the ORs of combinations of Flag1 to Flag18 respectively, are all "0", too. Therefore, as shown in FIG. 41, each of the switches SWA1 to SWA18 in the integrated circuit 10 has its terminal 0 connected to its terminal 1, whereby the integrated circuit 10 is configured in the same manner as the conventional circuit of FIG. 54.

The following describes the operation of the integrated circuit 10. Each of the DFs, which constitute the pointer shift register, receives a clock signal through the CLK signal line and, at the timing of a rise in the CLK signal, outputs through its output section Q a signal as received through its input section D. Then, the output signals from the output sections Q of DF_1 to DF_18 are inputted to the input sections D of the next DFs and inputted as selection signals to the latch circuits DLA connected to the output sections Q, respectively. Each of the selection signals serves as a signal for selecting which of the latch circuits latches incoming gray-scale data.

First, the first stage DF_1 of the pointer shift register circuit receives an operation start pulse signal (SP signal) through the SP signal line. The first stage DF_1 of the pointer shift register circuit loads a "H" pulse of the SP signal at the timing of a rise in the CLK signal and outputs the "H" signal through its output section Q. At the next rising edge of the CLK signal, the SP signal is "L" and, accordingly, the first stage DF_1 of the pointer shift register circuit outputs an "L" signal through its output section Q.

At the timing of a rise in the CLK signal, each of DF_2 to DF_18, as with DF_1, outputs through its output section Q a signal as received through its input section D. Thus, DF_1 to DF_18 take turns outputting a "H" pulse signal for each and every single clock pulse. In the following, the outputs from DF_1 to DF_18 are represented by Q (DF_1) to Q (DF_18), respectively. Similarly, the outputs from the latch circuits DLA_1 to DLA_18 are represented by Q (DLA_1) to Q (DLA_18), respectively, and the outputs from the hold circuits DLB_1 to DLB_18 are represented by Q (DLB_1) to Q (DLB_18), respectively.

The latch circuits receive gray-scale data through the DATA signal line. Shifting of the gray-scale data received through the DATA signal line is performed at every falling edge of the CLK signal. That is, shifts from D1 to D2, from D2 to D3, and so forth are made in synchronization with the timing of falls in the CLK signal. Each of the latch circuits loads a signal through its input section D and outputs the signal through its output section Q, while receiving a "H" signal through its gate G. That is, while receiving Q (DF_1) to Q (DF_18) at "H", the latch circuits DLA_1 to DLA_18 load incoming gray-scale data and output the gray-scale data through their output sections Q, respectively.

Thus, with the latch circuits DLA_1 to DLA_18 being selected in sequence in synchronization with the timing of shifting of the gray-scale data, the latch circuits DLA load gray-scale data corresponding to video signals to be outputted through the output terminals corresponding to the latch circuits, respectively. That is, the latch circuits DLA_1 to DLA_18 load gray-scale data "D1" to "D18" in sequence in accordance with the "H" pulses Q (DF_1) to Q (DF_18), respectively. Further, the latch circuits DLA_1 to DLA_18 hold the loaded gray-scale data while Q (DF_1) to Q (DF_18) are "L".

For example, while receiving Q (DF_1) at "H", the latch circuit DLA_1 loads the gray-scale data "D1" through the DATA signal line. After that, by the time Q (DF_1) becomes "L", the latch circuit DLA_1 has been receiving the gray-scale data "D1" through the DATA signal line; therefore, the latch circuit DLA_1 holds "D1" thereafter as the output Q (DLA_1) through its output section Q.

Further, because the next stage DF_2 has also been receiving Q (DF_1) through its input section D and Q (DF_1) is yet to become "L" (i.e., Q (DF_1) is in a "H" state) at the timing of a rise in the CLK signal inputted into DF_2, DF_2 outputs Q (DF_2) at "H" through its output section Q. Then, while receiving Q (DF_2) at "H", DLA_2 loads the gray-scale data "D2" through the DATA signal line. After that, by the time Q (DF_2) becomes "L", the latch circuit DLA_2 has been receiving the gray-scale data "D2" through the DATA signal line: therefore, the latch circuit DLA_2 holds "D2" thereafter as the output Q (DLA_2) through its output section Q.

Similarly, when Q (DF_3) to Q (DF_18) become "L", DLA_2 to DLA_18 hold the gray-scale data "D2" to "D18" as the outputs Q (DLA_2) to Q (DLA_18) through their output sections Q, respectively.

As described above, the DFs, which constitute the pointer shift register, shift a pulse in sequence starting from DF_1 and, in accordance with the pulse, DLA_1 to DLA_18 load the gray-scale data "D1" to "D18" through the DATA signal line, respectively. Moreover, the hold circuits DLB_1 to DLB_18 receive the gray-scale data "D1" to "D18", which have been held at the output sections Q of DLA_1 to DLA_18, through their input sections D, respectively.

Furthermore, after DLA_1 to DLA_18 starts loading the gray-scale data in sequence, respectively, and DLA_18 finishes loading the data, the integrated circuit 10 of FIG. 41 inputs a "H" pulse" through the LS signal line. That is, the hold circuits DLB_1 to DLB_18 receive a "H" pulse as a data LOAD signal (hereinafter referred to as "LS signal") through their gates G. Thus, DLB_1 to DLB_18 output the gray-scale data "D1" to "D18", which have been inputted through their input sections D, through their output sections Q, respectively. As a result of this operation, the output circuits receive the gray-scale data "D1" to "D18" loaded in sequence by the DLA_1 to DLA_18, respectively. Then, the output circuits 11 convert the digital gray-scale data into gray-scale voltages (i.e., video signals), and then send the gray-scale voltages corresponding to the gray-scale data "D1" to "D18" through the corresponding output terminals OUT1 to OUT18, respectively.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIG. 42.

Figure 42:
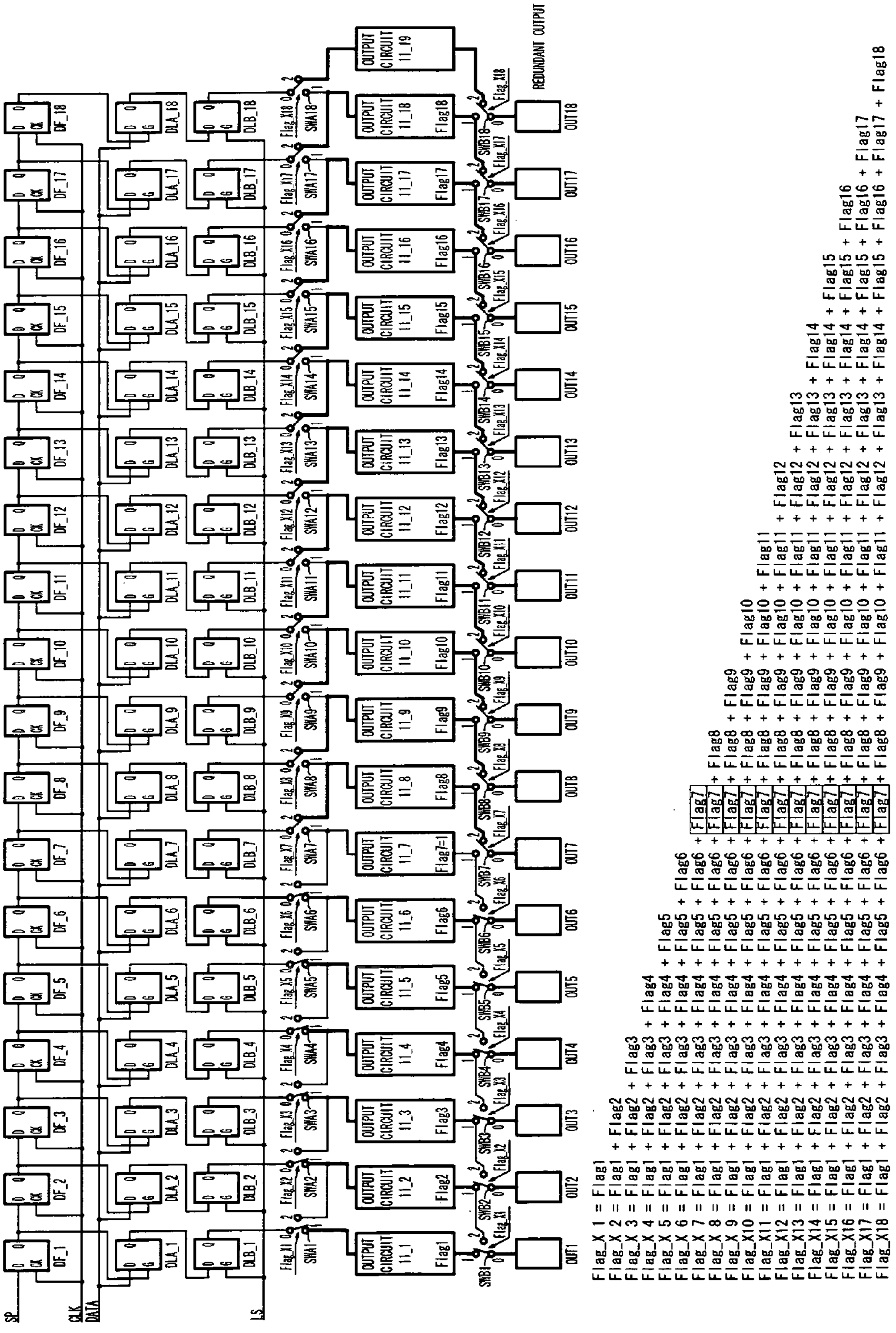
FIG. 42 shows the configuration of the integrated circuit for self-repairing operation in accordance with Embodiment 7.

FIG. 42 shows the configuration of the integrated circuit 10 for self-repairing operation in accordance with the present embodiment. When the integrated circuit 10 has Flag7 set to "1" in the presence of an abnormality in the output circuit 11_7. Flag_X7 to Flag_X18, each calculated according to an OR including Flag7, become "1". For this reason, SWA7 to SWA18 change from connecting their terminals 0 to their terminals 1 to connecting their terminals 0 to their terminals 2, respectively.

Thus, the output circuit 11_7 has its input open, whereby the hold circuits DLB are connected to the output circuits 11 in a one-stage shifted manner as follows: the output section Q of the hold circuit DLB_7 is connected to the output circuit 11_8; the output section Q of the hold circuit DLB_8 is connected to the output circuit 11_9; and the output section Q of the hold circuit DLB_9 is connected to the output circuit 11_10. Finally, the output section Q of the hold circuit DLB_18 is connected to the spare output circuit 11_19. That is, the integrated circuit 10 according to the present invention uses the switches so that the abnormal output circuit 11_7 no longer receives any gray-scale data.

Further, at this point in the integrated circuit 10, as shown in FIG. 42, the switches SWB7 to SWB18, which are controlled by Flag_X7 to Flag_X18, have changed from connecting their terminals 0 to their terminals 1 to connecting their terminals 0 to their terminals 2, respectively; therefore, the output circuit 11_7 is no longer connected to any of the output terminals OUT1 to OUT18. Then, the output circuits are shifted in sequence to be connected to the output terminals as follows: the output circuit 11_8 is connected to the output terminal OUT7; and the output circuit 11_9 is connected to the output terminal OUT8. Finally, the spare output circuit 11_19 is connected to the output terminal OUT18.

As described above, the configuration capable of self-repairing is realized by: (i) disconnecting a defective output circuit, if detected, by switching connections between the hold circuits DLB_1 to DLB_18 and the output circuits 11_1 to 11_19 and switching connections between the output circuits 11_1 to 11_19 and the output terminals OUT1 to OUT18, so as to shift from one normal circuit to another in sequence; and (ii) adding the spare circuit.

Embodiment 8

Embodiment 8 of the present invention is described below with reference to FIGS. 43 and 44.

(Configuration of a Self-Repairing Circuit)

First, the configuration of a display driving semiconductor integrated circuit (hereinafter referred to as "integrated circuit) 10 according to the present embodiment is described with reference to FIG. 43. As explained in FIG. 41 in [Embodiment 7], eighteen outputs are abstracted for explanation. However, the number of outputs from the integrated circuit 10 is not limited to 18.

Figure 43:
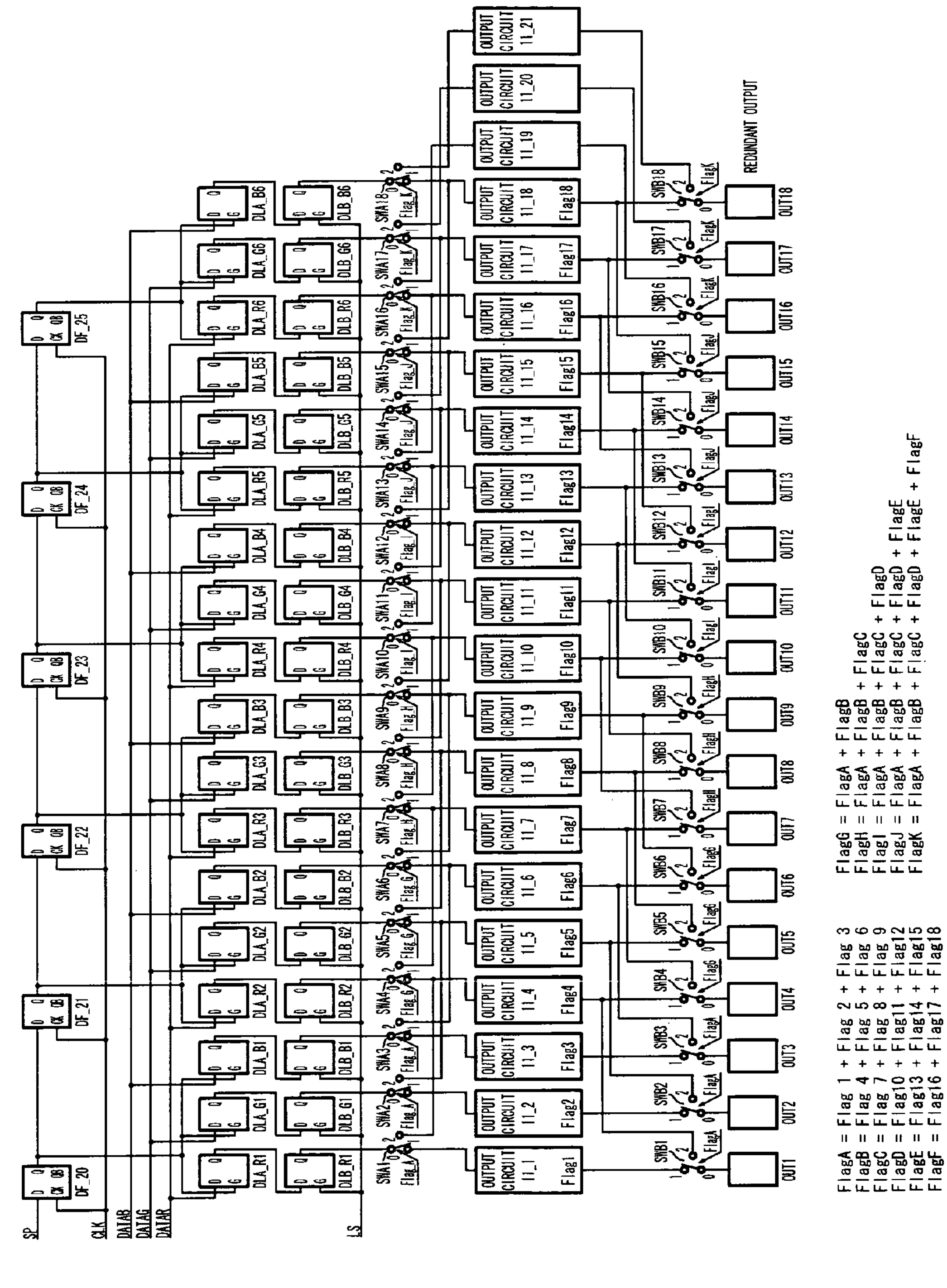
FIG. 43 shows the configuration of an integrated circuit for normal operation in accordance with Embodiment 8.

FIG. 43 shows the configuration of the integrated circuit for normal operation in accordance with the present embodiment. The integrated circuit 10 includes: a D flip-flop_20 to a D flip-flop_25 (hereinafter abbreviated as "DF_20 to DF_25"); switches SWA1 to SWA18; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; signal output terminals OUT1 to OUT18; and spare output circuits 11_19 to 11_21.

The integrated circuit 10 is connected to a display device (not shown) through the output terminals OUT1 to OUT18 to drive the display device.

In the present embodiment, the output sections as set forth in the claims correspond to separate output circuits 11 (output circuits 11_1, 11_2, and 11_3, respectively), and each of the video signal output sections as set forth in the claims corresponds to a block composed of output circuits 11 arranged in a row to correspond to the primary colors R, G, and B, by which the display colors are constituted (e.g., a block composed of the output circuits 11_1 to 11_3).

Further, the sub-latch sections as set forth in the claims correspond to blocks composed of separate latch circuits DLA (e.g., the latch circuits DLA_R1, DLA_G1, and DLA_B1, respectively) and separate hold circuits DLB (e.g., the hold circuits DLB_R1, DLB_G1, and DLB_B1, respectively). Each of the latch sections as set forth in the claim corresponds to a block composed of latch circuits DLA arranged in a row to correspond to the primary colors R, G, and B, by which the display colors are constituted, and hold circuits DLB arranged in a row to correspond to the primary colors R, G, and B (e.g., a block composed of the latch circuits DLA_R1, DLA_G1, and DLA_B1 and the hold circuits DLB_R1, DLB_G1, and DLB_B1).

Further, the sub-output terminals as set forth in the claims correspond to the output terminals OUT1 to OUT18, respectively, and each of the output terminals as set forth in the claims corresponds to a set of three output terminals (e.g., OUT1 to OUT3) disposed to correspond to such a video signal output section.

The integrated circuit 10 according to the present embodiment receives gray-scale data of the three primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 43, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to “0” when the output circuit is good and is set to “1” When the output circuit is defective. Furthermore, as shown in FIG. 43, the integrated circuit 10 includes the spare circuits 11_19 to 11_21.

The switches SWA1 to SWA18 are provided between the hold circuits DLB_R1 to DLB_R6, DLB_G1 to DLB_G6, and DLB_B1 to DLB_B6 and the output circuits 11_1 to 11_18. The switches SWB1 to SWB18 are provided between the output circuits 11_1 to 11_21 and the output terminals OUT1 to OUT18. Further, the hold circuits DLB_R1 to DLB_R6, DLB_G1 to DLB_G6, and DLB_B1 to DLB_B6, connected to the latch circuits DLA_R1 to DLA_R6, DLA_G1 to DLA_G6, and DLA_B1 to DLA_B6 respectively, form blocks corresponding to latch sections.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA1 to SWA3, the states of connection in SWA4 to SWAG, the states of connection in SWA7 to SWA9, the states of connection in SWA10 to SWA12, the states of connection in SWA13 to SWA15, and the states of connection in SWA16 to SWA18 are determined by the values of FlagA, FlagG, FlagH, FlagI, FlagJ, and FlagK, respectively. Further, the states of connection in SWB1 to SWB3, the states of connection in SWB4 to SWB6, the states of connection in SWB7 to SWB9, the states of connection in SWB10 to SWB12, the states of connection in SWB13 to SWB15, and the states of connection in SWB16 to SWB18 are determined by combinations of FlagA, FlagG, FlagH, FlagI, FlagJ, and FlagK, respectively. FlagA to FlagK are determined by combinations of Flag1 to Flag18, and the combinations are shown as logical expressions in the lower part of FIG. 43.

Although not shown, there is no particular limit on the specific configuration for generating FlagA to FlagK, so long as it can perform logical operations as shown in FIG. 43.

When the values of FlagA, FlagG, FlagH, FlagI, FlagJ, and FlagK are “0”, SWA1 to SWA18 connect their terminals 0 to their terminals 1, respectively. On the other hand, when the values of FlagA, FlagG, FlagH, FlagI, FlagJ, and FlagK are “1”, SWA1 to SWA18 connect their terminals 0 to their terminals 2, respectively. For example, when the values of Flag1 to Flag3 are “0”, i.e., when the operation of the output circuits 11_1 to 11_3 is good, FlagA is “0” according to the logical expression shown in FIG. 43, whereby SWA1 connects its terminal 0 to its terminal 1. On the other hand, when any of the values of Flag1 to Flag3 is “1”, i.e., when the operation of any of the output circuits 11_1 to 11_3 is defective, FlagA is “1”, whereby SWA1 connects its terminal 0 to its terminal 2. In FIG. 43, the signals (FlagA to FlagK) for determining the states of the switches SWA1 to SWA18 and SWB1 to SWB18 are indicated by arrows. It should be noted that FlagA to FlagK are determined by a control section (not shown). Moreover, the connection switching means as set forth in the claims corresponds to a control section (not shown) and SWB1 to SWB18. Moreover, the selecting means as set forth in the claims corresponds to a control section (not shown) and SWA1 to SWA18.

Embodiment 7 expresses gray-scale data input as a single system; however, it is usual, as in the present embodiment, to input gray-scale data for each of the colors R, G, and B in carrying out a color display.

(Normal Operation)

Next, the operation of the integrated circuit 10 without a defective output circuit, i.e. normal operation, is described below with reference to FIG. 43. As mentioned above, FIG. 43 shows the configuration of the integrated circuit 10 for normal operation in accordance with the present embodiment.

In the absence of a defective output circuit, Flag1 to Flag18 in the output circuits 11_1 to 11_18 are all “0”. Accordingly, FlagA to FlagK, constituted by the ORs of combinations of Flag1 to Flag18 respectively, are all “0”, too.

The following describes the operation of the integrated circuit 10. Each of the DFs, which constitute the pointer shift register, receives a clock signal through the CLK signal line and, at the timing of a rise in the CLK signal, outputs through its output section Q a signal as received through its input section D. Then, the output signals from the output sections Q of DF_20 to DF_25 are inputted to the input sections D of the next DFs and inputted as selection signals to the latch circuits DLA connected to the output sections Q, respectively. Each of the selection signals serves as a signal for selecting which of the latch circuits latches incoming gray-scale data.

First, the first stage DF_20 of the pointer shift register circuit receives an operation start pulse signal (SP signal) through the SP signal line. The first stage DF_20 of the pointer shift register circuit loads a “H” pulse of the SP signal at the timing of a rise in the CLK signal and outputs the “H” signal through its output section Q. At the next rising edge of the CLK signal, the SP signal is "L" and, accordingly, the first stage DF_20 of the pointer shift register circuit outputs an "L" signal through its output section Q. At the timing of a rise in the CLK signal, each of DF_21 to DF_25, as with DF_20, outputs through its output section Q a signal as received through its input section D. Thus, DF_20 to DF_25 take turns outputting a "H" pulse signal for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, shifts in R gray-scale data from R1 to R2 and so forth, shifts in G gray-scale data from G1 to G2 and so forth, or shifts in B gray-scale data from B1 to B2 and so forth are made in synchronization with the timing of falls in the CLK signal. Each of the latch circuits DLA loads a signal through its input section D and outputs the signal through its output section Q, while receiving a "H" selection signal through its gate G. That is, while receiving Q (DF_20) to Q (DF_25) at "H", the latch circuits DLA_R1 to DLA_R6, DLA_G1 to DLA_G6, and DLA_B1 to DLA_B6 load incoming gray-scale data and output the gray-scale data through their output sections Q, respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data "R1" to "R6" in sequence in accordance with the "H" pulses Q (DF_20) to Q (DF_25), respectively. Similarly, the latch circuits DLA_G1 to DLA_G6 load gray-scale data "G1" to "G6" in sequence in accordance with the "H" pulses Q (DF_20) to Q (DF_25), respectively. Similarly, the latch circuits DLA_B1 to DLA_B6 load gray-scale data "B1" to "B6" in sequence in accordance with the "H" pulses Q (DF_20) to Q (DF_25), respectively.

Then, the latch circuits DLA_R1 to DLA_R6, DLA_G1 to DLA_G6, and DLA_B1 to DLA_B6 hold the loaded gray-scale data while Q (DF_20) to Q (DF_25) are "L".

For example, while receiving Q (DF_20) at "H", the latch circuit DLA_R1 loads the gray-scale data "R1" through the DATAR signal line. After that, by the time Q (DF_20) becomes "L", the latch circuit DLA_R1 has been receiving the gray-scale data "R1" through the DATAR signal line; therefore, the latch circuit DLA_R1 holds "R1" thereafter as the output Q (DLA_R1) through its output section Q. Similarly, when Q (DF_20) to Q (DF_25) become "L", DLA_R2 to DLA_R6 hold the gray-scale data "R2" to "R6" thereafter as the outputs through their output sections Q, respectively. At this point, the hold circuits DLB_R1 to DLB_R6 receive the data, which have been held at the output sections Q of DLA_R1 to DLA_R6, through their input sections D, respectively.

Further, while receiving Q (DF_20) at "H", the latch circuit DLA_G1 loads the gray-scale data "G1" through the DATAG signal line. After that, by the time Q (DF_20) becomes "L", the latch circuit DLA_G1 has been receiving the gray-scale data "G1" through the DATAG signal line; therefore, the latch circuit DLA_G1 holds "G1" thereafter as the output Q (DLA_G1) through its output section Q. Similarly, when Q (DF_20) to Q (DF_25) become "L", DLA_G2 to DLA_G6 hold the gray-scale data "G2" to "G6" thereafter as the outputs through their output sections Q, respectively. At this point, the hold circuits DLB_G1 to DLB_G6 receive the data, which have been held at the output sections Q of DLA_G1 to DLA_G6, through their input sections D, respectively.

Further, while receiving Q (DF_20) at "H", the latch circuit DLA_B1 loads the gray-scale data "B1" through the DATAB signal line. After that, by the time Q (DF_20) becomes "L", the latch circuit DLA_B1 has been receiving the gray-scale data "B1" through the DATAB signal line; therefore, the latch circuit DLA_B1 holds "B1" thereafter as the output Q (DLA_B1) through its output section Q. Similarly, when Q (DF_20) to Q (DF_25) become "L", DLA_B2 to DLA_B6 hold the gray-scale data "B2" to "B6" thereafter as the outputs through their output sections Q, respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 8 and, as such, is not described here.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIG. 44.

Figure 44:
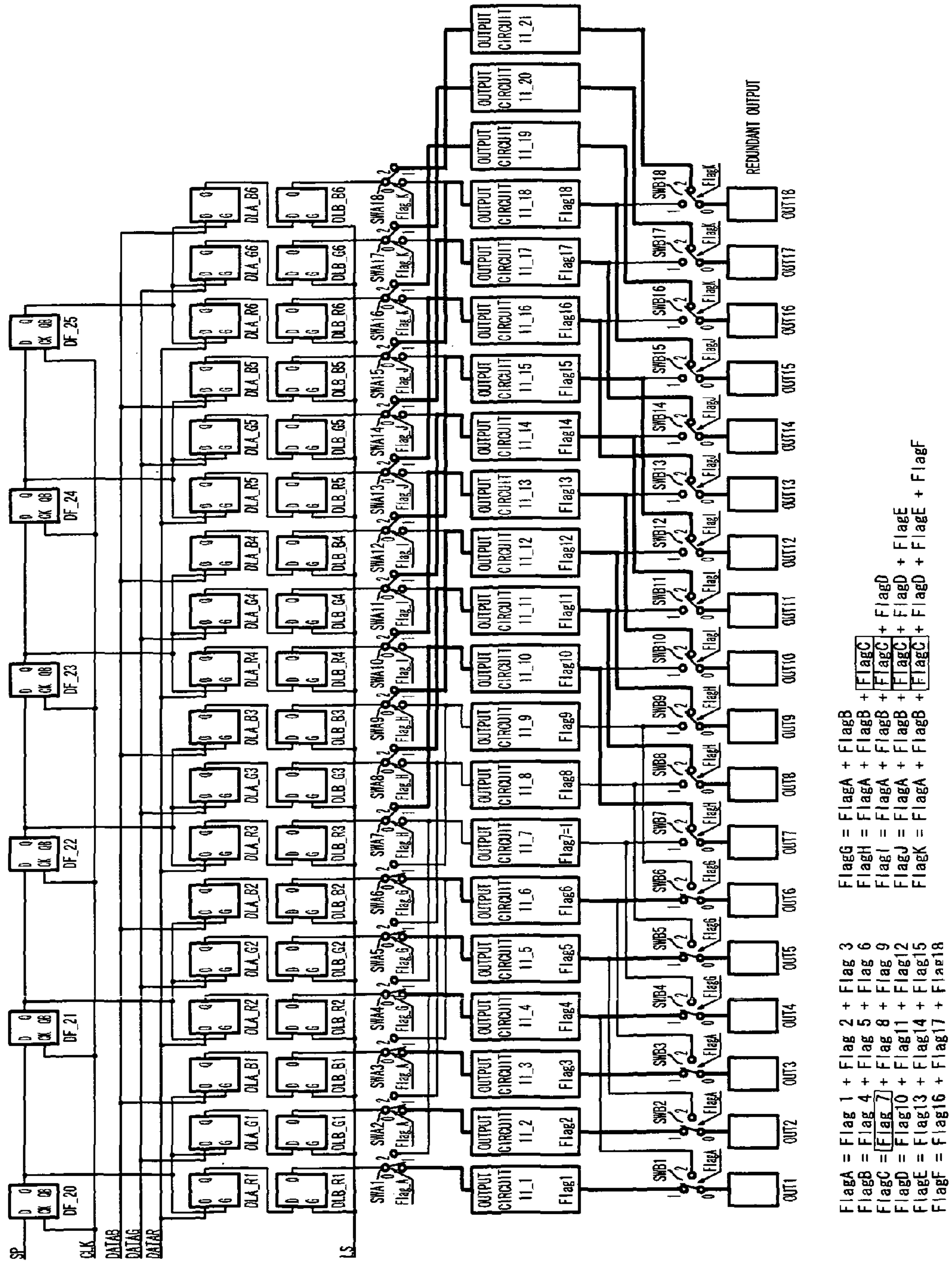
FIG. 44 shows the configuration of the integrated circuit for self-repairing operation in accordance with Embodiment 8.

FIG. 44 shows the state of the integrated circuit 10 for self-repairing operation in accordance with the present embodiment. When the integrated circuit 10 has Flag7 set to "1" in the presence of an abnormality in the output circuit 11_7. FlagC to FlagK, each calculated according to an OR including Flag7, become "1". For this reason, SWA7 to SWA18 change from connecting their terminals 0 to their terminals 1 to connecting their terminals 0 to their terminals 2, respectively.

Thus, the output circuit 11_7 to 11_9 have their inputs open, whereby the output sections Q of the hold circuit DLB_R3, DLB_G3, and DLB_B3 are connected to the output circuits 11_10, 11_11, and 11_12, respectively. That is, Q (DLB_R3), Q (DLB_G3), and Q (DLB_B3) are supplied to the output circuits 11_10, 11_11, and 11_12, respectively.

Similarly, the hold circuits DLB and the output circuits 11 are connected with each RGB block shifted in sequence. Finally, the output sections Q of the hold circuits DLB_R6, DLB_G6, and DLB_B6 are connected to the spare output circuits 11_19, 11_20, and 11_21, respectively, whereby Q (DLB_R6), Q (DLB_G6), and Q (DLB_B6) are supplied to the spare output circuits 11_19, 11_20, and 11_21, respectively. Therefore, in the presence of an abnormality in the output circuit 11_7, the integrated circuit 10 according to the present invention uses the switches so that the output circuits 11_7, 11_8, and 11_9 no longer receive any gray-scale data.

Further, at this point in the integrated circuit 10, as shown in FIG. 44, the switches SWB7 to SWB18, which are controlled by FlagH to FlagK, have changed from connecting their terminals 0 to their terminals 1 to connecting their terminals 0 to their terminals 2, respectively; therefore, the output circuits 11_7, 11_8, and 11_9 are no longer connected to any of the output terminals OUT1 to OUT18.

Then, the sets of three output circuits for outputting RGB gray-scale voltages are shifted in sequence to be connected to the output terminals as follows: the output circuits 11_10 to 11_12 are connected to the output terminals OUT7 to OUT9, respectively; and the output circuits 11_13 to 11_15 are connected to the output terminals OUT10 to OUT12, respectively. Finally, the spare output circuits 11_19 to 11_21 are connected to the output terminals OUT16 to OUT18, respectively.

As described above, the configuration capable of self-repairing is realized by: (i) disconnecting a defective output circuit, if detected, by switching connections between the latch circuits and the output circuits and switching connections between the output circuits and the output terminals, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 (11_1, 11_4, . . . ) corresponding to R, by which the display colors are constituted, uses its operational amplifier to compare a voltage outputted from its DAC circuit with a voltage outputted from the DAC circuit of the output circuit 11_19. Similarly, each of the output circuits 11 (11_2, 11_5, . . . ) corresponding to G, by which the display colors are constituted, uses its operational amplifier to compare a voltage outputted from its DAC circuit with a voltage outputted from the DAC circuit of the output circuit 11_20, and each of the output circuits 11 (11_3, 11_6, . . . ) corresponding to B, by which the display colors are constituted, uses its operational amplifier to compare a voltage outputted from its DAC circuit with a voltage outputted from the DAC circuit of the output circuit 11_21. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Embodiment 9

Embodiment 9 of the present invention is described below with reference to FIGS. 45 and 46.

(Configuration of a Self-Repairing Circuit)

First, the configuration of a display driving semiconductor integrated circuit (hereinafter referred to as "integrated circuit) 10 according to the present embodiment is described with reference to FIG. 45. As explained in FIG. 41 in [Embodiment 7], eighteen outputs are abstracted for explanation. However, the number of outputs from the integrated circuit 10 is not limited to 18.

Figure 45:
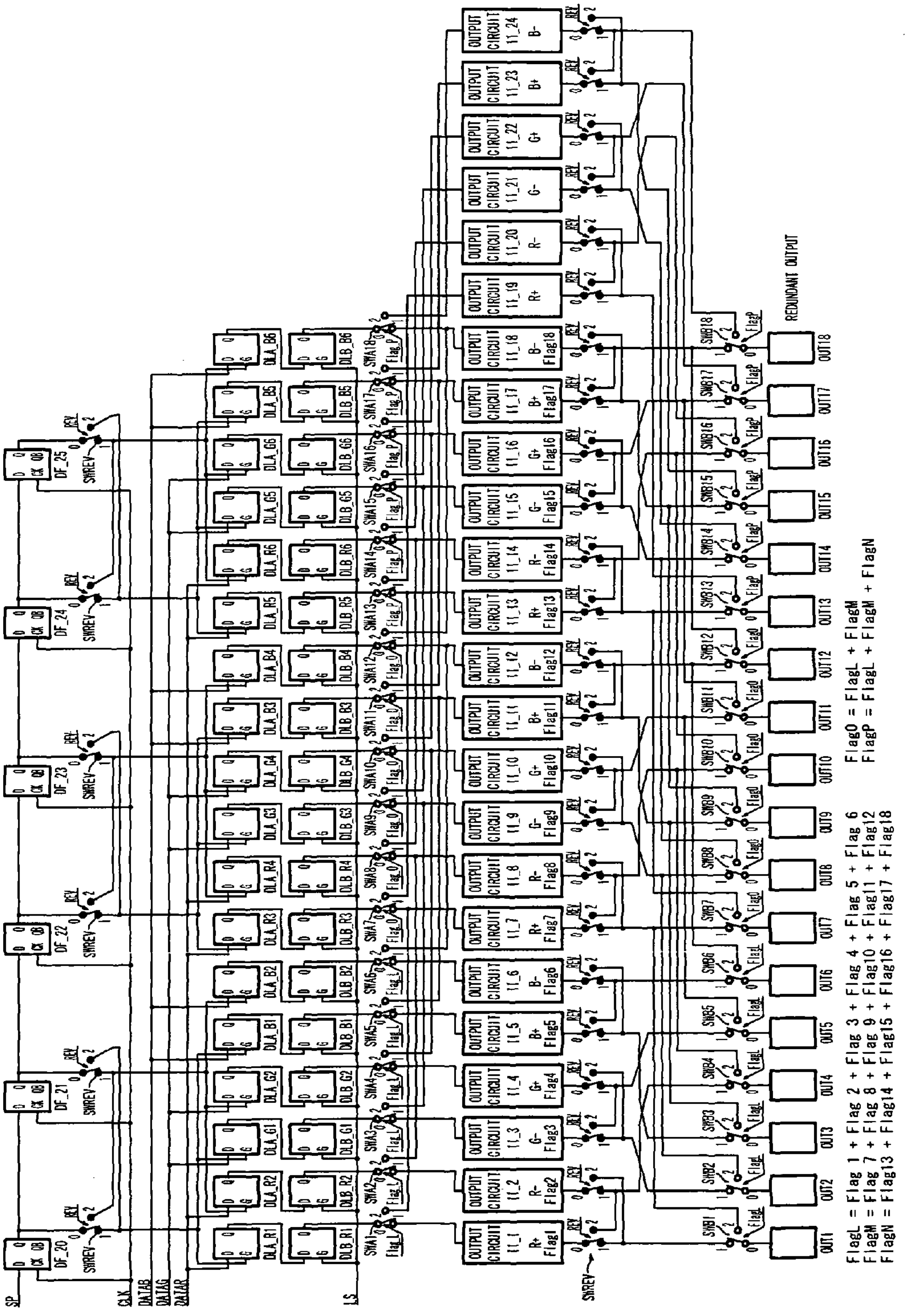
FIG. 45 shows the configuration of an integrated circuit for normal operation in accordance with Embodiment 9.

FIG. 45 shows the configuration of the integrated circuit for normal operation in accordance with the present embodiment. The integrated circuit 10 includes: a D flip-flop_20 to a D flip-flop_25; switches SWA1 to SWA18; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; signal output terminals OUT1 to OUT18; and spare output circuits 11_19 to 11_24.

The integrated circuit 10 is connected to a display device (not shown) through the output terminals OUT1 to OUT18 to drive the display device.

In the present embodiment, the output sections as set forth in the claims correspond to separate output circuits 11 (output circuits 11_1, 11_2, 11_3, 11_4, 11_5, and 11_6, respectively), and each of the video signal output sections as set forth in the claims corresponds to a block composed of output circuits 11 arranged in a row to correspond to positive and negative gray-scale voltages for each of the primary colors R, G, and B, by which the display colors are constituted (e.g., a block composed of the output circuits 11_1 to 11_6).

Further, the sub-latch circuits as set forth in the claims correspond to separate latch circuits DLA (e.g., the latch circuits DLA_R1, DLA_G1, DLA_B1, DLA_R2, DLA_G2, and DLA_B2, respectively), and the sub-hold circuits as set forth in the claims correspond to separate hold circuits DLB (e.g., the latch hold circuits DLB_R1, DLB_G1, DLB_B1, DLB_R2, DLB_G2, and DLB_B2, respectively). Each of the latch circuits as set forth in the claim corresponds to a block composed of latch circuits DLA arranged in a row to correspond to positive and negative gray-scale voltages for each of the primary colors R, G, and B, by which the display colors are constituted (e.g., a block composed of the latch circuits DLA_R1, DLA_G1, DLA_B1, DLA_R2, DLA_G2, and DLA_B2), and each of the hold circuits as set forth in the claim corresponds to a block composed of hold circuits DLB arranged in a row to correspond to positive and negative gray-scale voltages for each of the primary colors R, G, and B (e.g., a block composed of the hold circuits DLB_R1, DLB_G1, DLB_B1, DLB_R2, DLB_G2, and DLB_B2).

Further, the sub-output terminals as set forth in the claims correspond to the output terminals OUT1 to OUT18, respectively, and each of the output terminals as set forth in the claims corresponds to a set of six output terminals (e.g., OUT1 to OUT6) disposed to correspond to such a video signal output section.

Further, DF_20 to DF_25 constitute a pointer shift register circuit, and each of them (e.g., DF_20) includes a connection terminal that is connected to latch circuits DLA in a unit of three colors R, G, and B (e.g., DLA_R1, DLA_G1, and DLA_B1).

The integrated circuit 10 according to the present embodiment receives gray-scale data of the three primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 45, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Further, each of the output circuits 11_1 to 11_18 of the integrated circuit 10 is a circuit that corresponds only to either a positive dot-inversion driving voltage output or a negative dot-inversion driving voltage output. In FIG. 45, the odd-numbered output circuits 11_1, 11_3, 11_5, . . . correspond to positive voltage outputs, and the even-numbered output circuits 11_2, 11_4, 11_6, . . . correspond to negative voltage outputs. Moreover, in order to carry out dot inversion drive, it is necessary to be able to output both positive and negative voltages to each output terminal. Accordingly, the integrated circuit 10 controls switching of the switches SWREV in accordance with a control signal REV to change the timing of sampling of gray-scale data by changing connections of the selection signal lines to the output circuits and the output terminals, thus realizing the switch between positive and negative voltages.

Furthermore, as shown in FIG. 45, the integrated circuit 10 includes the spare output circuits 11_19 to 11_24.

The switches SWA1 to SWA18 are provided between the hold circuits DLB_R1 to DLB_R6, DLB_G1 to DLB_G6, and DLB_B1 to DLB_B6 and the output circuits 11_1 to 11_18. The switches SWB1 to SWB18 are provided between the output circuits 11_1 to 11_24 and the output terminals OUT1 to OUT18. Further, the hold circuits DLB_R1 to DLB_R6, DLB_G1 to DLB_G6, and DLB_B1 to DLB_B6, connected to the latch circuits DLA_R1 to DLA_R6, DLA_G1 to DLA_G6, and DLA_B1 to DLA_B6 respectively, form blocks corresponding to latch sections.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA1 to SWAG, the states of connection in SWA7 to SWA12, and the states of connection in SWA13 to SWA18 are determined by the values of FlagI, FlagO, and FlagP, respectively. Further, the states of connection in SWB1 to SWB6, the states of connection in SWB7 to SWB12, and the states of connection in SWB13 to SWB18, are determined by the values of FlagL, FlagO, and FlagP, respectively. FlagL to FlagP are determined by combinations of Flag1 to Flag18, and the combinations are shown as logical expressions in the lower part of FIG. 45.

Although not shown, there is no particular limit on the specific configuration for generating FlagL to FlagP, so long as it can perform logical operations as shown in FIG. 45.

When the values of FlagL, FlagO, and FlagP are "0", SWA1 to SWA18 connect their terminals 0 to their terminals 1, respectively. On the other hand, when the values of FlagL, FlagO, and FlagP are "1", SWA1 to SWA18 connect their terminals 0 to their terminals 2, respectively. For example, when the values of Flag1 to Flag6 are "0", i.e., when the operation of the output circuits 11_1 to 11_6 is good, FlagL is "0" according to the logical expression shown in FIG. 45, whereby SWA1 connects its terminal 0 to its terminal 1. On the other hand, when any of the values of Flag1 to Flag6 is "1", i.e., when the operation of any of the output circuits 11_1 to 11_6 is defective, FlagL is "1", whereby SWA1 connects its terminal 0 to its terminal 2. In FIG. 45, the signals (FlagL to FlagP) for determining the states of the switches SWA1 to SWA18 and SWB1 to SWB18 are indicated by arrows. It should be noted that FlagL to FlagN are determined by a control section (not shown). Moreover, the connection switching means as set forth in the claims corresponds to a control section (not shown) and SWB1 to SWB18. Moreover, the selecting means as set forth in the claims corresponds to a control section (not shown) and SWA1 to SWA18.

(Normal Operation)

Next, the operation of the integrated circuit 10 without a defective output circuit, i.e. normal operation, is described below with reference to FIG. 45. As mentioned above, FIG. 45 shows the configuration of the integrated circuit 10 for normal operation in accordance with the present embodiment. The present embodiment describes a state in which each of the switches SWREV has connected its terminal 0 to its terminal 1.

In the absence of a defective output circuit, Flag 1 to Flag18 in the output circuits 11_1 to 11_18 are all "0". Accordingly, FlagL to FlagP, constituted by the ORs of combinations of Flag1 to Flag18 respectively, are all "0", too.

The following describes the operation of the integrated circuit 10. Each of the DFs, which constitute the pointer shift register, receives a clock signal through the CLK signal line and, at the timing of a rise in the CLK signal, outputs through its output section Q a signal as received through its input section D. Then, the output signals from the output sections Q of DF_20 to DF_25 are inputted to the input sections D of the next DFs and inputted as selection signals to the latch circuits DLA connected to the output sections Q, respectively. Each of the selection signals serves as a signal for selecting which of the latch circuits latches incoming gray-scale data.

First, the first stage DF_20 of the pointer shift register circuit receives an operation start pulse signal (SP signal) through the SP signal line. The first stage DF_20 of the pointer shift register circuit loads a "H" pulse of the SP signal at the timing of a rise in the CLK signal and outputs the "H" signal through its output section Q. At the next rising edge of the CLK signal, the SP signal is "L" and, accordingly, the first stage DF_20 of the pointer shift register circuit outputs an "L" signal through its output section Q. At the timing of a rise in the CLK signal, each of DF_21 to DF_25, as with DF_20, outputs through its output section Q a signal as received through its input section D. Thus, DF_20 to DF_25 take turns outputting a "H" pulse signal for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, shifts in R gray-scale data from R1 to R2 and so forth, shifts in G gray-scale data from G1 to G2 and so forth, or shifts in B gray-scale data from B1 to B2 and so forth are made in synchronization with the timing of falls in the CLK signal. Each of the latch circuits DLA loads a signal through its input section D and outputs the signal through its output section Q, while receiving a "H" selection signal through its gate G. That is, while receiving Q (DF_20) to Q (DF_25) at "H", the latch circuits DLA_R1 to DLA_R6, DLA_G1 to DLA_G6, and DLA_B1 to DLA_B6 load incoming gray-scale data and output the gray-scale data through their output sections Q, respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data "R1" to "R6" in sequence in accordance with the "H" pulses Q (DF_20) to Q (DF_25), respectively. Similarly, the latch circuits DLA_G1 to DLA_G6 load gray-scale data "G1" to "G6" in sequence in accordance with the "H" pulses Q (DF_20) to Q (DF_25), respectively. Similarly, the latch circuits DLA_B1 to DLA_B6 load gray-scale data "B1" to "B6" in sequence in accordance with the "H" pulses Q (DF_20) to Q (DF_25), respectively.

Then, the latch circuits DLA_R1 to DLA_R6, DLA_G1 to DLA_G6, and DLA_B1 to DLA_B6 hold the loaded gray-scale data while Q (DF_20) to Q (DF_25) are "L".

For example, while receiving Q (DF_20) at "H", the latch circuit DLA_R1 loads the gray-scale data "R1" through the DATAR signal line. After that, by the time Q (DF_20) becomes "L", the latch circuit DLA_R1 has been receiving the gray-scale data "R1" through the DATAR signal line; therefore, the latch circuit DLA_R1 holds "R1" thereafter as the output Q (DLA_R1) through its output section Q. Similarly, when Q (DF_20) to Q (DF_25) become "L", DLA_R2 to DLA_R6 hold the gray-scale data "R2" to "R6" thereafter as the outputs through their output sections Q, respectively. At this point, the hold circuits DLB_R1 to DLB_R6 receive the data, which have been held at the output sections Q of DLA_R1 to DLA_R6, through their input sections D, respectively.

Further, while receiving Q (DF_20) at "H", the latch circuit DLA_G1 loads the gray-scale data "G1" through the DATAG signal line. After that, by the time Q (DF_20) becomes "L", the latch circuit DLA_G1 has been receiving the gray-scale data "G1" through the DATAG signal line; therefore, the latch circuit DLA_G1 holds "G1" thereafter as the output Q (DLA_G1) through its output section Q. Similarly, when Q (DF_20) to Q (DF_25) become "L", DLA_G2 to DLA_G6 hold the gray-scale data "G2" to "G6" thereafter as the outputs through their output sections Q, respectively. At this point, the hold circuits DLB_G1 to DLB_G6 receive the data, which have been held at the output sections Q of DLA_G1 to DLA_G6, through their input sections D, respectively.

Further, while receiving Q (DF_20) at "H", the latch circuit DLA_B1 loads the gray-scale data "B1" through the DATAB signal line. After that, by the time Q (DF_20) becomes "L", the latch circuit DLA_B1 has been receiving the gray-scale data "B1" through the DATAB signal line; therefore, the latch circuit DLA_B1 holds "B1" thereafter as the output Q (DLA_B1) through its output section Q. Similarly, when Q (DF_20) to Q (DF_25) become "L", DLA_B2 to DLA_B6 hold the gray-scale data "B2" to "B6" thereafter as the outputs through their output sections Q, respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 1 and, as such, is not described here.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIG. 46.

Figure 46:
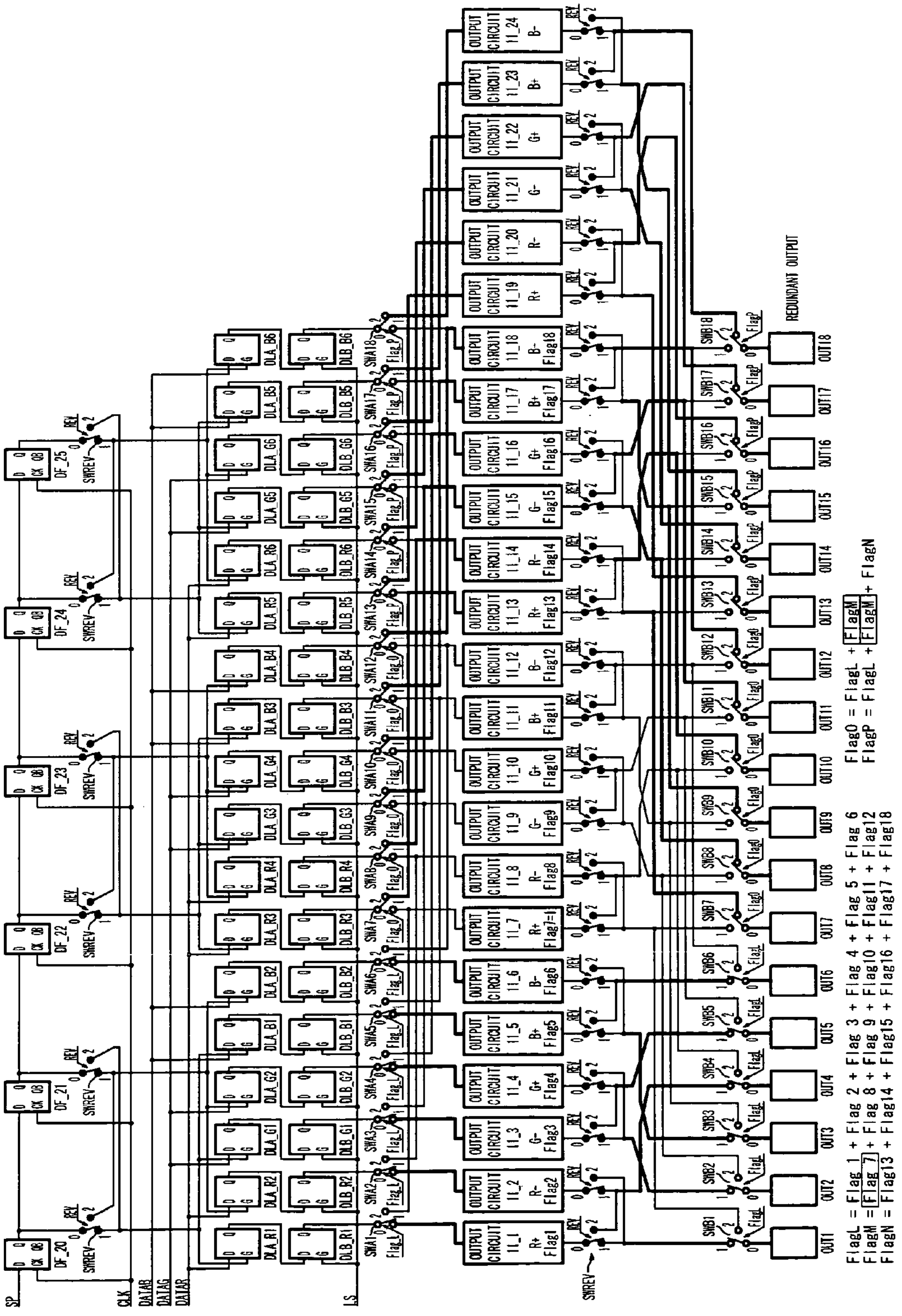
FIG. 46 shows the configuration of the integrated circuit for self-repairing operation in accordance with Embodiment 9.

FIG. 46 shows the state of the integrated circuit 10 for self-repairing operation in accordance with the present embodiment. When the integrated circuit 10 has Flag7 set to "1" in the presence of an abnormality in the output circuit 11_7. FlagC to FlagK, each calculated according to an OR including Flag7, become "1". For this reason, SWA7 to SWA18 change from connecting their terminals 0 to their terminals 1 to connecting their terminals 0 to their terminals 2, respectively.

Thus, the output circuit 11_7 to 11_12 have their inputs open, whereby the output sections Q of the hold circuit DLB_R3, DLB_R4, DLB_G3, DLB_G4, DLB_B3, and DLB_B4 are connected to the output circuits 11_13 to 11_18, respectively. That is, Q (DLB_R3), Q (DLB_R4), Q (DLB_G3), Q (DLB_G4), Q (DLB_B3), and Q (DLB_B4) are supplied to the output circuits 11_13 to 11_18, respectively.

Similarly, the hold circuits DLB and the output circuits 11 are connected with each RGB block shifted in sequence. Finally, the output sections Q of the hold circuits DLB_R5, DLB_R6, DLB_G5, DLB_G6, DLB_B5, and DLB_B6 are connected to the spare output circuits 11_19 to 11_24, respectively, whereby Q (DLB_R5), Q (DLB_R6), Q (DLB_G5), Q (DLB_G6), Q (DLB_B5), and Q (DLB_B6) are supplied to the spare output circuits 11_19 to 11_24, respectively. Therefore, in the presence of an abnormality in the output circuit 11_7, the integrated circuit 10 according to the present invention uses the switches so that the output circuits 11_7, 11_8, 11_9, 11_10, 11_11, and 11_12 no longer receive any gray-scale data.

Further, at this point in the integrated circuit 10, as shown in FIG. 46, the switches SWB7 to SWB18, which are controlled by FlagO and FlagP, have changed from connecting their terminals 0 to their terminals 1 to connecting their terminals 0 to their terminals 2, respectively; therefore, the output circuits 11_7, 11_8, 11_9, 11_10, 11_11, and 11_12 are no longer connected to any of the output terminals OUT1 to OUT18.

Then, the sets of six output circuits for outputting positive and negative RGB gray-scale voltages are shifted in sequence to be connected to the output terminals as follows: the output circuits 11_13, 11_15, 11_17, 11_14, 11_16, and 11_18 are connected to the output terminals OUT7 to OUT12, respectively. Finally, the spare output circuits 11_19 to 11_24 are connected to the output terminals OUT13 to OUT18, respectively.

As described above, the configuration capable of self-repairing is realized by: (i) disconnecting a defective output circuit, if detected, by switching connections between the latch circuits and the output circuits and switching connections between the output circuits and the output terminals, so as to shift from one normal circuit to another in sequence; and (ii) adding the spare circuits.

Further, the integrated circuit 10 according to the present embodiment may detect a failure in its output circuits 11 by using the first failure detection method described in Embodiment 1. Specifically, each of the output circuits 11 receives an output voltage from the DAC of a spare output circuit 11 identical in primary color, by which the display colors are constituted, and identical in polarity of gray-scale voltage for dot inversion drive. Then, the output circuit 11 uses its operational amplifier to compare the voltage received from the DAC of the spare output circuit with a voltage outputted from the DAC of the output circuit 11. Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Furthermore, the integrated circuit 10 according to the present embodiment may detect a failure in its output circuits 11 by using the second failure detection method described in Embodiment 1. Specifically, each of the output circuits 11 uses its operational amplifier to compare a voltage outputted from its DAC circuit with a voltage outputted from the DAC circuit of an output circuit 11 paired with the output circuit 11. The output circuit 11_1 uses its operational amplifier to compare a voltage outputted from its DAC with a voltage outputted from the DAC of the output circuit 11_2, and the output circuit 11_2 uses its operational amplifier to compare a voltage outputted from its DAC with a voltage outputted from the DAC of the output circuit 11_1. The same applies to the output circuits 11_3 and 11_4, the output circuits 11_5 and 11_6, . . . . Thus, the decision circuits of the output circuits 11 determine the quality of the output circuits 11 in accordance with results of the comparisons made by the operational amplifiers, and the output circuits 11 send Flag1 to Flag18 to the control circuit and the switches SWA and SWB in accordance with results of the determinations made by the decision circuits, respectively. It should be noted that the configuration in which and method by which the integrated circuit 10 carries out self-repairs in accordance with the values of Flag1 to Flag18 are the same as those previously mentioned.

Embodiment 10

Embodiment 10 of the present invention is described below with reference to FIGS. 47 and 48.

(Configuration of a Self-Repairing Circuit)

First, the configuration of a display driving semiconductor integrated circuit (hereinafter referred to as "integrated circuit") 10 capable of self-repairing in accordance with the present embodiment is described with reference to FIG. 47. For simplicity of explanation, a configuration of eighteen outputs is described as in the description of the conventional integrated circuit of FIG. 53. However, the integrated circuit 10 is not limited to a configuration of eighteen outputs.

FIG. 47 shows the configuration of the integrated circuit for normal operation in accordance with the present embodiment. The integrated circuit 10 includes: a D flip-flop_1 to a D flip-flop_18; switches SWA1 to SWA18; latch circuits DLA_1 to DLA_18; hold circuits DLB_1 to DLB_18; output circuits 11_1 to 11_18; switches SWB1 to SWB18; signal output terminals OUT1 to OUT18; a spare hold circuit DLB_19; and a spare output circuit 11_19.

The integrated circuit 10 is connected to a display device (not shown) through the output terminals OUT1 to OUT18 to drive the display device.

Each of the output circuits 11 includes: a DAC (digital-analog converter) circuit for converting gray-scale data into a gray-scale voltage signal; an operational amplifier that serves as a buffer circuit; a decision circuit (decision section) for determining the quality of operation of the output circuit; and a decision flag for indicating the quality of operation as determined by the decision circuit. It should be noted, in FIG. 47, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18; respectively. Further, the decision flag is set to "0" when the output circuit is good and is set to "1" when the output circuit is defective.

The switches SWA1 to SWA18 are provided between DLA_1 to DLA_18 and DLB_1 to DLB_19. The switches SWB1 to SWB18 are provided between the output circuits 11_1 to 11_19 and the output terminals OUT1 to OUT18. Further, DLB_1 to DLB_19, connected to the output circuits 11_1 to 11_19 respectively, form a block corresponding to a video signal output section.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of Flag1 to Flag18. More specifically, the states of connection in SWA1 to SWA18 and SWB1 to SWB18 are determined by the values of Flag_X1 to Flag_X18, respectively. Flag_X1 to Flag_X18 are determined by combinations of Flag1 to Flag18, and the combinations are shown as logical expressions in the lower part of FIG. 47. Flag_X1 to Flag_X18 are determined by a control section (not shown). Moreover, the connection switching means as set forth in the claims corresponds to a control section (not shown) and SWB1 to SWB18. Moreover, the selecting means as set forth in the claims corresponds to a control section (not shown) and SWA1 to SWA18.

The latch circuits DLA_1 to DLA_18 and hold circuits DLB_1 to DLB_18, which latch digital signals representing gray-scale data inputted through the DATA signal line, are each shown as a single circuit in FIG. 47. However, when the incoming gray-scale data is 6-bit data, six latch circuits DLA_1 to six latch circuits DLA_18 and six hold circuits DLB_1 to six hold circuits DLB_18 are needed; and when the incoming gray-scale data is 8-bit data, eight latch circuits DLA_1 to eight latch circuits DLA_18 and eight hold circuits DLB_1 to eight hold circuits DLB_18 are needed. To avoid complexity of explanation, the latch circuits DLA_1 to DLA_18 and the hold circuits DLB_1 to DLB_18 are each represented by a single circuit.

(Normal Operation)

Next, the operation of the integrated circuit 10 without a defective output circuit, i.e. normal operation, is described below with reference to FIG. 47. As mentioned above, FIG. 47 shows the configuration of the integrated circuit 10 for normal operation in accordance with the present embodiment.

In the absence of a defective output circuit, Flag1 to Flag18 in the output circuits 11 are all "0". Accordingly, Flag_X1 to Flag_X18, constituted by the ORs of combinations of Flag1 to Flag18 respectively, are all "0", too. Therefore, as shown in FIG. 47, each of the switches SWA1 to SWA18 in the integrated circuit 10 has its terminal 0 connected to its terminal 1, whereby the integrated circuit 10 is configured in the same manner as the conventional circuit of FIG. 54.

The following describes the operation of the integrated circuit 10. The integrated circuit 10 has a pointer shift register, constituted by DF_1 to DF_18, whose operation is the same as that of the pointer shift register of the integrated circuit 10 in Embodiment 1.

First, the first stage DF_1 of the pointer shift register circuit receives an operation start pulse signal (SP signal) through the SP signal line. The first stage DF_1 of the pointer shift register circuit loads a "H" pulse of the SP signal at the timing of a rise in the CLK signal and outputs the "H" signal through its output section Q. At the next rising edge of the CLK signal, the SP signal is "L" and, accordingly, the first stage DF_1 of the pointer shift register circuit outputs an "L" signal through its output section Q. At the timing of a rise in the CLK signal, each of DF_2 to DF_18, as with DF_1, outputs through its output section Q a signal as received through its input section D. Thus, DF_1 to DF_18 take turns outputting a "H" pulse signal for each and every single clock pulse.

The latch circuits receive gray-scale data through the DATA signal line. Shifting of the gray-scale data received through the DATA signal line is performed at every falling edge of the CLK signal. That is, shifts from D1 to D2, from D2 to D3, and so forth are made in synchronization with the timing of falls in the CLK signal. Each of the latch circuits loads a signal through its input section D and outputs the signal through its output section Q, while receiving a "H" signal through its gate G. That is, while receiving Q (DF_1) to Q (DF_18) at "H", the latch circuits DLA_1 to DLA_18 load incoming gray-scale data and output the gray-scale data through their output sections Q, respectively.

Thus, with the latch circuits DLA_1 to DLA_18 being selected in sequence in synchronization with the timing of shifting of the gray-scale data, the latch circuits DLA load gray-scale data corresponding to video signals to be outputted through the output terminals corresponding to the latch circuits, respectively. That is, the latch circuits DLA_1 to DLA_18 load gray-scale data "D1" to "D18" in sequence in accordance with the "H" pulses Q (DF_1) to Q (DF_18), respectively. Further, the latch circuits DLA_1 to DLA_18 hold the loaded gray-scale data while Q (DF_1) to Q (DF_18) are "L".

For example, while receiving Q (DF_1) at "H", the latch circuit DLA_1 loads the gray-scale data "D1" through the DATA signal line. After that, by the time Q (DF_1) becomes "L", the latch circuit DLA_1 has been receiving the gray-scale data "D1" through the DATA signal line; therefore, the latch circuit DLA_1 holds "D1" thereafter as the output Q (DLA_1) through its output section Q.

Further, because the next stage DF_2 has also been receiving Q (DF_1) through its input section D and Q (DF_1) is yet to become "L" (i.e., Q (DF_1) is in a "H" state) at the timing of a rise in the CLK signal inputted into DF_2, DF_2 outputs Q (DF_2) at "H" through its output section Q. Then, while receiving Q (DF_2) at "H", DLA_2 loads the gray-scale data "D2" through the DATA signal line. After that, by the time Q (DF_2) becomes "L", the latch circuit DLA_2 has been receiving the gray-scale data "D2" through the DATA signal line; therefore, the latch circuit DLA_2 holds "D2" thereafter as the output Q (DLA_2) through its output section Q.

Similarly, when Q (DF_3) to Q (DF_18) become "L", DLA_2 to DLA_18 hold the gray-scale data "D2" to "D18" as the outputs (DLA_2) to Q (DLA_18) through their output sections Q, respectively.

As described above, the DFs, which constitute the pointer shift register, shift a pulse in sequence starting from DF_1 and, in accordance with the pulse, DLA_1 to DLA_18 load the gray-scale data "D1" to "D18" through the DATA signal line, respectively. Moreover, the hold circuits DLB_1 to DLB_18 receive the gray-scale data "D1" to "D18", which have been held at the output sections Q of DLA_1 to DLA_18, through their input sections D, respectively.

Furthermore, after DLA_1 to DLA_18 starts loading the gray-scale data in sequence, respectively, and DLA_18 finishes loading the data, the integrated circuit 10 of FIG. 47 inputs a "H" pulse" through the LS signal line. That is, the hold circuits DLB_1 to DLB_18 receive a "H" pulse through their gates G. Thus, DLB_1 to DLB_18 output the gray-scale data "D1" to "D18", which have been inputted through their input sections D, through their output sections Q, respectively. As a result of this operation, the output circuits receive the gray-scale data "D1" to "D18" loaded in sequence by the DLA_1 to DLA_18, respectively. Then, the output circuits 11 convert the digital gray-scale data into gray-scale voltages (i.e., video signals), and then send the gray-scale voltages corresponding to the gray-scale data "D1" to "D18" through the corresponding output terminals OUT1 to OUT18, respectively.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIG. 48.

Figure 48:
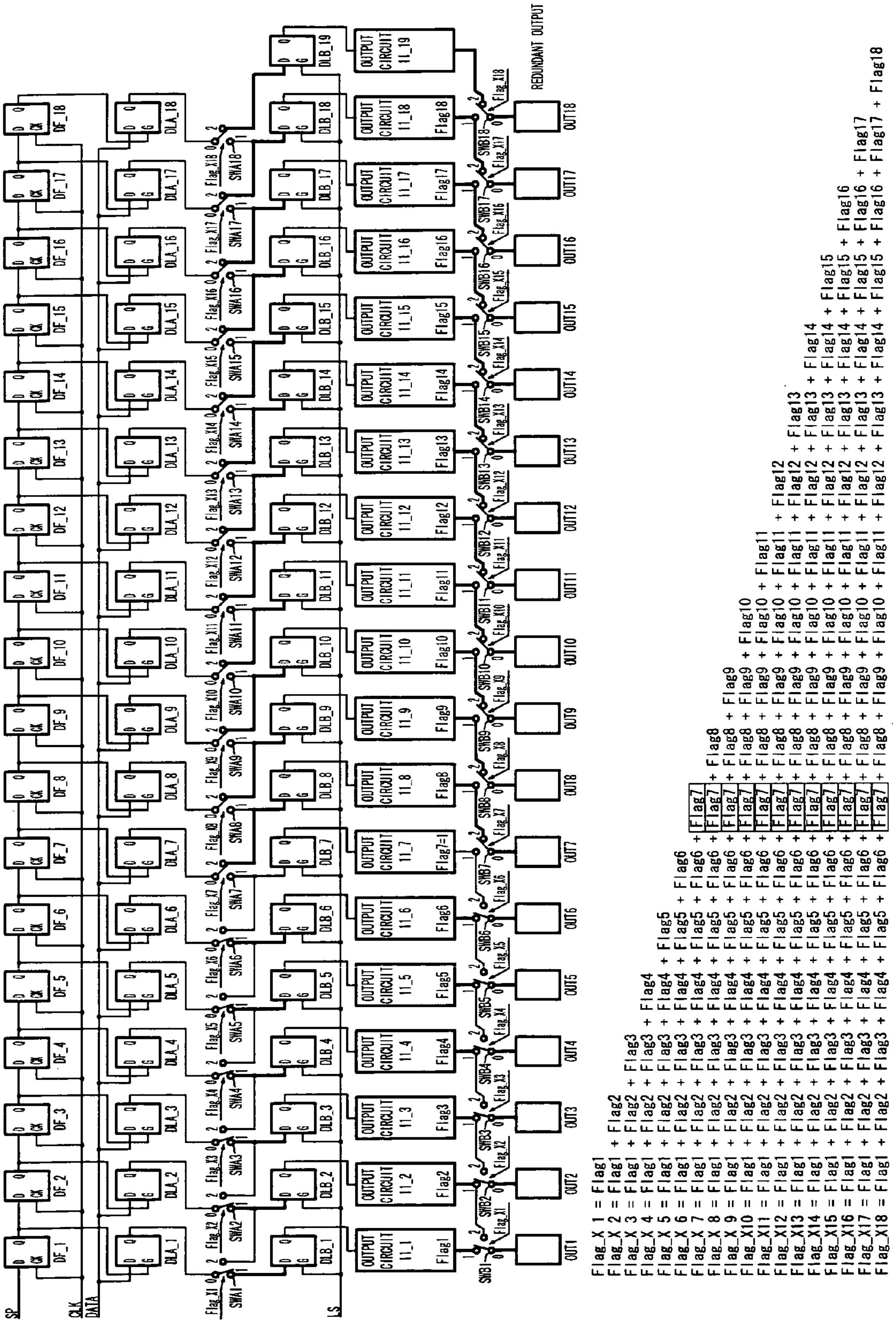
FIG. 48 shows the configuration of the integrated circuit for self-repairing operation in accordance with Embodiment 10.

FIG. 48 shows the configuration of the integrated circuit 10 for self-repairing operation in accordance with the present embodiment. When the integrated circuit 10 has Flag7 set to "1" in the presence of an abnormality in the output circuit 11_7. Flag_X7 to Flag_X18, each calculated according to an OR including Flag7, become "1". For this reason, SWA7 to SWA18 change from connecting their terminals 0 to their terminals 1 to connecting their terminals 0 to their terminals 2, respectively.

Thus, the hold circuit DLB_7, would normally be connected to the output circuit 11_7, has its input open, whereby the latch circuits DLA are connected to the hold circuits DLB in a one-stage shifted manner as follows: the output section Q of the latch circuit DLA_7 is connected to the hold circuit DLB_8; the output section Q of the latch circuit DLA_8 is connected to the hold circuit DLB_9; and the output section Q of the latch circuit DLA_9 is connected to the hold circuit DLB_10. Finally, the output section Q of the latch circuit DLA_18 is connected to the spare hold circuit DLB_19. Therefore, the integrated circuit 10 according to the present invention uses the switches so that the block composed of the abnormal output circuit 11_7 and the hold circuit DLB_7 no longer receives any gray-scale data.

Further, at this point in the integrated circuit 10, as shown in FIG. 48, the switches SWB7 to SWB18, which are controlled by Flag_X7 to Flag_X18, have changed from connecting their terminals 0 to their terminals 1 to connecting their terminals 0 to their terminals 2, respectively; therefore, the output circuit 11_7 is no longer connected to any of the output terminals OUT1 to OUT18. Then, the output circuits are shifted in sequence to be connected to the output terminals as follows: the output circuit 11_8 is connected to the output terminal OUT7; and the output circuit 11_9 is connected to the output terminal OUT8. Finally, the spare output circuit 11_19 is connected to the output terminal OUT18.

As described above, the configuration capable of self-repairing is realized by: (i) disconnecting a defective output circuit, if detected, by switching connections between the latch circuits DLA_1 to DLA_18 and the hold circuits DLB_1 to DLB_19 and switching connections between the output circuits 11_1 to 11_19 and the output terminals OUT1 to OUT18, so as to shift from one normal circuit to another in sequence; (ii) adding the spare circuits.

Further, the integrated circuit 10 according to the present embodiment may detect a failure in its output circuits by using a failure detection method described in Embodiment 1.

Embodiment 11

Embodiment 11 of the present invention is described below with reference to FIGS. 49 and 50.

(Configuration of a Self-Repairing Circuit)

First, the configuration of a display driving semiconductor integrated circuit (hereinafter referred to as "integrated circuit) 10 according to the present embodiment is described with reference to FIG. 49. As explained in FIG. 41 in [Embodiment 7], eighteen outputs are abstracted for explanation. However, the number of outputs from the integrated circuit 10 is not limited to 18.

Figure 49:
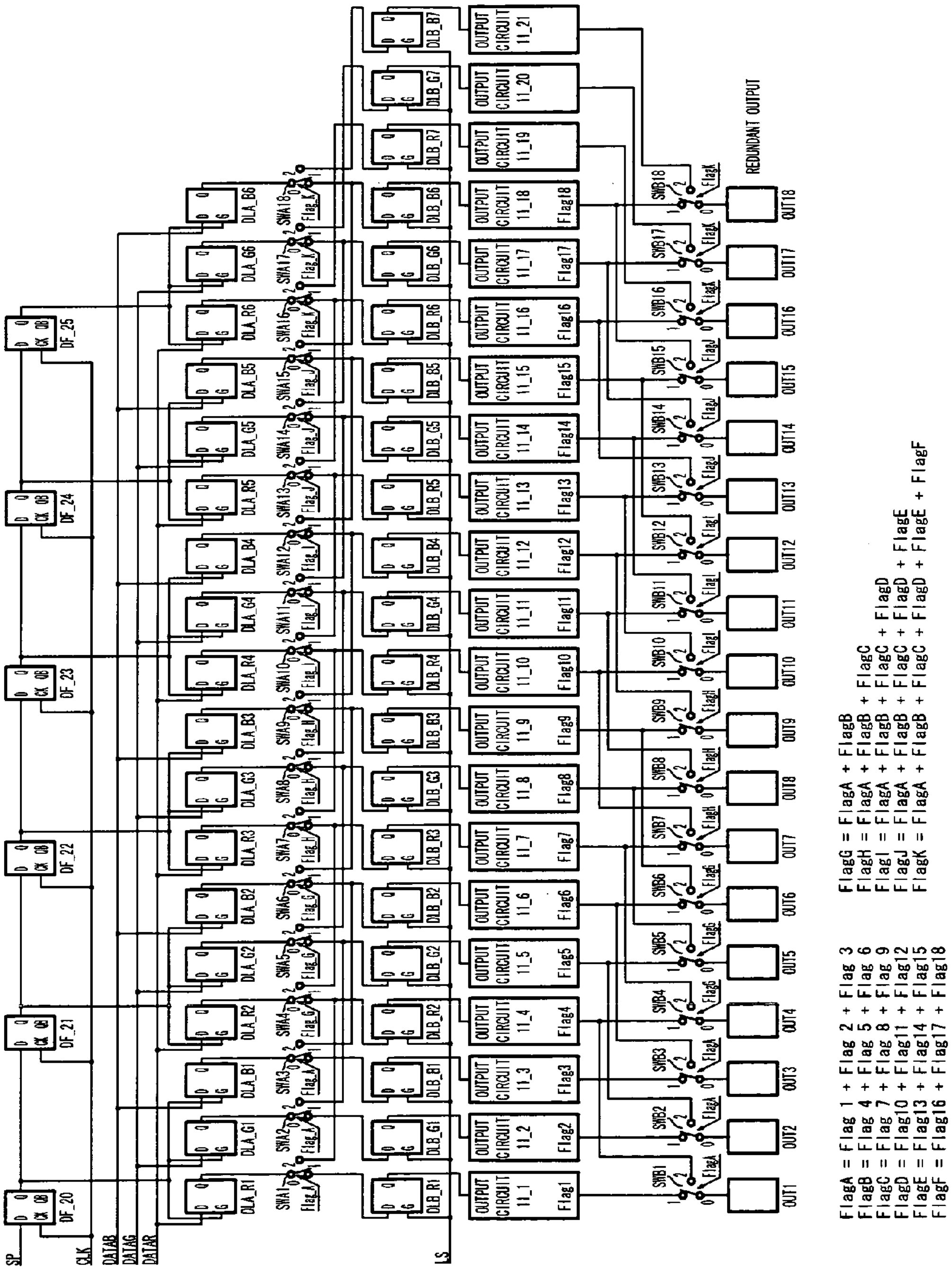
FIG. 49 shows the configuration of an integrated circuit for normal operation in accordance with Embodiment 11.

FIG. 49 shows the configuration of the integrated circuit 10 for normal operation in accordance with the present embodiment. The integrated circuit 10 includes: a D flip-flop_20 to a D flip-flop_25 (hereinafter abbreviated as "DF_20 to DF_25"); switches SWA1 to SWA18; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; signal output terminals OUT1 to OUT18; spare hold circuits DLB_R7, DLB_G7, and DLB_B7; and spare output circuits 11_19 to 11_21.

The integrated circuit 10 is connected to a display device (not shown) through the output terminals OUT1 to OUT18 to drive the display device.

In the present embodiment, the sub-hold circuits as set forth in the claims correspond to separate hold circuits DUB (e.g., the hold circuits DLB_R1, DLB_G2, and DLB_B1 respectively), and each of the sub-output circuits as set forth in the claims corresponds to separate output circuits 11 (output circuits 11_1, 11_2, and 11_3, respectively). Each of the hold circuits as set forth in the claim corresponds to a block composed of hold circuits DUB arranged in a row to correspond to the primary colors R, G, and B, by which the display colors are constituted (e.g., a block composed of the hold circuits DLB_R1, DLB_G1, and DLB_B1), and each of the output circuits as set forth in the claim corresponds to a block composed of output circuits 11 arranged in a row to correspond to the primary colors R, G, and B (e.g., a block composed of the output circuits 11_1 to 11_3).

Further, the sub-latch circuits as set forth in the claims correspond to separate latch circuits DLA (e.g., the latch circuits DLA_R1, DLA_G1, and DLA_B1, respectively), and each of the latch circuits as set forth in the claim corresponds to a block composed of latch circuits DLA arranged in a row to correspond to the primary colors R, G, and B, by which the display colors are constituted (e.g., a block composed of the latch circuits DLA_R1, DLA_G1, and DLA_B1).

Further, the sub-output terminals as set forth in the claims correspond to the output terminals OUT1 to OUT18, respectively, and each of the output terminals as set forth in the claims corresponds to a set of three output terminals (e.g., OUT1 to OUT3) disposed to correspond to such an output circuit.

The integrated circuit 10 according to the present embodiment receives gray-scale data of the three primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 49, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Furthermore, as shown in FIG. 49, the integrated circuit 10 includes the spare hold circuits DLB_R7, DLB_G7, and DLB_B7, and the spare output circuits 11_19 to 11_21.

The switches SWA1 to SWA18 are provided between the latch circuits DLA_R1 to DLA_R6, DLA_G1 to DLA_G6, and DLA_B1 to DLA_B6 and the hold circuits DLB_R1 to DLB_R7, DLB_G1 to DLB_G7, and DLB_B1 to DLB_B7. The switches SWB1 to SWB18 are provided between the output circuits 11_1 to 11_21 and the output terminals OUT1 to OUT18. Further, as shown in FIG. 49, DLB_R1 DLB_B7, connected to the output circuits 11_1 to 11_21 respectively, form output blocks corresponding to video signal output sections.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of FlagA to FlagK. FlagA to FlagK are determined by combinations of Flag1 to Flag 18, and the combinations are shown as logical expressions in the lower part of FIG. 49. FlagA to FlagK are determined by a control section (not shown). Moreover, the first connection switching means as set forth in the claims corresponds to a control section (not shown) and the switches SWB1 to SWB18. Moreover, the second connection switching means as set forth in the claims corresponds to a control section (not shown) and the switches SWA1 to SWA18.

Embodiment 7 expresses gray-scale data input as a single system; however, it is usual, as in the present embodiment, to input gray-scale data for each of the colors R, G, and B in carrying out a color display.

(Normal Operation)

Next, the operation of the integrated circuit 10 without a defective output circuit, i.e. normal operation, is described below with reference to FIG. 49. As mentioned above, FIG.

49 shows the configuration of the integrated circuit 10 for normal operation in accordance with the present embodiment.

In the absence of a defective output circuit, Flag1 to Flag18 in the output circuits 11_1 to 11_18 are all “0”. Accordingly, FlagA to FlagK, constituted by the ORs of combinations of Flag1 to Flag18 respectively, are all “0”, too.

The following describes the operation of the integrated circuit 10. The integrated circuit 10 has a pointer shift register, constituted by DF_20 to DF_25, whose operation is the same as that of the pointer shift register of the integrated circuit 10 in Embodiment 2.

First, the first stage DF_20 of the pointer shift register circuit receives an operation start pulse signal (SP signal) through the SP signal line. The first stage DF_20 of the pointer shift register circuit loads a “H” pulse of the SP signal at the timing of a rise in the CLK signal and outputs the “H” signal through its output section Q . At the next rising edge of the CLK signal, the SP signal is “L” and, accordingly, the first stage DF_20 of the pointer shift register circuit outputs an “L” signal through its output section Q . At the timing of a rise in the CLK signal, each of DF_21 to DF_25, as with DF_20, outputs through its output section Q a signal as received through its input section D. Thus, DF_20 to DF_25 take turns outputting a “H” pulse signal for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, shifts in R gray-scale data from R1 to R2 and so forth, shifts in G gray-scale data from G1 to G2 and so forth, or shifts in B gray-scale data from B1 to B2 and so forth are made in synchronization with the timing of falls in the CLK signal. Each of the latch circuits DLA loads a signal through its input section D and outputs the signal through its output section Q , while receiving a “H” selection signal through its gate G. That is, while receiving Q (DF_20) to Q (DF_25) at “H”, the latch circuits DLA_R1 to DLA_R6, DLA_G1 to DLA_G6, and DLA_B1 to DLA_B6 load incoming gray-scale data and output the gray-scale data through their output sections Q , respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data “R1” to “R6” in sequence in accordance with the “H” pulses Q (DF_20) to Q (DF_25), respectively. Similarly, the latch circuits DLA_G1 to DLA_G6 load gray-scale data “G1” to “G6” in sequence in accordance with the “H” pulses Q (DF_20) to Q (DF_25), respectively. Similarly, the latch circuits DLA_B1 to DLA_B6 load gray-scale data “B1” to “B6” in sequence in accordance with the “H” pulses Q (DF_20) to Q (DF_25), respectively.

Then, the latch circuits DLA_R1 to DLA_R6, DLA_G1 to DLA_G6, and DLA_B1 to DLA_B6 hold the loaded gray-scale data while Q (DF_20) to Q (DF_25) are “L”.

For example, while receiving Q (DF_20) at “H”, the latch circuit DLA_R1 loads the gray-scale data “R1” through the DATAR signal line. After that, by the time Q (DF_20) becomes “L”, the latch circuit DLA_R1 has been receiving the gray-scale data “R1” through the DATAR signal line; therefore, the latch circuit DLA_R1 holds “R1” thereafter as the output Q (DLA_R1) through its output section Q . Similarly, when Q (DF_20) to Q (DF_25) become “L”, DLA_R2 to DLA_R6 hold the gray-scale data “R2” to “R6” thereafter as the outputs through their output sections Q , respectively. At this point, the hold circuits DLB_R1 to DLB_R6 receive the data, which have been held at the output sections Q of DLA_R1 to DLA_R6, through their input sections D, respectively.

Further, while receiving Q (DF_20) at “H”, the latch circuit DLA_G1 loads the gray-scale data “G1” through the DATAG signal line. After that, by the time Q (DF_20) becomes “L”, the latch circuit DLA_G1 has been receiving the gray-scale data “G1” through the DATAG signal line; therefore, the latch circuit DLA_G1 holds “G1” thereafter as the output Q (DLA_G1) through its output section Q . Similarly, when Q (DF_20) to Q (DF_25) become “L”, DLA_G2 to DLA_G6 hold the gray-scale data “G2” to “G6” thereafter as the outputs through their output sections Q , respectively. At this point, the hold circuits DLB_G1 to DLB_G6 receive the data, which have been held at the output sections Q of DLA_G1 to DLA_G6, through their input sections D, respectively.

Further, while receiving Q (DF_20) at “H”, the latch circuit DLA_B1 loads the gray-scale data “B1” through the DATAB signal line. After that, by the time Q (DF_20) becomes “L”, the latch circuit DLA_B1 has been receiving the gray-scale data “B1” through the DATAB signal line; therefore, the latch circuit DLA_B1 holds “B1” thereafter as the output Q (DLA_B1) through its output section Q . Similarly, when Q (DF_20) to Q (DF_25) become “L”, DLA_B2 to DLA_B6 hold the gray-scale data “B2” to “B6” thereafter as the outputs through their output sections Q , respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 1 and, as such, is not described here.

(Self-Repairing Operation)

Next, the operation of the integrated circuit 10 with Flag7 set to “1” by the decision circuit of the output circuit 11_7 in the presence of an abnormality in the output circuit 11_7, i.e. self-repairing operation, is described with reference to FIG. 50.

Figure 50:
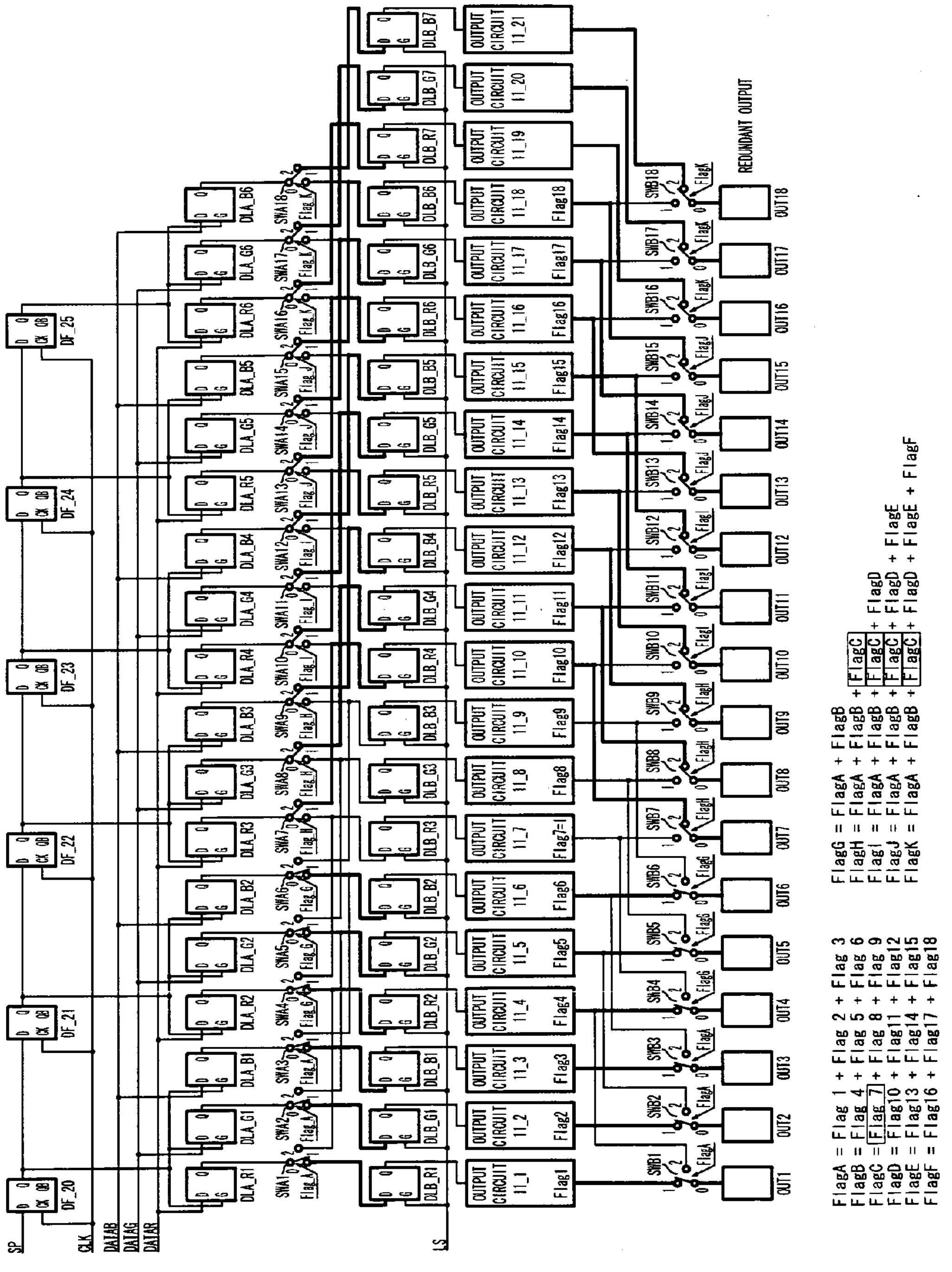
FIG. 50 shows the configuration of the integrated circuit for self-repairing operation in accordance with Embodiment 11.

FIG. 50 shows the state of the integrated circuit 10 for self-repairing operation in accordance with the present embodiment. When the integrated circuit 10 has Flag7 set to “1” in the presence of an abnormality in the output circuit 11_7, FlagC to FlagK, each calculated according to an OR including Flag7, become “1”. For this reason, SWA7 to SWA18 change from connecting their terminals 0 to their terminals 1 to connecting their terminals 0 to their terminals 2, respectively.

Thus, the hold circuit DLB_R3, DLB_G3, and DLB_B3, which would normally be connected to the output circuit 11_7 to 11_9 respectively, have their inputs open, whereby: the output section Q of the latch circuit DLA_R3 is connected to the hold circuit DLB_R4; the output section Q of the latch circuit DLA_G3 is connected to the hold circuit DLB_G4; and the output section Q of the latch circuit DLA_B3 is connected to the hold circuit DLB_B4. That is, Q (DLB_R3), Q (DLB_G3), and Q (DLB_B3) are supplied to the hold circuits DLB_R4, DLB_G4, and DLB_B4, respectively.

Similarly, the latch circuits DLA and the hold circuits DLB are connected with each RGB block shifted in sequence. Finally, the output sections Q of the latch circuits DLA_R6, DLA_G6, and DLA_B6 are connected to the spare hold circuits DLB_R7, DLB_G7, and DLB_B7, respectively, whereby Q (DLA_R6), Q (DLA_G6), and Q (DLA_B6) are supplied to the hold circuits DLB_R7, DLB_G7, and DLB_B7, respectively. Therefore, in the presence of an abnormality in the output circuit 11_7, the integrated circuit 10 according to the present invention uses the switches so that the output circuits 11_7, 11_8, and 11_9 no longer receive any gray-scale data.

Further, at this point in the integrated circuit 10, as shown in FIG. 50, the switches SWB7 to SWB18, which are controlled by FlagH to FlagK, have changed from connecting their terminals 0 to their terminals 1 to connecting their terminals 0 to their terminals 2, respectively; therefore, the output circuits 11_7, 11_8, and 11_9 are no longer connected to any of the output terminals OUT1 to OUT18.

Then, the sets of three output circuits for outputting RGB gray-scale voltages are shifted in sequence to be connected to the output terminals as follows: the output circuits 11_10 to 11_12 are connected to the output terminals OUT7 to OUT9, respectively; and the output circuits 11_13 to 11_15 are connected to the output terminals OUT10 to OUT12, respectively. Finally, the spare output circuits 11_19 to 11_21 are connected to the output terminals OUT16 to OUT18, respectively.

As described above, the configuration capable of self-repairing is realized by: (i) disconnecting a defective output circuit, if detected, by switching connections between the latch circuits and the hold circuits and switching connections between the output circuits and the output terminals, so as to shift from one normal circuit to another in sequence; and (ii) adding the spare circuits.

Further, the integrated circuit 10 according to the present embodiment may detect a failure in its output circuits by using a failure detection method described in Embodiment 1.

Embodiment 12

Embodiment 12 of the present invention is described below with reference to FIGS. 51 and 52.

(Configuration of a Self-Repairing Circuit)

First, the configuration of a display driving semiconductor integrated circuit (hereinafter referred to as "integrated circuit) 10 according to the present embodiment is described with reference to FIG. 51. As explained in FIG. 41 in [Embodiment 7], eighteen outputs are abstracted for explanation. However, the number of outputs from the integrated circuit 10 is not limited to 18.

Figure 51:
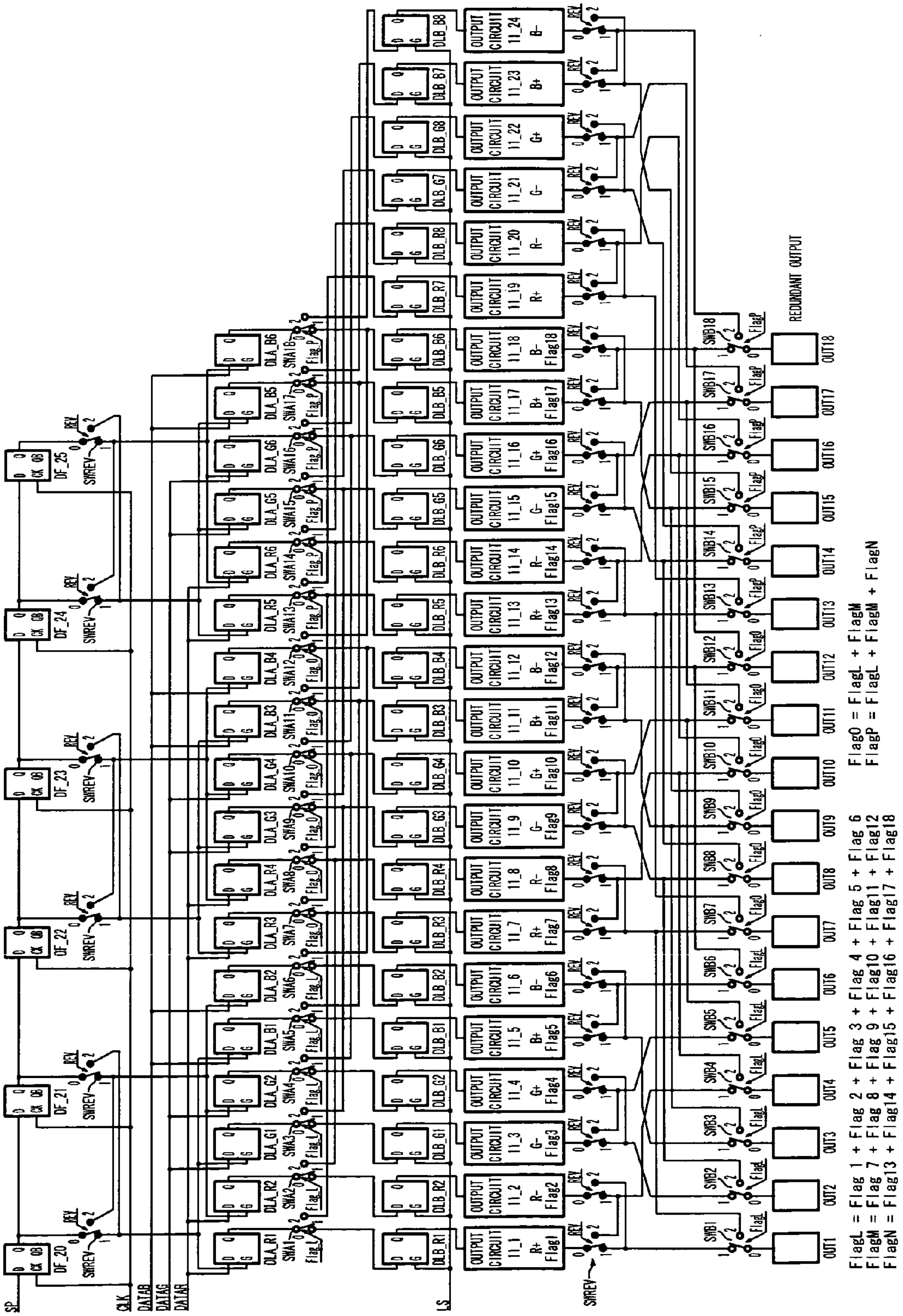
FIG. 51 shows the configuration of an integrated circuit for normal operation in accordance with Embodiment 12.

FIG. 51 shows the configuration of the integrated circuit for normal operation in accordance with the present embodiment. The integrated circuit 10 includes: a D flip-flop_20 to a D flip-flop_25 (hereinafter abbreviated as "DF_20 to DF_25"); switches SWA1 to SWA18; latch circuits DLA_R1 to DLA_R6, DLA_G1 to DLA_G6, and DLA_B1 to DLA_B6; hold circuits DLB_R1 to DLB_R6, DLB_G1 to DLB_G6, and DLB_B1 to DLB_B6; output circuits 11_1 to 11_18; switches SWB1 to SWB18; signal output terminals OUT1 to OUT18; spare hold circuits DLB_R7, DLB_R8, DLB_G7, DLB_G8, DLB_B7, and DLB_B8; and spare output circuits 11_19 to 11_24.

The integrated circuit 10 is connected to a display device (not shown) through the output terminals OUT1 to OUT18 to drive the display device.

In the present embodiment, the sub-hold circuits as set forth in the claims correspond to separate hold circuits DLB (e.g., the hold circuits DLB_R1, DLB_G1, DLB_B1, DLB_R2, DLB_G2, and DLB_B2, respectively), and each of the sub-output circuits as set forth in the claims corresponds to separate output circuits 11 (output circuits 11_1, 11_2, 11_3, 11_4, 11_5, and 11_6, respectively). Each of the hold circuits as set forth in the claim corresponds to a block composed of hold circuits DLB arranged in a row to correspond to positive and negative gray-scale voltages for each of the primary colors R, G, and B, by which the display colors are constituted (e.g., a block composed of the hold circuits DLB_R1, DLB_G1, DLB_B1, DLB_R2, DLB_G2, and DLB_B2), and each of the output circuits as set forth in the claim corresponds to a block composed of output circuits 11 arranged in a row to correspond to positive and negative gray-scale voltages for each of the primary colors R, G, and B (e.g., a block composed of the output circuits 11_1 to 11_6).

Further, the sub-latch circuits as set forth in the claims correspond to separate latch circuits DLA (e.g., the latch circuits DLA_R1, DLA_G1, DLA_B1, DLA_R2, DLA_G2, and DLA_B2, respectively), and each of the latch circuits as set forth in the claims corresponds to a block composed of latch circuits DLA arranged in a row to correspond to positive and negative gray-scale voltages for each of the primary colors R, G, and B, by which the display colors are constituted (e.g., a block composed of the latch circuits DLA_R1, DLA_G1, DLA_B1, DLA_R2, DLA_G2, and DLA_B2).

Further, the sub-output terminals as set forth in the claims correspond to the output terminals OUT1 to OUT18, respectively, and each of the output terminals as set forth in the claims corresponds to a set of six output terminals (e.g., OUT1 to OUT6) disposed to correspond to such a video signal output section.

Further, DF_20 to DF_25 constitute a pointer shift register circuit, and each of them (e.g., DF_20) includes a connection terminal that is connected to latch circuits in a unit of three colors R, G, and B (e.g., DLA_R1, DLA_G1, and DLA_B1).

The integrated circuit 10 according to the present embodiment receives gray-scale data of the three primary colors, i.e. red (R), green (G), and blue (B), by which the display colors are constituted, through three data signal lines, namely a DATAR signal line, a DATAG signal line, and a DATAB signal line, respectively. That is, the integrated circuit 10 is configured to drive a color display device whose display colors are constituted by the three colors R, G, and B. The latch circuits DLA_R1 to DLA_R6 receive R gray-scale data through the DATAR signal line. Similarly, the latch circuits DLA_G1 to DLA_G6 receive G gray-scale data through the DATAG signal line, and the latch circuits DLA_B1 to DLA_B6 receive B gray-scale data through the DATAB signal line.

Further, the latch circuits DLA_R1 to DLA_B6 extract, from the received gray-scale data, gray-scale data corresponding to video signals to be outputted through the output terminals OUT1 to OUT18, and then send the extracted gray-scale data to the hold circuits DLB_R1 to DLB_B6, respectively. After holding the gray-scale data sent from the latch circuits DLA_R1 to DLA_B6, the hold circuits DLB_R1 to DLB_B6 send the gray-scale data to the output circuits 11_1 to 11_18, respectively.

Each of the output circuits 11_1 to 11_18 includes: a DAC (digital-analog converter) circuit for converting gray-scale data into a gray-scale voltage signal; an operational amplifier that serves as a buffer circuit; a decision circuit for determining the quality of operation of the output circuit; and a decision flag for indicating the quality of operation as determined by the decision circuit. It should be noted, in FIG. 51, that the decision flag of an output circuit 11_A is denoted by FlagA. For example, the result of determination of the quality of the output circuit 11_1, the result of determination of the quality of the output circuit 11_2, . . . , and the result of determination of the quality of the output circuit 11_18 are denoted by Flag1, Flag2, . . . , and Flag 18, respectively. Further, although the method for determining the quality of an output circuit is detailed later, the decision flag is set to "0" when the output circuit is good and is set to "1" when the output circuit is defective.

Further, each of the output circuits 11_1 to 11_18 of the integrated circuit 10 is a circuit that corresponds only to either a positive dot-inversion driving voltage output or a negative dot-inversion driving voltage output. In FIG. 51, the odd-numbered output circuits 11_1, 11_3, 11_5, . . . correspond to positive voltage outputs, and the even-numbered output circuits 11_2, 11_4, 11_6, . . . correspond to negative voltage outputs. Moreover, in order to carry out dot inversion drive, it is necessary to be able to output both positive and negative voltages to each output terminal. Accordingly, the integrated circuit 10 controls switching of the switches SWREV in accordance with a control signal REV to change the timing of sampling of gray-scale data by changing connections of the selection signal lines to the output circuits and the output terminals, thus realizing the switch between positive and negative voltages.

Furthermore, as shown in FIG. 51, the integrated circuit 10 includes the spare hold circuits DLB_R7, DLB_R8, DLB_G7, DLB_G8, DLB_B7, and DLB_B8 and the spare output circuits 11_19 to 11_24.

The switches SWA1 to SWA18 are provided between the latch circuits DLA_R1 to DLA_R6, DLA_G1 to DLA_G6, and DLA_B1 to DLA_B6 and the hold circuits DLB_R1 to DLB_R8, DLB_G1 to DLB_G8, and DLB_B1 to DLB_B8. The switches SWB1 to SWB18 are provided between the output circuits 11_1 to 11_24 and the output terminals OUT1 to OUT18. Further, as shown in FIG. 51, DLB_R1 to DLB_B8, connected to the output circuits 11_1 to 11_24 respectively, form output blocks corresponding to video signal output sections.

Each of the switches SWA1 to SWA18 and SWB1 to SWB18 is a switch circuit, including a terminal 0, a terminal 1, and a terminal 2, which has two states in which to connect the terminal 0 to the terminal 1 and in which to connect the terminal 0 to the terminal 2, and the states of connection are switched in accordance with the values of FlagL to FlagP. FlagL to FlagP are determined by combinations of Flag1 to Flag 18, and the combinations are shown as logical expressions in the lower part of FIG. 51. FlagL to FlagP are determined by a control section (not shown). Moreover, the connection switching means as set forth in the claims corresponds to a control section (not shown) and the switches SWB1 to SWB18. Moreover, the selecting means as set forth in the claims corresponds to a control section (not shown) and the switches SWA1 to SWA18.

(Normal Operation)

Next, the operation of the integrated circuit 10 without a defective output circuit, i.e. normal operation, is described below with reference to FIG. 51. As mentioned above, FIG. 51 shows the configuration of the integrated circuit 10 for normal operation in accordance with the present embodiment. The present embodiment describes a state in which each of the switches SWREV has connected its terminal 0 to its terminal 1.

In the absence of a defective output circuit, Flag 1 to Flag18 in the output circuits 11_1 to 11_18 are all "0". Accordingly, FlagL to FlagP, constituted by the ORs of combinations of Flag1 to Flag 18 respectively, are all "0", too.

The following describes the operation of the integrated circuit 10. The integrated circuit 10 has a pointer shift register, constituted by DF_20 to DF_25, whose operation is the same as that of the pointer shift register of the integrated circuit 10 in Embodiment 3.

First, the first stage DF_20 of the pointer shift register circuit receives an operation start pulse signal (SP signal) through the SP signal line. The first stage DF_20 of the pointer shift register circuit loads a "H" pulse of the SP signal at the timing of a rise in the CLK signal and outputs the "H" signal through its output section Q. At the next rising edge of the CLK signal, the SP signal is "L" and, accordingly, the first stage DF_20 of the pointer shift register circuit outputs an "L" signal through its output section Q. At the timing of a rise in the CLK signal, each of DF_21 to DF_25, as with DF_20, outputs through its output section Q a signal as received through its input section D. Thus, DF_20 to DF_25 take turns outputting a "H" pulse signal for each and every single clock pulse.

The latch circuits DLA receive RGB gray-scale data through the DATAR signal line, the DATAG signal line, and the DATAB signal line. Shifting of the gray-scale data received through the DATAR signal line, the DATAG signal line, and the DATAB signal line is performed at every falling edge of the CLK signal. That is, shifts in R gray-scale data from R1 to R2 and so forth, shifts in G gray-scale data from G1 to G2 and so forth, or shifts in B gray-scale data from B1 to B3 and so forth are made in synchronization with the timing of falls in the CLK signal. Each of the latch circuits DLA loads a signal through its input section D and outputs the signal through its output section Q, while receiving a "H" selection signal through its gate G. That is, while receiving Q (DF_20) to Q (DF_25) at "H", the latch circuits DLA_R1 to DLA_R6, DLA_G1 to DLA_G6, and DLA_B1 to DLA_B6 load incoming gray-scale data and output the gray-scale data through their output sections Q, respectively.

Thus, with the latch circuits DLA_R1 to DLA_R6 being selected in sequence in synchronization with the timing of shifting of the gray-scale data inputted through the DATAR signal line, the latch circuits DLA load gray-scale data corresponding to video signals to be outputted through the output terminals corresponding to the latch circuits, respectively. That is, the latch circuits DLA_R1 to DLA_R6 load gray-scale data "R1" to "R6" in sequence in accordance with the "H" pulses Q (DF_20) to Q (DF_25), respectively. Similarly, the latch circuits DLA_G1 to DLA_G6 load gray-scale data "G1" to "G6" in sequence in accordance with the "H" pulses Q (DF_20) to Q (DF_25), respectively. Similarly, the latch circuits DLA_B1 to DLA_B6 load gray-scale data "B1" to "B6" in sequence in accordance with the "H" pulses Q (DF_20) to Q (DF_25), respectively.

Then, the latch circuits DLA_R1 to DLA_R6, DLA_G1 to DLA_G6, and DLA_B1 to DLA_B6 hold the loaded gray-scale data while Q (DF_20) to Q (DF_25) are "L".

For example, while receiving Q (DF_20) at "H", the latch circuit DLA_R1 loads the gray-scale data "R1" through the DATAR signal line. After that, by the time Q (DF_20) becomes "L", the latch circuit DLA_R1 has been receiving the gray-scale data "R1" through the DATAR signal line; therefore, the latch circuit DLA_R1 holds "R1" thereafter as the output Q (DLA_R1) through its output section Q. Similarly, when Q (DF_20) to Q (DF_25) become "L", DLA_R2 to DLA_R6 hold the gray-scale data "R2" to "R6" thereafter as the outputs through their output sections Q, respectively.

At this point, the hold circuits DLB_R1 to DLB_R6 receive the data, which have been held at the output sections Q of DLA_R1 to DLA_R6, through their input sections D, respectively.

Further, while receiving Q (DF_20) at "H", the latch circuit DLA_G1 loads the gray-scale data "G1" through the DATAG signal line. After that, by the time Q (DF_20) becomes "L", the latch circuit DLA_G1 has been receiving the gray-scale data "G1" through the DATAG signal line; therefore, the latch circuit DLA_G1 holds "G1" thereafter as the output Q (DLA_G1) through its output section Q. Similarly, when Q (DF_20) to Q (DF_25) become "L", DLA_G2 to DLA_G6 hold the gray-scale data "G2" to "G6" thereafter as the outputs through their output sections Q, respectively. At this point, the hold circuits DLB_G1 to DLB_G6 receive the data, which have been held at the output sections Q of DLA_G1 to DLA_G6, through their input sections D, respectively.

Further, while receiving Q (DF_20) at "H", the latch circuit DLA_B1 loads the gray-scale data "B1" through the DATAB signal line. After that, by the time Q (DF_20) becomes "L", the latch circuit DLA_B1 has been receiving the gray-scale data "B1" through the DATAB signal line; therefore, the latch circuit DLA_B1 holds "B1" thereafter as the output Q (DLA_B1) through its output section Q. Similarly, when Q (DF_20) to Q (DF_25) become "L", DLA_B2 to DLA_B6 hold the gray-scale data "B2" to "B6" thereafter as the outputs through their output sections Q, respectively. At this point, the hold circuits DLB_B1 to DLB_B6 receive the data, which have been held at the output sections Q of DLA_B1 to DLA_B6, through their input sections D, respectively.

The subsequent operation in the integrated circuit 10 is the same as that in the integrated circuit 10 of Embodiment 1 and, as such, is not described here.

(Self-Repairing Operation)

Next, the operation of the integrated circuit 10 with Flag7 set to "1" by the decision circuit of the output circuit 11_7 in the presence of an abnormality in the output circuit 11_7, i.e. self-repairing operation, is described with reference to FIG. 52.

Figure 52:
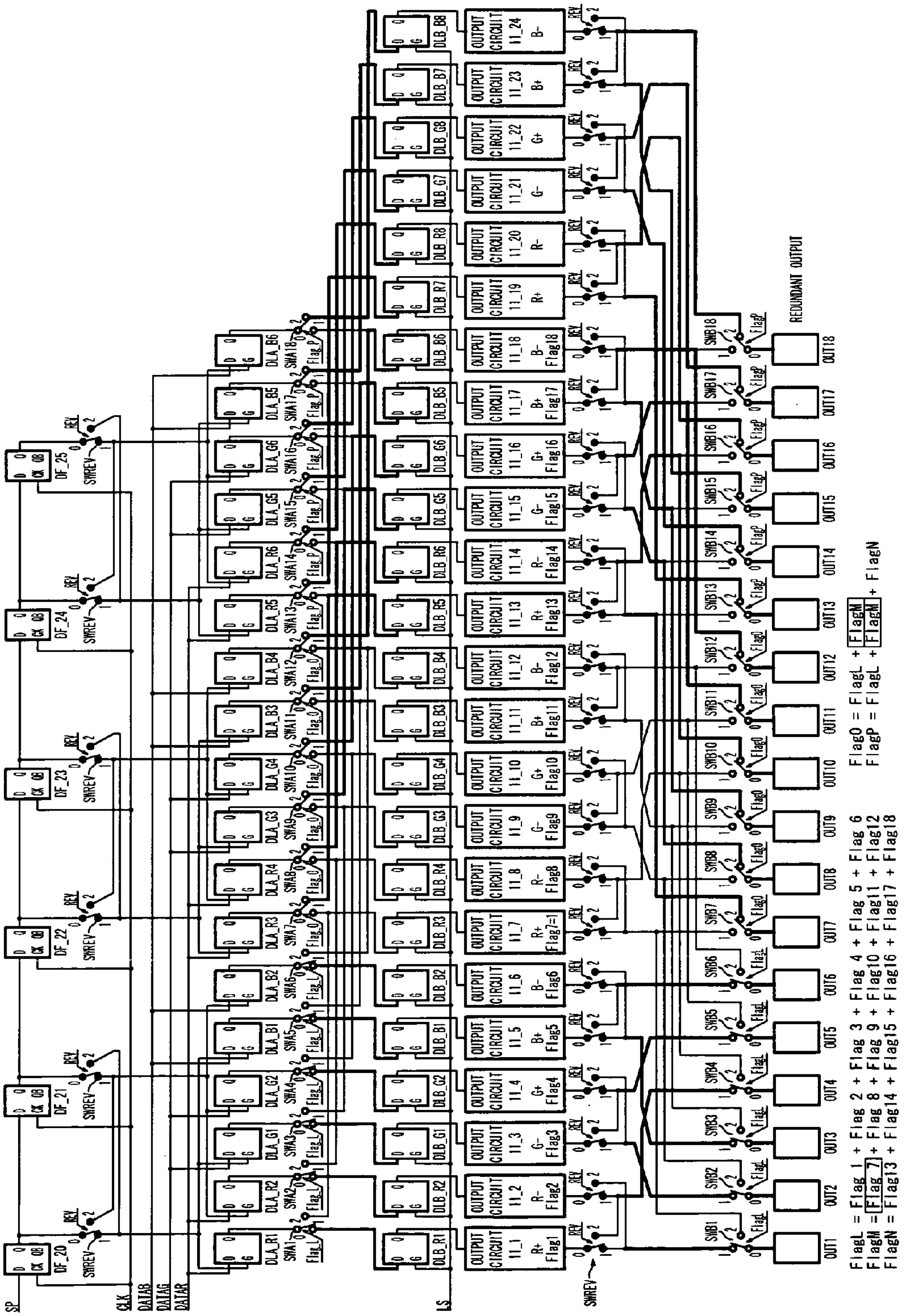
FIG. 52 shows the configuration of the integrated circuit for self-repairing operation in accordance with Embodiment 12.

FIG. 52 shows the state of the integrated circuit 10 for self-repairing operation in accordance with the present embodiment. When the integrated circuit 10 has Flag7 set to "1" in the presence of an abnormality in the output circuit 11_7. FlagC to FlagK, each calculated according to an OR including Flag7, become "1". For this reason, SWA7 to SWA18 change from connecting their terminals 0 to their terminals 1 to connecting their terminals 0 to their terminals 2, respectively.

Thus, the hold circuit DLB_R3, DLB_R4, DLB_G3, DLB_G4, DLB_B3, and DLB_B4 have their inputs open, whereby the output sections Q of the latch circuit DLA_R3, DLA_R4, DLA_G3, DLA_G4, DLA_B3, and DLA_B4 are connected to the hold circuits DLB_R5, DLB_R6, DLB_G5, DLB_G6, DLB_B5, and DLB_B6, respectively. That is, Q (DLB_R3), Q (DLB_R4), Q (DLB_G3), Q (DLB_G4), Q (DLB_B3), and Q (DLB_B4) are supplied to the hold circuits DLB_R5, DLB_R6, DLB_G5, DLB_G6, DLB_B5, and DLB_B6, respectively.

Similarly, the latch circuits DLA and the hold circuits DLB are connected with each RGB block shifted in sequence. Finally, the output sections Q of the latch circuits DLA_R5, DLA_R6, DLA_G5, DLA_G6, DLA_B5, and DLA_B6 are connected to the hold circuits DLB_R7, DLB_R8, DLB_G7, DLB_G8, DLB_B7, and DLB_B8, respectively, whereby Q (DLA_R5), Q (DLA_R6), Q (DLA_G5) Q (DLA_G6), Q (DLA_B5), and Q (DLA_B6) are supplied to the hold circuits DLB_R7, DLB_R8, DLB_G7, DLB_G8, DLB_B7, and DLB_B8, respectively. Therefore, in the presence of an abnormality in the output circuit 11_7, the integrated circuit 10 according to the present invention uses the switches so that the hold circuit DLB_R3, DLB_R4, DLB_G3, DLB_G4, DLB_B3, and DLB_B4 no longer receive any gray-scale data.

Further, at this point in the integrated circuit 10, as shown in FIG. 52, the switches SWB7 to SWB18, which are controlled by FlagO and FlagP, have changed from connecting their terminals 0 to their terminals 1 to connecting their terminals 0 to their terminals 2, respectively; therefore, the output circuits 11_7, 11_8, 11_9, 11_10, 11_11, and 11_12 are no longer connected to any of the output terminals OUT1 to OUT18.

Then, the sets of six output circuits for outputting positive and negative RGB gray-scale voltages are shifted in sequence to be connected to the output terminals as follows: the output circuits 11_13, 11_15, 11_17, 11_14, 11_16, and 11_18 are connected to the output terminals OUT7 to OUT12, respectively. Finally, the spare output circuits 11_19 to 11_24 are connected to the output terminals OUT13 to OUT18, respectively.

As described above, the configuration capable of self-repairing is realized by: (i) disconnecting a defective output circuit, if detected, by switching connections between the latch circuits and the output circuits and switching connections between the output circuits and the output terminals, so as to shift from one normal circuit to another in sequence; and (ii) adding the spare circuits.

Further, the integrated circuit 10 according to the present embodiment may detect a failure in its output circuits by using a failure detection method described in Embodiment 1.

Further, the driving circuit according to the present invention may be configured such that: each of the output circuit blocks includes a circuit in which signals supplied to the output circuits are stored; and the spare output circuit block includes a circuit in which signals supplied to the spare output circuits are stored.

Further, the driving circuit according to the present invention may be configured such that: the first test input signal and the second test input signal are different in magnitude; the control means outputs the logical value of a result of comparison that is logically derived from the comparing means when the first test input signal and the second test input signal, which are different in magnitude, are supplied; when the result of comparison and the logical value are different, the decision means determines any of the output circuits to be defective.

Further, the driving circuit according to the present invention may be configured to further include flag storing means in which a flag indicative of a result of determination made by the decision means is stored, wherein: when the value of the flag indicates that any of the output circuits is defective, the connection switching means connects the spare output buffer instead of the output buffer to an output terminal to which an output signal is outputted from the defective output circuit; and when the value of the flag indicates that any of the output circuits is defective, the input switching means switches from inputting an input signal into the output circuit, into which the input signal would normally be inputted if the output circuit were not defective, to inputting the input signal into the spare output circuit.

Further, the driving circuit according to the present invention may be configured such that the control means switches to the self-detection repairing operation during such a period as not to affect an image that is displayed by the display panel.

Further, the driving circuit according to the present invention may be configured to further include: detecting means for detecting the value of a power supply current that is supplied to the driving circuit; normal current value storing means in which the value of the power supply current during the normal operation of the driving circuit is stored in advance; current value comparing means for comparing the value of the power supply current as detected by the detecting means with the value of the power supply current as stored in the normal current value storing means; and driving circuit determining means for determining, in accordance with a result of comparison made by the current value comparing means, whether the driving circuit is defective or not, wherein the control means switches to the self-detection repairing operation when a result of determination made by the driving circuit determining means indicates a defect.

Further, the driving circuit according to the present invention may be configured such that the control means switches to the self-detection repairing operation immediately after the display panel is powered on.

Further, the driving circuit according to the present invention may be configured such that the control means switches to the self-detection repairing operation during a vertical blanking period of the display panel.

Further, the driving circuit according to the present invention may be configured to further include blocking means for blocking a signal transmission channel from each of the output terminals to the display panel, wherein the control means switches to the self-detection repairing operation after the blocking means has blocked a signal transmission channel from the output terminal to the display panel.

Further, a driving circuit according to the present invention is a driving circuit for driving a display panel, the driving circuit including: N (N: positive even number) output terminals connected to the display panel; output circuit blocks, provided for each separate one of the output terminals, which includes (i) output circuits for outputting output signals for driving the display panel and (ii) output buffers, constituted by operational amplifiers, which buffer the output signals outputted from the output circuits and then output the output signals to the output terminals, respectively; a single first spare output circuit block including (i) a first spare output circuit capable of outputting output signals for driving the display panel and (ii) a first spare output buffer, constituted by an operational amplifiers, which is capable of buffering the output signals outputted from the first spare output circuit and then outputting the output signals to the odd-numbered output terminals; a single second spare output circuit block including (i) a second spare output circuit capable of outputting output signals for driving the display panel and (ii) a second spare output buffer, constituted by an operational amplifiers, which is capable of buffering the output signals outputted from the second spare output circuit and then outputting the output signals to the even-numbered output terminals; control means for controlling switching of the driving circuit between normal operation and self-detection operation, for causing input signals to be inputted into the plurality of output circuits during the normal operation, and for causing a first test input signal to be inputted into the odd-numbered output circuit and the first spare output circuit and a second test input signal to be inputted into the even-numbered output circuits and the second spare output circuit; self-repairing means for, after having been switched by the control means to the self-detection repairing operation, self-repairing the driving circuit if the driving circuit is defective, the self-repairing means including: comparing means for comparing the output signals outputted from the output circuits with output signals outputted from output circuits paired with the output circuits; decision means for determining, in accordance with a result of comparison made by the comparing means, whether any of the output circuits or any of the output circuits paired with the output circuits is defective or not; connection switching means for, when the decision means yields a result of determination indicative of a defect in any of the output circuits, connecting the first and second spare output buffers instead of the output buffers to an output terminal to which an output signal is outputted from the defective output circuit and an output terminal to which an output signal is outputted from an output circuit paired with the defective output circuit, respectively; input switching means for, when the decision means yields a result of determination indicative of a defect in any of the output circuits, switching from inputting input signals into the output circuit and an output circuit paired therewith, into which the input signals would normally be inputted if the former output circuit were not defective, to inputting the input signals into the first and second spare output circuits, respectively, the comparing means being constituted by the operational amplifiers of the output circuit blocks, the operational amplifiers of the odd-numbered output circuit blocks being controlled by switching control of the control means so that (i) the operational amplifiers switch to serving as the output buffers during the normal operation by receiving the output signals from the odd-numbered output circuits through positive input terminals and having their outputs negatively fed back through negative input terminals and (ii) the operational amplifiers switch to serving as the comparing means during the self-detection repairing operation by receiving the output signals from the odd-numbered output circuits through the positive input terminals and receiving the output signals from the even-numbered output circuits, paired with the odd-numbered output circuits, through the negative input terminals, the operational amplifiers of the even-numbered output circuit blocks being controlled by switching control of the control means so that (i) the operational amplifiers switch to serving as the output buffers during the normal operation by receiving the output signals from the even-numbered output circuits through positive input terminals and having their outputs negatively fed back through negative input terminals and (ii) the operational amplifiers switch to serving as the comparing means during the self-detection repairing operation by receiving the output signals from the even-numbered output circuits through the positive input terminals and receiving the output signals from the odd-numbered output circuits, paired with the even-numbered output circuits, through the negative input terminals.

Further, the driving circuit according to the present invention may be configured such that: the first test input signal and the second test input signal are different in magnitude; the control means outputs the logical value of a result of comparison that is logically derived from the comparing means when the first test input signal and the second test input signal, which are different in magnitude, are supplied; when the result of comparison and the logical value are different, the decision means determines any of the output circuits and an output circuit paired therewith to be defective.

Further, a display device according to the present invention may include such a driving circuit and such a display panel.

Further, a display device according to the present invention may include: a display panel; and a driving circuit, having a first output terminal and a plurality of second output terminals connected to the display panel, which serves to drive the display panel, the driving circuit including: output circuit blocks, provided for each separate one of the second output terminals, which include (i) output circuits for outputting output signals for driving the display panel and (ii) output buffers, constituted by operational amplifiers, which buffer the output signals outputted from the output circuits and then output the output signals to the second output terminals, respectively; a single spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the first output terminal; control means for controlling switching of the driving circuit between normal operation and self-detection repairing operation, for causing input signals to be inputted into the plurality of output circuits during the normal operation, and for causing a first test input signal to be inputted into the plurality of output circuits and a second test input signal to be inputted into the spare output circuit during the self-detection repairing operation; and self-repairing means for, after having been switched by the control means to the self-detection repairing operation, self-repairing the driving circuit if the driving circuit is defective, the self-repairing means including: comparing means for comparing the output signals outputted from the output circuits with the output signal outputted from the spare output circuit; decision means for determining, in accordance with a result of comparison made by the comparing means, whether any of the output circuits is defective or not; and input switching means for, when the decision means yields a result of determination indicative of a defect in any of the output circuits, switching from inputting an input signal into the output circuit, into which the input signal would normally be inputted if the output circuit were not defective, to inputting the input signal into the spare output circuit, the display panel including switching means for, when the decision means yields a result of determination indicative of a defect in any of the output circuits, switching an output signal for driving the display panel from (i) the output signal from the output circuit determined to be defective through the output buffer and the second output terminal to (ii) the output signal from the spare output circuit through the spare output buffer and the first output terminal, the comparing means in the driving circuit being constituted by the operational amplifiers of the output circuit blocks, the operational amplifiers of the output circuit blocks being controlled by switching control of the control means so that (i) the operational amplifiers switch to serving as the output buffers during the normal operation by receiving the output signals from the output circuits through positive input terminals and having their outputs negatively fed back through negative input terminals and (ii) the operational amplifiers switch to serving as the comparing means during the self-detection repairing operation by receiving the output signals from the output circuits through the positive input terminals and receiving the output signal from the spare output circuit through the negative input terminals.

Further, a display device according to the present invention may include: a display panel; a plurality of output circuit blocks including (i) output circuits for outputting output signals for driving the display panel and (ii) output buffers, constituted by operational amplifiers, which buffer the output signals outputted from the output circuits and then output the output signals to the display panel, respectively; a single spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the display panel; control means for controlling switching between normal operation and self-detection repairing operation, for causing input signals to be inputted into the plurality of output circuits during the normal operation, and for causing a first test input signal to be inputted into the plurality of output circuits and a second test input signal to be inputted into the spare output circuit during the self-detection repairing operation; and self-repairing means for, after having been switched by the control means to the self-detection repairing operation, self-repairing a defective one of the output circuits, the self-repairing means including: comparing means for comparing the output signals outputted from the output circuits with the output signal outputted from the spare output circuit; decision means for determining, in accordance with a result of comparison made by the comparing means, whether any of the output circuits is defective or not; switching means for, when the decision means yields a result of determination indicative of a defect in any of the output circuits, switching from outputting an output signal for driving the display panel from (i) the output signal from the output circuit determined to be defective to (ii) the output signal from the spare output circuit; and input switching means for, when the decision means yields a result of determination indicative of a defect in any of the output circuits, switching from inputting an input signal into the output circuit, into which the input signal would normally be inputted if the output circuit were not defective, to inputting the input signal into the spare output circuit, the comparing means being constituted by the operational amplifiers of the output circuit blocks, the operational amplifiers of the output circuit blocks being controlled by switching control of the control means so that (i) the operational amplifiers switch to serving as the output buffers during the normal operation by receiving the output signals from the output circuits through positive input terminals and having their outputs negatively fed back through negative input terminals and (ii) the operational amplifiers switch to serving as the comparing means during the self-detection repairing operation by receiving the output signals from the output circuits through the positive input terminals and receiving the output signal from the spare output circuit through the negative input terminals.

It should be noted that a driving circuit of the present invention may be configured as follows:

(First Configuration)

A driving circuit for driving a display device, the driving circuit including: output terminals connected to the display device; output circuit blocks including output circuits connectable to the output terminals; a spare output circuit block including a spare output circuit connectable to the output terminals; a decision section for determining whether the output circuits are good or defective, and a switching circuit for, when the decision section yields a result of determination indicative of a defect in any of the output circuits, shifting the output circuits, including the spare output circuit block, in sequence to that one of the output terminals which was in connection with the output circuit determined to be defective, and for disabling the output circuit determined to be defective as a part of the output circuit block.

(Second Configuration)

A driving circuit for driving a display device, the driving circuit including: a plurality of sampling circuits for loading display data in sequence in accordance with pulse signals prepared by a shift register; display output circuits connected to the sampling circuits respectively; a decision section for determining whether the output circuits are good or defective; and a switching circuit for, when the decision section yields a result of determination indicative of a defect in any of the output circuits, switching the pulse signals to disable that one of the sampling circuits which is in connection with the output circuit determined to be defective, and for shifting the plurality of sampling circuits in sequence to disable sampling of data by the output circuit determined to be defective.

(Third Configuration)

The driving circuit as set forth in the first or second configuration, the driving circuit including spare output circuits in a unit of colors constituting each display pixel, disabling the unit of outputs including the output circuit determined to be defective, and switching to the spare output circuits.

(Fourth Configuration)

A driving circuit including spare output circuits as set forth in the third configuration in a unit of three outputs, disabling three outputs including the output circuit determined to be defective, and switching to the spare output circuits.

(Fifth Configuration)

The driving circuit as set forth in the first or second configuration, the driving circuit including spare output circuits in a unit of an integer multiple of a unit of colors constituting each display pixel, disabling the unit of the integer multiple of outputs including the output circuit determined to be defective, and switching to the spare output circuits.

(Sixth Configuration)

A driving circuit including spare output circuits as set forth in the fifth configuration in a unit of six outputs, disabling six outputs including the output circuit determined to be defective, and switching to the spare output circuits.

(Seventh Configuration)

The driving circuit as set forth in the fifth or sixth configuration, the driving circuit being compatible to dot inversion drive.

(Eighth Configuration)

A driving circuit for driving a display device, the driving circuit including: a plurality of sampling circuits for loading display data in sequence in accordance with pulse signals prepared by counters and decoders; display output circuits connected to the sampling circuits respectively; decision means for determining whether the output circuits are good or defective; and a switching circuit for, when the decision section yields a result of determination indicative of a defect in any of the output circuits, switching the pulse signals to disable that one of the sampling circuits which is in connection with the output circuit determined to be defective, and for shifting the plurality of sampling circuits in sequence to disable sampling of data by the output circuit determined to be defective.

(Ninth Configuration)

The driving circuit as set forth in the eighth configuration, the driving circuit including spare output circuits in a unit of colors constituting each display pixel, disabling the unit of outputs including the output circuit determined to be defective, and switching to the spare output circuits.

(Tenth Configuration)

The driving circuit as set forth in the ninth configuration, the driving circuit including spare output circuits in a unit of three outputs as the unit of colors, disabling three outputs including the output circuit determined to be defective, and switching to the spare output circuits.

(Eleventh Configuration)

The driving circuit as set forth in the eighth configuration, the driving circuit including spare output circuits in a unit of an integer multiple of a unit of colors constituting each display pixel, disabling the unit of the integer multiple of outputs including the output circuit determined to be defective, and switching to the spare output circuits.

(Twelfth Configuration)

The driving circuit as set forth in the eleventh configuration, the driving circuit including spare output circuits in a unit of six outputs, disabling six outputs including the output circuit determined to be defective, and switching to the spare output circuits.

(Thirteenth Configuration)

The driving circuit as set forth in the eleventh or twelfth configuration, the driving circuit being compatible to dot inversion drive.

(Fourteenth Configuration)

A driving circuit for driving a display device, the driving circuit including: a sampling circuit for loading display data in a time-sharing manner; a plurality of first latch circuits for serially storing the display data loaded by the sampling circuit: a plurality of second latch circuits to which the display data is transferred from the first latch circuits after the loading of the display data by the sampling circuit in the time-sharing manner; output terminals connected to the display device; a group of output circuits, connectable to the output terminals, which produce outputs in accordance with the display data transferred to the second latch circuits; at least one spare output circuit connectable to the output terminals; decision means for determining whether the output circuits are good or defective; and a switching circuit for, when the decision section yields a result of determination indicative of a defect in any of the output circuits, shifting the output circuits, including the spare output circuit, in sequence to that one of the output terminals which was in connection with the output circuit determined to be defective, and for disabling the output circuit determined to be defective as a part of the group of output circuits.

(Fifteenth Configuration)

A driving circuit for driving a display device, the driving circuit including: a sampling circuit for loading display data in a time-sharing manner; a plurality of first latch circuits for serially storing the display data loaded by the sampling circuit; a plurality of second latch circuits to which the display data is transferred from the first latch circuits after the loading of the display data by the sampling circuit in the time-sharing manner; output terminals connected to the display device; a group of output circuit blocks, connectable to the output terminals, which produce outputs in accordance with the second latch circuits and the display data transferred to the second latch circuits; at least one spare output circuit block including spare output circuits connectable to the output terminals and spare second latch circuits; decision means for determining whether the output circuits are good or defective; and a switching circuit for, when the decision section yields a result of determination indicative of a defect in any of the output circuits, shifting the output circuit blocks, including the spare output circuit block, in sequence to that one of the output terminals which was in connection with the output circuit determined to be defective, and for disabling the output circuit determined to be defective as a part of the group of output circuit blocks.

(Sixteenth Configuration)

The driving circuit as set forth in the fourteenth or fifteenth configuration, the driving circuit including spare output circuits in a unit of colors constituting each display pixel, disabling the unit of outputs including the output circuit determined to be defective, and switching to the spare output circuits.

(Seventeenth Configuration)

The driving circuit as set forth in the sixteenth configuration, the driving circuit including spare output circuits a unit of three outputs as the unit of colors, disabling three outputs including the output circuit determined to be defective, and switching to the spare output circuits.

(Eighteenth Configuration)

The driving circuit as set forth in the fourteenth or fifteenth configuration, the driving circuit including spare output circuits in a unit of an integer multiple of a unit of colors constituting each display pixel, disabling the unit of the integer multiple of outputs including the output circuit determined to be defective, and switching to the spare output circuits.

(Nineteenth Configuration)

The driving circuit as set forth in the eighteenth configuration, the driving circuit including spare output circuits in a unit of six outputs, disabling six outputs including the output circuit determined to be defective, and switching to the spare output circuits.

(Twentieth Configuration)

The driving circuit as set forth in the eighteenth or nineteenth configuration, the driving circuit being compatible to dot inversion drive.

The present invention is not limited to the description of the embodiments above, but may be altered by a skilled person within the scope of the claims. An embodiment based on a proper combination of technical means disclosed in different embodiments is encompassed in the technical scope of the present invention.

A driving circuit according to the present invention is a driving circuit for driving a display panel, the driving circuit including: m (m being a natural number of 2 or more) output terminals connected to the display panel; m+1 output circuit blocks, provided for each separate one of the output terminals, which include (i) output circuits for outputting output signals for driving the display panel and (ii) output buffers, constituted by operational amplifiers, which buffer the output signals outputted from the output circuits and then output the output signals to the output terminals, respectively, the (m+1)th one of the output circuit blocks being a spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the plurality of output terminals; control means for controlling switching of the driving circuit between normal operation and self-detection repairing operation, for causing input signals to be inputted into the plurality of output circuits during the normal operation, and for causing a first test input signal to be inputted into the plurality of output circuits and a second test input signal to be inputted into the spare output circuit during the self-detection repairing operation; and self-repairing means for, after having been switched by the control means to the self-detection repairing operation, self-repairing the driving circuit if the driving circuit is defective, the self-repairing means including: comparing means for comparing the output signals outputted from the output circuits with the output signal outputted from the spare output circuit; decision means for determining, in accordance with a result of comparison made by the comparing means, whether any of the output circuits is defective or not; connection switching means for, when the decision means has determined all the output circuits to be good, connecting the hth (h being a natural number of m or less) output circuit to the hth output terminal, and for, when the decision means has determined the ith (i being a natural number of m or less) output circuit to be defective, connecting the jth U being a natural number of i−1 or less) output circuit to the jth output terminal and connecting the (k+1)th (k being a natural number of i or more to m or less) output circuit to the kth output terminal; and selecting means for, when the decision means has determined all the output circuits to be good, selecting the hth output circuit as an output circuit for loading that one of the input signals which corresponds to the hth output terminal, and for, when the decision means has determined the ith output circuit to be defective, selecting the jth output circuit as an output circuit for loading that one of the input signals which corresponds to the jth output terminal and selecting the (k+1)th output circuit as an output circuit for loading that one of the input signals which corresponds to the kth output terminal, the comparing means being constituted by the operational amplifiers of the output circuit blocks, the operational amplifiers of the output circuit blocks being controlled by switching control of the control means so that (i) the operational amplifiers switch to serving as the output buffers during the normal operation by receiving the output signals from the output circuits through positive input terminals and having their outputs negatively fed back through negative input terminals and (ii) the operational amplifiers switch to serving as the comparing means during the self-detection repairing operation by receiving the output signals from the output circuits through the positive input terminals and receiving the output signal from the spare output circuit through the negative input terminals.

Therefore, the driving circuit according to the present invention includes the decision means for determining the quality of each of the output circuits, and the connection switching means switches connections between the output terminals and the output circuits, as mentioned above, in accordance with a result of determination made by the decision means. That is, the driving circuit according to the present invention determines the quality of each of its output circuits and, if it detects a failure in any of its output circuits, carries out self-repairs by itself or, in other words, can use the normal output circuits to output video signals to the output terminals, without being repaired by a human being. Consequently, the driving circuit of the present invention can bring about an effect of being capable of self-repairing a defective output circuit detected, if any, and having more simplified wires connected to the output circuits.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention provides: a display-device driving integrated circuit, including specific means for detecting and self-repairing a defect in an output circuit, which is capable of coping with a failure in an output circuit more easily; and a display device including such a driving circuit. In particular, the present invention can be applied to large-size liquid crystal display devices and high-definition televisions.

The invention claimed is:

1. A driving circuit for driving a display panel, the driving circuit comprising:

m (m being a natural number of 2 or more) output terminals connected to the display panel;

m+1 output circuit blocks, provided for each separate one of the output terminals, which include (i) output circuits for outputting output signals for driving the display panel and (ii) output buffers, constituted by operational amplifiers, which buffer the output signals outputted from the output circuits and then output the output signals to the output terminals, respectively, the (m+1)th one of the output circuit blocks being a spare output circuit block including (i) a spare output circuit capable of outputting an output signal for driving the display panel and (ii) a spare output buffer, constituted by an operational amplifier, which is capable of buffering the output signal outputted from the spare output circuit and then outputting the output signal to the plurality of output terminals;

a control circuit for controlling switching of the driving circuit between normal operation and self-detection repairing operation, for causing input signals to be inputted into the plurality of output circuits during the normal operation, and for causing a first test input signal to be inputted into the plurality of output circuits and a second test input signal to be inputted into the spare output circuit during the self-detection repairing operation; and a self-repairing circuit for, after having been switched by the control circuit to the self-detection repairing operation, self-repairing the driving circuit if the driving circuit is defective, the self-repairing circuit including, a comparing circuit for comparing the output signals outputted from the output circuits with the output signal outputted from the spare output circuit;

a decision circuit for determining, in accordance with a result of comparison made by the comparing circuit, whether any of the output circuits is defective or not;

a connection switching circuit for, when the decision circuit has determined all the output circuits to be good, connecting the hth (h being a natural number of m or less) output circuit to the hth output terminal, and for, when the decision circuit has determined the ith (i being a natural number of m or less) output circuit to be defective, connecting the jth (j being a natural number of i−1 or less) output circuit to the jth output terminal and connecting the (k+1)th (k being a natural number of i or more to m or less) output circuit to the kth output terminal; and a selecting circuit for, when the decision circuit has determined all the output circuits to be good, selecting the hth output circuit as an output circuit for loading that one of the input signals which corresponds to the hth output terminal, and for, when the decision circuit has determined the ith output circuit to be defective, selecting the jth output circuit as an output circuit for loading that one of the input signals which corresponds to the jth output terminal and selecting the (k+1)th output circuit as an output circuit for loading that one of the input signals which corresponds to the kth output terminal, the comparing circuit being constituted by the operational amplifiers of the output circuit blocks, the operational amplifiers of the output circuit blocks being controlled by switching control of the control circuit so that (i) the operational amplifiers switch to serving as the output buffers during the normal operation by receiving the output signals from the output circuits through positive input terminals and having their outputs negatively fed back through negative input terminals and (ii) the operational amplifiers switch to serving as the comparing circuit during the self-detection repairing operation by receiving the output signals from the output circuits through the positive input terminals and receiving the output signal from the spare output circuit through the negative input terminals.

2. The driving circuit as set forth in claim 1, further comprising m+1 latch circuits, connected to the output circuits respectively, which latch the input signals that are loaded into the output circuits, wherein:

the selecting circuit is a shift register, having m+1 terminals connected to the latch circuits, which outputs selection signals for selecting which of the latch circuits latches its corresponding one of the input signals;

when the decision circuit has determined all the output circuits to be good, the shift register selects the hth latch circuit as a latch circuit for latching that one of the input signals which corresponds to the hth output terminal; and when the decision circuit has determined the ith output circuit to be defective, the shift register selects the jth latch circuit as a latch circuit for latching that one of the input signals which corresponds to the jth output terminal and selects the (k+1)th latch circuit as a latch circuit for latching that one of the input signals which corresponds to the kth output terminal.

3. The driving circuit as set forth in claim 2 wherein:

the output terminals are each composed of a plurality of sub-output terminals whose number is equal to the number of primary colors of each display pixel of the display panel;

the output circuits are each composed of a plurality of sub-output circuits whose number is equal to the number of primary colors; and when the decision circuit has determined that any of the output circuits has a defect in at least one of its sub-output circuits, the decision circuit determines that output circuit to be defective.

4. The driving circuit as set forth in claim 3, wherein the number of primary colors is 3.

5. The driving circuit as set forth in claim 2, wherein:

the output terminals are each composed of a plurality of sub-output terminals whose number is equal to a natural number multiple of the number of primary colors of each display pixel of the display panel;

the latch circuits are each composed of a plurality of sub-latch circuits whose number is equal to the natural number multiple of the number of primary colors;

the output circuits are each composed of a plurality of sub-output circuits whose number is equal to the natural number multiple of the number of primary colors;

when the decision circuit has determined that any of the output circuits has a defect in at least one of its sub-output circuits, the decision circuit determines that output circuit to be defective.

6. The driving circuit as set forth in claim 5, wherein the number of primary colors is 3 and the natural number is 2.

7. The driving circuit as set forth in claim 5, wherein:

the selecting circuit includes a plurality of connection terminals connected to the sub-output circuits in units of the number of primary colors; and the plurality of sub-output circuits are connected to any of the plurality of connection terminals in units of the number of primary colors.

8. The driving circuit as set forth in claim 1, further comprising m+1 latch circuits, connected to the output circuits respectively, which latch the input signals that are loaded into the output circuits, wherein:

the selecting circuit is a pointer circuit, having m terminals to be connected to the latch circuits, which switches connections between the m terminals and the latch circuits to select which of the latch circuits latches its corresponding one of the input signals;

when the decision circuit has determined all the output circuits to be good, the pointer circuit selects the hth latch circuit as a latch circuit for latching that one of the input signals which corresponds to the hth output terminal; and when the decision circuit has determined the ith output circuit to be defective, the pointer circuit selects the jth latch circuit as a latch circuit for latching that one of the input signals which corresponds to the jth output terminal and selects the (k+1)th latch circuit as a latch circuit for latching that one of the input signals which corresponds to the kth output terminal.

9. The driving circuit as set forth in claim 8 wherein:

the output terminals are each composed of a plurality of sub-output terminals whose number is equal to the number of primary colors of each display pixel of the display panel;

the latch circuits are each composed of a sub-latch circuits whose number is equal to the number of primary colors;

the output circuits are each composed of a plurality of sub-output circuits whose number is equal to the number of primary colors; and when the decision circuit has determined that any of the output circuits has a defect in at least one of its sub-output terminals, the decision circuit determines that output circuit to be defective.

10. The driving circuit as set forth in claim 9, wherein the number of primary colors is 3.

11. The driving circuit as set forth in claim 8, wherein:

the output terminals are each composed of a plurality of sub-output terminals whose number is equal to an integer multiple of the number of primary colors of each display pixel of the display panel;

the latch circuits are each composed of a plurality of sub-latch circuits whose number is equal to the integer multiple of the number of primary colors;

the output circuits are each composed of a plurality of sub-output circuits whose number is equal to the integer multiple of the number of primary colors;

when the decision section has determined that any of the output circuits has a defect in at least one of its sub-output circuits, the decision circuit determines that output circuit to be defective.

12. The driving circuit as set forth in claim 11, wherein the number of primary colors is 3 and the integer is 2.

13. The driving circuit as set forth in claim 11, wherein:

the selecting circuit includes a plurality of connection terminals connected to the sub-latch circuits in units of the number of primary colors; and the plurality of sub-latch circuits are connected to any of the plurality of connection terminals in units of the number of primary colors.

14. The driving circuit as set forth in claim 1, further comprising:

m latch circuits for loading the input signals corresponding to the output terminals; and m hold circuits, connected to the latch circuits respectively, which after all the latch circuits have loaded the input signals, receive the input signals from the latch circuits and send the input signals to the output circuits, wherein:

when the decision circuit has determined all the output circuits to be good, the selecting circuit connects the hth hold circuit to the hth output circuit; and when the decision circuit has determined the ith output circuit to be defective, the selection circuit connects the jth hold circuit to the jth output circuit and connects the kth hold circuit to the (k+1)th output circuit.

15. The driving circuit as set forth in claim 1, further comprising:

m latch circuits for loading the input signals corresponding to the output terminals; and m+1 hold circuits, connected to the outputs circuits respectively, which after all the latch circuits have loaded the input signals, receive the input signals from the latch circuits and send the input signals to the output circuits, wherein:

when the decision circuit has determined all the output circuits to be good, the selecting circuit connects the hth latch circuit to the hth hold circuit; and when the decision circuit has determined the ith output circuit to be defective, the selection circuit connects the jth latch circuit to the jth hold circuit and connects the kth latch circuit to the (k+1)th hold circuit.

16. The driving circuit as set forth in claim 14, wherein:

the output terminals are each composed of a plurality of sub-output terminals whose number is equal to the number of primary colors of each display pixel of the display panel;

the output circuits are each composed of a plurality of sub-output circuits whose number is equal to the number of primary colors;

the latch circuits are each composed of a plurality of sub-latch circuits whose number is equal to the number of primary colors;

the hold circuits are each composed of a plurality of sub-hold circuits whose number is equal to the number of primary colors;

when the decision circuit has determined that any of the output circuits has a defect in at least one of its sub-output circuits, the decision circuit determines that output circuit to be defective.

17. The driving circuit as set forth in claim 16, wherein the number of primary colors is 3.

18. The driving circuit as set forth in claim 14, wherein:

the output terminals are each composed of a plurality of sub-output terminals whose number is equal to an integer multiple of the number of primary colors of each display pixel of the display panel;

the latch circuits are each composed of a plurality of sub-latch circuits whose number is equal to the integer multiple of the number of primary colors;

the hold circuits are each composed of a plurality of sub-hold circuits whose number is equal to the integer multiple of the number of primary colors;

the output circuits are each composed of a plurality of sub-output circuits whose number is equal to the integer multiple of the number of primary colors;

when the decision circuit has determined that any of the output circuits has a defect in at least one of its sub-output circuits, the decision circuit determines that output circuit to be defective.

19. The driving circuit as set forth in claim 18, wherein the number of primary colors is 3 and the integer is 2.

20. The driving circuit as set forth in claim 18, wherein:

the selecting circuit includes a plurality of connection terminals connected to the sub-latch circuits in units of the number of primary colors; and the plurality of sub-latch circuits are connected to any of the plurality of connection terminals in units of the number of primary colors.

21. A display device comprising a driving circuit as set forth in claim 1.

* * * * *